United States Patent
Van Os et al.

(10) Patent No.: US 10,332,079 B2
(45) Date of Patent: Jun. 25, 2019

(54) USER INTERFACE FOR LOYALTY ACCOUNTS AND PRIVATE LABEL ACCOUNTS FOR A WEARABLE DEVICE

(71) Applicant: Apple Inc., Cupertino, CA (US)

(72) Inventors: Marcel Van Os, San Francisco, CA (US); Gregg Suzuki, Daly City, CA (US); Lawrence Y. Yang, San Francisco, CA (US); Peter Anton, San Francisco, CA (US); Donald W. Pitschel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/870,726

(22) Filed: Sep. 30, 2015

(65) Prior Publication Data

US 2016/0358134 A1 Dec. 8, 2016

Related U.S. Application Data

(63) Continuation of application No. 14/869,877, filed on Sep. 29, 2015.
(Continued)

(51) Int. Cl.
*G06Q 20/20* (2012.01)
*G06Q 20/10* (2012.01)
(Continued)

(52) U.S. Cl.
CPC ............ *G06Q 20/10* (2013.01); *G06Q 20/08* (2013.01); *G06Q 20/3278* (2013.01); *G06Q 20/34* (2013.01); *G06Q 20/36* (2013.01); *G06Q 20/40* (2013.01); *G06Q 20/4018* (2013.01); *G07F 17/0035* (2013.01)

(58) Field of Classification Search
None
See application file for complete search history.

(56) References Cited

U.S. PATENT DOCUMENTS 4,803,487 A  2/1989 Willard et al.
5,617,031 A  4/1997 Tuttle
(Continued)

FOREIGN PATENT DOCUMENTS

AU  2015100708 A4  7/2015
AU  2015100709 A4  7/2015
(Continued)

OTHER PUBLICATIONS

Final Office Action received for U.S. Appl. No. 14/869,715, dated Jun. 17, 2016, 35 pages.
(Continued)

*Primary Examiner* — Robert R Niquette
*Assistant Examiner* — William J Jacob
(74) *Attorney, Agent, or Firm* — Dentons US LLP

(57) ABSTRACT

The present disclosure generally relates to the use of loyalty accounts, private label payment accounts, and general payment accounts using a wearable electronic device with an electronic wallet. Various accounts are linked to the electronic device. In some examples, the electronic device is NFC-enabled. The electronic device may be used to provide loyalty account information and payment account information to a payment terminal, such as an NFC-enabled payment terminal.

39 Claims, 64 Drawing Sheets

Related U.S. Application Data

(60) Provisional application No. 62/230,430, filed on Jun. 5, 2015.

(51) Int. Cl.
  *G06Q 20/32* (2012.01)
  *G06Q 20/36* (2012.01)
  *G07F 17/00* (2006.01)
  *G06Q 20/40* (2012.01)
  *G06Q 20/34* (2012.01)
  *G06Q 20/08* (2012.01)

(56) References Cited

U.S. PATENT DOCUMENTS

| | | |
|---|---|---|
| 5,853,327 A | 12/1998 | Gilboa |
| 5,917,913 A | 6/1999 | Wang |
| 6,167,353 A | 12/2000 | Piernot et al. |
| 6,190,174 B1 | 2/2001 | Lam |
| 6,282,656 B1 | 8/2001 | Wang |
| 6,323,846 B1 | 11/2001 | Westerman et al. |
| 6,398,646 B1 | 6/2002 | Wei et al. |
| 6,570,557 B1 | 5/2003 | Westerman et al. |
| 6,677,932 B1 | 1/2004 | Westerman |
| 6,889,138 B1 | 5/2005 | Krull et al. |
| 6,922,147 B1 | 7/2005 | Viksnins et al. |
| 7,081,905 B1 | 7/2006 | Raghunath |
| 7,130,664 B1 | 10/2006 | Williams |
| 7,155,411 B1 | 12/2006 | Blinn et al. |
| 7,305,350 B1 | 12/2007 | Bruecken |
| 7,347,361 B2 | 3/2008 | Lovett |
| 7,496,527 B2 | 2/2009 | Silverstein et al. |
| 7,614,008 B2 | 11/2009 | Ording |
| 7,633,076 B2 | 12/2009 | Huppi et al. |
| 7,644,019 B2 | 1/2010 | Woda et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,810,720 B2 | 10/2010 | Lovett |
| 7,843,471 B2 | 11/2010 | Doan et al. |
| 7,844,914 B2 | 11/2010 | Andre et al. |
| 7,890,422 B1 | 2/2011 | Hirka et al. |
| 7,957,762 B2 | 6/2011 | Herz et al. |
| RE42,574 E | 7/2011 | Cockayne |
| 8,006,002 B2 | 8/2011 | Kalayjian et al. |
| 8,050,997 B1 | 11/2011 | Nosek et al. |
| 8,121,945 B2 | 2/2012 | Rackle et al. |
| 8,195,507 B2 | 6/2012 | Postrel |
| 8,195,576 B1 | 6/2012 | Grigg et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,392,259 B2 | 3/2013 | MacGillivray et al. |
| 8,453,940 B2 * | 6/2013 | Diamond .............. G06Q 20/04 235/380 |
| 8,479,122 B2 | 7/2013 | Hotelling et al. |
| 8,554,694 B1 | 10/2013 | Ward et al. |
| 8,571,937 B2 | 10/2013 | Rose et al. |
| 8,706,628 B2 | 4/2014 | Phillips |
| 8,763,896 B2 | 7/2014 | Kushevsky et al. |
| 8,831,677 B2 | 9/2014 | Villa-Real |
| 8,880,055 B1 | 11/2014 | Clement et al. |
| 8,892,474 B1 | 11/2014 | Inskeep et al. |
| 8,894,462 B2 | 11/2014 | Leyland et al. |
| 8,924,259 B2 | 12/2014 | Neighman et al. |
| 8,924,292 B1 | 12/2014 | Ellis et al. |
| 8,931,703 B1 | 1/2015 | Mullen et al. |
| 8,942,420 B2 | 1/2015 | Kim et al. |
| 8,983,539 B1 | 3/2015 | Kim et al. |
| 9,305,310 B2 | 4/2016 | Radhakrishnan et al. |
| 9,324,067 B2 | 4/2016 | Van Os et al. |
| 9,355,393 B2 | 5/2016 | Purves et al. |
| 9,405,766 B2 | 8/2016 | Robbin et al. |
| 9,483,763 B2 | 11/2016 | Van Os et al. |
| 9,547,419 B2 | 1/2017 | Yang et al. |
| 9,574,896 B2 | 2/2017 | McGavran et al. |
| 9,628,950 B1 | 4/2017 | Noeth et al. |
| 9,652,741 B2 | 5/2017 | Goldberg et al. |
| 9,940,637 B2 | 4/2018 | Van Os et al. |
| 2002/0015024 A1 | 2/2002 | Westerman et al. |
| 2002/0023215 A1 | 2/2002 | Wang et al. |
| 2002/0029169 A1 | 3/2002 | Oki et al. |
| 2002/0087262 A1 | 7/2002 | Bullock et al. |
| 2003/0006280 A1 | 1/2003 | Seita et al. |
| 2003/0061157 A1 | 3/2003 | Hirka et al. |
| 2003/0128237 A1 | 7/2003 | Sakai |
| 2003/0142227 A1 | 7/2003 | Van Zee |
| 2003/0151982 A1 | 8/2003 | Brewer et al. |
| 2003/0171984 A1 | 9/2003 | Wodka et al. |
| 2003/0181201 A1 | 9/2003 | Bomze et al. |
| 2003/0200184 A1 | 10/2003 | Dominguez et al. |
| 2004/0044953 A1 | 3/2004 | Watkins et al. |
| 2004/0100389 A1 | 5/2004 | Naito et al. |
| 2004/0169722 A1 | 9/2004 | Pena |
| 2004/0254891 A1 | 12/2004 | Blinn et al. |
| 2005/0117601 A1 | 6/2005 | Anderson et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0237194 A1 | 10/2005 | Voba |
| 2005/0253814 A1 | 11/2005 | Ghassabian |
| 2006/0000900 A1 | 1/2006 | Fernandes et al. |
| 2006/0017692 A1 | 1/2006 | Wehrenberg et al. |
| 2006/0021003 A1 | 1/2006 | Fisher et al. |
| 2006/0025923 A1 | 2/2006 | Dotan et al. |
| 2006/0026536 A1 | 2/2006 | Hotelling et al. |
| 2006/0033724 A1 | 2/2006 | Chaudhri et al. |
| 2006/0064313 A1 | 3/2006 | Steinbarth et al. |
| 2006/0064372 A1 | 3/2006 | Gupta |
| 2006/0079973 A1 | 4/2006 | Bacharach |
| 2006/0135064 A1 | 6/2006 | Cho et al. |
| 2006/0165060 A1 | 7/2006 | Dua |
| 2006/0173749 A1 | 8/2006 | Ward et al. |
| 2006/0179404 A1 | 8/2006 | Yolleck et al. |
| 2006/0197753 A1 | 9/2006 | Hotelling |
| 2006/0224882 A1 | 10/2006 | Chin |
| 2006/0294025 A1 | 12/2006 | Mengerink |
| 2007/0096283 A1 | 5/2007 | Ljung et al. |
| 2007/0096765 A1 | 5/2007 | Kagan |
| 2007/0131759 A1 | 6/2007 | Cox et al. |
| 2007/0162963 A1 | 7/2007 | Penet et al. |
| 2007/0188409 A1 | 8/2007 | Repetto et al. |
| 2007/0194110 A1 | 8/2007 | Esplin et al. |
| 2007/0194113 A1 * | 8/2007 | Esplin .................. G06Q 20/10 235/383 |
| 2007/0226778 A1 | 9/2007 | Pietruszka |
| 2007/0254712 A1 | 11/2007 | Chitti |
| 2007/0260558 A1 | 11/2007 | Look |
| 2008/0016443 A1 | 1/2008 | Hiroshima et al. |
| 2008/0027947 A1 | 1/2008 | Pritchett et al. |
| 2008/0040265 A1 * | 2/2008 | Rackley, III .......... G06Q 20/02 705/40 |
| 2008/0040786 A1 | 2/2008 | Chang |
| 2008/0041936 A1 | 2/2008 | Vawter |
| 2008/0052181 A1 | 2/2008 | Devitt-Carolan et al. |
| 2008/0077673 A1 | 3/2008 | Thomas et al. |
| 2008/0120029 A1 | 5/2008 | Zelek et al. |
| 2008/0120707 A1 | 5/2008 | Ramia |
| 2008/0165136 A1 | 7/2008 | Christie et al. |
| 2008/0214191 A1 | 9/2008 | Yach et al. |
| 2008/0221903 A1 | 9/2008 | Kanevsky et al. |
| 2008/0247519 A1 | 10/2008 | Abella et al. |
| 2008/0292074 A1 | 11/2008 | Boni et al. |
| 2008/0320391 A1 | 12/2008 | Lemay et al. |
| 2009/0030793 A1 | 1/2009 | Fordyce, III |
| 2009/0036165 A1 | 2/2009 | Brede |
| 2009/0037326 A1 | 2/2009 | Chitti et al. |
| 2009/0057396 A1 | 3/2009 | Barbour et al. |
| 2009/0083850 A1 | 3/2009 | Fadell et al. |
| 2009/0088207 A1 | 4/2009 | Sweeney et al. |
| 2009/0173784 A1 | 7/2009 | Yang |
| 2009/0182674 A1 | 7/2009 | Patel et al. |
| 2009/0195402 A1 | 8/2009 | Izadi et al. |
| 2009/0195469 A1 | 8/2009 | Lim et al. |

(56) References Cited

U.S. PATENT DOCUMENTS

| | | |
|---|---|---|
| 2009/0199130 A1 | 8/2009 | Tsern et al. |
| 2009/0203315 A1 | 8/2009 | Kawabata et al. |
| 2009/0207743 A1 | 8/2009 | Huq et al. |
| 2009/0210308 A1 | 8/2009 | Toomer et al. |
| 2009/0222748 A1 | 9/2009 | Lejeune et al. |
| 2009/0307139 A1 | 12/2009 | Mardikar et al. |
| 2009/0325630 A1 | 12/2009 | Tiitola et al. |
| 2010/0023449 A1 | 1/2010 | Skowronek et al. |
| 2010/0026453 A1 | 2/2010 | Yamamoto et al. |
| 2010/0042517 A1 | 2/2010 | Paintin et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0114731 A1 | 5/2010 | Kingston et al. |
| 2010/0125456 A1 | 5/2010 | Weng et al. |
| 2010/0131190 A1 | 5/2010 | Terauchi et al. |
| 2010/0149090 A1 | 6/2010 | Morris et al. |
| 2010/0153265 A1 | 6/2010 | Hershfield et al. |
| 2010/0161434 A1 | 6/2010 | Herwig et al. |
| 2010/0164864 A1 | 7/2010 | Chou |
| 2010/0185446 A1 | 7/2010 | Homma et al. |
| 2010/0223145 A1* | 9/2010 | Dragt .............. G06Q 20/20 705/17 |
| 2010/0267362 A1 | 10/2010 | Smith et al. |
| 2010/0272250 A1 | 10/2010 | Yap et al. |
| 2010/0287513 A1 | 11/2010 | Singh et al. |
| 2010/0306107 A1 | 12/2010 | Nahari |
| 2011/0010470 A1 | 1/2011 | Hulbert et al. |
| 2011/0059769 A1 | 3/2011 | Brunolli |
| 2011/0078025 A1 | 3/2011 | Shrivastav |
| 2011/0081860 A1 | 4/2011 | Brown et al. |
| 2011/0099079 A1 | 4/2011 | White |
| 2011/0145049 A1 | 6/2011 | Hertel et al. |
| 2011/0153628 A1 | 6/2011 | Basu et al. |
| 2011/0159959 A1 | 6/2011 | Mallinson et al. |
| 2011/0184820 A1 | 7/2011 | Mon et al. |
| 2011/0218849 A1 | 9/2011 | Rutigliano et al. |
| 2011/0225057 A1 | 9/2011 | Webb et al. |
| 2011/0225426 A1 | 9/2011 | Agarwal et al. |
| 2011/0244796 A1 | 10/2011 | Khan et al. |
| 2011/0250895 A1 | 10/2011 | Wohlert et al. |
| 2011/0251892 A1* | 10/2011 | Laracey .......... G06Q 30/0253 705/14.51 |
| 2012/0022872 A1 | 1/2012 | Gruber et al. |
| 2012/0028609 A1 | 2/2012 | Hruska |
| 2012/0036029 A1 | 2/2012 | Esplin et al. |
| 2012/0036556 A1 | 2/2012 | LeBeau et al. |
| 2012/0071146 A1 | 3/2012 | Shrivastava et al. |
| 2012/0078751 A1 | 3/2012 | MacPhail et al. |
| 2012/0084210 A1 | 4/2012 | Farahmand |
| 2012/0089300 A1 | 4/2012 | Wolterman |
| 2012/0089507 A1 | 4/2012 | Zhang et al. |
| 2012/0101881 A1 | 4/2012 | Taylor et al. |
| 2012/0101887 A1 | 4/2012 | Harvey et al. |
| 2012/0116669 A1 | 5/2012 | Lee et al. |
| 2012/0123937 A1 | 5/2012 | Spodak |
| 2012/0136780 A1 | 5/2012 | El-awady et al. |
| 2012/0185397 A1 | 7/2012 | Levovitz |
| 2012/0191603 A1 | 7/2012 | Nuzzi |
| 2012/0192094 A1 | 7/2012 | Goertz |
| 2012/0197740 A1 | 8/2012 | Grigg et al. |
| 2012/0198531 A1 | 8/2012 | Ort et al. |
| 2012/0209748 A1 | 8/2012 | Small |
| 2012/0215647 A1 | 8/2012 | Powell et al. |
| 2012/0221464 A1 | 8/2012 | Pasquero et al. |
| 2012/0232968 A1 | 9/2012 | Calman et al. |
| 2012/0236037 A1 | 9/2012 | Lessing et al. |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0284185 A1 | 11/2012 | Mettler et al. |
| 2012/0284297 A1 | 11/2012 | Aguera-Arcas et al. |
| 2012/0287290 A1 | 11/2012 | Jain et al. |
| 2012/0290449 A1 | 11/2012 | Mullen et al. |
| 2012/0290472 A1 | 11/2012 | Mullen et al. |
| 2012/0303268 A1 | 11/2012 | Su et al. |
| 2012/0310760 A1 | 12/2012 | Phillips et al. |
| 2012/0316777 A1 | 12/2012 | Kitta et al. |
| 2012/0317023 A1 | 12/2012 | Moon et al. |
| 2012/0322370 A1 | 12/2012 | Lee |
| 2012/0322371 A1 | 12/2012 | Lee |
| 2013/0006637 A1 | 1/2013 | Kanevsky et al. |
| 2013/0006746 A1 | 1/2013 | Moore |
| 2013/0041654 A1 | 2/2013 | Walker et al. |
| 2013/0047034 A1 | 2/2013 | Salomon et al. |
| 2013/0050263 A1 | 2/2013 | Khoe et al. |
| 2013/0065482 A1 | 3/2013 | Trickett |
| 2013/0076591 A1 | 3/2013 | Sirpal et al. |
| 2013/0080162 A1 | 3/2013 | Chang et al. |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0102298 A1 | 4/2013 | Goodman et al. |
| 2013/0103519 A1 | 4/2013 | Kountotsis et al. |
| 2013/0106603 A1 | 5/2013 | Weast et al. |
| 2013/0110719 A1 | 5/2013 | Carter et al. |
| 2013/0115932 A1 | 5/2013 | Williams et al. |
| 2013/0117022 A1 | 5/2013 | Chen et al. |
| 2013/0124319 A1 | 5/2013 | Hodge et al. |
| 2013/0124423 A1 | 5/2013 | Fisher |
| 2013/0125016 A1 | 5/2013 | Pallakoff et al. |
| 2013/0134212 A1 | 5/2013 | Chang |
| 2013/0141325 A1 | 6/2013 | Bailey |
| 2013/0141331 A1 | 6/2013 | Shiu et al. |
| 2013/0144706 A1 | 6/2013 | Qawami et al. |
| 2013/0166679 A1 | 6/2013 | Kuwahara |
| 2013/0179304 A1 | 7/2013 | Swist |
| 2013/0185059 A1 | 7/2013 | Riccardi |
| 2013/0189953 A1 | 7/2013 | Mathews |
| 2013/0189963 A1 | 7/2013 | Epp et al. |
| 2013/0198112 A1 | 8/2013 | Bhat |
| 2013/0200146 A1 | 8/2013 | Moghadam |
| 2013/0212655 A1 | 8/2013 | Hoyos et al. |
| 2013/0218721 A1 | 8/2013 | Borhan et al. |
| 2013/0219285 A1 | 8/2013 | Iwasaki |
| 2013/0219303 A1 | 8/2013 | Eriksson et al. |
| 2013/0232073 A1 | 9/2013 | Sheets et al. |
| 2013/0238455 A1 | 9/2013 | Laracey |
| 2013/0244615 A1 | 9/2013 | Miller |
| 2013/0246202 A1 | 9/2013 | Tobin |
| 2013/0254574 A1 | 9/2013 | Zacchio et al. |
| 2013/0282533 A1 | 10/2013 | Foran-Owens et al. |
| 2013/0297414 A1 | 11/2013 | Goldfarb et al. |
| 2013/0304651 A1 | 11/2013 | Smith |
| 2013/0320080 A1 | 12/2013 | Olson et al. |
| 2013/0322665 A1 | 12/2013 | Bennett et al. |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0339436 A1 | 12/2013 | Gray |
| 2013/0345975 A1 | 12/2013 | Vulcano et al. |
| 2013/0346273 A1 | 12/2013 | Stockton et al. |
| 2013/0346302 A1 | 12/2013 | Purves et al. |
| 2013/0346882 A1 | 12/2013 | Shiplacoff et al. |
| 2014/0003597 A1 | 1/2014 | Lazaridis et al. |
| 2014/0006285 A1 | 1/2014 | Chi et al. |
| 2014/0006949 A1 | 1/2014 | Briand et al. |
| 2014/0015546 A1 | 1/2014 | Frederick |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0052553 A1 | 2/2014 | Uzo |
| 2014/0058860 A1 | 2/2014 | Roh et al. |
| 2014/0058935 A1 | 2/2014 | Mijares |
| 2014/0058941 A1 | 2/2014 | Moon et al. |
| 2014/0064155 A1 | 3/2014 | Evans |
| 2014/0068751 A1 | 3/2014 | Last |
| 2014/0073252 A1 | 3/2014 | Lee et al. |
| 2014/0074407 A1 | 3/2014 | Hernandez-Silveira et al. |
| 2014/0074569 A1 | 3/2014 | Francis et al. |
| 2014/0074716 A1 | 3/2014 | Ni |
| 2014/0074717 A1 | 3/2014 | Evans |
| 2014/0081854 A1 | 3/2014 | Sanchez et al. |

(56) References Cited

U.S. PATENT DOCUMENTS

| | | |
|---|---|---|
| 2014/0084857 A1 | 3/2014 | Liu et al. |
| 2014/0094124 A1 | 4/2014 | Dave et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0134947 A1 | 5/2014 | Stouder-Studenmund |
| 2014/0138435 A1 | 5/2014 | Khalid |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0143737 A1 | 5/2014 | Mistry et al. |
| 2014/0149198 A1 | 5/2014 | Kim et al. |
| 2014/0155031 A1 | 6/2014 | Lee et al. |
| 2014/0156531 A1 | 6/2014 | Poon et al. |
| 2014/0160033 A1 | 6/2014 | Brikman et al. |
| 2014/0164241 A1 | 6/2014 | Neuwirth |
| 2014/0167986 A1 | 6/2014 | Parada et al. |
| 2014/0172533 A1 | 6/2014 | Andrews et al. |
| 2014/0173455 A1 | 6/2014 | Shimizu et al. |
| 2014/0180582 A1 | 6/2014 | Pontarelli et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0191715 A1 | 7/2014 | Wechlin et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0236840 A1 | 8/2014 | Islam |
| 2014/0237389 A1 | 8/2014 | Ryall et al. |
| 2014/0244495 A1 | 8/2014 | Davis et al. |
| 2014/0247229 A1 | 9/2014 | Cho et al. |
| 2014/0273975 A1 | 9/2014 | Barat et al. |
| 2014/0279442 A1 | 9/2014 | Luoma et al. |
| 2014/0279474 A1 | 9/2014 | Evans et al. |
| 2014/0279497 A1 | 9/2014 | Qaim-maqami et al. |
| 2014/0279556 A1 | 9/2014 | Priebatsch et al. |
| 2014/0282987 A1 | 9/2014 | Narendra et al. |
| 2014/0292396 A1 | 10/2014 | Bruwer et al. |
| 2014/0297385 A1 | 10/2014 | Ryan |
| 2014/0320387 A1 | 10/2014 | Eriksson et al. |
| 2014/0337207 A1 | 11/2014 | Zhang et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0344082 A1 | 11/2014 | Soundararajan |
| 2014/0359454 A1 | 12/2014 | Lee et al. |
| 2014/0359481 A1 | 12/2014 | Dawson et al. |
| 2014/0365113 A1 | 12/2014 | McGavran et al. |
| 2014/0370807 A1 | 12/2014 | Lei et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0014141 A1 | 1/2015 | Rao et al. |
| 2015/0017956 A1 | 1/2015 | Jeong |
| 2015/0020081 A1 | 1/2015 | Cho et al. |
| 2015/0039494 A1 | 2/2015 | Sinton et al. |
| 2015/0044965 A1 | 2/2015 | Kamon et al. |
| 2015/0051846 A1 | 2/2015 | Masuya |
| 2015/0056957 A1 | 2/2015 | Mardikar et al. |
| 2015/0058146 A1 | 2/2015 | Gaddam et al. |
| 2015/0061972 A1 | 3/2015 | Seo et al. |
| 2015/0065035 A1 | 3/2015 | Kim et al. |
| 2015/0066758 A1 | 3/2015 | DeNardis et al. |
| 2015/0067580 A1 | 3/2015 | Um et al. |
| 2015/0077362 A1 | 3/2015 | Seo |
| 2015/0094031 A1 | 4/2015 | Liu |
| 2015/0095174 A1 | 4/2015 | Dua |
| 2015/0121405 A1 | 4/2015 | Ekselius et al. |
| 2015/0127539 A1 | 5/2015 | Ye et al. |
| 2015/0178878 A1 | 6/2015 | Huang |
| 2015/0186871 A1 | 7/2015 | Laracey |
| 2015/0243246 A1 | 8/2015 | Mun et al. |
| 2015/0257004 A1 | 9/2015 | Shanmugam et al. |
| 2015/0287403 A1 | 10/2015 | Holzer zaslansky et al. |
| 2015/0302493 A1 | 10/2015 | Batstone et al. |
| 2015/0302510 A1 | 10/2015 | Godsey et al. |
| 2015/0339652 A1 | 11/2015 | Park et al. |
| 2015/0348001 A1 | 12/2015 | Van Os et al. |
| 2015/0348002 A1 | 12/2015 | Van Os et al. |
| 2015/0348009 A1* | 12/2015 | Brown .............. G06Q 20/3227 705/16 |
| 2015/0348014 A1 | 12/2015 | Van Os et al. |
| 2015/0348029 A1 | 12/2015 | Van Os et al. |
| 2015/0350448 A1 | 12/2015 | Coffman et al. |
| 2016/0005028 A1 | 1/2016 | Mayblum et al. |
| 2016/0012465 A1 | 1/2016 | Sharp |
| 2016/0021003 A1 | 1/2016 | Pan |
| 2016/0043905 A1 | 2/2016 | Fiedler |
| 2016/0048705 A1 | 2/2016 | Yang et al. |
| 2016/0061613 A1 | 3/2016 | Jung et al. |
| 2016/0061623 A1 | 3/2016 | Pahwa et al. |
| 2016/0062572 A1 | 3/2016 | Yang et al. |
| 2016/0104228 A1 | 4/2016 | Sundaresan |
| 2016/0134737 A1 | 5/2016 | Pulletikurty |
| 2016/0160305 A1 | 6/2016 | Dresser et al. |
| 2016/0224966 A1 | 8/2016 | Van Os et al. |
| 2016/0224973 A1 | 8/2016 | Van Os et al. |
| 2016/0238402 A1 | 8/2016 | Mcgavran et al. |
| 2016/0253665 A1 | 9/2016 | Van Os et al. |
| 2016/0259489 A1 | 9/2016 | Yang |
| 2016/0260414 A1 | 9/2016 | Yang |
| 2016/0358133 A1 | 12/2016 | Van Os et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2017/0004507 A1 | 1/2017 | Henderson et al. |
| 2017/0011210 A1 | 1/2017 | Cheong et al. |
| 2017/0032375 A1 | 2/2017 | Van Os et al. |
| 2017/0083188 A1 | 3/2017 | Yang et al. |
| 2017/0160098 A1 | 6/2017 | Mcgavran et al. |
| 2017/0357972 A1 | 12/2017 | Van os et al. |

FOREIGN PATENT DOCUMENTS

| | | |
|---|---|---|
| AU | 2016100796 A4 | 6/2016 |
| CN | 101171604 A | 4/2008 |
| CN | 101730907 A | 6/2010 |
| CN | 101877748 A | 11/2010 |
| CN | 102282578 A | 12/2011 |
| CN | 103067625 A | 4/2013 |
| CN | 103139370 A | 6/2013 |
| CN | 103413218 A | 11/2013 |
| CN | 103458215 A | 12/2013 |
| CN | 103778533 A | 5/2014 |
| CN | 103853328 A | 6/2014 |
| CN | 103970208 A | 8/2014 |
| CN | 104024987 A | 9/2014 |
| CN | 104038256 A | 9/2014 |
| CN | 104205785 A | 12/2014 |
| CN | 104272854 A | 1/2015 |
| CN | 104281430 A | 1/2015 |
| CN | 104346297 A | 2/2015 |
| EP | 0836074 A2 | 4/1998 |
| EP | 1614992 A1 | 1/2006 |
| EP | 1858238 A2 | 11/2007 |
| EP | 2096413 A1 | 9/2009 |
| EP | 2247087 A1 | 11/2010 |
| EP | 2306692 A1 | 4/2011 |
| EP | 2341315 A1 | 7/2011 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2654275 A1 | 10/2013 |
| EP | 2672377 A2 | 12/2013 |
| EP | 2701107 A1 | 2/2014 |
| EP | 2720442 A1 | 4/2014 |

(56) References Cited

FOREIGN PATENT DOCUMENTS

| | | |
|---|---|---|
| EP | 2725537 A1 | 4/2014 |
| GB | 2505476 A | 3/2014 |
| JP | 6-284182 A | 10/1994 |
| JP | 11-73530 A | 3/1999 |
| JP | 11-183183 A | 7/1999 |
| JP | 2002-99854 A | 4/2002 |
| JP | 2003-16398 A | 1/2003 |
| JP | 2003-346059 A | 12/2003 |
| JP | 2004-104813 A | 4/2004 |
| JP | 2004-252736 A | 9/2004 |
| JP | 2004-258738 A | 9/2004 |
| JP | 2005-521961 A | 7/2005 |
| JP | 2005-523505 A | 8/2005 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-277670 A | 10/2006 |
| JP | 2007-34637 A | 2/2007 |
| JP | 2007-334637 A | 12/2007 |
| JP | 2009-502048 A | 1/2009 |
| JP | 2009-49878 A | 3/2009 |
| JP | 2009-99076 A | 5/2009 |
| JP | 2009-134521 A | 6/2009 |
| JP | 2010-503082 A | 1/2010 |
| JP | 2011-519439 A | 7/2011 |
| JP | 2011-237857 A | 11/2011 |
| JP | 2012-504273 A | 2/2012 |
| JP | 2012-508930 A | 4/2012 |
| JP | 2012-215981 A | 11/2012 |
| JP | 2013-20496 A | 1/2013 |
| JP | 2013-34322 A | 2/2013 |
| JP | 2013-530445 A | 7/2013 |
| JP | 2013-533532 A | 8/2013 |
| JP | 5267966 B2 | 8/2013 |
| JP | 2013-222410 A | 10/2013 |
| JP | 2014-41616 A | 3/2014 |
| JP | 2014-44719 A | 3/2014 |
| JP | 2014-44724 A | 3/2014 |
| JP | 2014-53692 A | 3/2014 |
| JP | 2014-123169 A | 7/2014 |
| JP | 2014-191653 A | 10/2014 |
| KR | 10-2004-0049502 A | 6/2004 |
| KR | 10-2006-0098024 A | 9/2006 |
| KR | 10-2008-0064395 A | 7/2008 |
| KR | 10-2011-0056561 A | 5/2011 |
| KR | 10-2012-0040693 A | 4/2012 |
| KR | 10-1184865 B1 | 9/2012 |
| KR | 10-2013-0027326 A | 3/2013 |
| KR | 10-2013-0116905 A | 10/2013 |
| KR | 10-1330962 A | 11/2013 |
| KR | 10-2014-0018019 A | 2/2014 |
| KR | 10-2014-0026263 A | 3/2014 |
| KR | 10-2014-0027029 A | 3/2014 |
| KR | 10-2014-0055429 A | 5/2014 |
| KR | 10-2014-0105309 A | 9/2014 |
| TW | 201012152 A | 3/2010 |
| TW | 201137722 A | 11/2011 |
| TW | 201215086 A | 4/2012 |
| TW | 201316247 A | 4/2013 |
| TW | 201324310 A | 6/2013 |
| TW | 201409345 A | 3/2014 |
| TW | M474482 U | 3/2014 |
| TW | 201509168 A | 3/2015 |
| WO | 2003/083793 A2 | 10/2003 |
| WO | 2003/093765 A2 | 11/2003 |
| WO | 2007/000012 A1 | 1/2007 |
| WO | 2007/008321 A2 | 1/2007 |
| WO | 2007/105937 A1 | 9/2007 |
| WO | 2007/116521 A1 | 10/2007 |
| WO | 2010/039337 A2 | 4/2010 |
| WO | 2010/056484 A2 | 5/2010 |
| WO | 2010/077960 A2 | 7/2010 |
| WO | 2011/063516 A1 | 6/2011 |
| WO | 2012/083113 A2 | 6/2012 |
| WO | 2012/172970 A1 | 12/2012 |
| WO | 2013/023224 A2 | 2/2013 |
| WO | 2013/169875 A2 | 11/2013 |
| WO | 2013/177548 A1 | 11/2013 |
| WO | 2014/074407 A1 | 5/2014 |
| WO | 2014078965 A1 | 5/2014 |
| WO | 2014/115605 A1 | 7/2014 |
| WO | 2014/171734 A2 | 10/2014 |
| WO | 2015/009581 A1 | 1/2015 |
| WO | 2015/030912 A1 | 3/2015 |
| WO | 2015/051361 A1 | 4/2015 |

OTHER PUBLICATIONS

Invitation to Pay Additional Fees received for PCT Patent Application No. PCT/US2016/033751, dated Jul. 22, 2016, 2 pages.
Non Final Office Action received for U.S. Appl. No. 14/869,715, dated Jan. 29, 2016, 62 pages.
Office Action received for Australian Patent Application No. 2016100795, dated Aug. 12, 2016, 6 pages.
Office Action received for Taiwanese Patent Application No. 104117508, dated Jul. 20, 2016, 19 pages (8 pages of English Translation and 11 pages of Official Copy).
International Search Report and Written Opinion received for PCT Patent Application no. PCT/US2016/015316, dated Mar. 8, 2016, 13 pages.
Non Final Office Action received for U.S. Appl. No. 14/869,831, dated Jan. 29, 2016, 18 pages.
Notice of Allowance received for U.S. Appl. No. 14/864,011, dated Apr. 28, 2016, 5 pages.
Office Action received for Australian Patent Application No. 2016100090, dated Apr. 13, 2016, 7 pages.
Office Action received for Danish Patent Application No. PA201670042, dated Mar. 31, 2016, 10 pages.
Non Final Office Action received for U.S. Appl. No. 14/503,364, dated Feb. 3, 2016, 16 pages.
Final Office Action received for U.S. Appl. No. 14/836,754, dated Mar. 22, 2016, 17 pages.
Non Final Office Action received for U.S. Appl. No. 14/839,913, dated Mar. 2, 2016, 11 pages.
Non Final Office Action received for U.S. Appl. No. 14/864,011, dated Jan. 21, 2016, 10 pages.
Notice of Allowance received for Chinese Patent Application No. 201520358683.8, dated Mar. 10, 2016, 5 pages (3 pages of English Translation and 2 pages of Official Copy).
Office Action received for Australian Patent Application No. 2016100155, dated May 4, 2016, 7 pages.
Office Action received for German Patent Application No. 2020150042678, dated Nov. 4, 2015, 5 pages (3 pages of English Translation and 2 pages of Official Copy).
Easyvideoguides, Mapquest, available on : <https://www.youtube.com/watch?v=7sDIDNM2bCI,> Dec. 26, 2007, 4 pages.
Office Action received for Danish Patent Application No. PA201570664, dated Mar. 15, 2016, 10 pages.
Office Action received for Danish Patent Application No. PA201570665, dated Mar. 31, 2016, 9 pages.
Office Action received for Danish Patent Application No. PA201670074, dated Apr. 7, 2016, 8 pages.
International Search Report and Written Opinion received for PCT Application No. PCT/US2015/046892, dated Jan. 27, 2016, 20 pages.
International Search Report and Written Opinion received for PCT Application No. PCT/US2015/047507, dated Feb. 22, 2016, 22 pages.
Invitation to Pay Additional Fees received for PCT Patent Application No. PCT/US2015/047507, dated Jan. 4, 2016, 8 pages.
International Search Report and Written Opinion received for PCT Patent Application No. PCT/US2015/055165, dated Apr. 20, 2016, 22 pages.
Invitation to Pay Additional Fees received for PCT Patent Application No. PCT/US2015/055165, dated Jan. 18, 2016, 6 pages.
Advisory Action received for U.S. Appl. No. 14/503,296, dated Oct. 2, 2015, 3 pages.

(56) References Cited

OTHER PUBLICATIONS

Non-Final Office Action received for U.S. Appl. No. 14/503,072, dated Jun. 17, 2016, 19 pages.
Notice of Allowance received for U.S. Appl. No. 14/503,364, dated Jun. 16, 2016, 11 pages.
Office Action received for Australian Patent Application No. 2016100367, dated May 25, 2016, 3 pages.
Office Action received for Australian Patent Application No. 2016100383, dated Jun. 9, 2016, 2 pages.
Office Action received for Danish Patent Application No. PA201570664, dated Jun. 3, 2016, 3 pages.
Office Action received for Taiwanese Patent Application No. 104114953, dated Jun. 8, 2016, 11 pages (5 pages of English Translation and 6 pages of Official Copy).
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Office Action received for Danish Patent Application No. PA201670074, dated Jun. 28, 2016, 5 pages.
Office Action received for Chinese Patent Application No. 201620119869.2, dated Jun. 3, 2016, 3 pages.
Office Action received for Danish Patent Application No. PA201670042, dated Jun. 23, 2016, 5 pages.
Final Office Action received for U.S. Appl. No. 14/869,831, dated Aug. 2, 2016, 14 pages.
Non-Final Office Action received for U.S. Appl. No. 14/719,217, dated Jul. 28, 2016, 28 pages.
Non-Final Office Action received for U.S. Appl. No. 14/839,913, dated Jul. 28, 2016, 12 pages.
Notice of Allowance received for U.S. Appl. No. 14/839,913, dated Aug. 11, 2016, 5 pages.
Office Action received for Chinese Patent Application No. 201620101636.X, dated May 25, 2016, 3 pages (1 page of English Translation and 2 pages of Official Copy).
International Search Report and Written Opinion received for PCT Patent Application No. PCT/US2016/016621, dated May 9, 2016, 12 pages.
Non-final Office Action received for U.S. Appl. No. 14/864,011, dated Jun. 10, 2016, 10 pages.
Final Office Action received for U.S. Appl. No. 14/503,072, dated Sep. 1, 2015, 16 pages.
Non Final Office Action received for U.S. Appl. No. 14/503,072, dated Jan. 26, 2015, 12 pages.
Final Office Action received for U.S. Appl. No. 14/503,296, dated Jul. 2, 2015, 7 pages.
Non Final Office Action received for U.S. Appl. No. 14/503,296, dated Jan. 30, 2015, 16 pages.
Non-Final Office Action received for U.S. Appl. No. 14/503,381, dated May 13, 2015, 13 pages.
Notice of Allowance received for the U.S. Appl. No. 14/503,381, dated Dec. 16, 2015, 8 pages.
Non Final Office Action received for U.S. Appl. No. 14/836,754, dated Nov. 17, 2015, 15 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Notice of Allowance received for Chinese Patent Application No. 201520357381.9, dated Jul. 29, 2015, 4 pages (2 pages of English Translation and 2 pages of Official Copy).
Office Action received for Chinese Patent Application No. 201520358683.8, dated Sep. 2, 2015, 4 pages (2 pages of English Translation and 2 pages of Official Copy).
Kamijo, Noboru, "Next Generation Mobile System—WatchPad1.5", Available at <http://researcher.ibm.com/researcher/view_group_subpage.php?id=5617>, accessed on Jul. 4, 2015, 2 pages.

Npasqua, "Maps: ability to swipe step by step in turn-by-turn mode", 2012, Apple Support Communities, Available at: <https://discussions.apple.com/thread/4424256?start=O&tstart=0>.
International Search Report and Written Opinion received for PCT Application No. PCT/US2015/033326, dated Aug. 10, 2015, 13 pages.
International Search Report and Written Opinion received for PCT Patent Application No. PCT/US2015/033380, dated Aug. 10, 2015, 13 pages.
Invitation to Pay Additional Fees and Partial Search Report received for PCT Patent Application No. PCT/US2015/046892, dated Nov. 4, 2015, 5 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/025188, dated Jun. 23, 2015, 11 pages.
Final Office Action received for U.S. Appl. No. 14/869,715, dated Oct. 6, 2016, 37 pages.
Final Office Action received for U.S. Appl. No. 14/869,877, dated Aug. 3, 2016, 13 pages.
International Search Report and Written Opinion received for PCT Patent Application No. PCT/US16/34175, dated Oct. 7, 2016, 17 pages.
International Search Report and Written Opinion received for PCT Patent Application No. PCT/US2016/033751, dated Oct. 5, 2016, 14 pages.
Invitation to Pay Additional Fees received for PCT Patent Application No. PCT/US16/34175, dated Aug. 11, 2016, 3 pages.
Non Final Office Action received for U.S. Appl. No. 14/503,327, dated Sep. 12, 2016, 10 pages.
Non Final Office Action received for U.S. Appl. No. 14/870,793, dated Apr. 19, 2016, 17 pages.
Non-Final Office Action received for U.S. Appl. No. 14/503,296, dated Oct. 5, 2016, 11 pages.
Non-Final Office Action received for U.S. Appl. No. 14/869,715, dated Oct. 11, 2016, 37 pages.
Non-Final Office Action received for U.S. Appl. No. 15/137,944, dated Oct. 18, 2016, 10 pages.
Non-Final Office Action received for U.S. Appl. No. 14/870,694, dated Sep. 23, 2016, 13 pages.
Non Final Office Action received for U.S. Appl. No. 14/869,877, dated Jan. 29, 2016, 18 pages.
Notice of Allowance received for Danish Patent Application No. PA201570771, dated Sep. 2, 2016, 2 pages.
Notice of Allowance received for U.S. Appl. No. 14/864,011, dated Oct. 5, 2016, 5 pages.
Office Action received for Australian Patent Application No. 2016100090, dated Oct. 7, 2016, 3 pages.
Office Action received for Australian Patent Application No. 2016100796, dated Aug. 26, 2016, 6 pages.
Office Action received for Danish Patent Application No. PA201570771, dated Jun. 13, 2016, 3 pages.
Office Action received for Danish Patent Application No. PA201570771, dated Mar. 17, 2016, 8 pages.
Office Action Received for Danish Patent Application No. PA201570773, dated Mar. 18, 2016, 9 pages.
Office Action received for Chinese Patent Application No. 201620480846.4, dated Sep. 14, 2016, 3 pages (1 page of English Translation and 2 pages of Official Copy).
Office Action received for Danish Patent Application No. PA201570665, dated Sep. 5, 2016, 3 pages.
Office Action received for Danish Patent Application No. PA201570773, dated Sep. 12, 2016, 3 pages.
Office Action received for Taiwanese Patent Application No. 104128700, dated Aug. 31, 2016, 13 pages (6 pages of English Translation and 7 pages of Official Copy).
Office Action received for Taiwanese Patent Application No. 104133757, dated Jul. 6, 2016, 22 pages (9 pages of English Translation and 13 pages of Official Copy).

(56) References Cited

OTHER PUBLICATIONS

Ehowtech, "How to Get Written Directions on a Garmin : Using a Garmin", available online at: https://www.youtube.com/watch?v=s_EKT6qH4LI, Dec. 2, 2012, 1 page.
Non-Final Office Action received for U.S. Appl. No. 14/836,754, dated Oct. 21, 2016, 18 pages.
Office Action received for Australian Patent Application No. 2016100367, dated Oct. 26, 2016, 3 pages.
Office Action received for Chinese Patent Application No. 201620101636.X, dated Oct. 13, 2016, 3 pages (1 page of English Translation and 2 pages of Official Copy).
Office Action received for Chinese Patent Application No. 201620480708.6, dated Sep. 14, 2016, 3 pages (1 page of English Translation and 2 pages of Official Copy).
Office Action received for Danish Patent Application No. PA201670363, dated Nov. 4, 2016, 11 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
Office Action received for Australian Patent Application No. 2016100383, dated Nov. 11, 2016, 3 pages.
Office Action received for Chinese Patent Application No. 201620509362.8, dated Oct. 21, 2016, 3 pages (1 page of English Translation and 2 pages of Official Copy).
Office Action received for Chinese Patent Application No. 201620509515.9, dated Nov. 9, 2016, 2 pages (1 page of English Translation and 1 page of Official Copy).
Office Action Received for Danish Patent Application No. PA 201670709, dated Nov. 30, 2016, 10 pages.
Office Action received for Danish Patent Application No. PA201670362, dated Nov. 21, 2016, 11 pages.
Office Action received for Danish Patent Application No. PA201670710, dated Dec. 8, 2016, 10 pages.
Office Action received for Taiwanese Patent Application No. 104128689, dated Nov. 14, 2016, 12 pages (5 pages of English Translation and 7 pages of Official Copy).
Office Action received for Danish Patent Application No. PA201570664, dated Dec. 14, 2016, 2 pages.
Advisory Action received for U.S. Appl. No. 14/869,715, dated Feb. 8, 2017, 3 pages.
Advisory Action received for U.S. Appl. No. 14/869,877, dated Jan. 5, 2017, 3 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages
Final Office Action received for U.S. Appl. No. 14/870,793, dated Jan. 19, 2017, 16 pages.
"IOS Security", White Paper, Available online at <https://web.archive.org/web/20150526223200/http://www.apple.com/business/docs/iOS_Security_Guide.pdf>, Apr. 2015, 55 pages.
Office Action received for Australian Patent Application No. 2016100795, dated Feb. 6, 2017, 3 pages.
Office Action received for Australian Patent Application No. 2016100796, dated Feb. 13, 2017, 4 pages.
Office Action received for Chinese Patent Application No. 201620119869.2, dated Nov. 22, 2016, 2 pages (Official Copy only). {See Communication Under 37 CFR § 1.98(a) (3)}.
Office Action received for Chinese Patent Application No. 201620480846.4, dated Jan. 9, 2017, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).

Office Action received for Danish Patent Application No. PA201670749, dated Jan. 30, 2017, 11 pages.
Office Action received for Danish Patent Application No. PA201670751, dated Jan. 13, 2017, 9 pages.
Office Action received for Danish Patent Application No. PA201670042, dated Feb. 15, 2017, 3 pages.
Office Action received for Australian Patent Application No. 2017100070, dated Mar. 16, 2017, 6 pages.
Office Action received for Australian Patent Application No. 2017201064, dated Mar. 9, 2017, 2 pages.
Office Action received for Australian Patent Application No. 2017201068, dated Mar. 10, 2017, 2 pages.
Office Action received for Danish Patent Application No. PA201670074, dated Mar. 16, 2017, 2 pages.
Office Action received for Taiwanese Patent Application No. 104114953, dated Feb. 18, 2017, 9 pages (4 pages of English Translation and 5 pages of Official copy).
Final Office Action received for U.S. Appl. No. 14/503,072, dated Mar. 2, 2017, 9 pages.
Final Office Action received for U.S. Appl. No. 14/869,715, dated Mar. 7, 2017, 41 pages.
Final Office Action received for U.S. Appl. No. 14/719,217, dated Feb. 23, 2017, 37 pages.
Final Office Action received for U.S. Appl. No. 15/137,944, dated Feb. 27, 2017, 11 pages.
Intention to Grant received for Danish Patent Application No. PA201570665, dated Feb. 28, 2017, 2 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/046892, dated Mar. 16, 2017, 14 pages.
International Preliminary Report on Patentability received for PCT Patent Application No. PCT/US2015/047507, dated Mar. 16, 2017, 16 pages.
Notice of Allowance received for Danish Patent Application No. PA201570664, dated Feb. 20, 2017, 2 pages.
Office Action received for Australian Patent Application No. 2016102031, dated Feb. 28, 2017, 4 pages.
Office Action received for Chinese Patent Application No. 201620509362.8, dated Feb. 10, 2017, 2 pages (Official Copy only) (see attached 37 CFR § 1.98(a) (3)).
Office Action received for Danish Patent Application No. PA201570773, dated Feb. 15, 2017, 3 pages.
Office Action received for Danish Patent Application No. PA201670362, dated Jun. 1, 2017, 6 pages.
Office Action received for Australian Patent Application No. 2017100231, dated Apr. 13, 2017, 3 pages.
Extended European Search Report received for European Patent Application No. 18178147.7, dated Oct. 4, 2018, 8 pages.
Notice of Allowance received for Taiwanese Patent Application No. 104128689, dated Aug. 28, 2018, 5 pages (2 pages of English Translation and 3 pages of Official copy).
Office Action received for Chinese Patent Application No. 201710093861.2, dated Sep. 14, 2018, 15 pages (6 pages of English Translation and 9 pages of Official copy).
Office Action received for European Patent Application No. 15787091.6, dated Oct. 8, 2018, 7 pages.
Corrected Notice of Allowance received for U.S. Appl. No. 14/839,897, dated Jan. 23, 2019, 6 pages.
Notice of Allowance received for Japanese Patent Application No. 2016-558332, dated Jan. 11, 2019, 4 pages (1 page of English Translation and 3 pages of Official Copy).
Office Action received for Australian Patent Application No. 2018200628, dated Jan. 24, 2019, 3 pages.
Office Action received for Australian Patent Application No. 2018202559, dated Jan. 16, 2019, 6 pages.
Office Action received for Chinese Patent Application No. 201580043701.6, dated Dec. 24, 2018, 20 pages (5 pages of English Translation and 15 pages of Official copy).

(56) References Cited

OTHER PUBLICATIONS

Office Action received for Chinese Patent Application No. 201610371774.4, dated Dec. 19, 2018, 13 pages (5 pages of English Translation and 8 pages of Official copy).
Office Action received for Chinese Patent Application No. 201610371856.9, dated Dec. 19, 2018, 12 pages (5 pages of English Translation and 7 pages of Official Copy).
Office Action received for Korean Patent Application No. 10-2017-7034558, dated Dec. 15, 2018, 15 pages (7 pages of English Translation and 8 pages of Official Copy).
Supplemental Notice of Allowance received for U.S. Appl. No. 14/870,694, dated Jan. 17, 2019, 3 pages.
International Preliminary Report on Patentability received for PCT Patent Application No. PCT/US2017/031748, dated Dec. 20, 2018, 10 pages.
Notice of Allowance received for U.S. Appl. No. 14/839,903, dated Jan. 3, 2019, 7 pages.
Notice of Allowance received for U.S. Appl. No. 15/294,439, dated Jan. 8, 2019, 8 pages.
Office Action received for Chinese Patent Application No. 201510284715.9, dated Dec. 21, 2018, 22 pages (5 pages of English Translation and 17 pages of Official Copy).
Office Action received for Chinese Patent Application No. 201610084974.1, dated Dec. 5, 2018, 6 pages (3 pages of English Translation and 3 pages of Official Copy).
Office Action received for Chinese Patent Application No. 201710094150.7 dated Dec. 19, 2018, 12 Pages. (5 pages of English translation and 7 pages of Official Copy).
Notice of Allowance received for U.S. Appl. No. 14/870,694, dated Dec. 11, 2018, 6 pages.
Office Action received for Australian Patent Application No. 2016270323, dated Nov. 26, 2018, 4 pages.
Office Action received for Australian Patent Application No. 2016270775, dated Nov. 26, 2018, 5 pages.
Office Action received for Chinese Patent Application No. 201810094316.X, dated Oct. 29, 2018, 12 pages (5 pages of English Translation and 7 pages of Official Copy).
Office Action received for European Patent Application No. 16803996.4, dated Nov. 29, 2018, 12 pages.
Office Action received for Japanese Patent Application No. 2018-126311, dated Nov. 2, 2018, 4 pages (2 pages of English Translation and 2 pages of official copy).
Summons to Attend Oral Proceedings received for European Patent Application No. 18154163.2, mailed on Nov. 29, 2018, 9 pages.
Nozawa et al., "iPad Perfect Manual for iOS 4", JPN, SOTEC Ltd., Yanagisawa Junichi, Dec. 31, 2010, pp. 189-190 (Official Copy Only) (See Communication under 37 CFR § 1.98(a) (3)).
Non-Final Office Action Received for U.S. Appl. No. 14/871,635, dated Nov. 16, 2018, 36 pages.
Office Action received for Chinese Patent Application No. 201580028491.3, dated Oct. 8, 2018, 9 pages (3 pages of English Translation and 6 pages of Official Copy).
Office Action received for Danish Patent Application No. PA201770292, dated Nov. 9, 2018, 3 pages.
Office Action received for Korean Patent Application No. 10-2017-7034677, dated Nov. 1, 2018, 5 pages (2 pages of English Translation and 3 pages of Official Copy).
Advisory Action received for U.S. Appl. No. 14/869,715, dated May 18, 2017, 6 pages.
Advisory Action received for U.S. Appl. No. 14/870,793, dated Apr. 13, 2017, 3 pages.
Advisory Action received for U.S. Appl. No. 15/137,944, dated May 11, 2017, 6 pages.
Corrected Notice of Allowance received for U.S. Appl. No. 14/836,754, dated May 23, 2018, 2 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.

Decision to Grant received for Danish Patent Application No. PA201570665, dated Apr. 26, 2017, 2 pages.
Decision to Grant received for Danish Patent Application No. PA201670042, dated Mar. 19, 2018, 2 pages.
Decision to Grant received for European Patent Application No. 15724160.5, dated Jun. 14, 2018, 2 pages.
"Does Apple Pay change payment?", Mac Fan, Japan, Mynavi Publishing Corporation, vol. 22, No. 11 common No. 381, Nov. 1, 2014, 11 pages (4 pages of English Translation and 7 pages of pfficial Copy).
Examiner's Answer to Appeal Brief received for U.S. Appl. No. 14/870,793, dated Apr. 16, 2018, 15 pages.
Extended European Search Report received for European Patent Application No. 16201159.7, dated Mar. 27, 2017, 12 pages.
Extended European Search Report received for European Patent Application No. 16803996.4, dated Feb. 7, 2018, 8 pages.
Extended European Search Report received for European Patent Application No. 16804040.0, dated Feb. 26, 2018, 9 pages.
Extended European Search Report received for European Patent Application No. 18154163.2, dated Mar. 2, 2018, 4 pages.
Final Office Action received for U.S. Appl. No. 14/503,327, dated May 18, 2017, 10 pages.
Final Office Action Received for U.S. Appl. No. 14/871,654, dated Nov. 16, 2017, 32 pages.
Final Office Action received for U.S. Appl. No. 14/503,296, dated Jun. 4, 2018, 8 pages.
Final Office Action received for U.S. Appl. No. 14/836,754, dated Jun. 14, 2017, 23 pages.
Final Office Action received for U.S. Appl. No. 14/839,897, dated Jan. 10, 2018, 16 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 14/869,877, dated Apr. 26, 2018, 18 pages.
Final Office Action Received for U.S. Appl. No. 14/871,635, dated Jan. 18, 2018, 33 pages.
Final Office Action received for U.S. Appl. No. 14/836,754, dated Mar. 31, 2017, 24 pages.
Final Office Action received for U.S. Appl. No. 14/839,903, dated Sep. 18, 2018, 11 pages.
Final Office Action received for U.S. Appl. No. 14/870,694, dated Apr. 7, 2017, 16 pages.
Intention to Grant received for Danish Patent Application No. PA201570773, dated Mar. 9, 2018, 2 pages.
Intention to Grant received for Danish patent Application No. PA201670042, dated Jan. 29, 2018, 2 pages.
Intention to Grant received for European Patent Application No. 15724160.5, dated Mar. 7, 2018, 8 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/016621, dated Aug. 24, 2017, 8 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/034175, dated Dec. 14, 2017, 14 pages.
International Search Report and Written Opinion received for PCT Patent Application No. PCT/US2017/031748, dated Aug. 29, 2017, 14 pages.
Invitation to Pay Additional Fee received for PCT Patent Application No. PCT/US2017/031748, dated Jun. 21, 2017, 2 pages.
Non Final Office Action received for U.S. Appl. No. 14/869,877, dated Jun. 16, 2017, 17 pages.

(56) References Cited

OTHER PUBLICATIONS

Non Final Office Action received for U.S. Appl. No. 14/869,877, dated Oct. 5, 2018, 19 pages.
Non Final Office Action received for U.S. Appl. No. 14/869,831, dated Nov. 22, 2017, 17 pages.
Non-Final Office Action received for U.S. Appl. No. 14/503,296, dated Aug. 28, 2017, 14 pages.
Non-Final Office Action received for U.S. Appl. No. 14/503,296, dated Sep. 18, 2018, 20 pages.
Non-Final Office Action received for U.S. Appl. No. 14/719,217, dated Jul. 26, 2018, 40 pages.
Non-Final Office Action received for U.S. Appl. No. 14/836,754, dated Aug. 16, 2017, 25 pages.
Non-Final Office Action received for U.S. Appl. No. 14/839,897, dated May 18, 2017, 11 pages.
Non-Final Office Action received for U.S. Appl. No. 14/839,903, dated Feb. 26, 2018, 10 pages.
Non-Final Office Action Received for U.S. Appl. No. 14/871,635, dated May 5, 2017, 23 pages.
Non-Final Office Action Received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/294,439, dated Jan. 26, 2018, 18 pages.
Non-Final Office Action received for U.S. Appl. No. 15/433,238, dated Nov. 3, 2017, 6 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2015385757, dated Jul. 16, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Allowance received for Chinese Patent Application No. 201620480708.6, dated Apr. 20, 2017, 3 pages (2 pages of English translation and 1 page of Official Copy).
Notice of Allowance received for Chinese Patent Application No. 201620480846.4, dated Apr. 20, 2017, 3 pages (2 pages of English Translation and 1 page of Official Copy).
Notice of Allowance received for Danish Patent Application No. PA201570773, dated Apr. 26, 2018, 2 pages.
Notice of Allowance received for Japanese Patent Application No. 2016-224508, dated Jun. 20, 2017, 3 pages (Official Copy only) (See Communication under 37 CFR § 1.98(a) (3)).
Notice of Allowance received for Japanese Patent Application No. 2017-545733, dated Jun. 1, 2018, 4 pages (1 page of English Translation and 3 pages of Official copy).
Notice of Allowance received for Japanese Patent Application No. 2018-008937, dated Jul. 2, 2018, 4 pages (1 page of English Translation and 3 pages of Official copy).
Notice of Allowance received for Korean Patent Application No. 10-2017-0022365, dated Mar. 27, 2018, 4 pages (1 page of English Translation and 3 pages of Official copy).
Notice of Allowance received for Korean Patent Application No. 10-2017-0022546, dated Feb. 27, 2018, 4 pages (1 page of English Translation and 3 pages of Official Copy).
Notice of Allowance received for Korean Patent Application No. 10-2017-7024513, dated Apr. 20, 2018, 5 pages (2 pages of English Translation and 3 pages of Official copy).
Notice of Allowance received for Korean Patent Application No. 10-2018-7001854, dated Aug. 21, 2018, 4 pages (1 page of English Translation and 3 pages of Official Copy).
Notice of Allowance received for Taiwanese Patent Application No. 104114953, dated Oct. 17, 2017, 3 pages (Official Copy only) (See Communication under 37 CFR § 1.98(a) (3)).
Notice of Allowance received for Taiwanese Patent Application No. 104128700, dated Mar. 27, 2017, 3 pages (Official Copy only) (See Communication under 37 CFR § 1.98(a) (3)).
Notice of Allowance received for Taiwanese Patent Application No. 104133756, dated Nov. 30, 2017, 5 pages (2 pages of English Translation and 3 pages of Official Copy).
Notice of Allowance received for Taiwanese Patent Application No. 104133757, dated Jan. 18, 2017, 3 pages (Official Copy only) (See Communication under 37 CFR § 1.98(a) (3)).
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/836,754, dated May 10, 2018, 27 pages.
Notice of Allowance received for U.S. Appl. No. 14/839,897, dated Jun. 8, 2018, 11 pages.
Notice of Allowance received for U.S. Appl. No. 14/869,715, dated Dec. 19, 2017, 32 pages.
Notice of Allowance received for U.S. Appl. No. 14/870,694, dated Jul. 31, 2018, 7 pages.
Notice of Allowance received for U.S. Appl. No. 14/871,654, dated May 22, 2018, 22 pages.
Notice of Allowance received for U.S. Appl. No. 15/137,944, dated Dec. 21, 2017, 8 pages.
Notice of Allowance received for U.S. Appl. No. 15/294,439, dated Sep. 10, 2018, 9 pages.
Notice of Allowance received for U.S. Appl. No. 15/433,238, dated May 17, 2018, 7 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages (7 pages of English Translation and 7 pages of Official Copy).
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2015385757, dated Sep. 11, 2017, 3 pages.
Office Action received for Australian Patent Application No. 2016218318, dated Aug. 24, 2018, 5 pages.
Office Action received for Australian Patent Application No. 2016218318, dated Sep. 26, 2018, 3 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017100558, dated Sep. 1, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017201068, dated Jan. 17, 2018, 5 pages.
Office Action received for Australian Patent Application No. 2018200485, dated Mar. 15, 2018, 3 pages.

(56) References Cited

OTHER PUBLICATIONS

Office Action received for Chinese Patent Application No. 201510284896.5, dated Jun. 28, 2018, 15 pages (4 pages of English Translation and 11 pages of Official Copy).
Office Action received for Chinese Patent Application No. 201610084974.1, dated May 3, 2018, 12 pages (5 pages of English Translation and 7 pages of Official Copy).
Office Action Received for Danish Patent Application No. PA 201670709, dated Jul. 21, 2017, 4 pages.
Office Action received for Danish Patent Application No. PA201570773, dated Aug. 28, 2017, 3 pages.
Office Action received for Danish Patent Application No. PA201670042, dated Sep. 25, 2017, 2 pages.
Office Action received for Danish Patent Application No. PA201670362, dated Jan. 29, 2018, 3 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670710, dated Sep. 25, 2017, 6 pages.
Office Action received for Danish Patent Application No. PA201670749, dated Oct. 3, 2017, 3 pages.
Office Action received for Danish Patent Application No. PA201670751, dated Nov. 13, 2017, 2 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Sep. 6, 2017, 4 pages.
Office Action received for European Patent Application No. 15727291.5, dated Jan. 15, 2018, 8 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated Sep. 17, 2018, 7 pages.
Office Action received for European Patent Application No. 18154163.2, dated Apr. 11, 2018, 6 pages.
Office Action received for Japanese Patent Application No. 2016-224507, dated Jun. 16, 2017, 16 pages (8 pages of English Translation and 8 pages of Official Copy).
Office Action received for Japanese Patent Application No. 2016-558332, dated Dec. 8, 2017, 12 pages (6 pages of English translation and 6 pages of Official copy).
Office Action received for Japanese Patent Application No. 2016-558332, dated Jul. 27, 2018, 9 pages (4 pages of English Translation and 5 pages of Official Copy).
Office Action received for Japanese Patent Application No. 2016-569665, dated Aug. 20, 2018, 9 pages (4 pages of English Translation and 5 pages of Official Copy).
Office Action received for Japanese Patent Application No. 2016-569665, dated Jan. 19, 2018, 10 pages (5 pages of English Translation and 5 pages of Official Copy).
Office Action received for Japanese Patent Application No. 2017-507413, dated May 25, 2018, 14 pages (7 pages of English Translation and 7 pages of Official Copy).
Office Action received for Japanese Patent Application No. 2017-540616, dated Jan. 12, 2018, 24 pages (13 pages of English Translation and 11 pages of Official Copy).
Office Action received for Japanese Patent Application No. 2017-540616, dated Jul. 27, 2018, 20 pages (11 pages of English Translation and 9 pages of Official copy).
Office Action received for Japanese Patent Application No. 2017-545733, dated Feb. 13, 2018, 7 pages (3 pages of English Translation and 4 pages of Official Copy).
Office Action received for Korean Patent Application No. 10-2016-0152210, dated May 14, 2018, 13 pages (6 pages of English Translation and 7 pages of Official Copy).
Office Action received for Korean Patent Application No. 10-2017-0022365, dated Jun. 26, 2017, 10 pages (4 pages of English Translation and 6 pages of Official Copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2017-0022582, dated Sep. 19, 2018, 6 pages (2 pages of English Translation and 4 pages of Official Copy).
Office Action received for Korean Patent Application No. 10-2018-7001854, dated Apr. 2, 2018, 13 pages (6 pages of English Translation and 7 pages of Official Copy).
Office Action received for Taiwanese Patent Application No. 104117508, dated Jul. 14, 2017, 9 pages (4 pages of English Translation and 5 pages of Official Copy).
Office Action received for Taiwanese Patent Application No. 104117508, dated Mar. 20, 2017, 22 pages (9 pages of English Translation and 13 pages of Official Copy).
Office Action received for Taiwanese Patent Application No. 104128689, dated Aug. 21, 2017, 8 pages (3 pages of English Translation and 5 pages of official Copy).
Office Action received for Taiwanese Patent Application No. 104133756, dated May 17, 2017, 13 pages (6 pages of English Translation and 7 pages of Official Copy).
Real Solution of two-step-authentication Password Management for Authentication Enhancement, Fukuda Takao, Nikkei PC, JPN, Nikkei Business Publications, Inc., No. 694, Mar. 24, 2014, 11 pages (3 pages of English translation and 8 pages of Official Copy).
Summons to Attend Oral Proceedings received for European Patent Application No. 16201195.1, mailed on Sep. 4, 2018, 21 pages.
Supplemental Notice of Allowance received for U.S. Appl. No. 15/433,238, dated Jun. 20, 2018, 2 pages.
Cazlar, "[iOS] MapsGPS (formerly PebbGPS) is now available—now with colour turn-by-turn directions!", Online Available at: <https://forums.pebble.com/t/ios-mapsgps-formerly-pebbgps-is-now-available-now-with-colour-turn-by-turn-directions/5584>, 2013, 31 pages.
Haris, "Google Maps Navigation on Android 2.0", Sizzled Core, Online available at <http://www.sizzledcore.com/2009/10/29/google-maps-navigation-on-android-20/>, Oct. 29, 2009, 6 pages.
Naver Blog, "How to Use Smart Wallet and Registered Card", Online Available at: <http://feena74.blog.me/140185758401>, Mar. 29, 2013, 20 pages.
Oates, Nathan, "PebbGPS", Online Available at:—https://pebble.devpost.com/submissions/21694-pebbgps, Mar. 16, 2014, 2 pages.
The Gadget Pill, "Sygic for Android Navigation with HUD", Online Available at:—<https://www.youtube.com/watch?v=fGqrycRevGU>, Mar. 23, 2014, 1 page.
Corrected Notice of Allowance received for U.S. Appl. No. 14/839,903, dated Feb. 13, 2019, 2 pages.
Notice of Allowance received for Japanese Patent Application No. 2018-126311, dated Feb. 1, 2019, 4 pages (1 page of English Translation and 3 pages of Official copy).
Notice of Allowance received for U.S. Appl. No. 14/719,217, dated Feb. 13, 2019, 13 pages.
Office Action received for Korean Patent Application No. 10-2016-0152210, dated Jan. 29, 2019, 7 pages (3 pages of English Translation and 4 pages of Official Copy.).
Office Action received for Japanese Patent Application No. 2017-562330, dated Jan. 18, 2019, 11 pages (6 pages of English Translation and 5 pages of Official Copy).

* cited by examiner

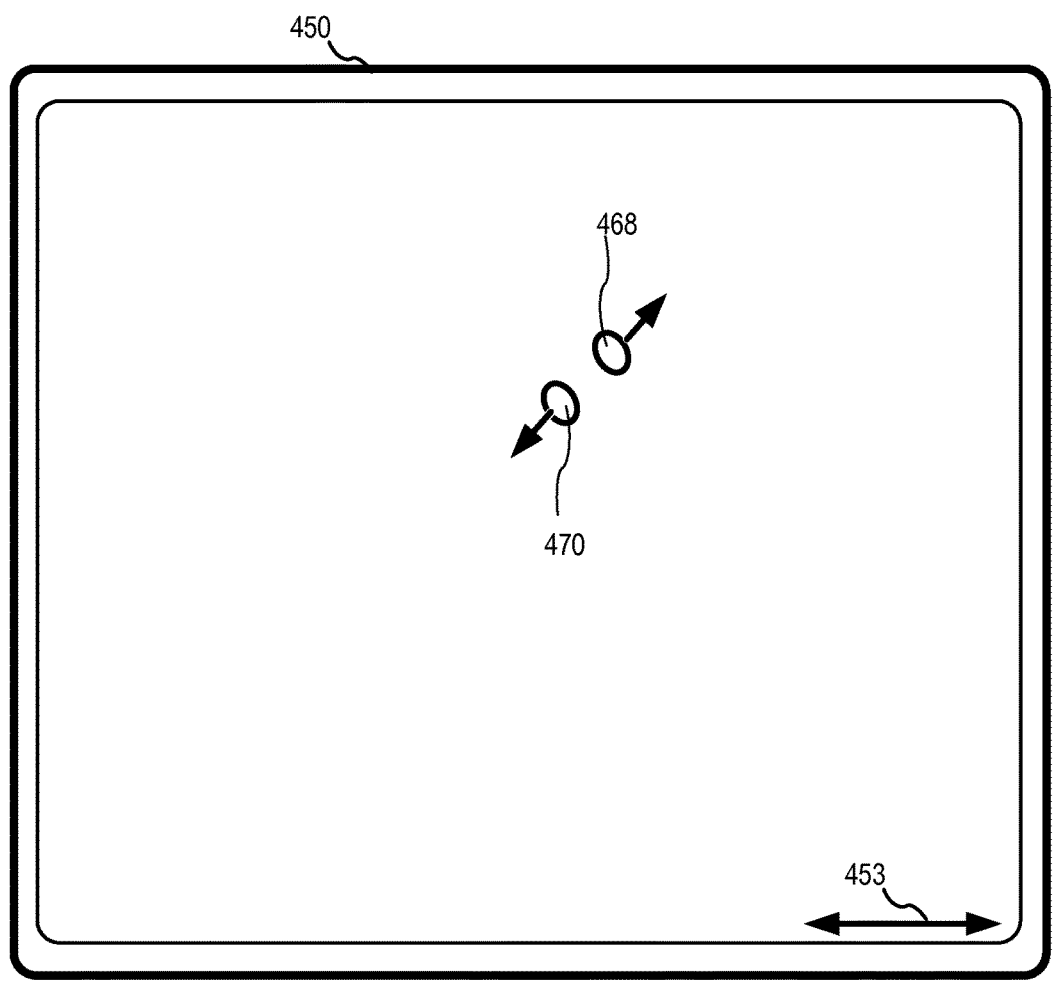
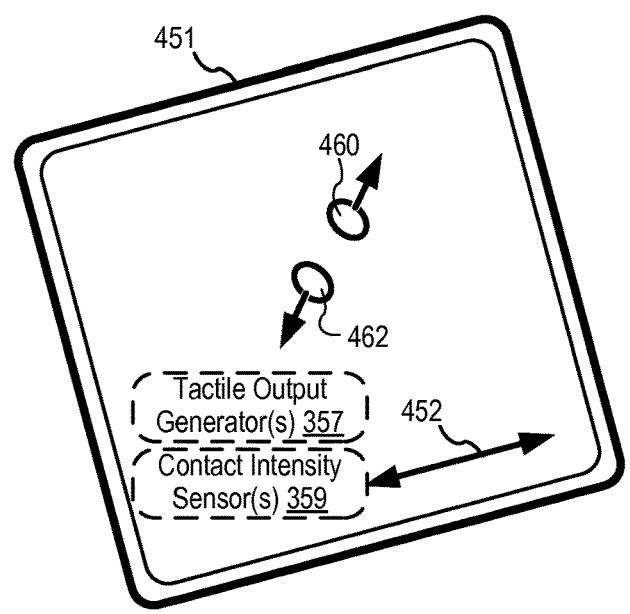
*FIG. 4B*

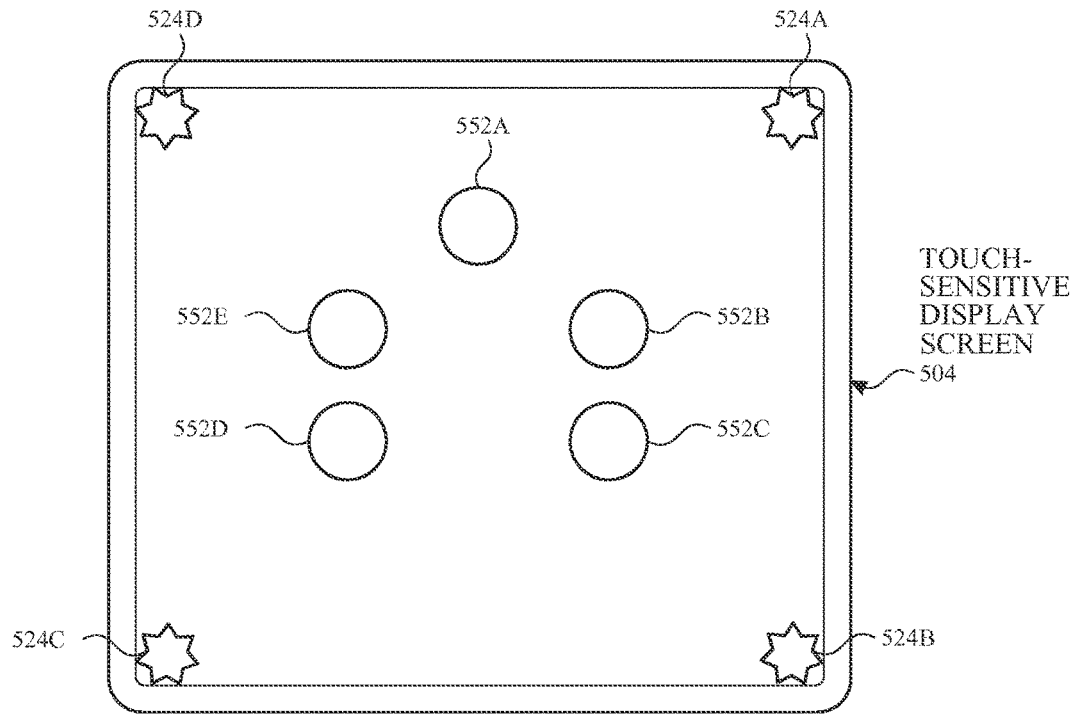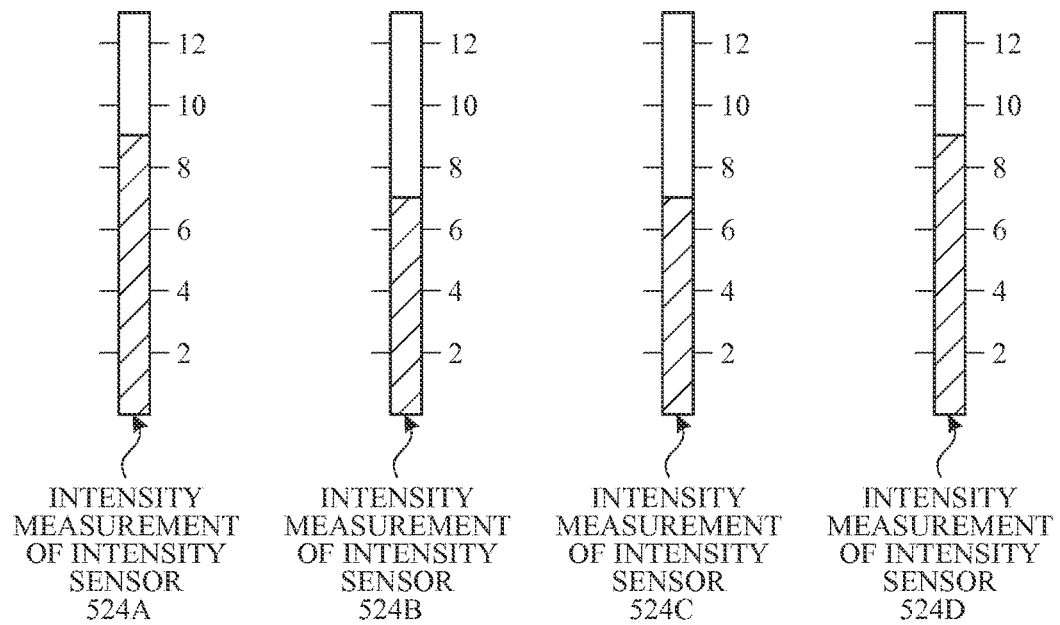
FIG. 5C

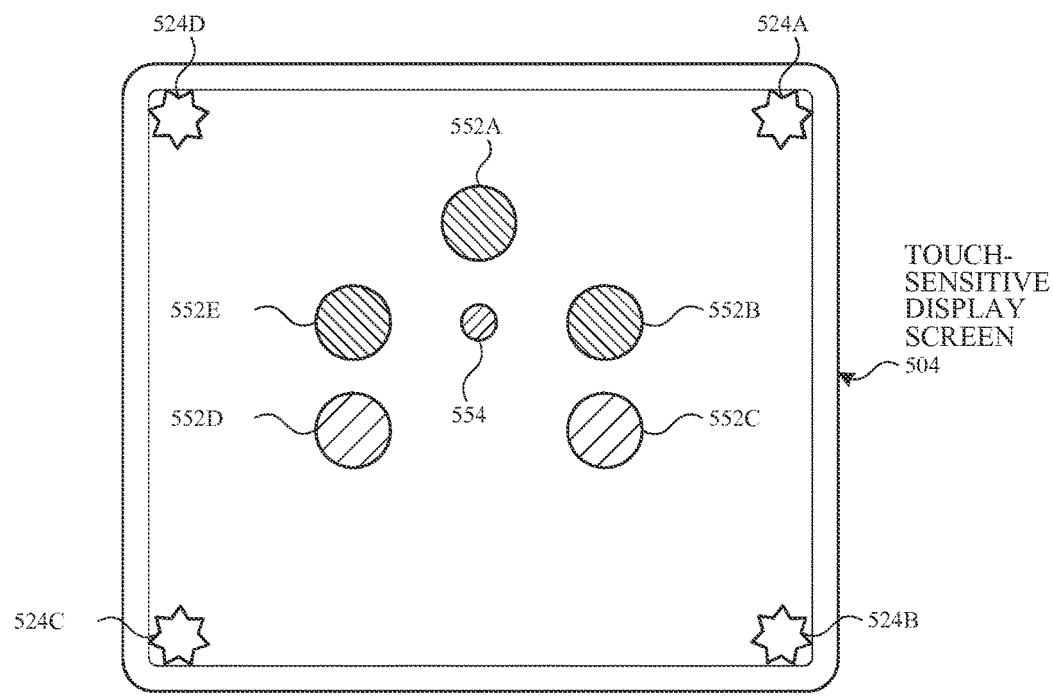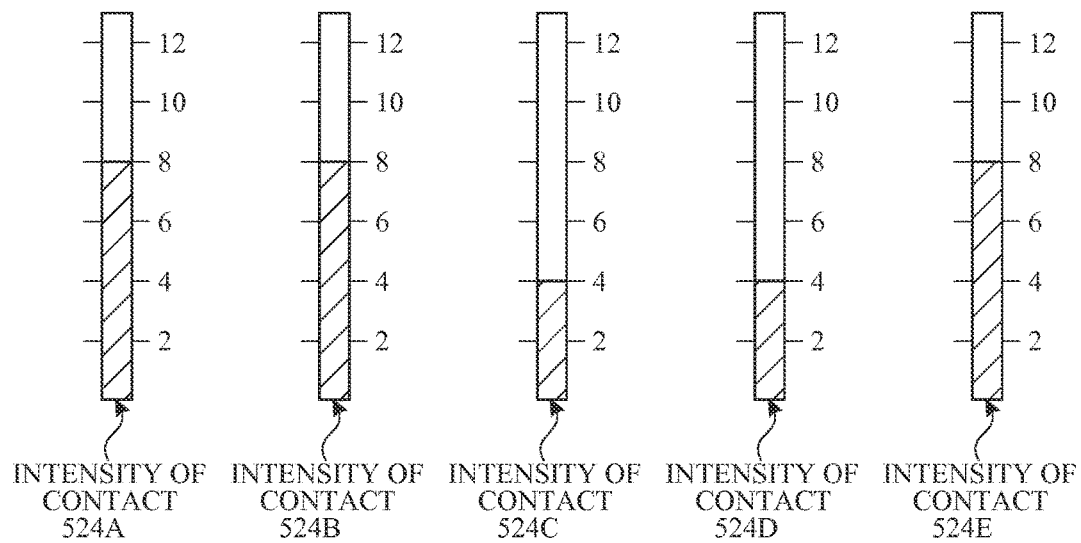
FIG. 5D

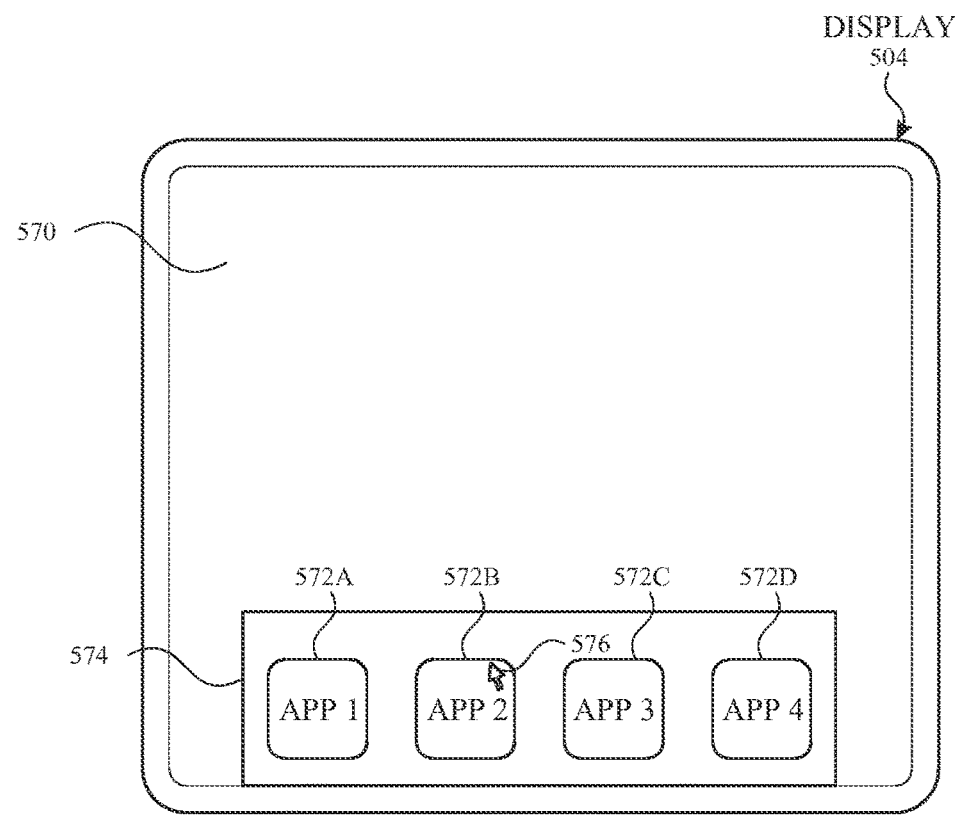
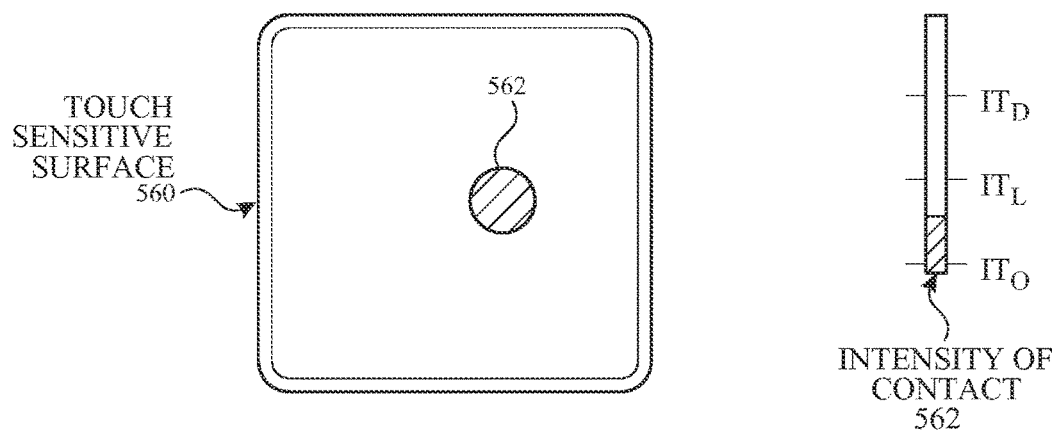
FIG. 5E

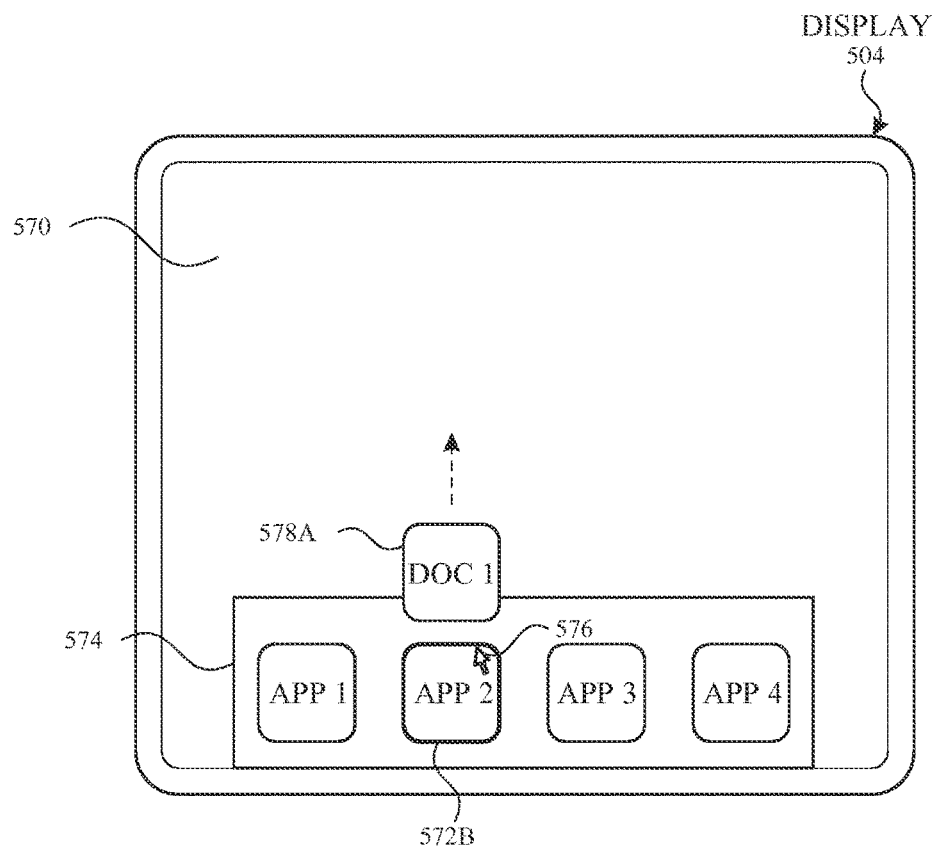
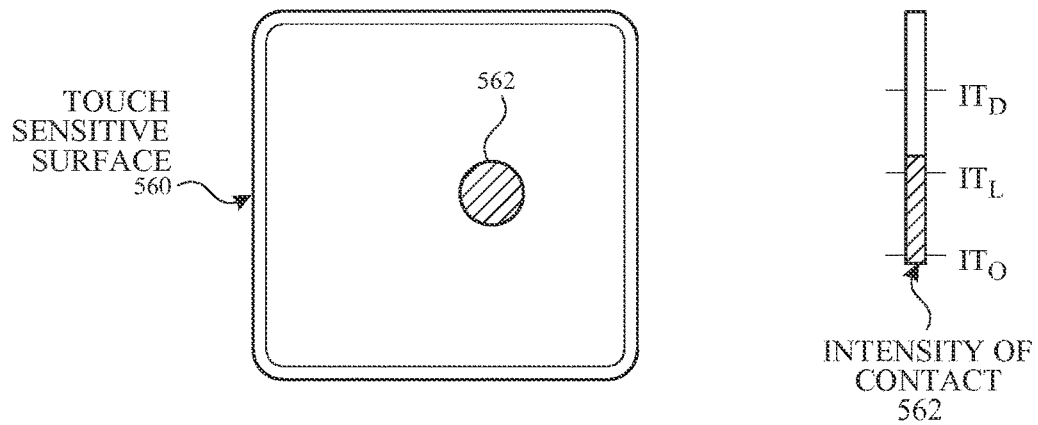
*FIG. 5F*

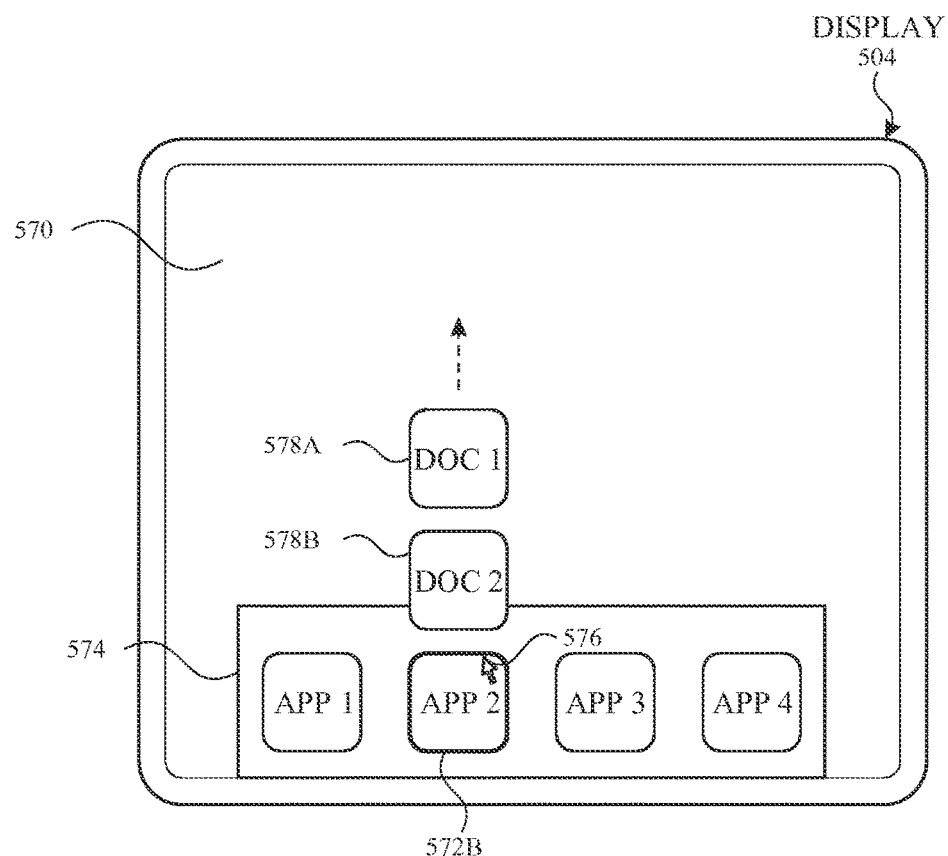
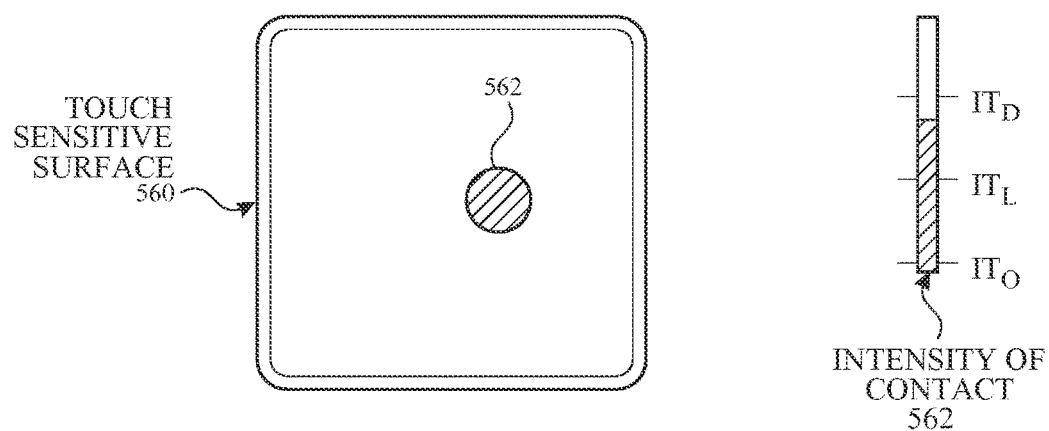
*FIG. 5G*

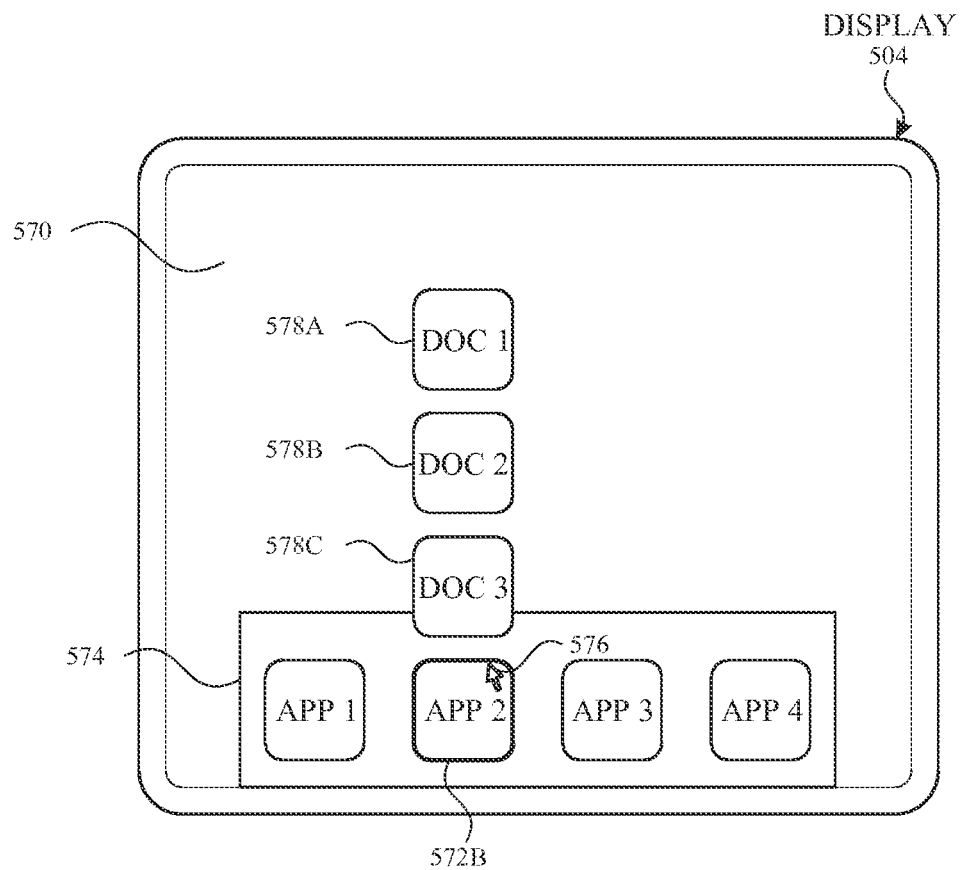
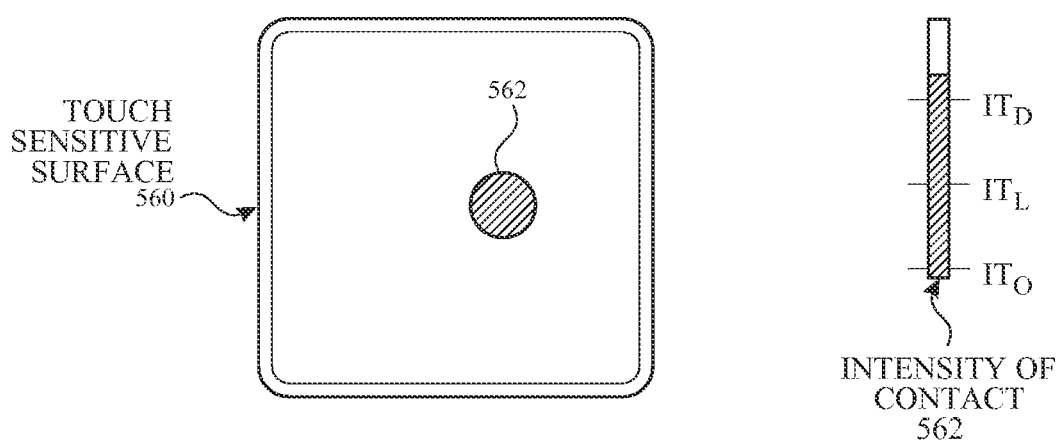
*FIG. 5H*

1900

1902
Display, on the display, a payment-account user interface for a second electronic device that is associated with the first electronic device.

1904
Displaying the payment-account user interface includes concurrently displaying:

1906
A representation of a first payment account along with status information for the first payment account indicating that the first payment account is linked to the second electronic device and that the second electronic device is configured to enable payment using the first payment account.

1908
A representation of a second payment account along with status information for the second payment account indicating that the second payment account is linked to the first electronic device but is not linked to the second electronic device.

*FIG. 19*

USER INTERFACE FOR LOYALTY ACCOUNTS AND PRIVATE LABEL ACCOUNTS FOR A WEARABLE DEVICE

CROSS-REFERENCE TO RELATED APPLICATIONS

This application is a continuation of U.S. patent application Ser. No. 14/869,877, entitled "USER INTERFACE FOR LOYALTY ACCOUNTS AND PRIVATE LABEL ACCOUNTS FOR A WEARABLE DEVICE", filed Sep. 29, 2015, which claims priority from U.S. Provisional Patent Application Ser. No. 62/230,430, entitled "USER INTERFACE FOR LOYALTY ACCOUNTS AND PRIVATE LABEL ACCOUNTS FOR A WEARABLE DEVICE", filed Jun. 5, 2015, which is hereby incorporated by reference in its entirety for all purposes.

This application relates to the following provisional applications: U.S. Patent Application Ser. No. 62/004,886, entitled "USER INTERFACE FOR PAYMENTS", filed May 29, 2014; U.S. Patent Application Ser. No. 62/047,545, entitled "USER INTERFACE FOR PAYMENTS", filed Sep. 8, 2014; U.S. Patent Application Ser. No. 62/127,790, entitled "USER INTERFACE FOR PAYMENTS", filed Mar. 3, 2015; and U.S. Patent Application Ser. No. 62/110,566, entitled "USER INTERFACE FOR PAYMENTS", filed Feb. 1, 2015; U.S. Patent Application Ser. No. 61/912,727, entitled "PROVISIONING AND AUTHENTICATING CREDENTIALS ON AN ELECTRONIC DEVICE", filed Dec. 6, 2013; U.S. Patent Application Ser. No. 61/909,717, entitled "PROVISIONING OF CREDENTIALS ON AN ELECTRONIC DEVICE USING PASSWORDS COMMUNICATED OVER VERIFIED CHANNELS", filed Nov. 27, 2013; U.S. Patent Application Ser. No. 62/004,182, entitled "ONLINE PAYMENTS USING A SECURE ELEMENT OF AN ELECTRONIC DEVICE", filed May 28, 2014; U.S. Patent Application Ser. No. 61/920,029, entitled "DELETION OF CREDENTIALS FROM AN ELECTRONIC DEVICE", filed Dec. 23, 2013; U.S. Patent Application Ser. No. 61/899,737, entitled "USING BIOAUTHENTICATION IN NEAR-FIELD-COMMUNICATION TRANSACTIONS", filed Nov. 4, 2013; U.S. Patent Application Ser. No. 61/905,035, entitled "GENERATING TRANSACTION IDENTIFIERS", filed Nov. 15, 2013; U.S. Patent Application Ser. No. 61/905,042, entitled "ELECTRONIC RECEIPTS FOR NFC-BASED FINANCIAL TRANSACTIONS", filed Nov. 15, 2013; U.S. Patent Application Ser. No. 62/004,798, entitled "FINANCIAL-TRANSACTION NOTIFICATIONS", filed May 29, 2014; U.S. Patent Application Ser. No. 62/004,837, entitled "METHODS FOR MANAGING PAYMENT APPLETS ON A SECURE ELEMENT TO CONDUCT MOBILE PAYMENT TRANSACTIONS", filed May 29, 2014; U.S. Patent Application Ser. No. 62/004,840, entitled "METHODS FOR OPERATING A PORTABLE ELECTRONIC DEVICE TO CONDUCT MOBILE PAYMENT TRANSACTIONS", filed May 29, 2014; U.S. Patent Application Ser. No. 62/004,835, entitled "METHODS FOR USING A PRIMARY USER DEVICE TO PROVISION CREDENTIALS ONTO A SECONDARY USER DEVICE", filed May 29, 2014; U.S. Patent Application Ser. No. 62/004,832, entitled "METHODS FOR USING A RANDOM AUTHORIZATION NUMBER TO PROVIDE ENHANCED SECURITY FOR A SECURE ELEMENT", filed May 29, 2014; U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014; and U.S. Utility patent application Ser. No. 14/092,205, entitled "SECURE PROVISIONING OF CREDENTIALS ON AN ELECTRONIC DEVICE", filed Nov. 27, 2013; each of which is hereby incorporated by reference in its entirety.

FIELD

The present disclosure relates generally to computer user interfaces, and more specifically to techniques for computer user interfaces for loyalty accounts and payment accounts.

BACKGROUND

The use of electronic devices for making payments at point-of-sale terminals and over the Internet has increased significantly in recent years. Exemplary point-of-sale terminals include Near Field Communication-enabled (NFC-enabled) terminals, Bluetooth-enabled terminals, and barcode scanner-enabled terminals. Electronic devices can be used in conjunction with these exemplary terminals to enable the user of the electronic device to make a payment for the purchase of, for example, a good or service.

BRIEF SUMMARY

Some techniques for linking accounts to an electronic device, selecting an account for use in a transaction, and transmitting account information in a transaction, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices.

Accordingly, the present inventions provide for electronic devices with faster, more efficient methods and interfaces for linking accounts to an electronic device, selecting an account for use in a transaction, and transmitting account information in a transaction. Such methods and interfaces optionally complement or replace other methods for performing similar tasks. Such methods and interfaces reduce the cognitive burden on a user and produce a more efficient human-machine interface. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out. For battery-operated computing devices, such methods and interfaces conserve power and increase the time between battery charges.

A method, comprising: at an electronic device with a display, a touch-sensitive surface, and one or more wireless communication elements: receiving an input requesting to enable the device for a payment transaction; in response to receiving the input requesting to enable the device for a payment transaction: displaying, on the display, a first visual indicator identifying a first account; and enabling the electronic device to participate in a transaction using the first account via the one or more wireless communication elements; receiving one or more swipe inputs in a first direction via the touch-sensitive surface; in response to receiving the one or more user swipe inputs: displaying, on the display, a second visual indicator identifying a second account; and enabling the electronic device to participate in a transaction using the second account via the one or more wireless communication elements; and wherein the first visual indicator is different from the second visual indicator.

A method, comprising: at an electronic device with a display and a location sensor: detecting, using the location sensor, a current location; determining whether the current location is associated with a first account; in accordance with a failure to determine that the current location is associated with an account other than a default payment account, displaying, on the display, a visual indication of a default payment account; in accordance with a determination that the current location is associated with the first account, concurrently displaying, on the display, the visual indication of the default payment account and a visual indication of the first account; and wherein the default payment account and the first account are linked to the electronic device and the default payment account and the first account are different.

A method, comprising: at an electronic device with a display and a location sensor: receiving an input requesting to enable the device for a payment transaction; and in response to receiving the input: detecting, using the location sensor, a current location; determining whether a set of one or more payment criteria have been met, wherein the set of one or more payment criteria includes a criterion that is met when the current location is associated with a first payment account; in accordance with a determination that the set of one or more payment criteria is not met, displaying, on the display, a visual indication of a default payment account, wherein the default payment account is different from the first payment account; and in accordance with a determination that the set of one or more payment criteria is met, displaying, on the display, a visual indication of the first payment account.

A method, comprising: at an electronic device with a display and one or more wireless communication elements: receiving an input requesting to enable the device for a payment transaction; in response to receiving the input, displaying, on the display, a payment indication that represents a plurality of payment accounts including a first payment account and a second payment account; receiving, via the one or more wireless communication elements, a request for account information corresponding to a payment transaction; in response to receiving the request for account information corresponding to the payment transaction: in accordance with a determination that payment criteria for a first payment account have been met, transmitting, via the one or more wireless communication elements, account information for the first payment account without transmitting account information for the second payment account; and in accordance with a determination that payment criteria for the second payment account have been met, transmitting, via the one or more wireless communication elements, account information for the second payment account without transmitting account information for the first payment account.

A method, comprising: at an electronic device with a display, a touch-sensitive surface configured to detect intensity of contacts, and one or more wireless communication elements: receiving a first input; in response to receiving the first input: displaying, on the display, a first user interface, wherein the first user interface includes: a first visual indicator identifying a payment card associated with multiple payment accounts, and a second visual indicator identifying a first payment account of the multiple payment accounts of the payment card; enabling the electronic device to use the first payment account to engage in a payment transaction via the one or more wireless communication elements; detecting a first contact on the touch-sensitive surface; determining whether a characteristic intensity of the first contact is above an intensity threshold; and in accordance with a determination that the characteristic intensity of the first contact is above the intensity threshold, displaying, on the display, a second user interface, wherein the second user interface enables selection between different payment accounts represented by the first visual indicator.

A method, comprising: at a first electronic device with a display and one or more wireless communication elements: receiving a first request to link a payment account associated with a payment card to the first electronic device; in response to receiving the first request, initiating a process for linking the payment account to the first electronic device; after successfully linking the payment account to the first electronic device, concurrently displaying, on the display: an indication that the payment account has been successfully linked to the first electronic device; and a selectable affordance for linking the payment account to a second electronic device different from the first electronic device; and receiving activation of the selectable affordance; and in response to receiving activation of the selectable affordance, initiating a process for linking the payment account to the second electronic device.

A method, comprising: at a first electronic device with a display and one or more wireless communication elements: displaying, on the display, a payment-account user interface for a second electronic device that is associated with the first electronic device, wherein displaying the payment-account user interface includes concurrently displaying: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

An electronic device, comprising: a display; a touch-sensitive surface; and means for receiving an input requesting to enable the device for a payment transaction; means, responsive to receiving the input requesting to enable the device for a payment transaction, for: displaying, on the display, a first visual indicator identifying a first account; and enabling the electronic device to participate in a transaction using the first account via the one or more wireless communication elements; means for receiving one or more swipe inputs in a first direction via the touch-sensitive surface; means, response to receiving the one or more user swipe inputs, for: displaying, on the display, a second visual indicator identifying a second account; and enabling the electronic device to participate in a transaction using the second account via the one or more wireless communication elements; and wherein the first visual indicator is different from the second visual indicator.

An electronic device, comprising: a display; a touch-sensitive surface; and means for detecting, using the location sensor, a current location; means for determining whether the current location is associated with a first account; means, in accordance with a failure to determine that the current location is associated with an account other than a default payment account, for displaying, on the display, a visual indication of a default payment account; means, in accordance with a determination that the current location is associated with the first account, for concurrently displaying, on the display, the visual indication of the default payment account and a visual indication of the first account; and wherein the default payment account and the first account are linked to the electronic device and the default payment account and the first account are different.

An electronic device, comprising: a display; a touch-sensitive surface; and means for receiving an input requesting to enable the device for a payment transaction; and means, responsive to receiving the input, for: detecting, using the location sensor, a current location; determining whether a set of one or more payment criteria have been met, wherein the set of one or more payment criteria includes a criterion that is met when the current location is associated with a first payment account; in accordance with a determination that the set of one or more payment criteria is not met, displaying, on the display, a visual indication of a default payment account, wherein the default payment account is different from the first payment account; and in accordance with a determination that the set of one or more payment criteria is met, displaying, on the display, a visual indication of the first payment account.

An electronic device, comprising: a display; a touch-sensitive surface; and means for receiving an input requesting to enable the device for a payment transaction; means, responsive to receiving the input, for displaying, on the display, a payment indication that represents a plurality of payment accounts including a first payment account and a second payment account; means for receiving, via the one or more wireless communication elements, a request for account information corresponding to a payment transaction; means, responsive to receiving the request for account information corresponding to the payment transaction, for: in accordance with a determination that payment criteria for a first payment account have been met, transmitting, via the one or more wireless communication elements, account information for the first payment account without transmitting account information for the second payment account; and in accordance with a determination that payment criteria for the second payment account have been met, transmitting, via the one or more wireless communication elements, account information for the second payment account without transmitting account information for the first payment account.

An electronic device, comprising: a display; a touch-sensitive surface configured to detect intensity of contacts; and means for receiving a first input; means, responsive to receiving the first input, for: displaying, on the display, a first user interface, wherein the first user interface includes: a first visual indicator identifying a payment card associated with multiple payment accounts, and a second visual indicator identifying a first payment account of the multiple payment accounts of the payment card; means for enabling the electronic device to use the first payment account to engage in a payment transaction via the one or more wireless communication elements; means for detecting a first contact on the touch-sensitive surface; means for determining whether a characteristic intensity of the first contact is above an intensity threshold; and means, in accordance with a determination that the characteristic intensity of the first contact is above the intensity threshold, for displaying, on the display, a second user interface, wherein the second user interface enables selection between different payment accounts represented by the first visual indicator.

An electronic device, comprising: a display; a touch-sensitive surface; and means for receiving a first request to link a payment account associated with a payment card to the first electronic device; means, responsive to receiving the first request, for initiating a process for linking the payment account to the first electronic device; means for, after successfully linking the payment account to the first electronic device, concurrently displaying, on the display: an indication that the payment account has been successfully linked to the first electronic device; and a selectable affordance for linking the payment account to a second electronic device different from the first electronic device; and means for receiving activation of the selectable affordance; and means, responsive to receiving activation of the selectable affordance, for initiating a process for linking the payment account to the second electronic device.

An electronic device, comprising: a display; a touch-sensitive surface; and means for displaying, on the display, a payment-account user interface for a second electronic device that is associated with the first electronic device, wherein displaying the payment-account user interface includes concurrently displaying: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

A non-transitory computer-readable storage medium comprising one or more programs for execution by one or more processors of an electronic device with a display, a touch-sensitive surface, and one or more wireless communication elements, the one or more programs including instructions which, when executed by the one or more processors, cause the electronic device to: receive an input requesting to enable the device for a payment transaction; in response to receiving the input requesting to enable the device for a payment transaction: display, on the display, a first visual indicator identifying a first account; and enable the electronic device to participate in a transaction using the first account via the one or more wireless communication elements; receive one or more swipe inputs in a first direction via the touch-sensitive surface; in response to receiving the one or more user swipe inputs: display, on the display, a second visual indicator identifying a second account; and enable the electronic device to participate in a transaction using the second account via the one or more wireless communication elements; and wherein the first visual indicator is different from the second visual indicator.

An electronic device comprising: a display, a touch-sensitive surface; one or more wireless communication elements one or more processors; memory; and one or more programs stored in memory, including instructions which, when executed by the one or more processors, cause the electronic device to: receive an input requesting to enable the device for a payment transaction; in response to receiving the input requesting to enable the device for a payment transaction: display, on the display, a first visual indicator identifying a first account; and enable the electronic device to participate in a transaction using the first account via the one or more wireless communication elements; receive one or more swipe inputs in a first direction via the touch-sensitive surface; in response to receiving the one or more user swipe inputs: display, on the display, a second visual indicator identifying a second account; and enable the electronic device to participate in a transaction using the second account via the one or more wireless communication elements; and wherein the first visual indicator is different from the second visual indicator.

A non-transitory computer-readable storage medium comprising one or more programs for execution by one or more processors of an electronic device with a display and a location sensor, the one or more programs including instructions which, when executed by the one or more processors, cause the electronic device to: detect, using the location sensor, a current location; determine whether the current location is associated with a first account; in accordance with a failure to determine that the current location is associated with an account other than a default payment account, display, on the display, a visual indication of a default payment account; in accordance with a determination that the current location is associated with the first account, concurrently display, on the display, the visual indication of the default payment account and a visual indication of the first account; and wherein the default payment account and the first account are linked to the electronic device and the default payment account and the first account are different.

An electronic device comprising: a display; a location sensor; one or more processors; memory; and one or more programs stored in memory, including instructions which, when executed by the one or more processors, cause the electronic device to: detect, using the location sensor, a current location; determine whether the current location is associated with a first account; in accordance with a failure to determine that the current location is associated with an account other than a default payment account, display, on the display, a visual indication of a default payment account; in accordance with a determination that the current location is associated with the first account, concurrently display, on the display, the visual indication of the default payment account and a visual indication of the first account; and wherein the default payment account and the first account are linked to the electronic device and the default payment account and the first account are different.

A non-transitory computer-readable storage medium comprising one or more programs for execution by one or more processors of an electronic device with a display and a location sensor, the one or more programs including instructions which, when executed by the one or more processors, cause the electronic device to: receive an input requesting to enable the device for a payment transaction; and in response to receiving the input: detect, using the location sensor, a current location; determine whether a set of one or more payment criteria have been met, wherein the set of one or more payment criteria includes a criterion that is met when the current location is associated with a first payment account; in accordance with a determination that the set of one or more payment criteria is not met, display, on the display, a visual indication of a default payment account, wherein the default payment account is different from the first payment account; and in accordance with a determination that the set of one or more payment criteria is met, display, on the display, a visual indication of the first payment account.

An electronic device comprising: a display; a location sensor; one or more processors; memory; and one or more programs stored in memory, including instructions which, when executed by the one or more processors, cause the electronic device to: receive an input requesting to enable the device for a payment transaction; and in response to receiving the input: detect, using the location sensor, a current location; determine whether a set of one or more payment criteria have been met, wherein the set of one or more payment criteria includes a criterion that is met when the current location is associated with a first payment account; in accordance with a determination that the set of one or more payment criteria is not met, display, on the display, a visual indication of a default payment account, wherein the default payment account is different from the first payment account; and in accordance with a determination that the set of one or more payment criteria is met, display, on the display, a visual indication of the first payment account.

A non-transitory computer-readable storage medium comprising one or more programs for execution by one or more processors of an electronic device with a display and one or more wireless communication elements, the one or more programs including instructions which, when executed by the one or more processors, cause the electronic device to: receive an input requesting to enable the device for a payment transaction; in response to receiving the input, display, on the display, a payment indication that represents a plurality of payment accounts including a first payment account and a second payment account; receive, via the one or more wireless communication elements, a request for account information corresponding to a payment transaction; in response to receiving the request for account information corresponding to the payment transaction: in accordance with a determination that payment criteria for a first payment account have been met, transmit, via the one or more wireless communication elements, account information for the first payment account without transmitting account information for the second payment account; and in accordance with a determination that payment criteria for the second payment account have been met, transmit, via the one or more wireless communication elements, account information for the second payment account without transmitting account information for the first payment account.

An electronic device comprising: a display; one or more wireless communication elements; one or more processors; memory; and one or more programs stored in memory, including instructions which, when executed by the one or more processors, cause the electronic device to: receive an input requesting to enable the device for a payment transaction; in response to receiving the input, display, on the display, a payment indication that represents a plurality of payment accounts including a first payment account and a second payment account; receive, via the one or more wireless communication elements, a request for account information corresponding to a payment transaction; in response to receiving the request for account information corresponding to the payment transaction: in accordance with a determination that payment criteria for a first payment account have been met, transmit, via the one or more wireless communication elements, account information for the first payment account without transmitting account information for the second payment account; and in accordance with a determination that payment criteria for the second payment account have been met, transmit, via the one or more wireless communication elements, account information for the second payment account without transmitting account information for the first payment account.

A non-transitory computer-readable storage medium comprising one or more programs for execution by one or more processors of an electronic device with a display, a touch-sensitive surface configured to detect intensity of contacts, and one or more wireless communication elements, the one or more programs including instructions which, when executed by the one or more processors, cause the electronic device to: receive a first input; in response to receiving the first input: display, on the display, a first user interface, wherein the first user interface includes: a first visual indicator identifying a payment card associated with multiple payment accounts, and a second visual indicator identifying a first payment account of the multiple payment accounts of the payment card; enable the electronic device to use the first payment account to engage in a payment transaction via the one or more wireless communication elements; detect a first contact on the touch-sensitive surface; determine whether a characteristic intensity of the first contact is above an intensity threshold; and in accordance with a determination that the characteristic intensity of the first contact is above the intensity threshold, display, on the display, a second user interface, wherein the second user interface enables selection between different payment accounts represented by the first visual indicator.

An electronic device comprising: a display; a touch-sensitive surface configured to detect intensity of contacts; one or more wireless communication elements; one or more processors; memory; and one or more programs stored in memory, including instructions which, when executed by the one or more processors, cause the electronic device to: receive a first input; in response to receiving the first input: display, on the display, a first user interface, wherein the first user interface includes: a first visual indicator identifying a payment card associated with multiple payment accounts, and a second visual indicator identifying a first payment account of the multiple payment accounts of the payment card; enable the electronic device to use the first payment account to engage in a payment transaction via the one or more wireless communication elements; detect a first contact on the touch-sensitive surface; determine whether a characteristic intensity of the first contact is above an intensity threshold; and in accordance with a determination that the characteristic intensity of the first contact is above the intensity threshold, display, on the display, a second user interface, wherein the second user interface enables selection between different payment accounts represented by the first visual indicator.

A non-transitory computer-readable storage medium comprising one or more programs for execution by one or more processors of a first electronic device with a display and one or more wireless communication elements, the one or more programs including instructions which, when executed by the one or more processors, cause the first electronic device to: receive a first request to link a payment account associated with a payment card to the first electronic device; in response to receiving the first request, initiate a process for linking the payment account to the first electronic device; after successfully linking the payment account to the first electronic device, concurrently display, on the display: an indication that the payment account has been successfully linked to the first electronic device; and a selectable affordance for linking the payment account to a second electronic device different from the first electronic device; and receive activation of the selectable affordance; and in response to receiving activation of the selectable affordance, initiate a process for linking the payment account to the second electronic device.

A first electronic device comprising: a display; one or more wireless communication elements; one or more processors; memory; and one or more programs stored in memory, including instructions which, when executed by the one or more processors, cause the first electronic device to: receive a first request to link a payment account associated with a payment card to the first electronic device; in response to receiving the first request, initiate a process for linking the payment account to the first electronic device; after successfully linking the payment account to the first electronic device, concurrently display, on the display: an indication that the payment account has been successfully linked to the first electronic device; and a selectable affordance for linking the payment account to a second electronic device different from the first electronic device; and receive activation of the selectable affordance; and in response to receiving activation of the selectable affordance, initiate a process for linking the payment account to the second electronic device.

A non-transitory computer-readable storage medium comprising one or more programs for execution by one or more processors of a first electronic device with a display and one or more wireless communication elements, the one or more programs including instructions which, when executed by the one or more processors, cause the first electronic device to: display, on the display, a payment-account user interface for a second electronic device that is associated with the first electronic device, wherein displaying the payment-account user interface includes concurrently displaying: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

A first electronic device comprising: a display; one or more wireless communication elements; one or more processors; memory; and one or more programs stored in memory, including instructions which, when executed by the one or more processors, cause the first electronic device to: display, on the display, a payment-account user interface for a second electronic device that is associated with the first electronic device, wherein displaying the payment-account user interface includes concurrently displaying: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

An electronic device, comprising: a touch-sensitive surface unit; a display unit; a wireless communication unit including one or more wireless communication elements; and a processing unit coupled to the display unit, the touch-sensitive surface unit, and the wireless communication unit, the processing unit configured to: receive an input requesting to enable the device for a payment transaction; in response to receiving the input requesting to enable the device for a payment transaction: enable display, on the display unit, of a first visual indicator identifying a first account; and enable the electronic device to participate in a transaction using the first account via the one or more wireless communication elements; receive one or more swipe inputs in a first direction via the touch-sensitive surface unit; in response to receiving the one or more user swipe inputs: enable display, on the display unit, of a second visual indicator identifying a second account; and enable the electronic device to participate in a transaction using the second account via the one or more wireless communication elements; and wherein the first visual indicator is different from the second visual indicator.

An electronic device, comprising: a display unit; a location sensor unit; and a processing unit coupled to the display unit and the location sensor unit, the processing unit configured to: detect, using the location sensor unit, a current location; determine whether the current location is associated with a first account; in accordance with a failure to determine that the current location is associated with an account other than a default payment account, enable display, on the display unit, of a visual indication of a default payment account; in accordance with a determination that the current location is associated with the first account, enable concurrent display, on the display unit, of the visual indication of the default payment account and a visual indication of the first account; and wherein the default payment account and the first account are linked to the electronic device and the default payment account and the first account are different.

An electronic device, comprising: a display unit; a location sensor unit; and a processing unit coupled to the display unit and the location sensor unit, the processing unit configured to: receive an input requesting to enable the device for a payment transaction; and in response to receiving the input: detect, using the location sensor unit, a current location; determine whether a set of one or more payment criteria have been met, wherein the set of one or more payment criteria includes a criterion that is met when the current location is associated with a first payment account; in accordance with a determination that the set of one or more payment criteria is not met, enable display, on the display unit, of a visual indication of a default payment account, wherein the default payment account is different from the first payment account; and in accordance with a determination that the set of one or more payment criteria is met, enable display, on the display unit, of a visual indication of the first payment account.

An electronic device, comprising: a display unit; a wireless communication unit including one or more wireless communication elements; and a processing unit coupled to the display unit and the wireless communication unit, the processing unit configured to: receive an input requesting to enable the device for a payment transaction; in response to receiving the input, enable display, on the display unit, of a payment indication that represents a plurality of payment accounts including a first payment account and a second payment account; receive, via the one or more wireless communication elements, a request for account information corresponding to a payment transaction; in response to receiving the request for account information corresponding to the payment transaction: in accordance with a determination that payment criteria for a first payment account have been met, transmit, via the one or more wireless communication elements, account information for the first payment account without transmitting account information for the second payment account; and in accordance with a determination that payment criteria for the second payment account have been met, transmit, via the one or more wireless communication elements, account information for the second payment account without transmitting account information for the first payment account.

An electronic device, comprising: a display unit; a touch-sensitive surface unit; a wireless communication unit including one or more wireless communication elements; and a processing unit coupled to the display unit, the touch-sensitive surface unit configured to detect intensity of contacts, and the wireless communication unit, the processing unit configured to: receive a first input; in response to receiving the first input: enable display, on the display unit, of a first user interface, wherein the first user interface includes: a first visual indicator identifying a payment card associated with multiple payment accounts, and a second visual indicator identifying a first payment account of the multiple payment accounts of the payment card; enable the electronic device to use the first payment account to engage in a payment transaction via the one or more wireless communication elements; detect a first contact on the touch-sensitive surface unit; determine whether a characteristic intensity of the first contact is above an intensity threshold; and in accordance with a determination that the characteristic intensity of the first contact is above the intensity threshold, enable display, on the display unit, of a second user interface, wherein the second user interface enables selection between different payment accounts represented by the first visual indicator.

A first electronic device, comprising: a display unit; a wireless communications unit with one or more wireless communication elements; and a processing unit coupled to the display unit and the wireless communications unit, the processing unit configured to: receive a first request to link a payment account associated with a payment card to the first electronic device; in response to receiving the first request, initiate a process for linking the payment account to the first electronic device; after successfully linking the payment account to the first electronic device, enable concurrent display, on the display unit, of: an indication that the payment account has been successfully linked to the first electronic device; and a selectable affordance for linking the payment account to a second electronic device different from the first electronic device; and receive activation of the selectable affordance; and in response to receiving activation of the selectable affordance, initiate a process for linking the payment account to the second electronic device.

A first electronic device, comprising: a display unit; a wireless communication unit that includes one or more wireless communication elements; and a processing unit coupled to the display unit and the wireless communication unit, the processing unit configured to: enable display, on the display unit, of a payment-account user interface for a second electronic device that is associated with the first electronic device, wherein enabling display of the payment-account user interface includes enabling concurrent display of: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

A transitory computer-readable storage medium comprising one or more programs for execution by one or more processors of an electronic device with a display, a touch-sensitive surface, and one or more wireless communication elements, the one or more programs including instructions which, when executed by the one or more processors, cause the electronic device to: receive an input requesting to enable the device for a payment transaction; in response to receiving the input requesting to enable the device for a payment transaction: display, on the display, a first visual indicator identifying a first account; and enable the electronic device to participate in a transaction using the first account via the one or more wireless communication elements; receive one or more swipe inputs in a first direction via the touch-sensitive surface; in response to receiving the one or more user swipe inputs: display, on the display, a second visual indicator identifying a second account; and enable the electronic device to participate in a transaction using the second account via the one or more wireless communication elements; and wherein the first visual indicator is different from the second visual indicator.

A transitory computer-readable storage medium comprising one or more programs for execution by one or more processors of an electronic device with a display and a location sensor, the one or more programs including instructions which, when executed by the one or more processors, cause the electronic device to: detect, using the location sensor, a current location; determine whether the current location is associated with a first account; in accordance with a failure to determine that the current location is associated with an account other than a default payment account, display, on the display, a visual indication of a default payment account; in accordance with a determination that the current location is associated with the first account, concurrently display, on the display, the visual indication of the default payment account and a visual indication of the first account; and wherein the default payment account and the first account are linked to the electronic device and the default payment account and the first account are different.

A transitory computer-readable storage medium comprising one or more programs for execution by one or more processors of an electronic device with a display and a location sensor, the one or more programs including instructions which, when executed by the one or more processors, cause the electronic device to: receive an input requesting to enable the device for a payment transaction; and in response to receiving the input: detect, using the location sensor, a current location; determine whether a set of one or more payment criteria have been met, wherein the set of one or more payment criteria includes a criterion that is met when the current location is associated with a first payment account; in accordance with a determination that the set of one or more payment criteria is not met, display, on the display, a visual indication of a default payment account, wherein the default payment account is different from the first payment account; and in accordance with a determination that the set of one or more payment criteria is met, display, on the display, a visual indication of the first payment account.

A transitory computer-readable storage medium comprising one or more programs for execution by one or more processors of an electronic device with a display and one or more wireless communication elements, the one or more programs including instructions which, when executed by the one or more processors, cause the electronic device to: receive an input requesting to enable the device for a payment transaction; in response to receiving the input, display, on the display, a payment indication that represents a plurality of payment accounts including a first payment account and a second payment account; receive, via the one or more wireless communication elements, a request for account information corresponding to a payment transaction; in response to receiving the request for account information corresponding to the payment transaction: in accordance with a determination that payment criteria for a first payment account have been met, transmit, via the one or more wireless communication elements, account information for the first payment account without transmitting account information for the second payment account; and in accordance with a determination that payment criteria for the second payment account have been met, transmit, via the one or more wireless communication elements, account information for the second payment account without transmitting account information for the first payment account.

A transitory computer-readable storage medium comprising one or more programs for execution by one or more processors of an electronic device with a display, a touch-sensitive surface configured to detect intensity of contacts, and one or more wireless communication elements, the one or more programs including instructions which, when executed by the one or more processors, cause the electronic device to: receive a first input; in response to receiving the first input: display, on the display, a first user interface, wherein the first user interface includes: a first visual indicator identifying a payment card associated with multiple payment accounts, and a second visual indicator identifying a first payment account of the multiple payment accounts of the payment card; enable the electronic device to use the first payment account to engage in a payment transaction via the one or more wireless communication elements; detect a first contact on the touch-sensitive surface; determine whether a characteristic intensity of the first contact is above an intensity threshold; and in accordance with a determination that the characteristic intensity of the first contact is above the intensity threshold, display, on the display, a second user interface, wherein the second user interface enables selection between different payment accounts represented by the first visual indicator.

A transitory computer-readable storage medium comprising one or more programs for execution by one or more processors of a first electronic device with a display and one or more wireless communication elements, the one or more programs including instructions which, when executed by the one or more processors, cause the first electronic device to: receive a first request to link a payment account associated with a payment card to the first electronic device; in response to receiving the first request, initiate a process for linking the payment account to the first electronic device; after successfully linking the payment account to the first electronic device, concurrently display, on the display: an indication that the payment account has been successfully linked to the first electronic device; and a selectable affordance for linking the payment account to a second electronic device different from the first electronic device; and receive activation of the selectable affordance; and in response to receiving activation of the selectable affordance, initiate a process for linking the payment account to the second electronic device.

A transitory computer-readable storage medium comprising one or more programs for execution by one or more processors of a first electronic device with a display and one or more wireless communication elements, the one or more programs including instructions which, when executed by the one or more processors, cause the first electronic device to: display, on the display, a payment-account user interface for a second electronic device that is associated with the first electronic device, wherein displaying the payment-account user interface includes concurrently displaying: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

Thus, devices are provided with faster, more efficient methods and interfaces for linking accounts to the device, selecting an account for use in a transaction, and transmitting account information in a transaction, thereby increasing the effectiveness, efficiency, and user satisfaction with such devices. Such methods and interfaces may complement or replace other methods for performing similar tasks.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 19 is a flow diagram illustrating a method for linking a payment account to an electronic device, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for linking accounts to the electronic device, selecting an account for use in a transaction, and transmitting account information in a transaction. In particular, there is a need to provide efficient methods and interfaces for wearable devices, such as smart watches. Such techniques can reduce the cognitive burden on a user who access event notifications, thereby enhancing productivity. Further, such techniques can reduce processor and battery power otherwise wasted on redundant user inputs.

Figure 11:
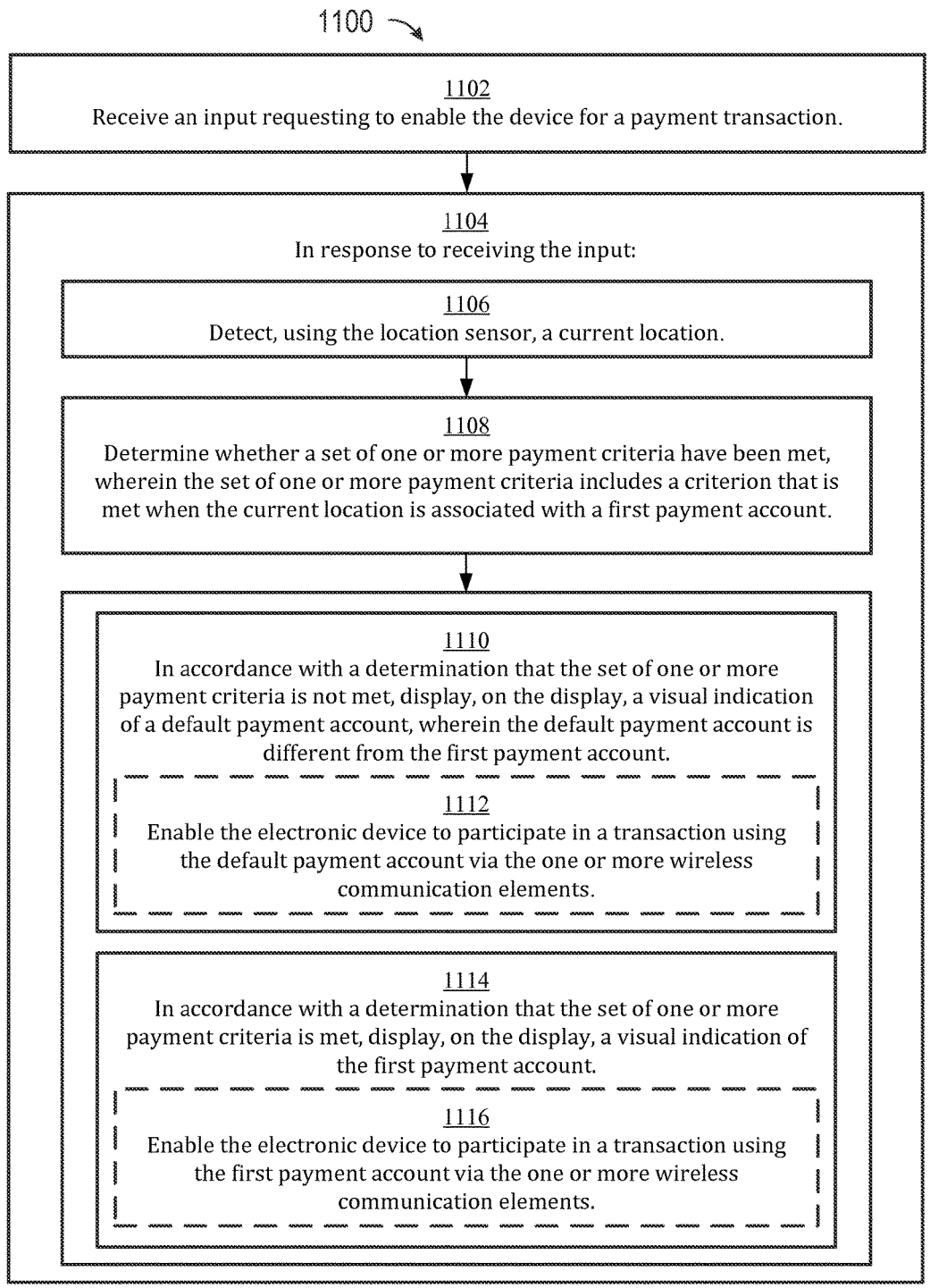
FIG. 11 is a flow diagram illustrating a method for selecting an account, in accordance with some embodiments.
Figure 12A:
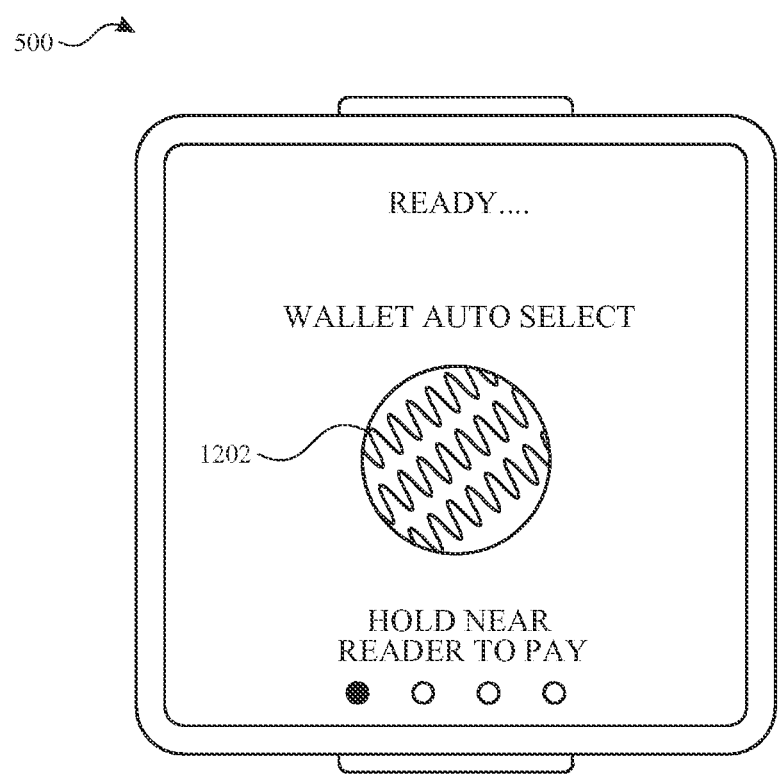
FIGS. 12A-12D illustrate exemplary techniques and exemplary user interfaces for transmitting account information of an account, in accordance with some embodiments.
Figure 17:
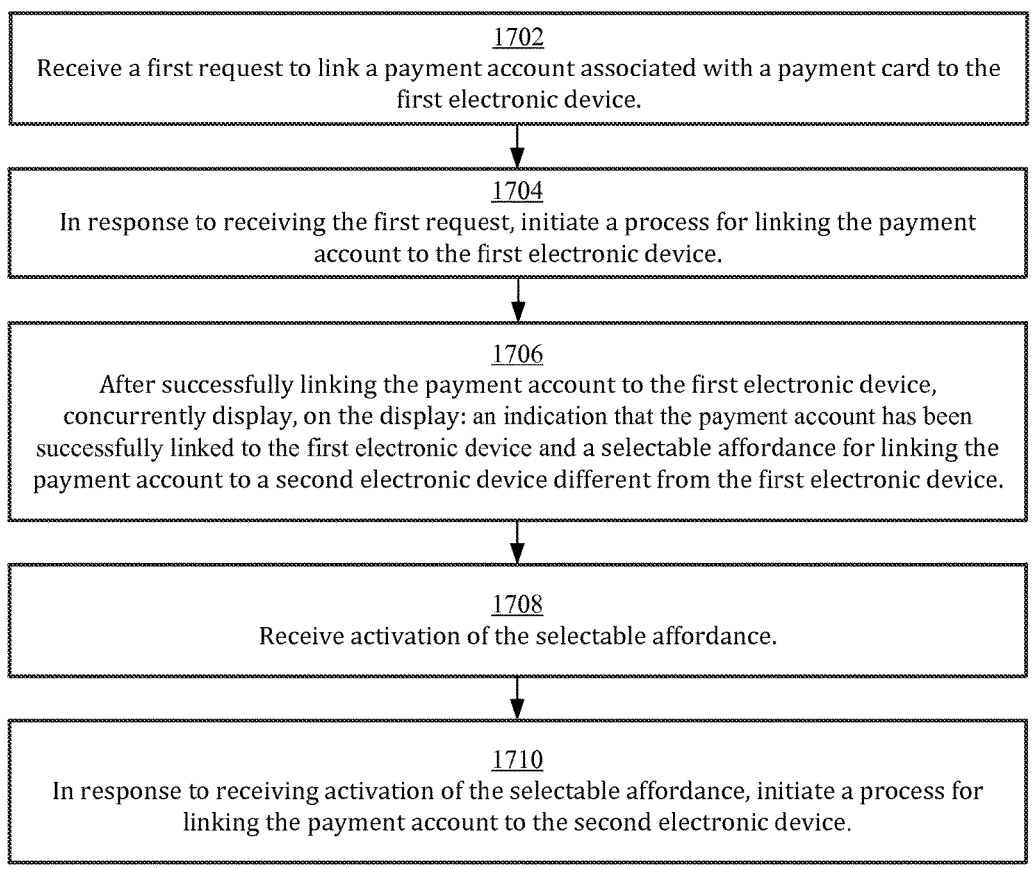
FIG. 17 is a flow diagram illustrating a method for linking a payment account to one or more electronic devices, in accordance with some embodiments.
Figure 18A:
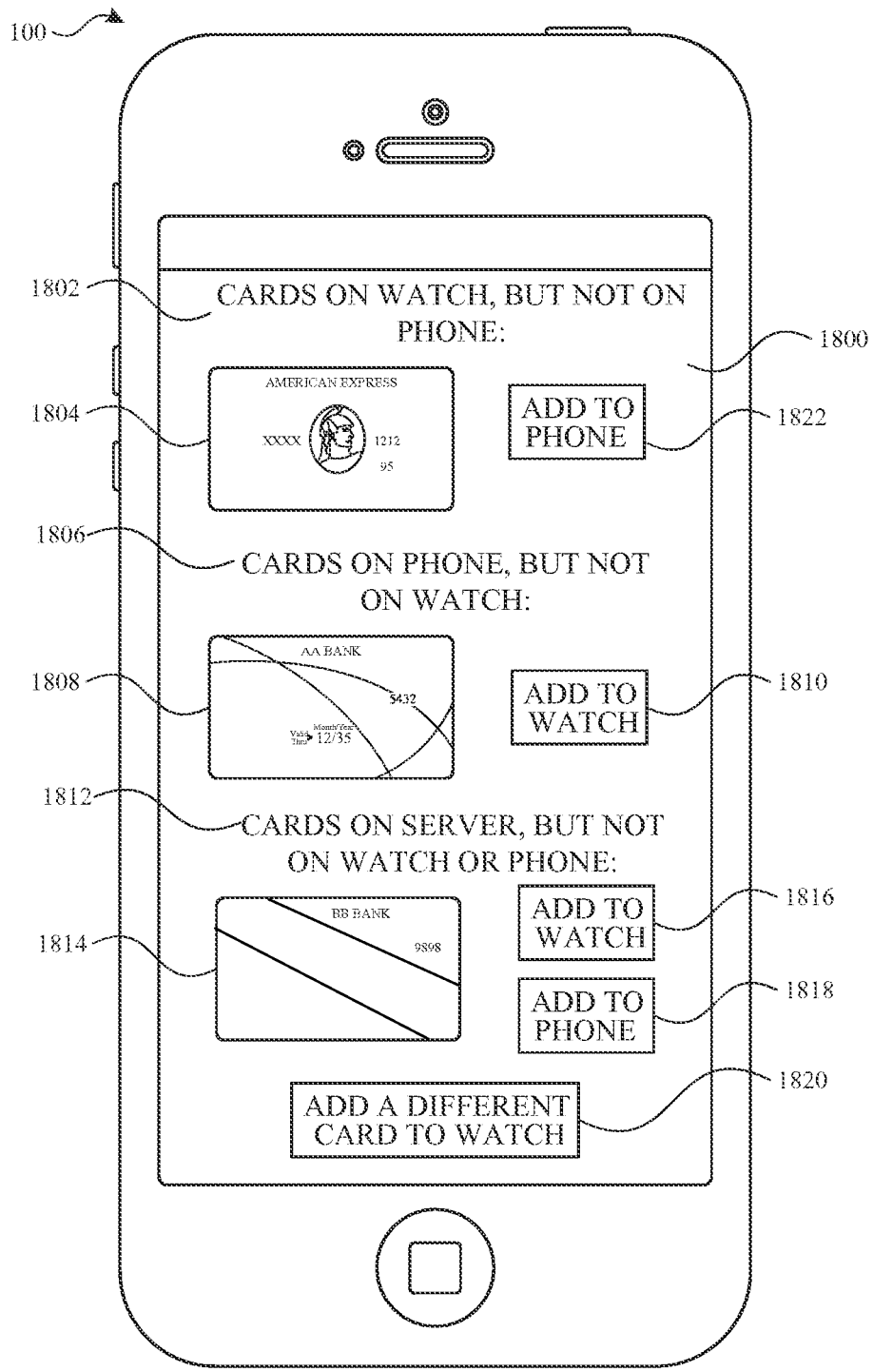
FIGS. 18A-18C illustrate exemplary techniques and exemplary user interfaces for linking a payment account to an electronic device, in accordance with some embodiments.
Figure 18B:
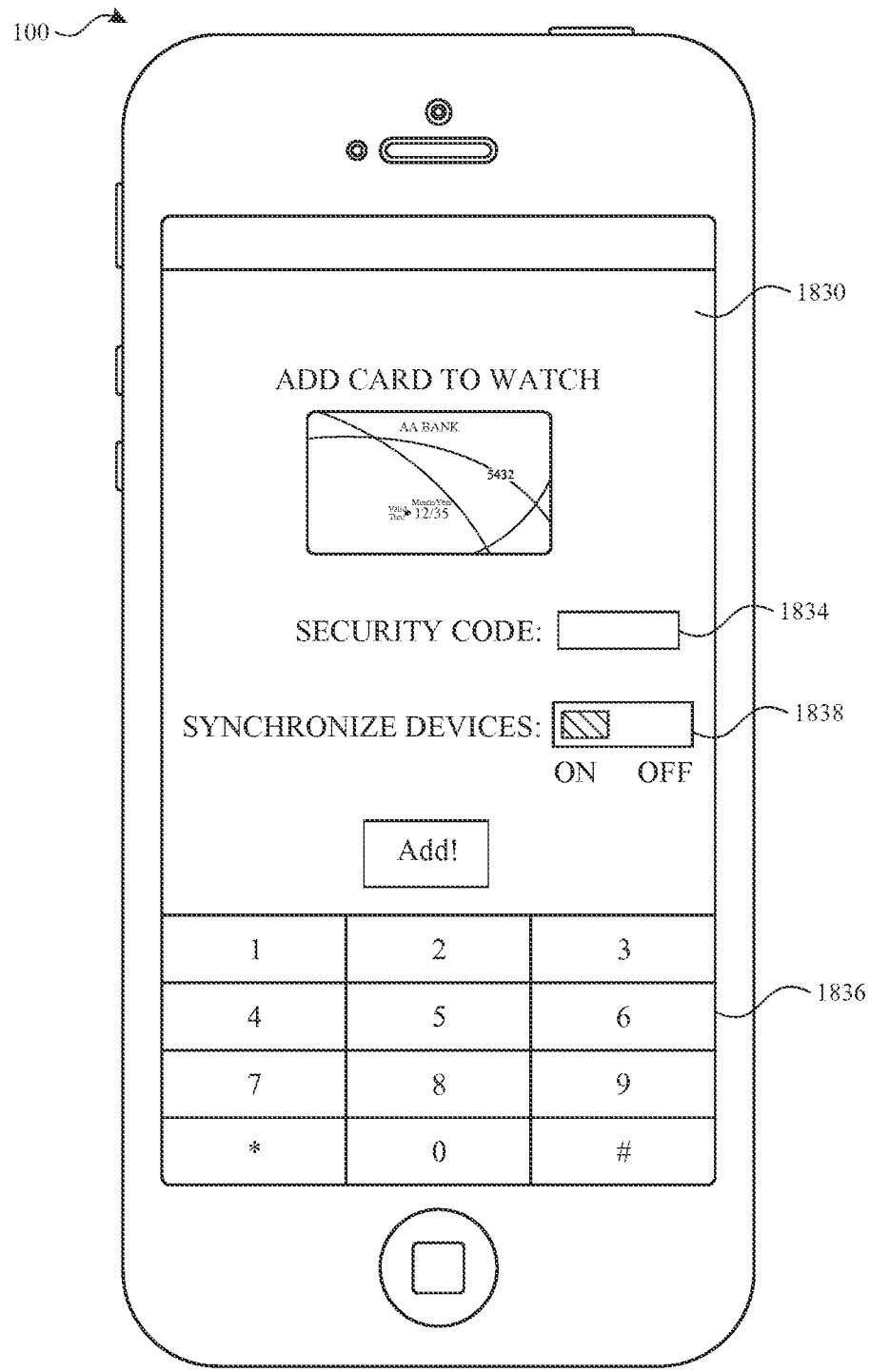
Figure 18C:
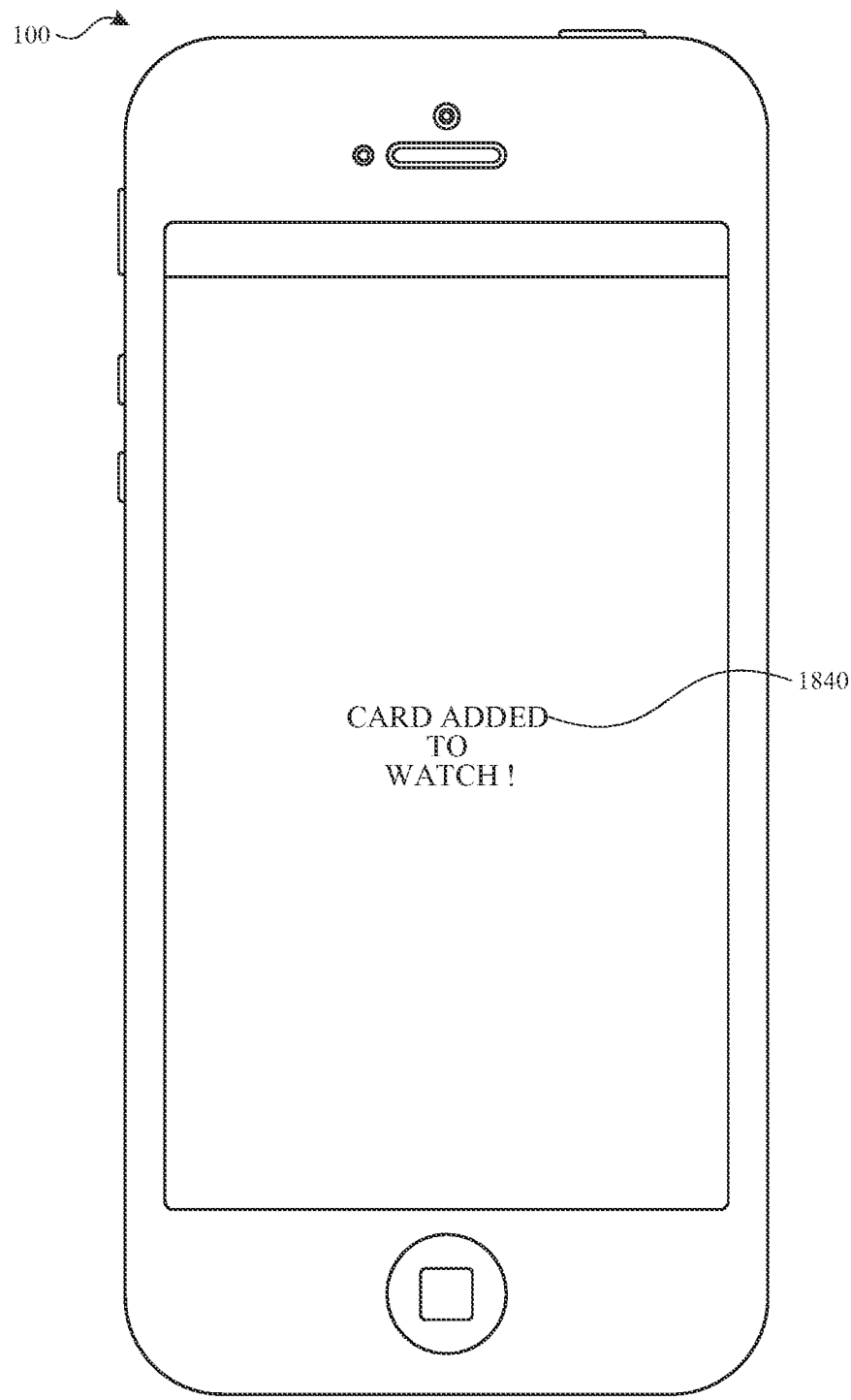

Below, FIGS. 1A-1B, 2, 3, 4A-4B, and 5A-5B provide a description of exemplary devices. FIGS. 6A-6G illustrate exemplary techniques and exemplary user interfaces for receiving a selection of an account. FIG. 7 is a flow diagram illustrating a method for receiving a selection of an account. The user interfaces in FIGS. 6A-6G are used to illustrate the processes in FIG. 7. FIGS. 8A-8D illustrate exemplary techniques and exemplary user interfaces for selecting an account. FIG. 9 is a flow diagram illustrating a method for selecting an account. The user interfaces in FIGS. 8A-8D are used to illustrate the processes in FIG. 9. FIGS. 10A-10E illustrate exemplary techniques and exemplary user interfaces for selecting an account. FIG. 11 is a flow diagram illustrating a method for selecting an account, in accordance with some embodiments. The user interfaces in FIGS. 10A-10E are used to illustrate the processes in FIG. 11. FIGS. 12A-12D illustrate exemplary techniques and exemplary user interfaces for transmitting account information of an account. FIG. 13 is a flow diagram illustrating a method for transmitting account information of an account, in accordance with some embodiments. The user interfaces in FIGS. 12A-12D are used to illustrate the processes in FIG. 13. FIGS. 14A-14E illustrate exemplary techniques and exemplary user interfaces for receiving a selection of an account. FIG. 15 is a flow diagram illustrating a method for receiving a selection of an account. The user interfaces in FIGS. 14A-14E are used to illustrate the processes in FIG. 15. FIGS. 16A-16G illustrate exemplary techniques and exemplary user interfaces for linking a payment account to one or more electronic devices. FIG. 17 is a flow diagram illustrating a method for linking a payment account to one or more electronic devices. The user interfaces in FIGS. 16A-16G are used to illustrate the processes in FIG. 17. FIGS. 18A-18C illustrate exemplary techniques and exemplary user interfaces for linking a payment account to an electronic device, in accordance with some embodiments. FIG. 19 is a flow diagram illustrating a method for linking a payment account to an electronic device. The user interfaces in FIGS. 18A-18C are used to illustrate the processes in FIG. 19.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
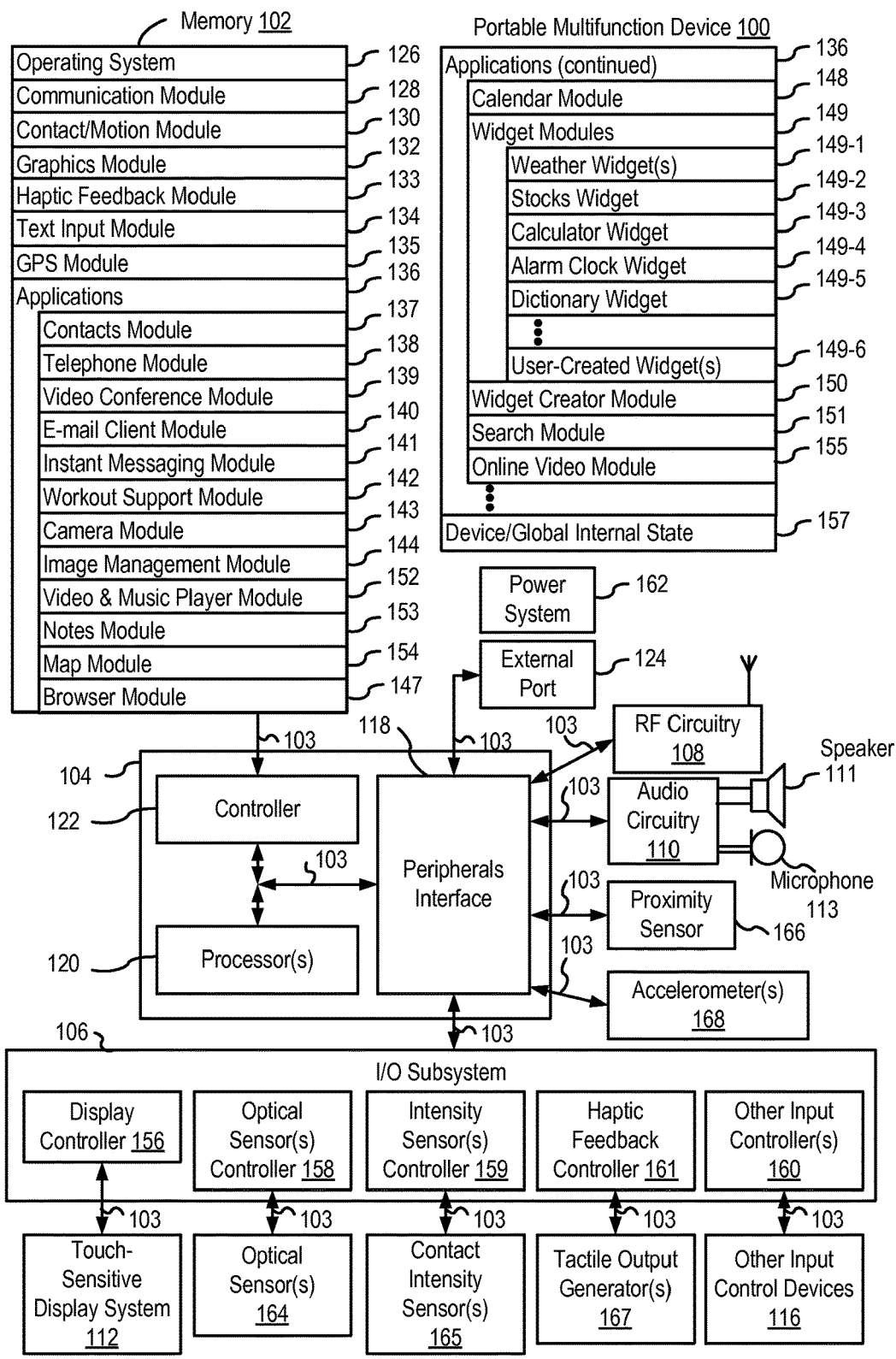
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
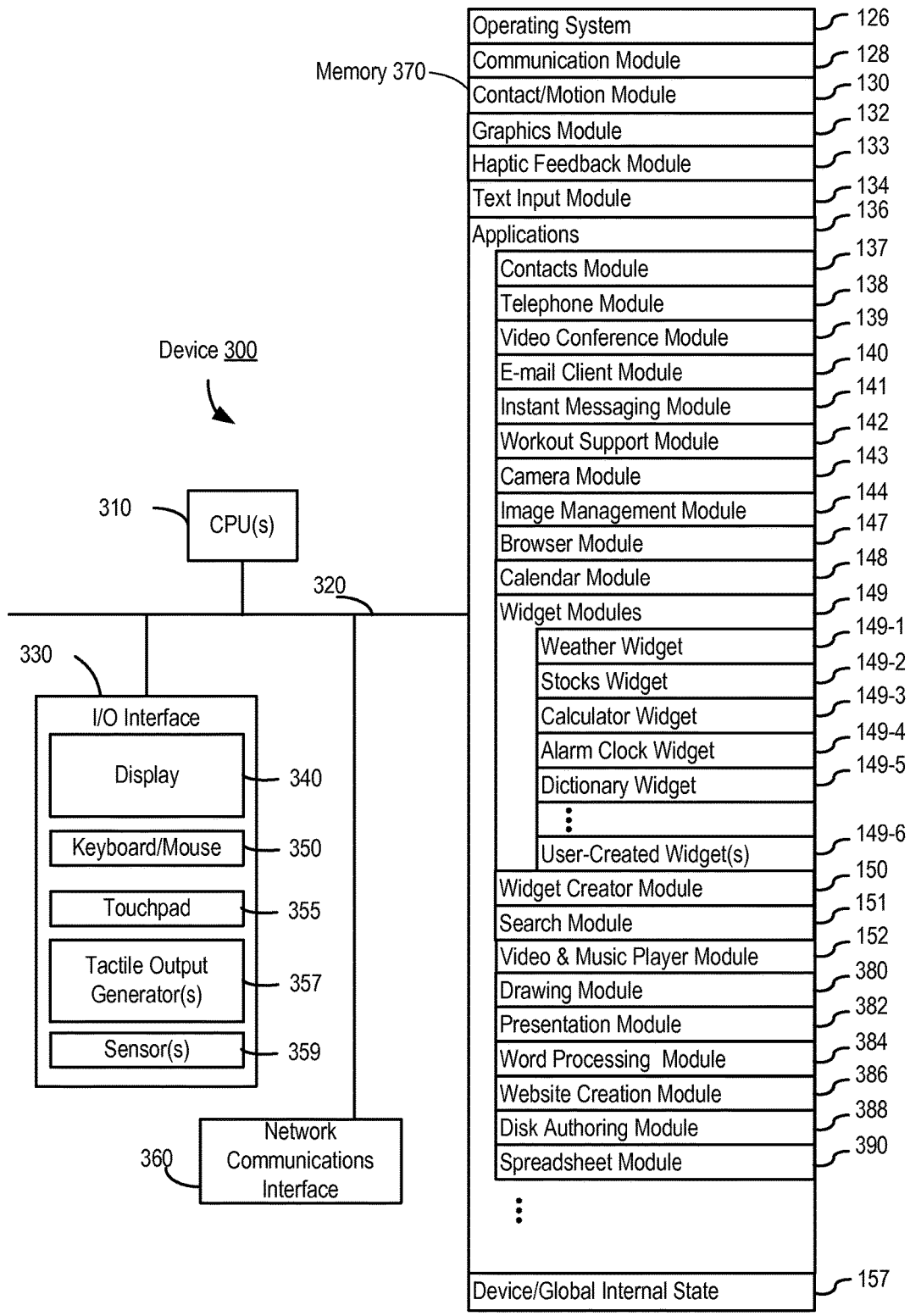
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
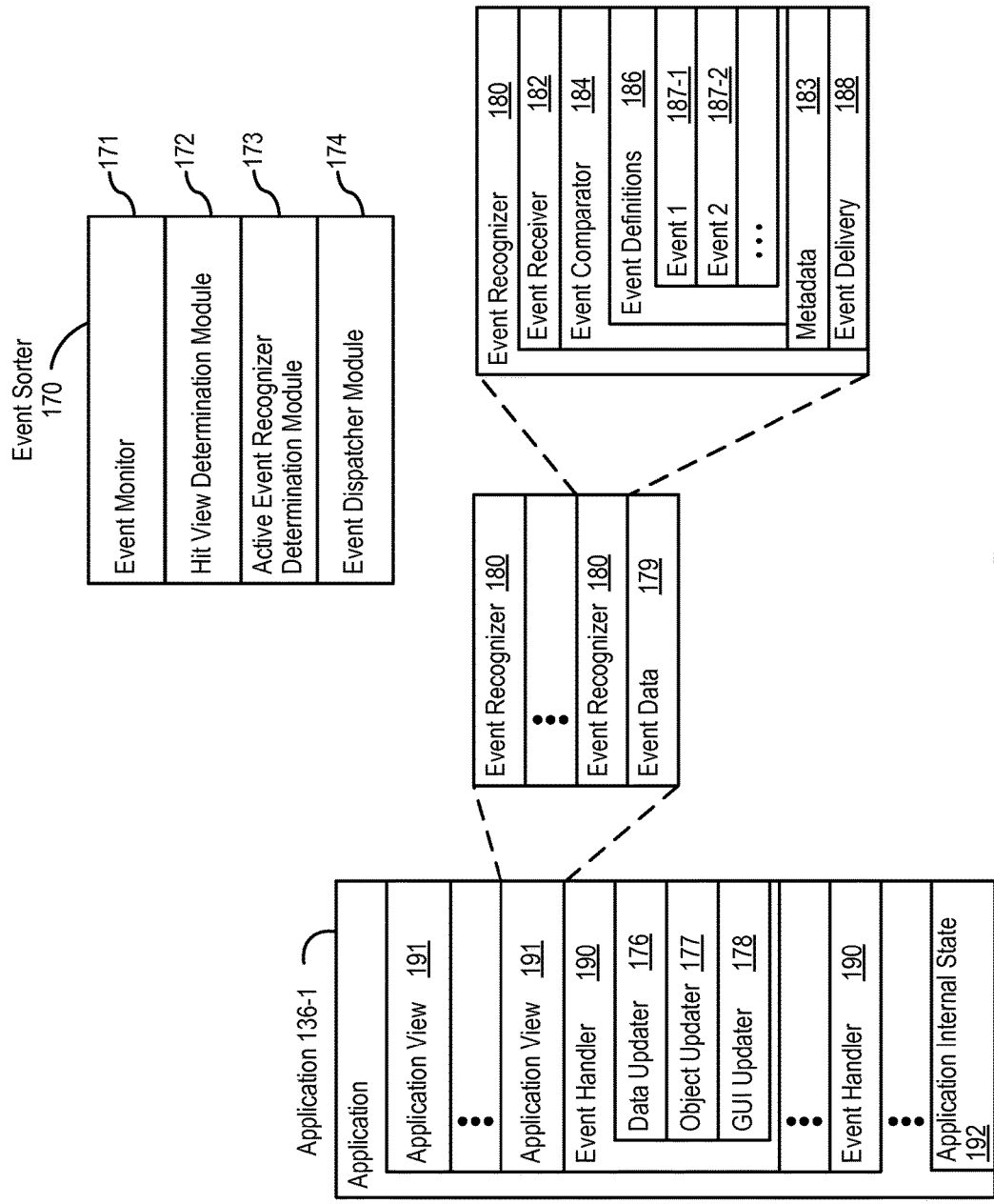
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
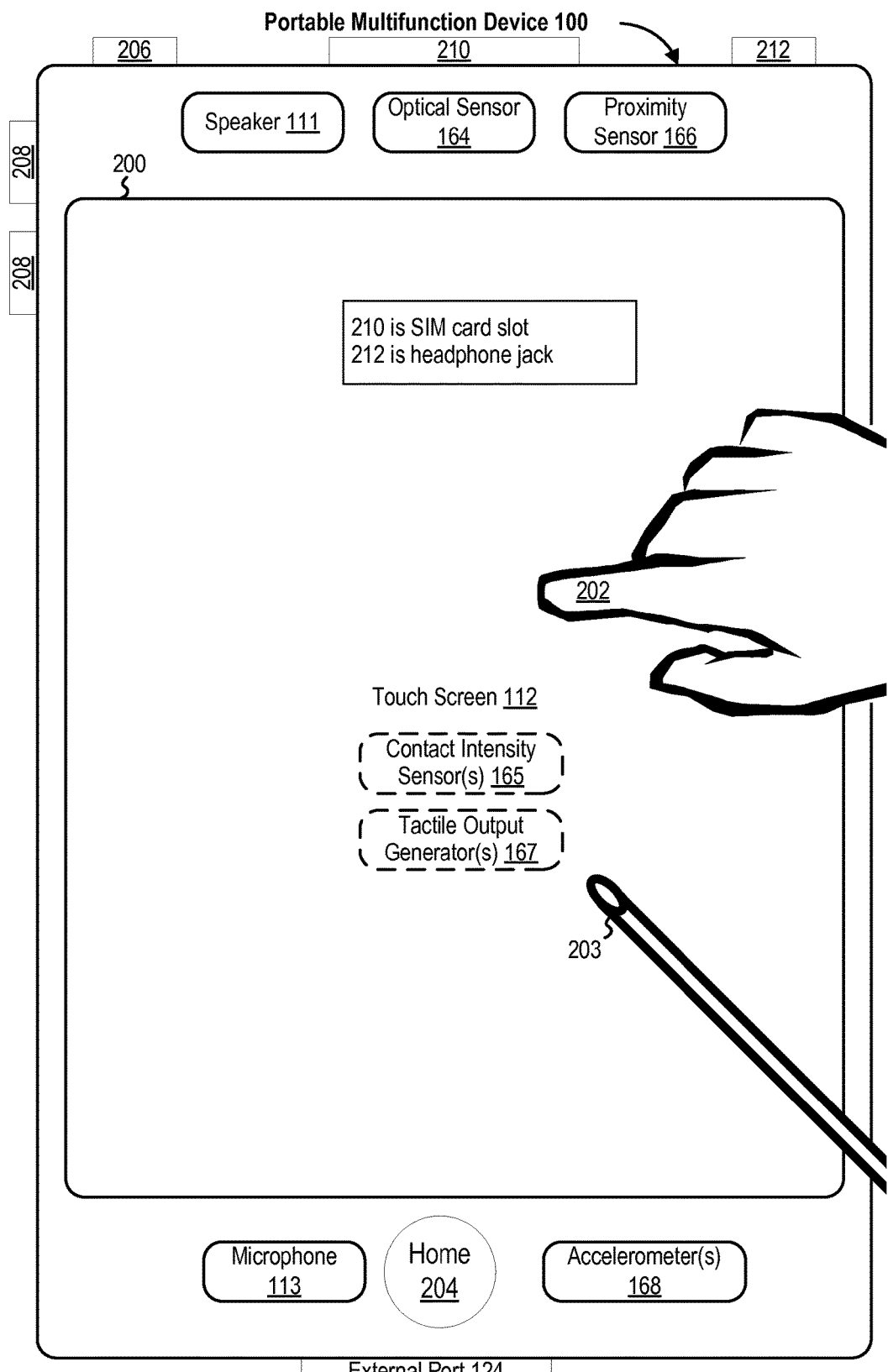
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
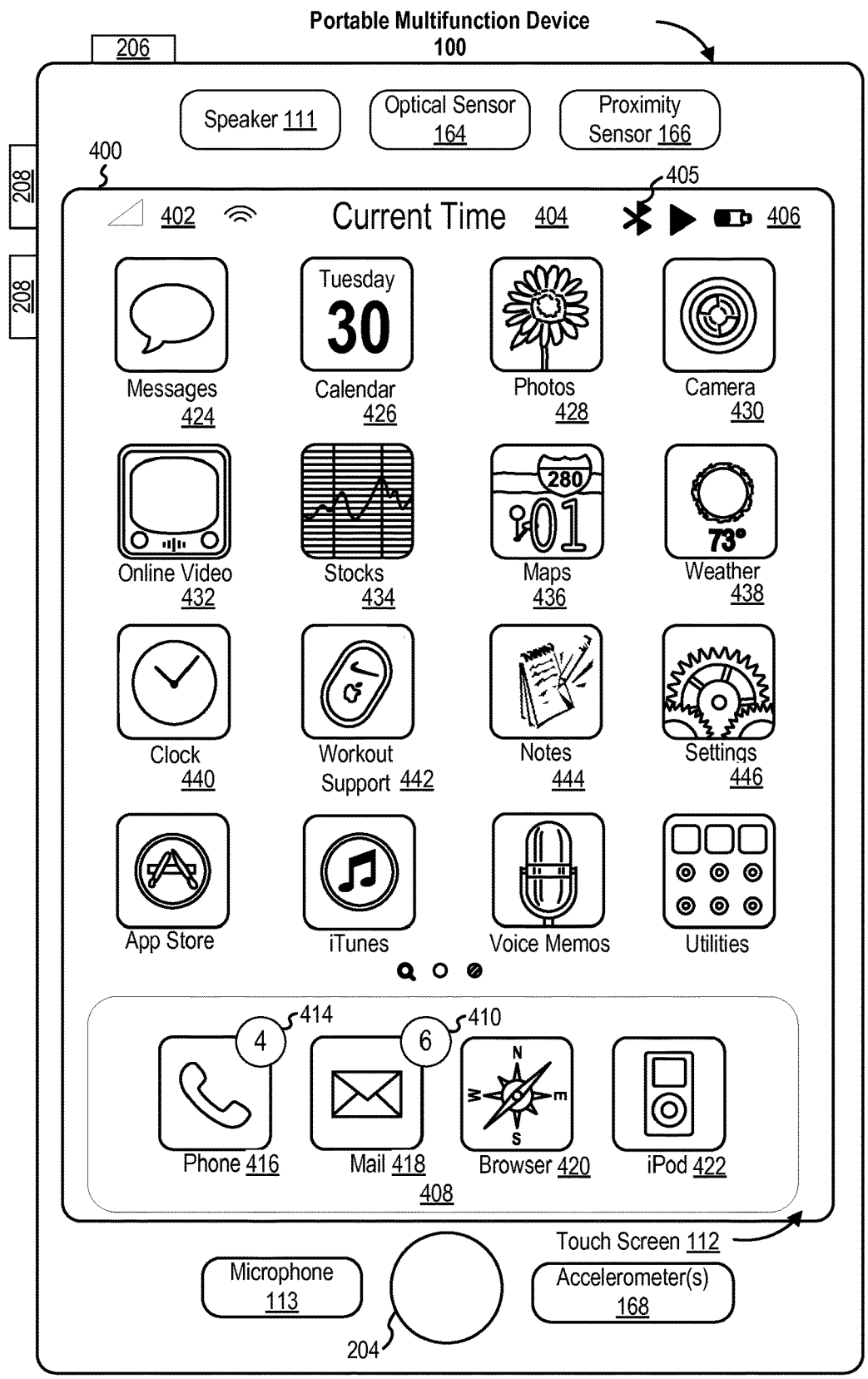
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
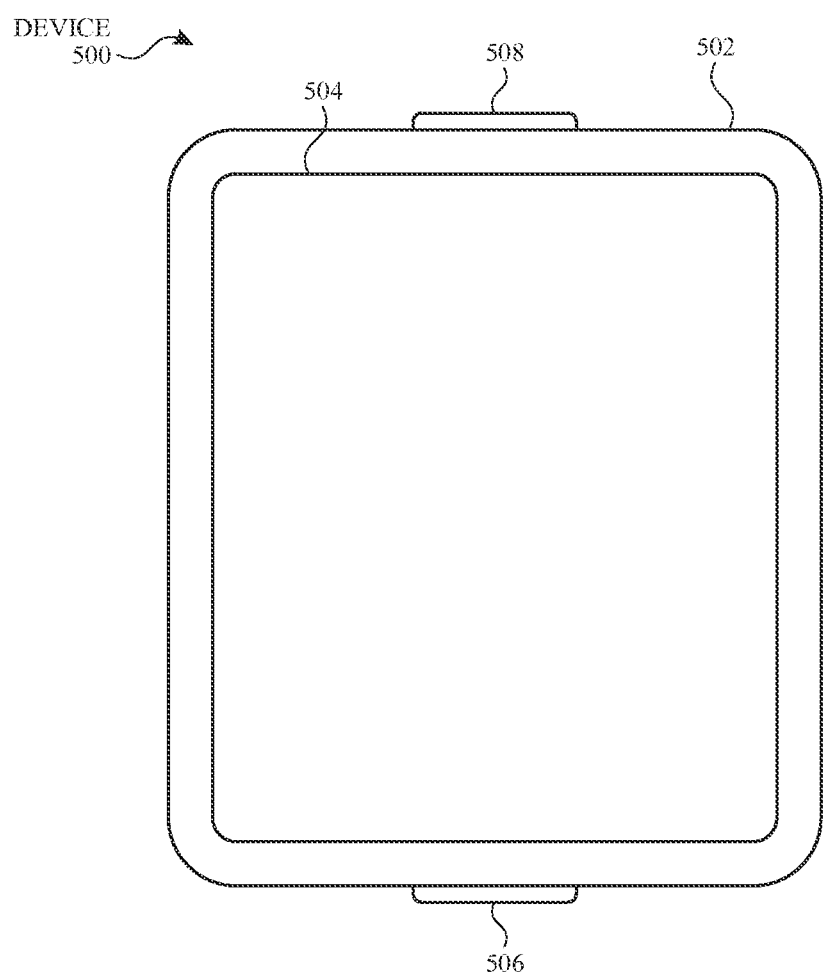
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
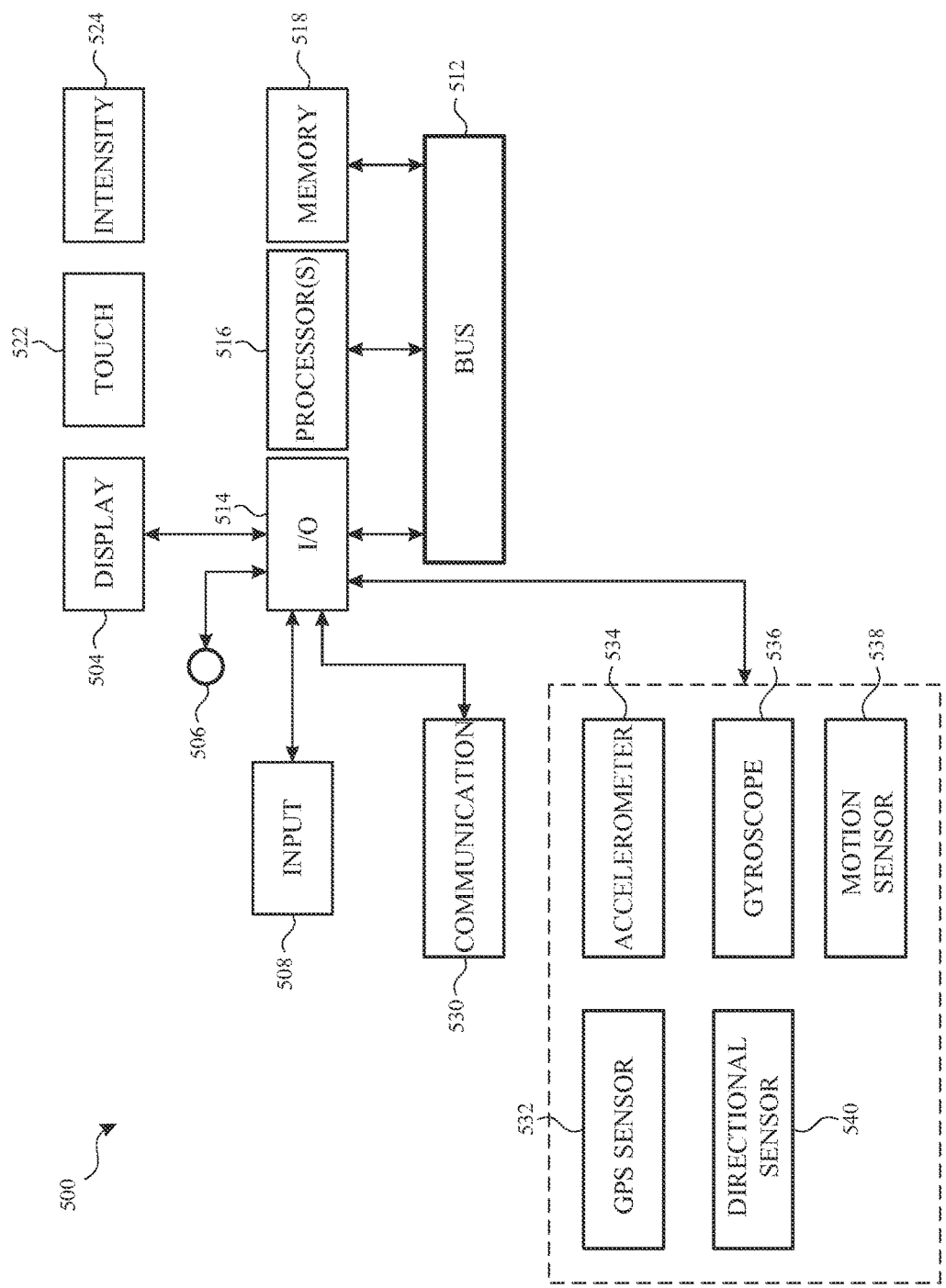
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700, 900, 1100, 1300, 1500, 1700, and 1900 (FIGS. 7, 9, 11, 13, 15, 17, and 19). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
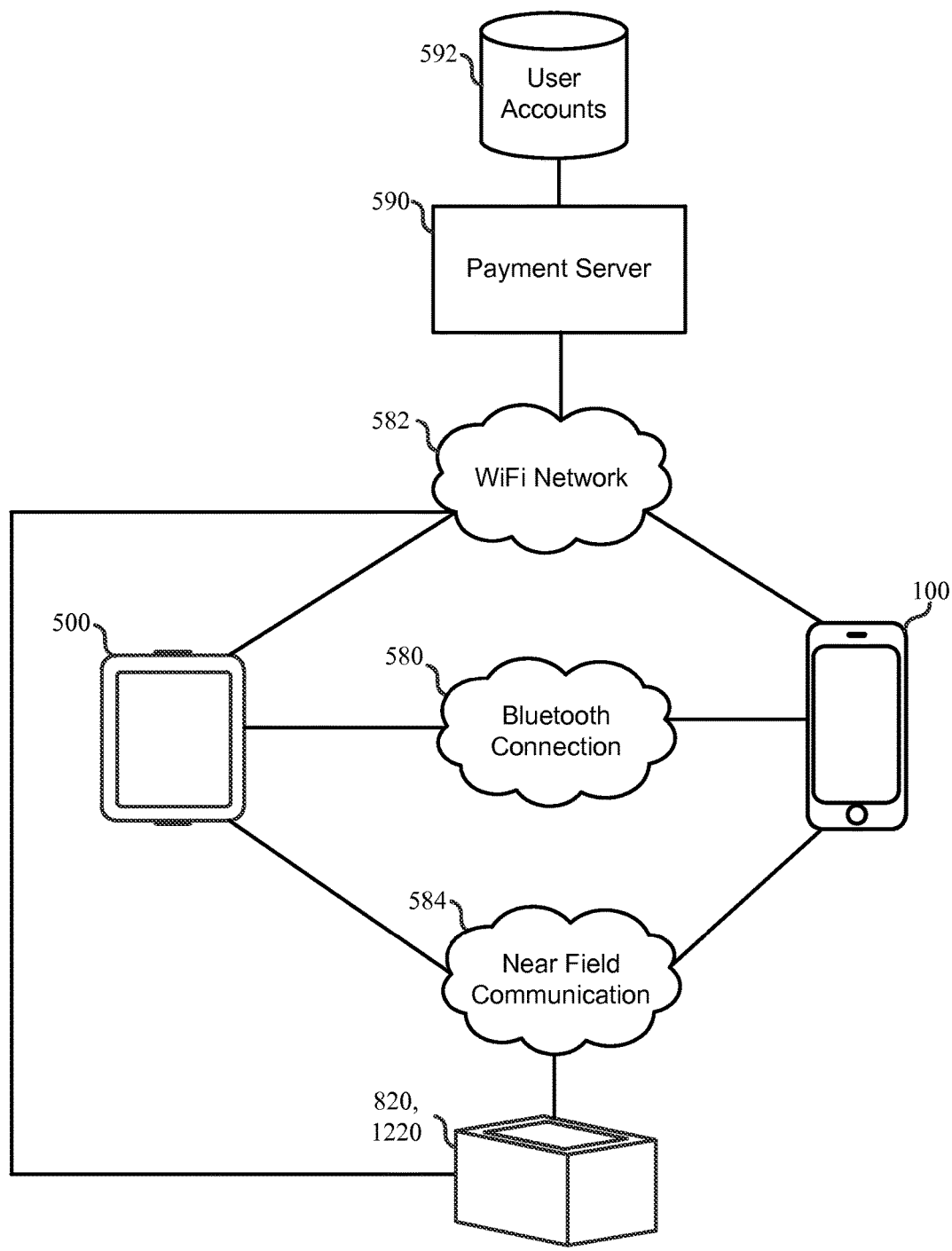
FIG. 5I illustrates exemplary devices connected via one or more communication channels to complete a payment transaction in accordance with some embodiments.

FIG. 5I illustrates exemplary devices connected via one or more communication channels to complete a payment transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each over any of a variety of networks. For example, the devices communicate using a Bluetooth connection 580 (e.g., which includes a traditional Bluetooth connection or a Bluetooth Low Energy connection) or using a WiFi network 582. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 820, 1220, which is optionally NFC-enabled. The communication optionally occurs using a variety of communication channels and/or technologies. In one examples, electronic device (e.g., 100, 300, 500) communicates with payment terminal 820, 1220 using an NFC channel 584. In some examples, payment terminal 820, 1220 communicates with an electronic device (e.g., 100, 300, 500) using a peer-to-peer NFC mode. Electronic device (e.g., 100, 300, 500) is optionally configured transmit a signal to payment terminal 820, 1220 that includes payment information for a payment account (e.g., a default account or an account selected for the particular transaction).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 820, 1220) is established within a defined time period from detection of the input, the secure element releases payment information to be transmitted to the other device (e.g., payment terminal 820, 1220). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 820, 1220 optionally uses the payment information to generate a signal to transmit to a payment server 590 to determine whether the payment is authorized. Payment server 590 optionally includes any device or system configured to receive payment information associated with a payment account and to determine whether a proposed purchase is authorized. In some examples, payment server 590 includes a server of an issuing bank. Payment terminal 820, 1220 communicates with payment server 590 directly or indirectly via one or more other devices or systems (e.g., a server of an acquiring bank and/or a server of a card network).

Payment server 590 optionally uses at least some of the payment information to identify a user account from among a database of user accounts (e.g., 592). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 590) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 590 responds to POS payment terminal 820, 1220 with an indication as to whether a proposed purchase is authorized or denied. In some examples, POS payment terminal 820, 1220 transmits a signal to the electronic device (e.g., 100, 300, 500) to identify the result. For example, POS payment terminal 820, 1220 sends a receipt to the electronic device (e.g., 100, 300, 500) when a purchase is authorized (e.g., via a transaction-coordination server that manages a transaction app on the user device). In some instances, POS payment terminal 820, 1220 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 820, 1220. For example, upon detecting that a mechanical input has been received, a secure element in the electronic device (e.g., 100, 300, 500) releases payment information to allow an application on the electronic device to access the information (e.g., and to transmit the information to a server associated with the application).

Attention is now directed towards embodiments of user interfaces ("UI") and associated processes that may be implemented on an electronic device, such as portable multifunction device 100, device 300, or device 500.

Some embodiments described below relate to loyalty accounts. For example, a loyalty account may be an account of a loyalty program that provides a structured marketing effort that rewards customers/members. A loyalty account is optionally specific to one particular company, store, or chain of stores. A company (such as a retail store or chain of stores) may use a loyalty account to track purchases or other information about a user (e.g., a purchaser). The loyalty account typically entitles the user to a discount on a current or future purchase and/or an allotment of points that may be used toward future purchases or gifts. In some examples, loyalty accounts cannot be used for making payments. Generally, loyalty accounts cannot be used make a monetary payment.

Some embodiments described below relate to private label accounts. For example, private label accounts include payment accounts branded for a specific merchant, independent dealer, or manufacturer. Some private label cards and private label accounts are accepted only at particular merchants or may provide certain benefits only available at particular merchants. For example, a particular merchant may offer a private label account to customers that can only be used when making purchases through that particular merchant. Merchants frequently prefer to offer private label accounts because it provides customers another way to shop with the merchant, thus increasing sales and providing customers with a convenient payment option.

Some embodiments described below relate to transmitting payment account information from the electronic device to a contactless payment terminal that enables the contactless payment terminal to engage in a payment transaction by, for example, routing information to one or more financial institutions to verify payment credentials and/or receive authorization to complete the transaction. An exemplary payment network architecture and additional details regarding routing for payment transactions can be found at, for example, FIG. 2 and the accompanying description of U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014.

FIGS. 6A-6G illustrate exemplary techniques and exemplary user interfaces for receiving a selection of an account, such as a loyalty account or a payment account, from among multiple accounts in an electronic wallet, in accordance with some embodiments. For example, account information of a selected account may subsequently be transmitted to an NFC-enabled payment terminal for use in a transaction (e.g., when the device is placed into a field of the payment terminal). The user interfaces in these figures are used to illustrate the processes described below, including the processes in FIG. 7.

Figure 6A:
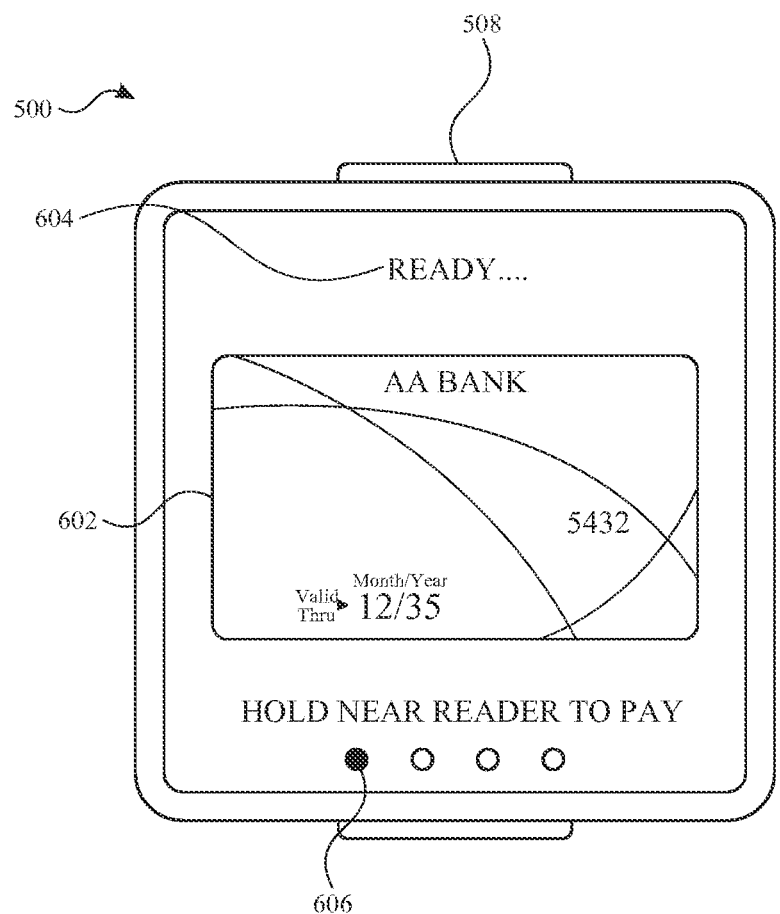
FIGS. 6A-6G illustrate exemplary techniques and exemplary user interfaces for receiving a selection of an account, in accordance with some embodiments.
Figure 7:
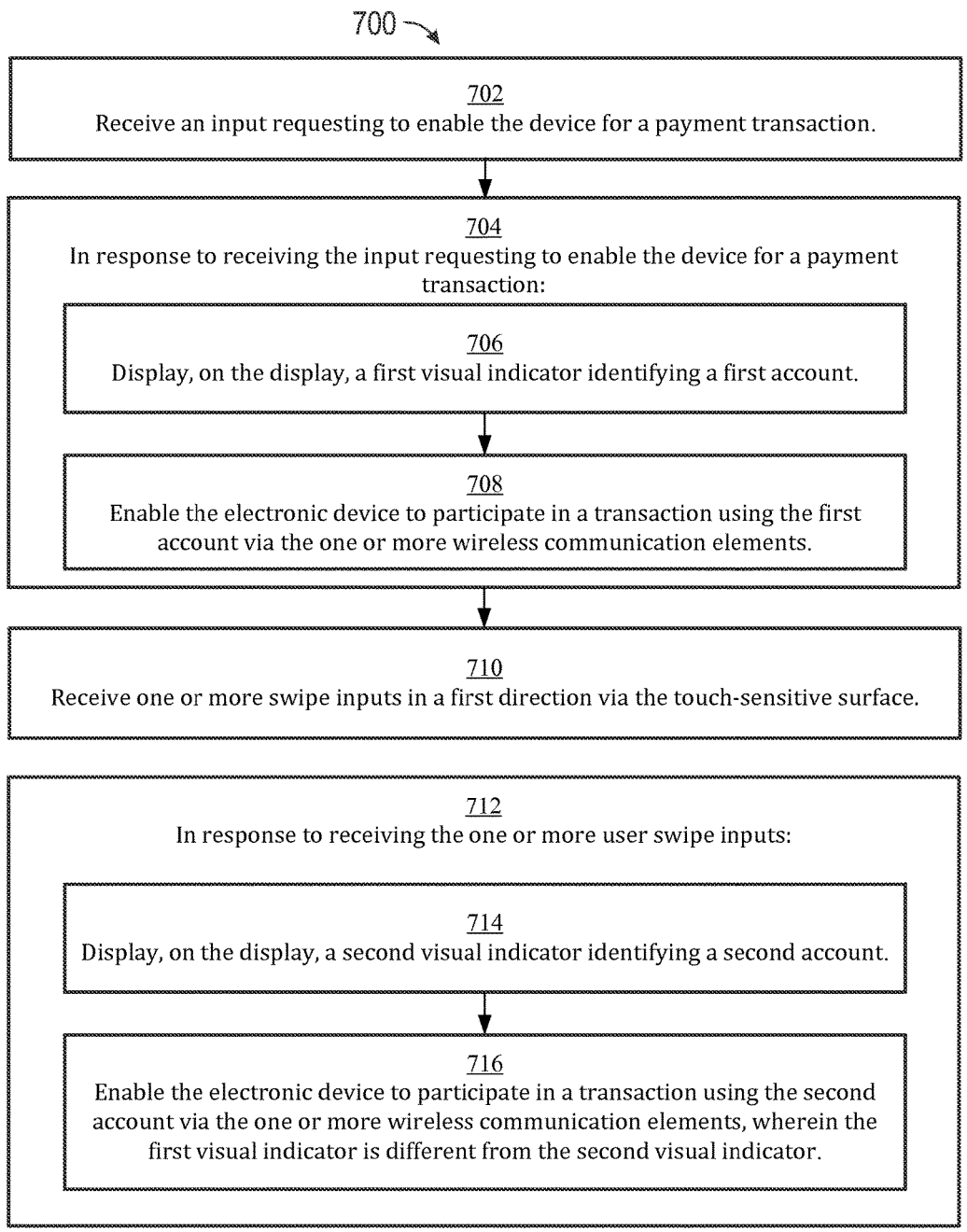
FIG. 7 is a flow diagram illustrating a method for receiving a selection of an account, in accordance with some embodiments.

FIG. 6A illustrates wearable electronic device 500, which is, for example, a smart watch. The device includes a display, a touch-sensitive surface, and one or more wireless communication elements (e.g., one or more wireless antennas such as NFC antennas, WiFi antennas). The device receives an input (e.g., a user input) requesting to enable the device for a payment transaction (e.g., the user performs a double-click of hardware button 508 of the device which arms the device for making NFC payments and/or for accessing an electronic wallet of the device).

In response to receiving the input requesting to enable the device for a payment transaction, and as illustrated in FIG. 6A, the device displays, on the display, a first visual indicator 602 identifying a first account and the device enables the electronic device to participate in a transaction using the first account via the one or more wireless communication elements (e.g., arming the device for making an NFC payment using the default payment account or arming the device for performing an NFC transaction using a loyalty account). Ready indication 604 is a visual indication that the device is enabled to participate in a transaction using the first account, represented by the first visual indicator 602. First visual indicator 602 may take up less than 70% (or less than 60%, 50%, or 40%) of the total display space of the display. The device may also display, on the display, an indication 606 that other accounts are also available or an indication 606 of the number of other accounts available. In this example, the indication 606 includes four paging dots. The first paging dot is of a first color that is different from a second color of the second, third, and fourth paging dots. The four paging dots indicate that a total of four accounts are available. The first paging dot being a different color from the other paging dots indicates that the device is currently displaying information (e.g., first visual indicator 602) corresponding to the first account.

Figure 6B:
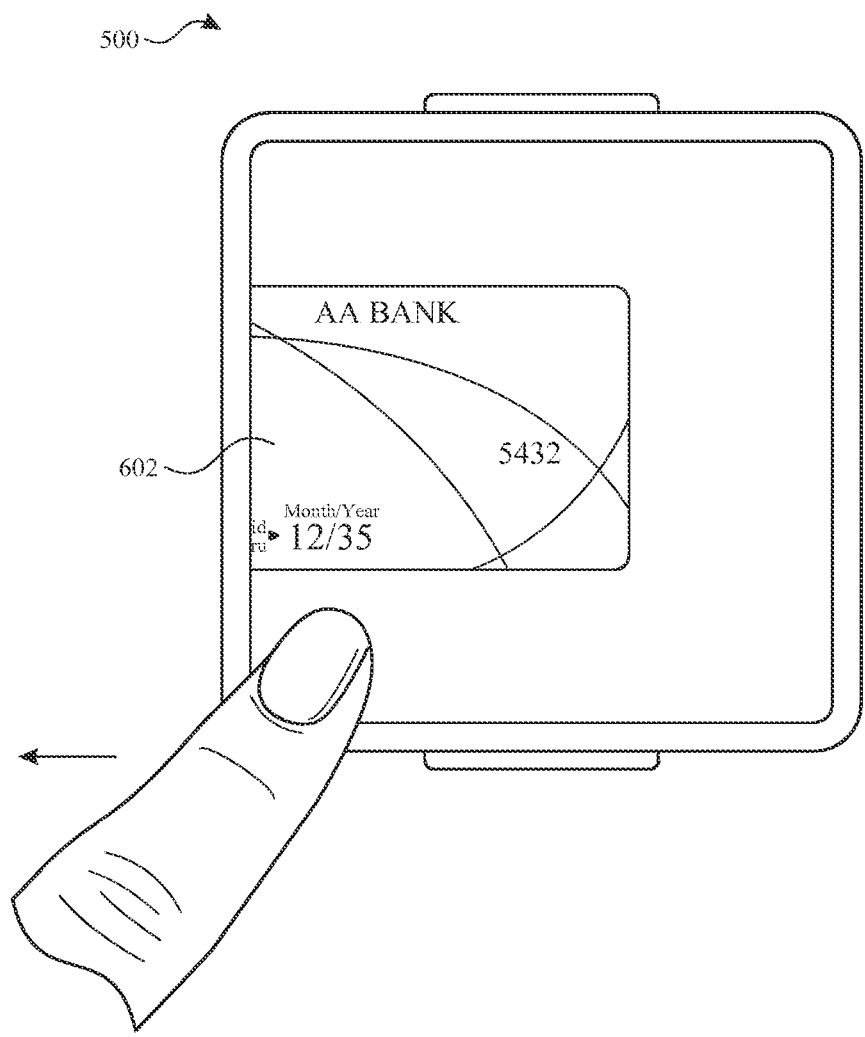

At FIG. 6B, the electronic device receives one or more swipe inputs in a first direction (e.g., one or more left swipes or one or more right swipes) via the touch-sensitive surface. At FIG. 6B, one or more swipe inputs are detected and the first visual indicator 602 is being transitioned to not being displayed (e.g., by sliding the first visual indicator 602 in the first direction). In some examples, ready indication 604 is no longer displayed while the first visual indicator 602 is transitioning to not being displayed.

Figure 6C:
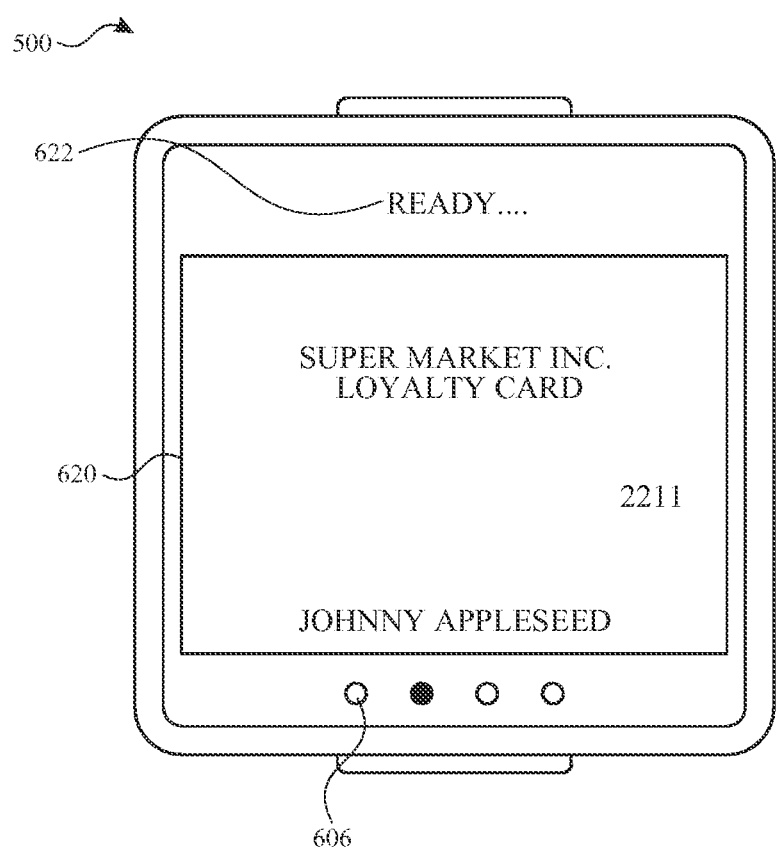

As illustrated in FIG. 6C, in response to receiving the one or more user swipe inputs, the device displays, on the display, a second visual indicator 620 identifying a second account that is different from the first account and the device enables the electronic device to participate in a transaction using the second account via the one or more wireless communication elements (e.g., arming the device for making an NFC transaction using the second account and disabling the device from participating in transactions using the first account). In some embodiments, second visual indicator 620 is larger than first visual indicator 602. For example, the second visual indicator takes up more than 70% (or more than 60%, 50%, or 40%) of the total display space of the display. At FIG. 6C, the first visual indicator 602 is no longer displayed and the paging dots 606 have been updated to reflect that the device is currently displaying information (e.g., second visual indicator 620) corresponding to the second account. Ready indication 622 is a visual indication that the device is enabled to participate in a transaction using the second account.

The first visual indicator 602 is different from the second visual indicator 610. For example, the first visual indicator 602 includes: the name of a first financial institution "AA BANK," has a first background art that corresponds to the background art of a payment card associated with the first account, at least a portion of an account number associated with the first account, and an expiration date associated with the first account. The second visual indicator 620 includes the name of a merchant "SUPERMARKET INC." associated with a loyalty account, has a second background art that is different from the first background art, and may or may not include at least a portion of an account number associated with the second account. In this example, the second visual indicator does not display an expiration date associated with the second account.

In accordance with some embodiments, as illustrated in FIGS. 6A-6C, the first account is a payment account and the second account is a loyalty account. In accordance with some embodiments, as illustrated in FIGS. 6A and 6G, the first account is a payment account and the second account is a payment account.

Figure 6D:
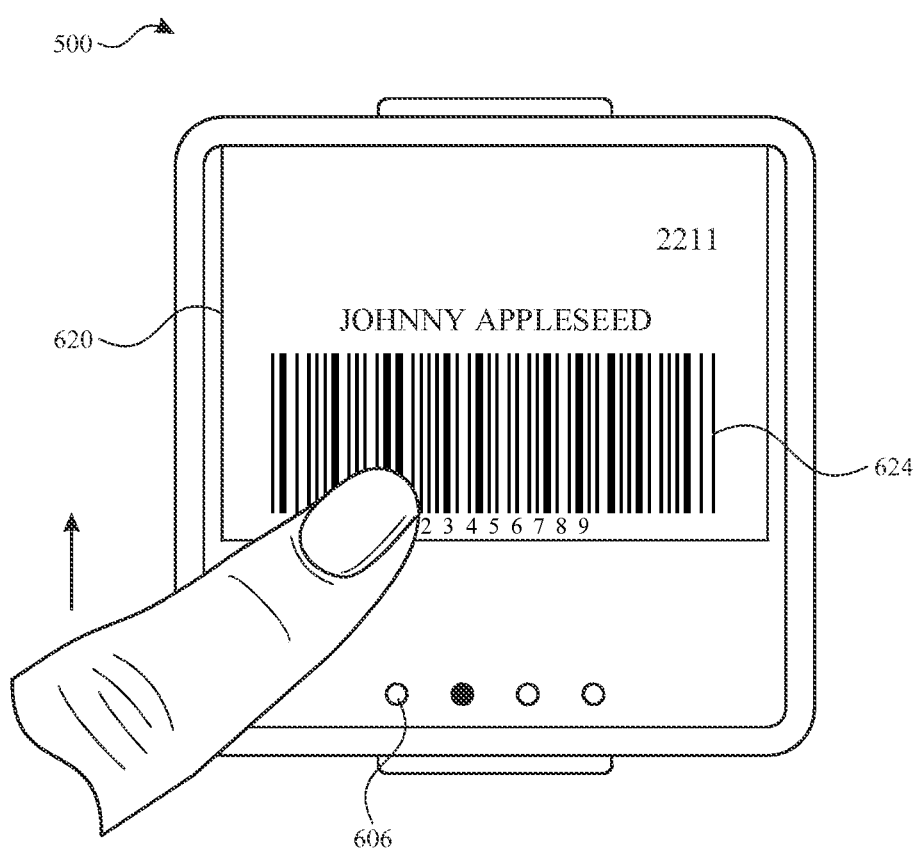
Figure 6E:
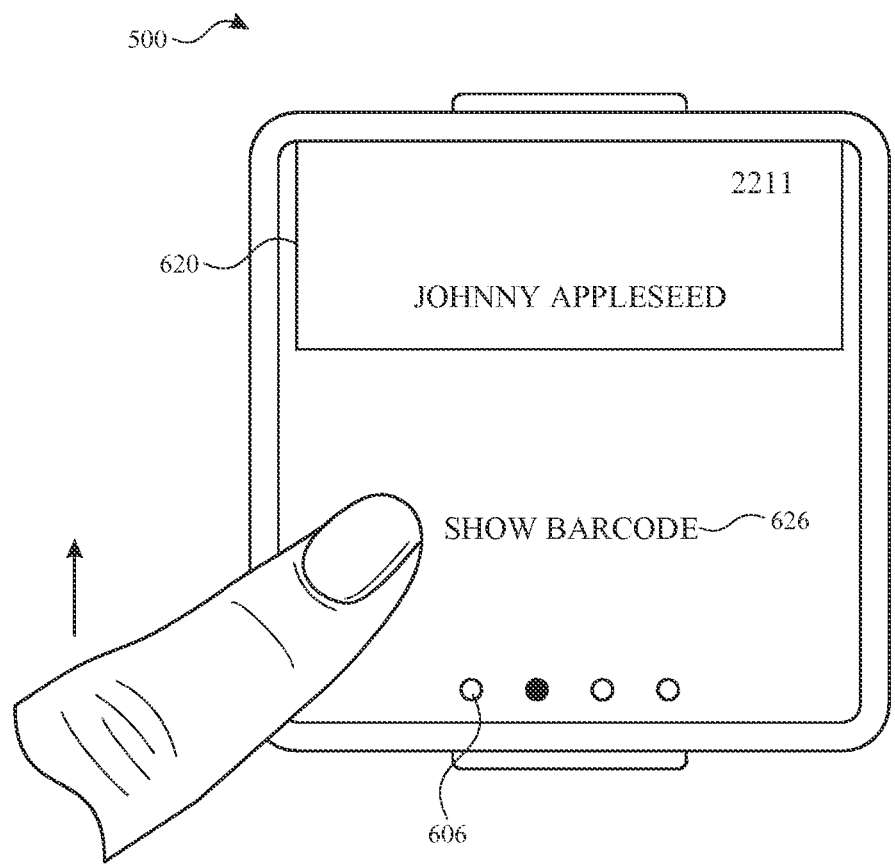
Figure 6F:
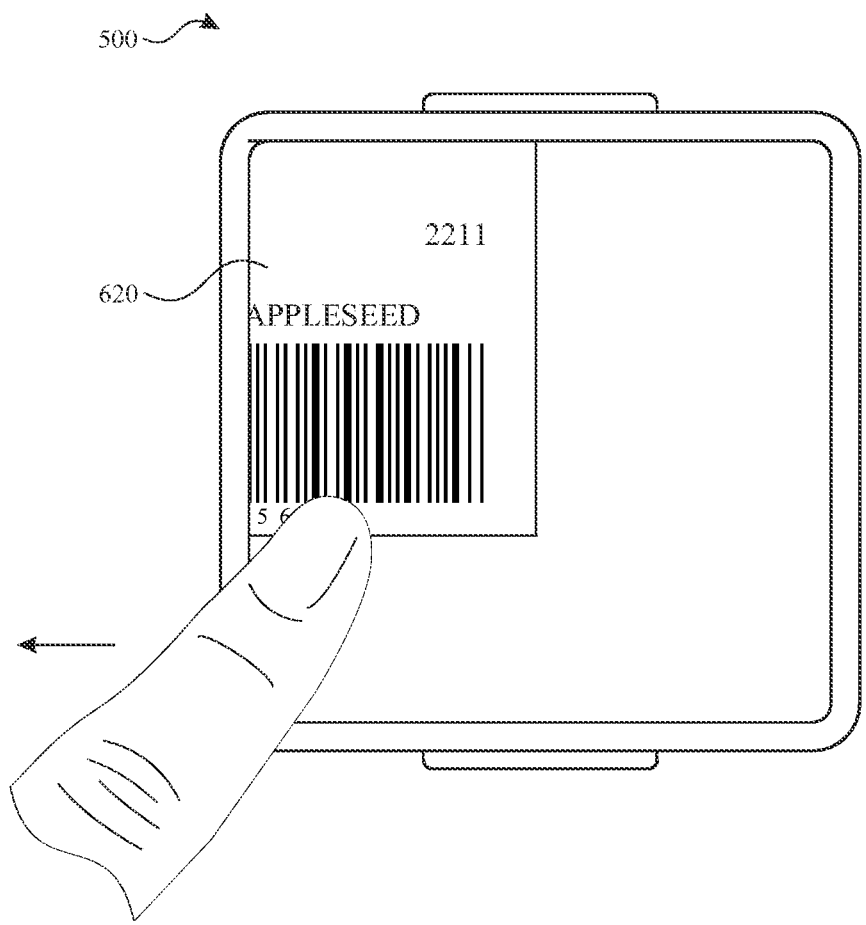
Figure 6G:
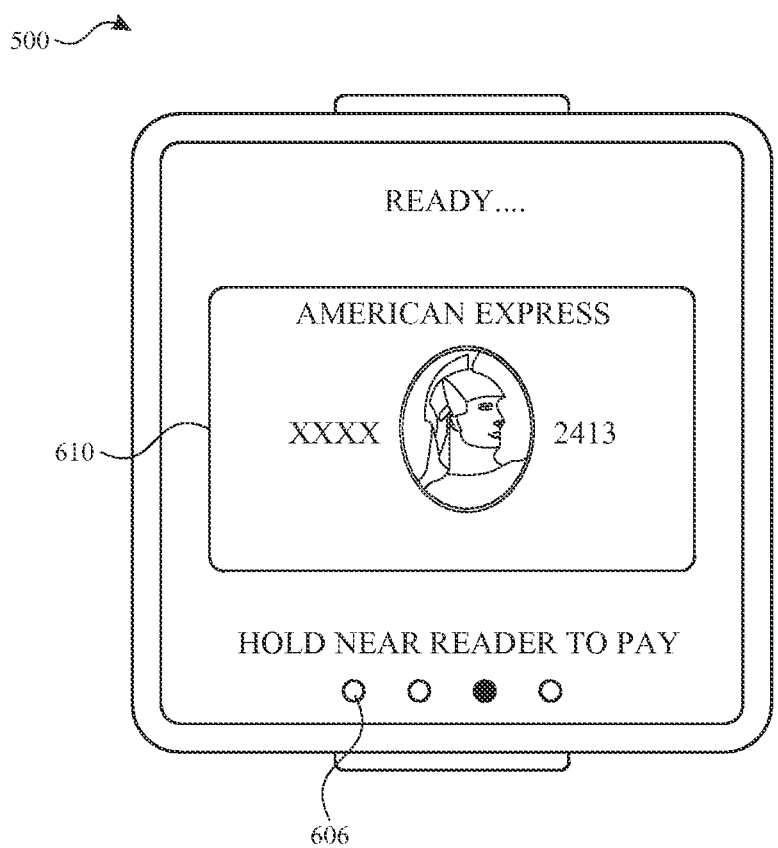

In accordance with some embodiments, as illustrated in FIGS. 6D-6F, while displaying the second visual indicator (e.g., of a loyalty account): the electronic device receives a card code display input (e.g., a user swipe input in a second direction different from the first direction; a tap on a "show barcode" affordance 626), and in response to receiving the card code display input, the electronic device displays, on the display, visual loyalty card code information (e.g., 624; a barcode or QR code). The visual loyalty card code information may optionally represent account information of the second account. For example, at FIG. 6D, the device receives an upward swipe input on the touch-sensitive surface, and in response displays bar code 624. The user may have bar code 624 visually scanned by a payment terminal. For another example, at FIG. 6D, the device receives the same upward swipe input on the touch-sensitive surface, and in response displays affordance 626, which when activated displays the visual loyalty card code information (e.g., 624) associated with the second account.

In accordance with some embodiments and with reference to the user interface of FIG. 6C, the user may place the device into a field of a contactless payment terminal. While displaying the second visual indicator: the electronic device receives a request for account information from a contactless payment terminal, and in response to receiving the request for account information, transmitting, via the one or more wireless communication elements, account information for the second account to the contactless payment terminal, wherein the account information enables the contactless payment terminal to engage in the payment transaction.

In accordance with some embodiments, engaging in the payment transaction includes routing loyalty information to one or servers for confirmation/authorization of the loyalty account (e.g., when the second account is a loyalty account). In some embodiments, engaging in the payment transaction includes routing information to one or more financial institutions to verify payment credentials and/or receive authorization to complete the transaction (e.g., when the second account is a payment account). For example, the account information is transmitted to the contactless payment terminal using NFC.

In accordance with some embodiments (e.g., wherein the second account is a payment account), while displaying the second visual indicator and after transmitting account information for the second account to the contactless payment terminal: the electronic device receives, via the one or more wireless communication elements, a failure communication from the contactless payment terminal (e.g., payment was rejected because the payment account type is not accepted by the contactless payment terminal). In response to receiving the failure communication: the electronic device displays, on the display, an indication that the second account was not accepted and provides an option to enable the electronic device to participate in the transaction using an account different from the second account (e.g., a default payment account that is not a private label payment account).

In accordance with some embodiments, subsequent to (or in response to) transmitting account information for the second account to the contactless payment terminal, the electronic device concurrently displays, on the display an indication that the first account and the second account were both used during the payment transaction (e.g., concurrently displaying at least a portion of the first visual indicator and at least a portion of the second visual indicator). For example, the user may use the electronic device to provide loyalty account information using the second account and to provide payment account information using the first account. As a result, both visual indicators will be simultaneously displayed after the transactions.

In accordance with some embodiments, enabling the electronic device to participate in the transaction using the second account via the one or more wireless communication elements does not require receiving a second user input requesting to enable the device for a payment transaction. For example, the user does not need to double-click the hardware button 508 again to arm the device to make an NFC payment or an NFC loyalty transaction using the second account.

In accordance with some embodiments, enabling the electronic device to participate in the transaction using the first account includes displaying a first animation of a ready indicator (e.g., 604) appearing from under an image of a card of the first account (e.g., the first visual indicator 602). The ready indicator (e.g., 604) indicates that the device is enabled to participate in payment transactions using the first account. In response to receiving a portion of the one or more user swipe inputs, the electronic device displays a second animation of the ready indicator to slide the ready indicator (e.g., 604) back under the image of the card of the first account.

In accordance with some embodiments, the electronic device displays the first visual indicator (e.g., 602) identifying the first account prior to enabling the electronic device to participate in the transaction using the first account via the one or more wireless communication elements. The electronic device displays, on the display, the second visual indicator (e.g., 620) identifying the second account prior to enabling the electronic device to participate in the transaction using the second account via the one or more wireless communication elements.

In accordance with some embodiments, one of the first account and the second account is a payment account and one of the first account and the second account is a loyalty account (e.g., the first account is a payment account and the second account is a loyalty account). The first visual indicator (e.g., 602) of the first account has a first dimension characteristic (e.g., size or aspect ratio) and the second visual indicator (e.g., 620) of the second account has a second dimension characteristic different from the first dimension characteristic (e.g., a different size or different aspect ratio). Thus, visual indications of loyalty accounts look different than visual indications of payment accounts. This helps a user quickly identify whether a loyalty account or a payment account is displayed and/or enabled.

In accordance with some embodiments, an electronic wallet of the electronic device includes payment account information for a plurality of payment accounts (e.g., including the payment accounts associated with 602 and 610) associated with a user of the electronic device.

As illustrated in FIG. 6F, the electronic device receives a second one or more swipe inputs in the first direction via the touch-sensitive surface. In response, to receiving the second one or more user swipe inputs, the electronic device displays, on the display, a third visual indicator identifying a third account, and the electronic device enables the electronic device to participate in a transaction using the third account via the one or more wireless communication elements; and (e.g., arming the device for making an NFC transaction using the third account and disabling the device from participating in transactions using the second account). The third visual indicator is different from the first visual indicator and the second visual indicator.

FIG. 7 is a flow diagram illustrating a method for receiving a selection of an account, such as a loyalty account or a payment account, from among multiple accounts in an electronic wallet using an electronic device in accordance with some embodiments. Method 700 is performed at a device (e.g., 100, 300, 500) with a display, a touch-sensitive surface, and one or more wireless communication elements. Some operations in method 700 may be combined, the order of some operations may be changed, and some operations may be omitted.

As described below, method 700 provides an intuitive way for receiving a selection of an account, such as a loyalty account or a payment account, from among multiple accounts in an electronic wallet. The method reduces the cognitive burden on a user for receiving a selection of an account, thereby creating a more efficient human-machine interface. For battery-operated computing devices, enabling a user to select an account faster and more efficiently conserves power and increases the time between battery charges.

At block 702, the electronic device receives an input (e.g., a user input at 508) requesting to enable the device for a payment transaction.

At block 704, in response to receiving the input requesting to enable the device for a payment transaction, the process proceeds to blocks 706-708.

At block 706, the electronic device displays, on the display, a first visual indicator (e.g., 602) identifying a first account. At block 708, the electronic device enables the electronic device to participate in a transaction using the first account via the one or more wireless communication elements.

At block 710, the electronic device receives one or more swipe inputs in a first direction (e.g., one or more left swipes) via the touch-sensitive surface.

At block 712, in response to receiving the one or more user swipe inputs, the process proceeds to blocks 714-716.

At block 714, the electronic device displays, on the display, a second visual indicator (e.g., 620) identifying a second account. At block 716, the electronic device enables the electronic device to participate in a transaction using the second account via the one or more wireless communication elements, wherein the first visual indicator (e.g., 601) is different from the second visual indicator (e.g., 620).

In accordance with some embodiments, the first account is a payment account and the second account is a loyalty account. In accordance with some embodiments, the first account is a payment account and the second account is a payment account.

In accordance with some embodiments, while displaying the second visual indicator (e.g., 620 of a loyalty account): the electronic device receives a card code display input, and in response to receiving the card code display input, the electronic device displays, on the display, visual loyalty card code information (e.g., 624; a barcode or QR code).

In accordance with some embodiments, the user may place the device into a field of a contactless payment terminal. While displaying the second visual indicator: the electronic device receives a request for account information from a contactless payment terminal, and in response to receiving the request for account information, transmitting, via the one or more wireless communication elements, account information for the second account to the contactless payment terminal, wherein the account information enables the contactless payment terminal to engage in the payment transaction.

In accordance with some embodiments (e.g., wherein the second account is a payment account), while displaying the second visual indicator and after transmitting account information for the second account to the contactless payment terminal: the electronic device receives, via the one or more wireless communication elements, a failure communication from the contactless payment terminal. In response to receiving the failure communication: the electronic device displays, on the display, an indication that the second account was not accepted and provides an option to enable the electronic device to participate in the transaction using an account different from the second account.

In accordance with some embodiments, subsequent to (or in response to) transmitting account information for the second account to the contactless payment terminal, the electronic device concurrently displays, on the display an indication that the first account and the second account were both used during the payment transaction (e.g., concurrently displaying at least a portion of the first visual indicator and at least a portion of the second visual indicator).

In accordance with some embodiments, enabling the electronic device to participate in the transaction using the first account includes displaying a first animation of a ready indicator (e.g., 604) appearing from under an image of a card of the first account (e.g., the first visual indicator 602). The ready indicator (e.g., 604) indicates that the device is enabled to participate in payment transactions using the first account. In response to receiving a portion of the one or more user swipe inputs, the electronic device displays a second animation of the ready indicator to slide the ready indicator (e.g., 604) back under the image of the card of the first account.

In accordance with some embodiments, the electronic device displays the first visual indicator (e.g., 602) identifying the first account prior to enabling the electronic device to participate in the transaction using the first account via the one or more wireless communication elements. The electronic device displays, on the display, the second visual indicator (e.g., 620) identifying the second account prior to enabling the electronic device to participate in the transaction using the second account via the one or more wireless communication elements.

In accordance with some embodiments, one of the first account and the second account is a payment account and one of the first account and the second account is a loyalty account (e.g., the first account is a payment account and the second account is a loyalty account). The first visual indicator (e.g., 602) of the first account has a first dimension characteristic (e.g., size or aspect ratio) and the second visual indicator (e.g., 620) of the second account has a second dimension characteristic different from the first dimension characteristic (e.g., a different size or different aspect ratio).

In accordance with some embodiments, an electronic wallet of the electronic device includes payment account information for a plurality of payment accounts (e.g., including the payment accounts associated with 602 and 610) associated with a user of the electronic device.

Note that details of the processes described above with respect to method 700 (e.g., FIG. 7) are also applicable in an analogous manner to the methods described below. For example, methods 900, 1100, 1300, 1500, 1700, and 1900 may include one or more of the characteristics of the various methods described above with reference to method 700. For example, the electronic wallet, payment accounts, loyalty accounts, affordances, and inputs of methods 900, 1100, 1300, 1500, 1700, and 1900 optionally have one or more of the characteristics of the electronic device, payment accounts, loyalty accounts, affordances, and inputs of the electronic device described in method 700. For brevity, these details are not repeated below.

FIGS. 8A-8D illustrate exemplary techniques and exemplary user interfaces for selecting an account, such as a loyalty account or a payment account, for display, in accordance with some embodiments. For example, account information of a selected account may subsequently be transmitted to an NFC-enabled payment terminal for use in a transaction (e.g., when the device is placed into a field of the payment terminal). The technique may be performed at an electronic device with a display and a location sensor. The user interfaces in these figures are used to illustrate the processes described below, including the processes in FIG. 9.

Some accounts, such as private label accounts or loyalty accounts, may be associated with particular locations (e.g., a particular merchant or a particular store of a merchant). When at these locations, a user may prefer to use the associated private label account or loyalty account in a transaction. For example, if a user is at Joe's Electronics store, the user may prefer to use the private label account associated with Joe's Electronics store (e.g., a private label credit card account). For another example, if a user is at a supermarket, the user may prefer to use the loyalty account associated with the supermarket during the transaction in which the user makes a payment using a default payment account. Thus, it provides value to a user to display on a display of the electronic device visual indications of accounts relevant to the current situation (e.g., location).

For example, a payment account may be associated with multiple locations (e.g., multiple stores in a chain). Additionally, different locations may be associated with different payment accounts (e.g., the user has a Joe's Electronics credit card and a Jack's Home Improvement Store credit card, and the Joe's Electronics credit card may be associated with Joe's Electronics stores and the Jack's Home Improvement Store card is associated with Jack's Home Improvement Stores).

Figure 8A:
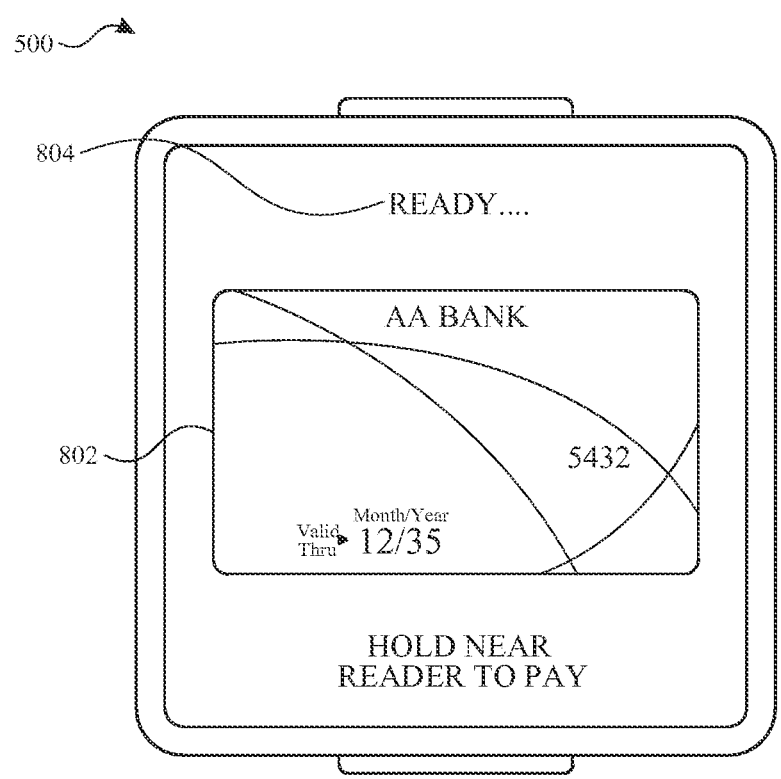
FIGS. 8A-8D illustrate exemplary techniques and exemplary user interfaces for selecting an account, in accordance with some embodiments.
Figure 9:
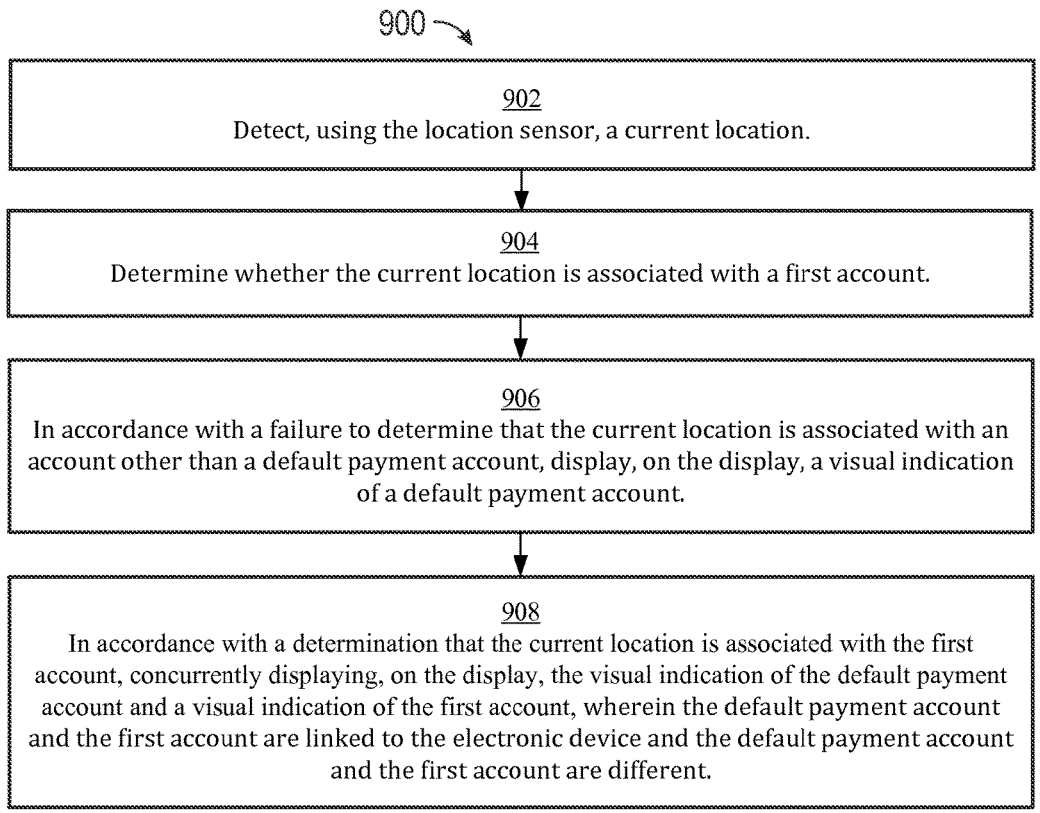
FIG. 9 is a flow diagram illustrating a method for selecting an account, in accordance with some embodiments.

Turning now to FIG. 8A, the electronic device detects, using the location sensor, a current location (e.g., the electronic device determines that the device is physically located at a particular retailer or a particular store of a particular retailer). The electronic device determines whether the current location is associated with a first account (e.g., determining that a particular private label payment account or a particular loyalty account is associated with the retailer).

As illustrated in FIG. 8A, in accordance with a failure to determine (e.g., during the time between receiving the request to arm the default payment account and arming the default payment account) that the current location is associated with an account other than a default payment account (e.g., the device determines that the location of the device is not associated with the current location or the device fails to determine the location of the device), the electronic device displays, on the display, a visual indication 802 of a default payment account (e.g., a visual depiction of a credit card associated with the default payment account). In some embodiments, the visual indication 802 of the default payment account is displayed without displaying graphical indicators for other accounts. At FIG. 8A, the ready indication 804 is a visual indication that the device is ready to participate in a transaction using the default account, represented by visual indicator 802.

The visual indication 802 of the default payment account includes: the name of a first financial institution "AA BANK" associated with the default payment account, a first background art that corresponds to the background art of a payment card associated with the default payment account, at least a portion of an account number associated with the default payment account, and an expiration date associated with the default payment account.

Figure 8B:
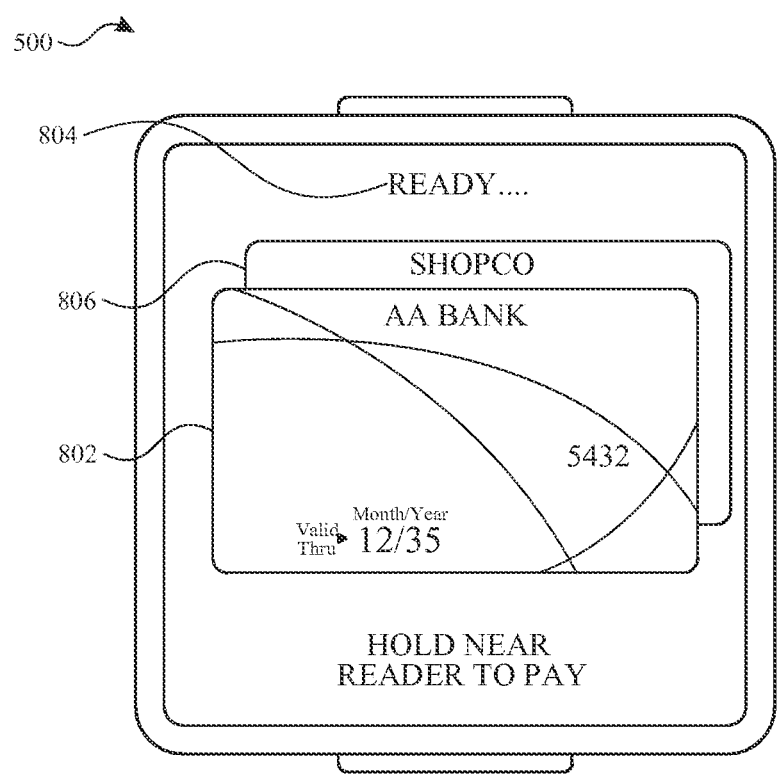

As illustrated in FIG. 8B, in accordance with a determination that the current location is associated with the first account, the electronic device concurrently displays, on the display, the visual indication 802 of the default payment account (e.g., a visual depiction of a credit card associated with the default payment account) and a visual indication 806 of the first account (e.g., a visual depiction of the private label card or the particular loyalty account associated with the particular payment account). The default payment account and the first account are linked to the electronic device (e.g., stored in an electronic wallet of the device; the electronic device has been provisioned for both accounts) and the default payment account and the first account are different accounts. At FIG. 8B, the ready indication 804 is a visual indication that the device is ready to participate in a transaction using either (or both) the default account, represented by visual indicator 802, and the first account, represented by visual indicator 806.

The visual indication 806 of the first account may include: the name of a merchant or financial institution (e.g., "SHOPCO") associated with the first account, a first background art that corresponds to first account, at least a portion of an account number associated with the first account, and an expiration date associated with the first account.

For example, a payment account (e.g., the first account) may be associated with multiple locations (e.g., multiple stores in a chain). Additionally, different locations may be associated with different payment accounts (e.g., the user has a Joe's Electronics credit card and a Jack's Home Improvement Store credit card. The Joe's Electronics credit card may be associated with Joe's Electronics stores and the Jack's Home Improvement Store card is associated with Jack's Home Improvement Stores).

In accordance with some embodiments, as illustrated in FIG. 8B, the first account is a payment account. In some embodiments, the first account is a private label account and the visual indication 806 of the first account is an image of the payment card associated with the private label account.

In some embodiments, the visual indication 806 of the first account is displayed partially behind the visual indication 802 of the default account.

Figure 8C:
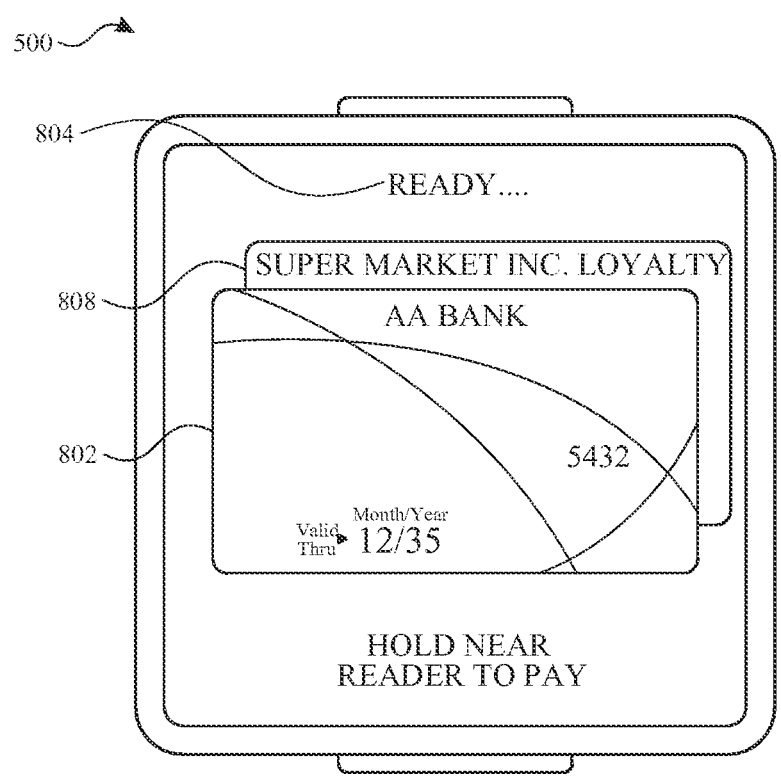

In accordance with some embodiments, as illustrated in FIG. 8C, the first account is a loyalty account. In some embodiments, the first account is a loyalty account and the visual indication 808 is an image of a loyalty card associated with the loyalty account. In some embodiments, the visual indication 808 of the first account is displayed partially behind the visual indication 802 of the default account.

Figure 8D:
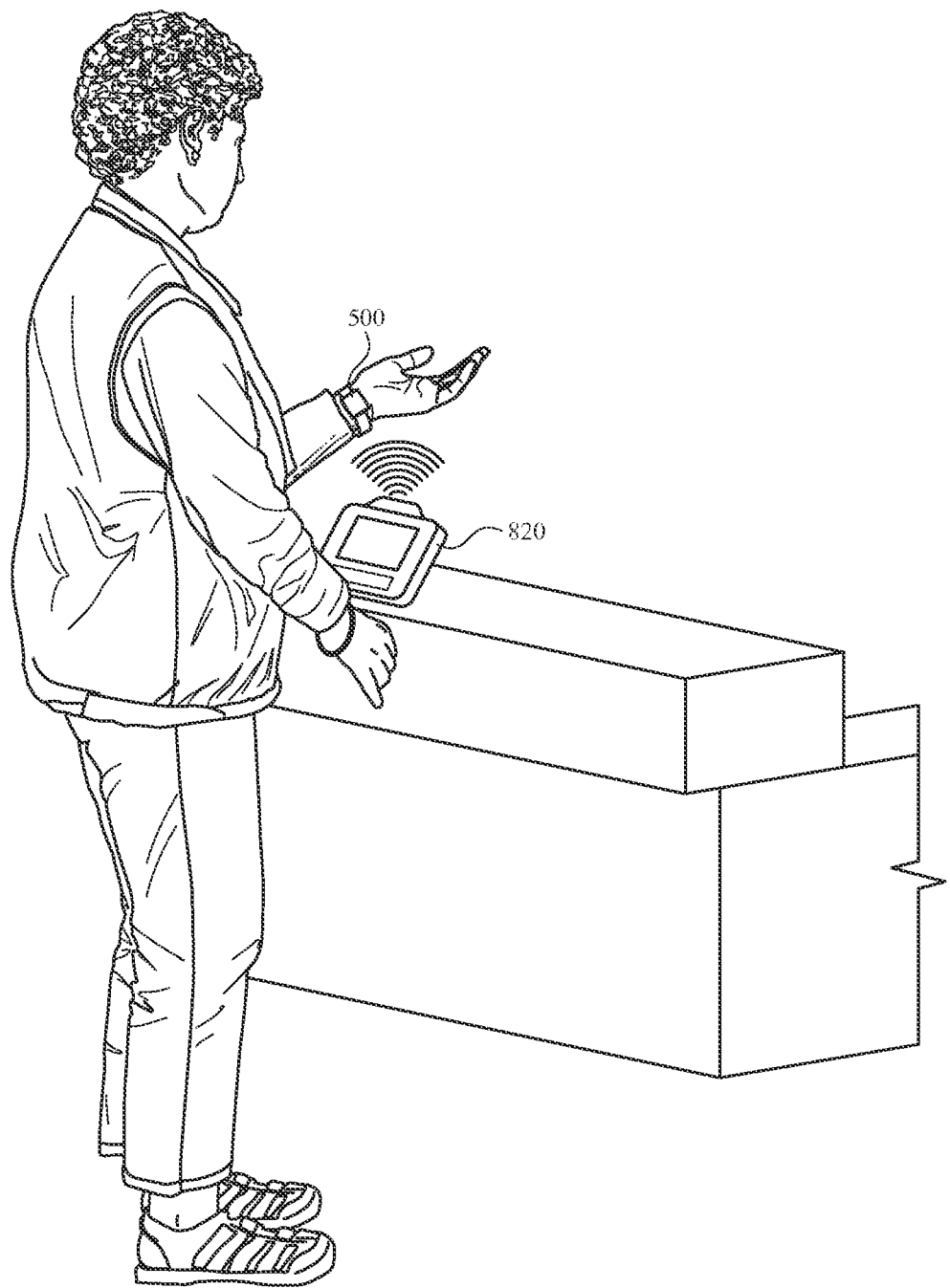

In accordance with some embodiments, as illustrated in FIG. 8D, the electronic device receives a request associated with a payment transaction from a contactless payment terminal 820 (e.g., while the device is in an NFC field of the contactless payment terminal 820). The electronic device determines whether the request includes a request for payment account information using a first account type corresponding to the first account (e.g., an NFC-enabled terminal requests a particular retailer's private label credit card when the device is placed into a field of the terminal). In accordance with the determination that the current location is associated with the first account and in accordance with a determination that the request includes a request for payment information using the first account type, the electronic device transmits, using one or more wireless communication elements, payment account information of the first account to the contactless payment terminal, wherein the payment account information of the first account enables the contactless payment terminal to engage in the payment transaction. In some embodiments, engaging in the payment transaction includes routing information to one or more financial institutions to verify payment credentials and/or receive authorization to complete the transaction. For example, the payment account information is transmitted to a contactless payment terminal using NFC. In some embodiments, engaging in the payment transaction includes routing loyalty information to one or servers for confirmation/authorization of the loyalty account.

In accordance with some embodiments, the electronic device receives a request associated with a payment transaction from a contactless payment terminal. The electronic device determines that the request includes a request for payment account information using a first account type corresponding to the first account (e.g., an NFC-enabled terminal requests a particular retailer's private label credit card when the device is placed into a field of the terminal). In accordance with the failure to determine that the current location is associated with an account other than the default payment account (and in accordance with determination that the request includes a request for payment account information using the first account type), the electronic device transmits, using one or more wireless communication elements, payment account information of the default payment account to the contactless payment terminal, wherein the payment account information of the default payment account enables the contactless payment terminal to engage in the payment transaction. In some embodiments, engaging in the payment transaction includes routing information to one or more financial institutions to verify payment credentials and/or receive authorization to complete the transaction. For example, the payment account information is transmitted to a contactless payment terminal using NFC.

In accordance with some embodiments, the visual indication of the first account is displayed on the visual indication 802 of the default account, and wherein the visual indication of the first account indicates that the first account is enabled to be selected by the device for use in a payment transaction without requiring additional user input. For example, the visual indication of the first account is just text written on an image of a card of the default account the device determines (at the time of payment) which payment account to use without user intervention.

In accordance with some embodiments, prior to detecting, using the location sensor, the current location, the electronic device receives an input (e.g., a user input) requesting to enable the device for a payment transaction (e.g., the user performs a double-click of a hardware button 508 of the device which arms the device for making NFC payments and/or accessing an electronic wallet). In some examples, in response to receiving the user input requesting to enable the device for a payment transaction, the device is enabled to participate in a transaction (e.g., arming the device for making an NFC payment using the default payment account).

In accordance with some embodiments, detecting, using the location sensor, the current location is in response to receiving the input requesting to enable the device for a payment transaction.

In accordance with some embodiments, determining whether the current location is associated with the first account is in response to receiving an input requesting to enable the device for a payment transaction (e.g., the user performs a double-click of a hardware button 508 of the device which arms the device for making NFC payments and/or accessing an electronic wallet). In some examples, in response to receiving the user input requesting to enable the device for a payment transaction, the device is enabled to participate in a transaction (e.g., arming the device for making an NFC payment using the default payment account).

In accordance with some embodiments, a failure to determine that the current location is associated with an account other than a default payment account occurs when the device fails to determine that the current location is associated with a first account before the electronic device is enabled to participate in a transaction using the default payment account via one or more wireless communication elements (e.g., determining whether the current location is associated with a first account takes longer than enabling the electronic device to participate in a transaction using the default payment account via one or more wireless communication elements). Or, optionally, the electronic device concurrently displays, on the display, the visual indication of the default payment account and the visual indication of the first account while the device detects that a user of the electronic device is still looking at the electronic device or that the electronic device is still facing the user. For example, by only changing the visual indications of the accounts on the display (1) while the user is still looking at the device or (2) while the device is still facing the user, the user is provided with the opportunity to view the change and appreciate that a different payment account may be used in the payment transactions.

In some embodiments, if the electronic device is worn on a user's wrist, the electronic device may detect that the user is looking at the electronic device by detecting the user moving the electronic device into a viewing position by raising or rotating their wrist (e.g., a raise gesture). The electronic device may detect that the user is no longer viewing the device by detecting the user lowering their wrist. As used herein, a viewing position is a position of the electronic device in which the user can view a display of the electronic device. In some embodiments, the electronic device may detect a signal indicative of a user raising or lowering their wrist as described in U.S. Provisional Patent Application Ser. No. 62/026,532, "Raise Gesture Detection in a Device," which is hereby incorporated by reference in its entirety.

In some embodiments, a raise gesture detection algorithm can progress through a series of states of increasing confidence that a raise gesture has been performed. For example, a raise-gesture detection algorithm can select a set of motion-sensor data samples (including accelerometer and/or gyroscopic sensor data) corresponding to a time interval of interest (e.g., the amount of time it would likely take a user to execute a raise gesture). By considering the oldest sample(s) in the set, the algorithm can define a "starting pose," which can reflect the spatial orientation of the device at the beginning of the time interval. The orientation can be defined relative to an assumed vertical axis of gravity. Based on the starting pose, the algorithm can determine the amount and/or direction(s) of motion that would likely occur to bring the device's display into the user's line of sight (also referred to as the device being brought into a "focus pose"). The likely amount and/or direction(s) of motion can be expressed as criteria for identifying a "possible" raise gesture, and these criteria can be used to identify, based on some or all of the motion-sensor data samples in the set, whether a possible raise gesture has occurred. The possible raise gesture can be further identified as a "detected" raise gesture by determining whether the device, having reached a focus pose, dwells in a focus pose for at least a minimum period of time. A further confirmation can be performed, if desired, using a gesture classifier. The raise gesture detection algorithm can notify other components of the device each time it identifies a possible, detected, and/or confirmed raise gesture.

In accordance with some embodiments, the electronic device receives a request for loyalty account information from a contactless payment terminal, wherein the first account is a loyalty account. In response to receiving the request for loyalty account information, in accordance with the failure to determine that the current location is associated with an account other than the default payment account (e.g., during the time between receiving the request to arm the account and arming the account) and in accordance with a subsequent determination that the current location is associated with the first account: the electronic device transmits, via one or more wireless communication elements, account information for the first account to the contactless payment terminal, and the electronic device transmits, via the one or more wireless communication elements, payment account information of the default payment account to the contactless payment terminal. In some embodiments, the account information for the first account is provided without regard to whether a representation of the first account is displayed on the display prior to engaging in the payment transaction. In some embodiments, the account information for the first account is provided only when a representation of the first account is displayed on the display prior to engaging in the payment transaction.

In accordance with some embodiments, the electronic device receives a request associated with a payment transaction from a contactless payment terminal. The electronic device determines that the request includes a request for payment account information using a first account type corresponding to the first account, wherein the first account is a payment account that is different from the default payment account (e.g., an NFC-enabled terminal requests a particular retailer's private label credit card when the device is placed into a field of the terminal). In response to receiving the request for account information in accordance with the failure to determine that the current location is associated with an account other than the default payment account (e.g., during the time between receiving the request to arm the account and arming the account) and in accordance with a subsequent determination that the current location is associated with the first account: the electronic device forgoes transmitting, via one or more wireless communication elements, account information for the first account to the contactless payment terminal, and the electronic device transmits, via the one or more wireless communication elements, payment account information of the default payment account to the contactless payment terminal. In some embodiments, account information for the first account is provided only when a representation of the first account is displayed on the display prior to engaging in the payment transaction.

In accordance with some embodiments, the electronic device receives a request associated with a payment transaction from a contactless payment terminal. Prior to receiving the request associated with the payment transaction from the contactless payment terminal, the visual indication of the default payment account (e.g., a visual depiction of a credit card associated with the default payment account) and the visual indication of the first account (e.g., a visual depiction of the private label card or the particular loyalty account associated with the particular payment account) were concurrently displayed, on the display. The request includes a request for payment account information using a first account type corresponding to the first account (e.g., an NFC-enabled terminal requests a particular retailer's private label credit card when the device is placed into a field of the terminal). The first account is a payment account of the first account type. In response to receiving the request for account information and in accordance with the failure to determine that the current location is associated with an account other than the default payment account (e.g., during the time between receiving the request to arm the account and arming the account) and in accordance with a subsequent determination that the current location is associated with the first account: the electronic device forgoes transmitting, via one or more wireless communication elements, account information for the default payment account to the contactless payment terminal, and the electronic device transmits, via the one or more wireless communication elements, payment account information of the first account to the contactless payment terminal.

In accordance with some embodiments, in accordance with the determination that the current location is associated with the first account, the electronic device receives, via the one or more wireless communication elements, a failure communication from the contactless payment terminal (e.g., payment was rejected because the payment account is suspended by the bank or does not have funds). In response to receiving the failure communication, the electronic device transmits, via one or more wireless communication elements, account information for the default payment account to the contactless payment terminal (e.g., pay with the default card instead). In some embodiments, the device concurrently displays indications of the default payment account and another payment account to indicate to the user that either payment account might be used in the payment transaction.

In accordance with some embodiments, concurrently displaying, on the display, the visual indication of the default payment account and a visual indication of the first account includes concurrently displaying, on the display, the visual indication of the default payment account in a stack (e.g., above or below the visual indication of the first account) with the visual indication of the first account. In some embodiments, the visual indication of the first account is at least partially obscured by the visual indication of the default payment account.

FIG. 9 is a flow diagram illustrating a method 900 for selecting an account, such as a loyalty account or a payment account, for display, in accordance with some embodiments. Method 900 is performed at a device (e.g., 100, 300, 500) with a display and a location sensor. Some operations in method 900 may be combined, the order of some operations may be changed, and some operations may be omitted.

As described below, method 900 provides an intuitive way for selecting an account, such as a loyalty account or a payment account, for display. The method reduces the cognitive burden on a user for selecting an account, thereby creating a more efficient human-machine interface. For battery-operated computing devices, enabling a user to select an account faster and more efficiently conserves power and increases the time between battery charges.

At block 902, the electronic device detects, using the location sensor, a current location. At block 904, the electronic device determines whether the current location is associated with a first account.

At block 904, in accordance with a failure to determine that the current location is associated with an account other than a default payment account, the electronic device displays, on the display, a visual indication (e.g., 802) of a default payment account.

At block 906, in accordance with a determination that the current location is associated with the first account, the electronic device concurrently displays, on the display, the visual indication (e.g., 802) of the default payment account and a visual indication (e.g., 806 of FIG. 8B; 808 of FIG. 8C) of the first account. The default payment account and the first account are linked to the electronic device and the default payment account and the first account are different.

In accordance with some embodiments, the first account is a payment account. In some embodiments, the first account is a private label account and the visual indication (e.g., 806) of the first account is an image of the payment card associated with the private label account. In some embodiments, the visual indication (e.g., 806) of the first account is displayed partially behind the visual indication (e.g., 802) of the default account.

In accordance with some embodiments, the first account is a loyalty account. In some embodiments, the first account is a loyalty account and the visual indication (e.g., 808) is an image of a loyalty card associated with the loyalty account. In some embodiments, the visual indication (e.g., 808) of the first account is displayed partially behind the visual indication of the default account.

In accordance with some embodiments, the electronic device receives a request associated with a payment transaction from a contactless payment terminal (e.g., while the device is in an NFC field of the contactless payment terminal 820). The electronic device determines whether the request includes a request for payment account information using a first account type corresponding to the first account. In accordance with the determination that the current location is associated with the first account and in accordance with a determination that the request includes a request for payment information using the first account type, the electronic device transmits, using one or more wireless communication elements, payment account information of the first account to the contactless payment terminal, wherein the payment account information of the first account enables the contactless payment terminal to engage in the payment transaction. In some embodiments, engaging in the payment transaction includes routing information to one or more financial institutions to verify payment credentials and/or receive authorization to complete the transaction. For example, the payment account information is transmitted to a contactless payment terminal using NFC. In some embodiments, engaging in the payment transaction includes routing loyalty information to one or servers for confirmation/authorization of the loyalty account.

In accordance with some embodiments, the electronic device receives a request associated with a payment transaction from a contactless payment terminal. The electronic device determines that the request includes a request for payment account information using a first account type corresponding to the first account. In accordance with the failure to determine that the current location is associated with an account other than the default payment account (and in accordance with determination that the request includes a request for payment account information using the first account type), the electronic device transmits, using one or more wireless communication elements, payment account information of the default payment account to the contactless payment terminal, wherein the payment account information of the default payment account enables the contactless payment terminal to engage in the payment transaction. In some embodiments, engaging in the payment transaction includes routing information to one or more financial institutions to verify payment credentials and/or receive authorization to complete the transaction.

In accordance with some embodiments, the visual indication of the first account is displayed on the visual indication (e.g., 802) of the default account, and wherein the visual indication of the first account indicates that the first account is enabled to be selected by the device for use in a payment transaction without requiring additional user input.

In accordance with some embodiments, prior to detecting, using the location sensor, the current location, the electronic device receives an input (e.g., a user input) requesting to enable the device for a payment transaction.

In accordance with some embodiments, detecting, using the location sensor, the current location is in response to receiving the input requesting to enable the device for a payment transaction.

In accordance with some embodiments, determining whether the current location is associated with the first account is in response to receiving an input requesting to enable the device for a payment transaction (e.g., the user performs a double-click of a hardware button 508 of the device which arms the device for making NFC payments and/or accessing an electronic wallet).

In accordance with some embodiments, a failure to determine that the current location is associated with an account other than a default payment account occurs when the device fails to determine that the current location is associated with a first account before the electronic device is enabled to participate in a transaction using the default payment account via one or more wireless communication elements.

In some embodiments, if the electronic device is worn on a user's wrist, the electronic device may detect that the user is looking at the electronic device by detecting the user moving the electronic device into a viewing position by raising or rotating their wrist. The electronic device may detect that the user is no longer viewing the device by detecting the user lowering their wrist. As used herein, a viewing position is a position of the electronic device in which the user can view a display of the electronic device.

In accordance with some embodiments, the electronic device receives a request for loyalty account information from a contactless payment terminal, wherein the first account is a loyalty account. In response to receiving the request for loyalty account information, in accordance with the failure to determine that the current location is associated with an account other than the default payment account (e.g., during the time between receiving the request to arm the account and arming the account) and in accordance with a subsequent determination that the current location is associated with the first account: the electronic device transmits, via one or more wireless communication elements, account information for the first account to the contactless payment terminal, and the electronic device transmits, via the one or more wireless communication elements, payment account information of the default payment account to the contactless payment terminal. In some embodiments, the account information for the first account is provided without regard to whether a representation of the first account is displayed on the display prior to engaging in the payment transaction. In some embodiments, the account information for the first account is provided only when a representation of the first account is displayed on the display prior to engaging in the payment transaction.

In accordance with some embodiments, the electronic device receives a request associated with a payment transaction from a contactless payment terminal. The electronic device determines that the request includes a request for payment account information using a first account type corresponding to the first account, wherein the first account is a payment account that is different from the default payment account. In response to receiving the request for account information in accordance with the failure to determine that the current location is associated with an account other than the default payment account (e.g., during the time between receiving the request to arm the account and arming the account) and in accordance with a subsequent determination that the current location is associated with the first account: the electronic device forgoes transmitting, via one or more wireless communication elements, account information for the first account to the contactless payment terminal, and the electronic device transmits, via the one or more wireless communication elements, payment account information of the default payment account to the contactless payment terminal. In some embodiments, account information for the first account is provided only when a representation of the first account is displayed on the display prior to engaging in the payment transaction.

In accordance with some embodiments, the electronic device receives a request associated with a payment transaction from a contactless payment terminal. Prior to receiving the request associated with the payment transaction from the contactless payment terminal, the visual indication of the default payment account (e.g., 802) and the visual indication of the first account (e.g., 806 or 808) were concurrently displayed, on the display. The request includes a request for payment account information using a first account type corresponding to the first account (e.g., an NFC-enabled terminal requests a particular retailer's private label credit card when the device is placed into a field of the terminal). The first account is a payment account of the first account type. In response to receiving the request for account information and in accordance with the failure to determine that the current location is associated with an account other than the default payment account (e.g., during the time between receiving the request to arm the account and arming the account) and in accordance with a subsequent determination that the current location is associated with the first account: the electronic device forgoes transmitting, via one or more wireless communication elements, account information for the default payment account to the contactless payment terminal, and the electronic device transmits, via the one or more wireless communication elements, payment account information of the first account to the contactless payment terminal.

In accordance with some embodiments, in accordance with the determination that the current location is associated with the first account, the electronic device receives, via the one or more wireless communication elements, a failure communication from the contactless payment terminal (e.g., payment was rejected because the payment account is suspended by the bank or does not have funds). In response to receiving the failure communication, the electronic device transmits, via one or more wireless communication elements, account information for the default payment account to the contactless payment terminal (e.g., pay with the default card instead). In some embodiments, the device concurrently displays indications of the default payment account and another payment account to indicate to the user that either payment account might be used in the payment transaction.

In accordance with some embodiments, concurrently displaying, on the display, the visual indication of the default payment account and a visual indication of the first account includes concurrently displaying, on the display, the visual indication (e.g., 802) of the default payment account in a stack (e.g., above or below the visual indication of the first account) with the visual indication (e.g., 806, 808) of the first account. In some embodiments, the visual indication (e.g., 806, 808) of the first account is at least partially obscured by the visual indication (e.g., 802) of the default payment account.

Note that details of the processes described above with respect to method 900 (e.g., FIG. 9) are also applicable in an analogous manner to the methods described above and below. For example, methods 700, 1100, 1300, 1500, 1700, and 1900 may include one or more of the characteristics of the various methods described above with reference to method 900. For example, the electronic wallet, payment accounts, loyalty accounts, affordances, and inputs of methods 700, 1100, 1300, 1500, 1700, and 1900 optionally have one or more of the characteristics of the electronic device, payment accounts, loyalty accounts, affordances, and inputs of the electronic device described in method 900. For brevity, these details are not repeated below.

FIGS. 10A-10E illustrate exemplary techniques and exemplary user interfaces for selecting an account, such as a loyalty account or a payment account, for display from among multiple accounts in an electronic wallet, in accordance with some embodiments. For example, account information of a selected account may subsequently be transmitted to an NFC-enabled payment terminal for use in a transaction (e.g., when the device is placed into a field of the payment terminal). The technique is performed at an electronic device with a display, a location sensor, and one or more wireless communication elements. The user interfaces in these figures are used to illustrate the processes described below, including the processes in FIG. 11.

The electronic device receives an input (e.g., a user input) requesting to enable the device for a payment transaction (e.g., the user performs a double-click of a hardware button 508 of the device to arm the device for making NFC payments).

In response to receiving the input, the electronic device detects, using the location sensor, a current location (e.g., determining that the device is physically located at a particular retailer or a particular store of a particular retailer). The electronic device also determines whether a set of one or more payment criteria have been met, wherein the set of one or more payment criteria includes a criterion that is met when the current location is associated with a first payment account (e.g., determining that a particular private label payment account is associated with the retailer).

Figure 10A:
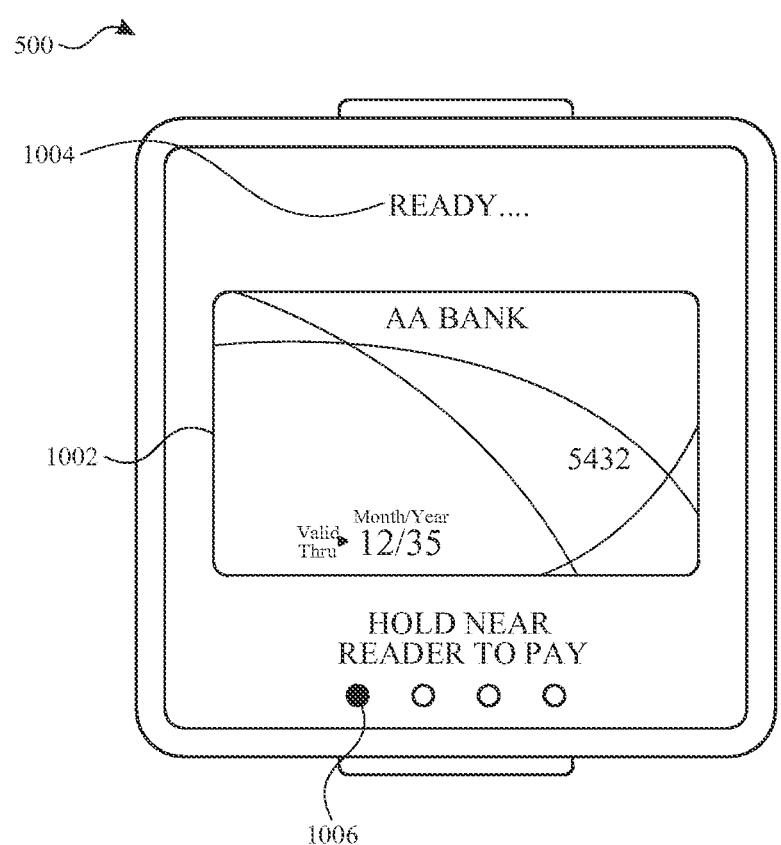
FIGS. 10A-10E illustrate exemplary techniques and exemplary user interfaces for selecting an account, in accordance with some embodiments.

As illustrated in FIG. 10A, in accordance with a determination that the set of one or more payment criteria is not met, the electronic device displays, on the display, a visual indication 1002 of a default payment account, wherein the default payment account is different from the first payment account (e.g., a visual depiction 1002 of a credit card associated with the default payment account, and forgoes displaying an indication of the first payment account).

The device may also display, on the display, an indication 1006 that other accounts are also available or an indication 1006 of the number of other accounts available. In this example, the indication 1006 includes four paging dots. The first paging dot is of a first color that is different from a second color of the second, third, and fourth paging dots. The four paging dots indicate that a total of four accounts are available. The first paging dot being a different color from the other paging dots indicates that the device is currently displaying information (e.g., visual indication 1002) corresponding to the default payment account.

The device may also display, on the display, ready indication 1004. Ready indication 1004 is a visual indication that the device is enabled to participate in a transaction using the default payment account, which is represented by visual indication 1002. Visual indication 1002 may include: the name of a financial institution "AA BANK" associated with the default payment account, a background art that corresponds to the background art of a payment card associated with the default payment account, at least a portion of an account number associated with the default payment account, and an expiration date associated with the default payment account.

Figure 10B:
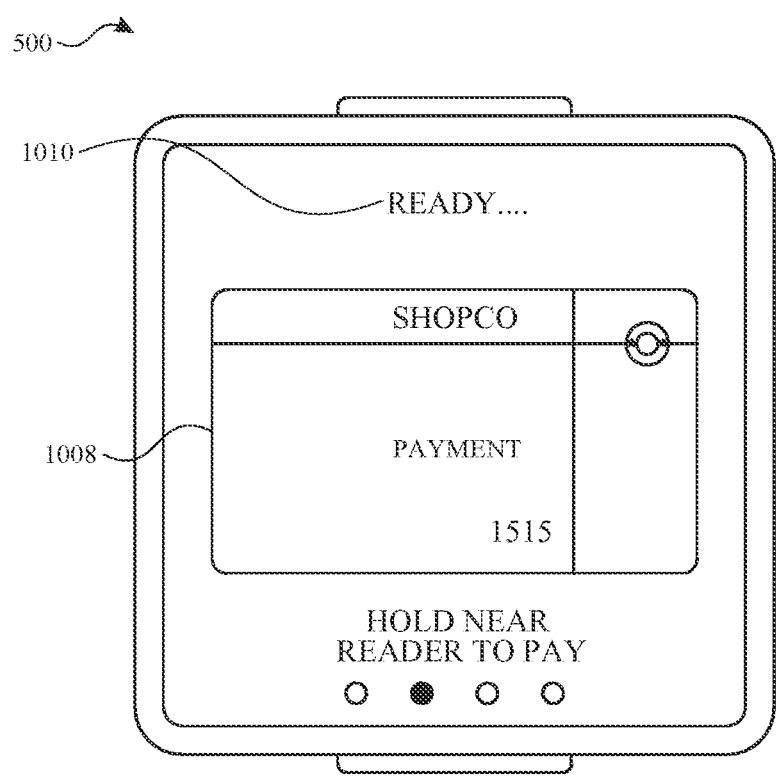

As illustrated in FIG. 10B, in accordance with a determination that the set of one or more payment criteria is met, the electronic device displays, on the display, a visual indication 1008 of the first payment account (and forgoes displaying an indication of the default payment account).

The device may also display, on the display, ready indication 1010. Ready indication 1010 is a visual indication that the device is enabled to participate in a transaction using the first payment account, which is represented by visual indication 1008. Visual indication 1008 may include: the name of a merchant "SHOPCO" associated with the first payment account, a background art that corresponds to the background art of a private label card associated with the first payment account, at least a portion of an account number associated with the first payment account, and an expiration date associated with the first payment account.

In accordance with some embodiments, in accordance with the determination that the set of one or more payment criteria is met, the electronic device enables the electronic device to participate in a transaction using the first payment account via the one or more wireless communication elements. Additionally, the electronic device may forgo enabling the electronic device to participate in a transaction using the default payment account.

In accordance with some embodiments, in accordance with the determination that the set of one or more payment criteria is not met, the electronic device enables the electronic device to participate in a transaction using the default payment account via the one or more wireless communication elements. Additionally, the electronic device may forgo enabling the electronic device to participate in a transaction using the first payment account.

In accordance with some embodiments, in accordance with the determination that the set of one or more payment criteria is not met, the electronic device forgoes displaying, on the display, the visual indication of the first payment account (e.g., displaying the visual indication of the default payment account without displaying the visual indication of the first payment account).

Figure 10C:
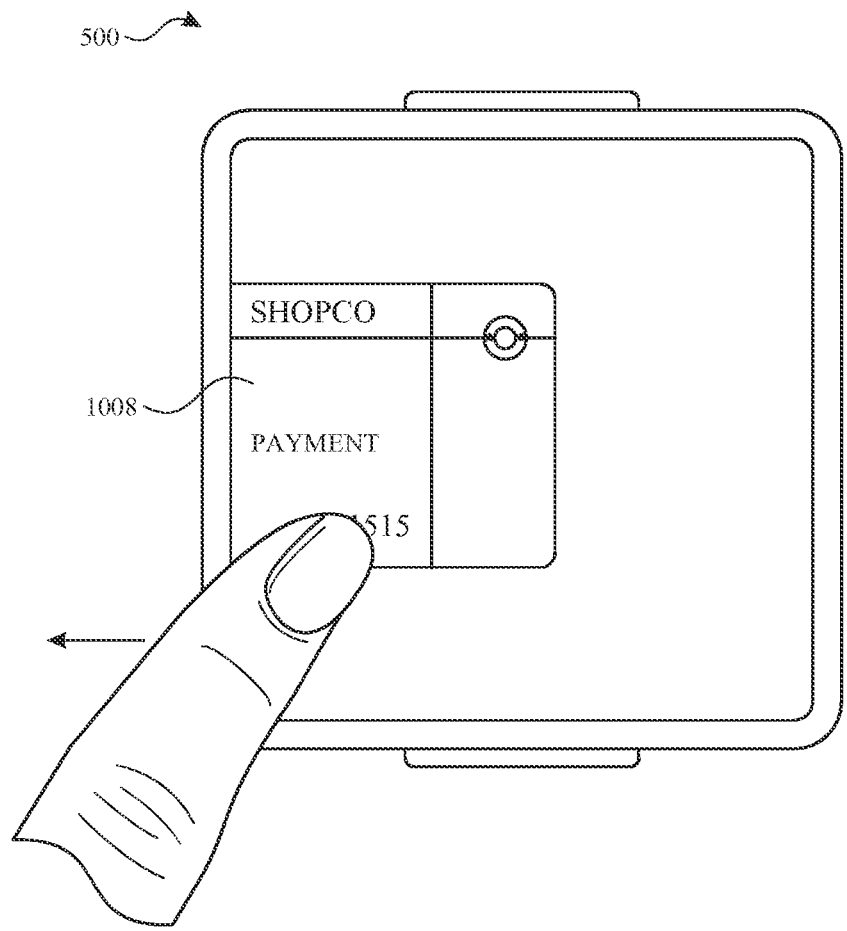
Figure 10D:
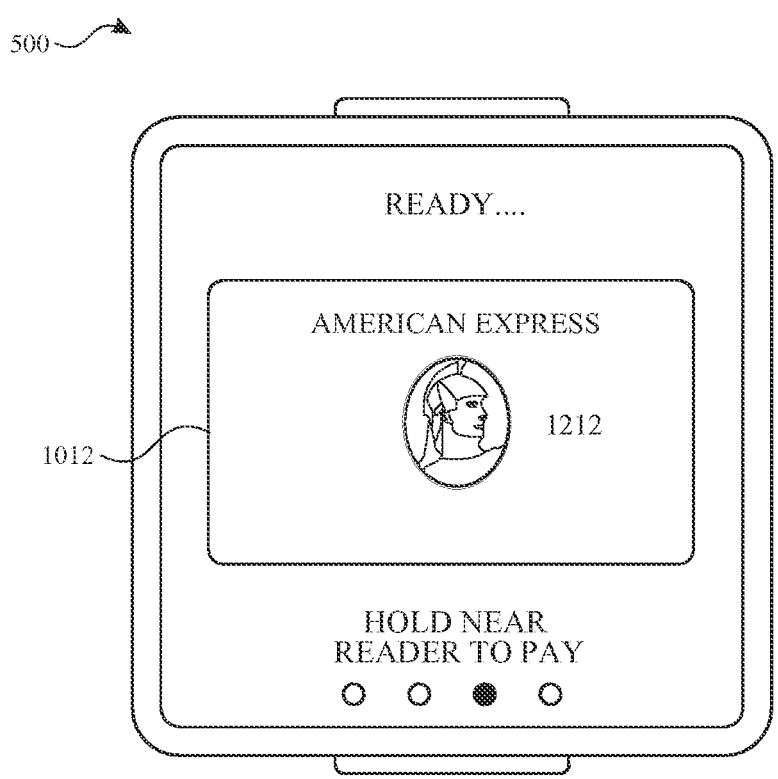

In accordance with some embodiments, the electronic device includes a touch-sensitive surface. As illustrated in FIG. 10C, the electronic device receives one or more inputs in a first direction (e.g., receiving one or more left swipes or right swipes via the touch-sensitive surface or detecting a change in device orientation in the first direction). As illustrated in FIG. 10D, in response to receiving the one or more inputs: the electronic device displays, on the display, a second visual indicator 1012 identifying (e.g., that identifies) a second account different from the first payment account and the default payment account. The electronic device enables the electronic device to participate in a transaction using the second account via the one or more wireless communication elements (e.g., arming the device for making an NFC transaction using the second account and disabling the device from participating in transactions using the first account). Thus, when the device presents a payment account, the user can provide input to change to a payment account (e.g., select a payment account from among a plurality of payment accounts in an electronic wallet of the device).

In accordance with some embodiments, the electronic device receives a request for account information from a contactless payment terminal (e.g., when the device detects that a user has placed the device into a field of an NFC-enabled contactless payment terminal). In response to receiving the request for account information, the electronic device transmits, via the one or more wireless communication elements, account information for a respective enabled account to the contactless payment terminal (e.g., whichever account for which the device is enabled to participate in payment transactions; whichever account is currently displayed), wherein the account information enables the contactless payment terminal to engage in the payment transaction. In some embodiments, engaging in the payment transaction includes routing information to one or more financial institutions to verify payment credentials and/or receive authorization to complete the transaction (e.g., if account information for a payment account is transmitted to the terminal). For example, the payment account information is transmitted to a contactless payment terminal using NFC. In some embodiments, engaging in the payment transaction includes routing loyalty information to one or servers for confirmation/authorization of the loyalty account (e.g., if account information for a loyalty account is transmitted to the terminal).

In accordance with some embodiments, the set of one or more criteria includes a criterion that is met when the device is authorized to use (e.g., without user confirmation) the first payment account (e.g., to override the default payment account) for transactions at the current location.

In accordance with some embodiments, the electronic device determines that the current location is associated with a loyalty account. The electronic device concurrently displays, on the display, a visual indication of the loyalty account along with a respective visual indication of a payment account (e.g., along with the visual indication of the default payment account or the first payment account). Thus, if the availability of an appropriate loyalty card is detected, the device displays the indication of the default payment card (or the private label card) along with the indication of the loyalty card.

In accordance with some embodiments, the electronic device includes one or more input devices. Prior to receiving the user input requesting to enable the device for a payment transaction: the electronic device receives a request (e.g., manual entry, importing from a server, or input using a camera sensor of the electronic device) to link a payment account with the electronic device. The request comprising account information (e.g., card number, card expiration date, name on card) of the payment account. The electronic device links the payment account with the electronic device; (e.g., adding the payment account to an electronic wallet on the electronic device). The electronic device determines that a financial institution associated with the payment account has authorized the payment account for selection based on location without requiring user input. The electronic device receives user input activating the payment account for selection based on location without requiring user input, as illustrated in FIG. 10E.

Figure 10E:
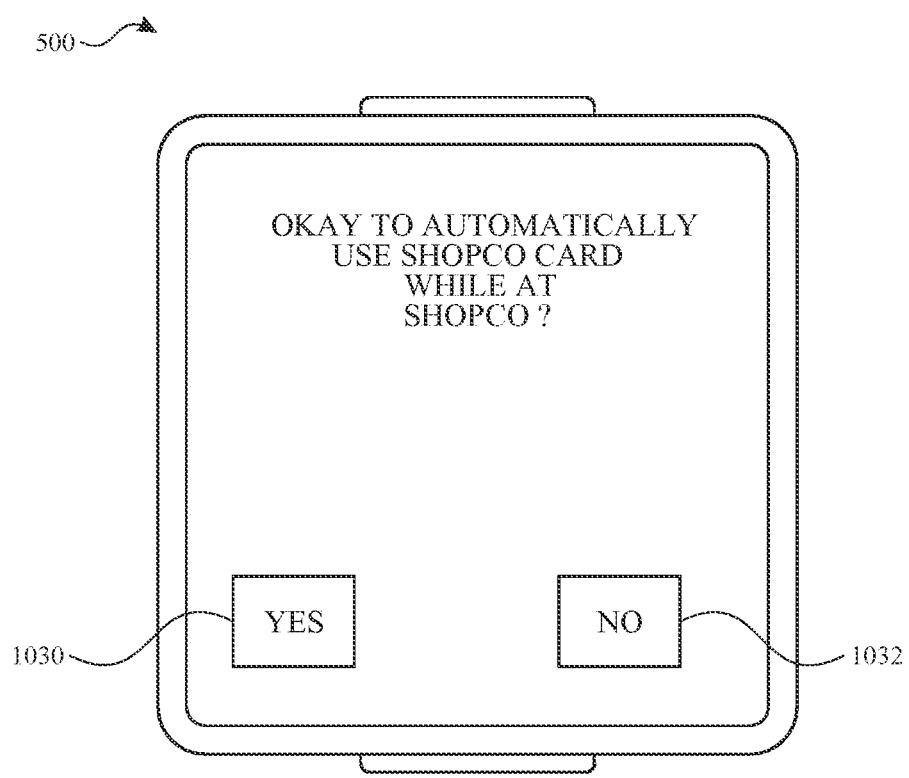

As illustrated in FIG. 10E, a user can activate a payment account to be used for location-based selection by activating the yes affordance 1030. Alternatively, a user can forgo activating the payment account for location-based selection by activating the no affordance 1032. In some embodiments, the option to activate a payment account for selection based on location is displayed during the setup of a card (e.g., during or right after the card is linked to the electronic device). Alternatively (or in addition), the financial institution can authorize a payment account for selection based on location (without requiring user input) at a time after the payment account has been linked to the electronic device. In that situation, a new option can appear in a setting menu for the payment account. Similarly, the device can display a pop-up notification when the devices detects that a payment is made. The notification indicates that the payment account is now capable of location-based selection. Subsequently, the user can elect to activate (or not activate) the feature for selection based on location without requiring user input.

In accordance with some embodiments, in accordance with the determination that the set of one or more payment criteria is met, the electronic device enables the electronic device to participate in a transaction using the first payment account via the one or more wireless communication elements. The electronic device receives a request associated with a payment transaction from a contactless payment terminal. The electronic device determines whether the request includes a request for payment account information using an account type corresponding to a second payment account different from the first payment account (e.g., an NFC-enabled terminal requests a particular retailer's private label credit card when the device is placed into a field of the terminal). In accordance with a determination that the request includes a request for payment information using the second account type, the electronic device provides a notification (e.g., visual, audio, or haptic) requesting authorization to transmit, using one or more wireless communication elements, payment account information of the second account to the contactless payment terminal, wherein the payment account information of the second account enables the contactless payment terminal to engage in the payment transaction. Thus, when the device determines that a first payment account is appropriate for a particular location, but the contactless payment terminal requests payment using a different payment account, the user is notified and requested to provide authorization to proceed with the payment transaction using the second payment account.

FIG. 11 is a flow diagram illustrating a method 1100 for selecting an account, such as a loyalty account or a payment account, for display from among multiple accounts in an electronic wallet in accordance with some embodiments. Method 1100 is performed at a device (e.g., 100, 300, 500) with a display and a location sensor. Some operations in method 1100 may be combined, the order of some operations may be changed, and some operations may be omitted.

As described below, method 1100 provides an intuitive way for selecting an account. The method reduces the cognitive burden on a user for selecting an account for display and/or payment, thereby creating a more efficient human-machine interface. For battery-operated computing devices, enabling a user to select an account faster and more efficiently conserves power and increases the time between battery charges.

At block 1102, the electronic device receives an input (e.g., a user input) requesting to enable the device for a payment transaction (e.g., the user performs a double-click of a hardware button 508 of the device to arm the device for making NFC payments).

At block 1104, in response to receiving the input, the technique continues to block 1106. At block 1106, the electronic device detects, using the location sensor, a current location (e.g., determining that the device is physically located at a particular retailer or a particular store of a particular retailer).

At block 1108, the electronic device determines whether a set of one or more payment criteria have been met, wherein the set of one or more payment criteria includes a criterion that is met when the current location is associated with a first payment account (e.g., determining that a particular private label payment account is associated with the retailer).

At block 1110, in accordance with a determination that the set of one or more payment criteria is not met, the electronic device displays, on the display, a visual indication (e.g., 1002) of a default payment account, wherein the default payment account is different from the first payment account (e.g., a visual depiction of a credit card associated with the default payment account, and forgoing displaying an indication of the particular payment account).

In accordance with some embodiments, at block 1112, in accordance with the determination that the set of one or more payment criteria is not met, the electronic device enables the electronic device to participate in a transaction using the default payment account via the one or more wireless communication elements.

At block 1114, in accordance with a determination that the set of one or more payment criteria is met, the electronic device displays, on the display, a visual indication (e.g., 1008) of the first payment account (and forgoes displaying an indication of the default payment account).

In accordance with some embodiments, at block 1116, in accordance with the determination that the set of one or more payment criteria is met, the electronic device enables the electronic device to participate in a transaction using the first payment account via the one or more wireless communication elements.

In accordance with some embodiments, in accordance with the determination that the set of one or more payment criteria is not met, the electronic device forgoes displaying, on the display, the visual indication (e.g., 1008) of the first payment account (e.g., displaying the visual indication of the default payment account without displaying the visual indication of the first payment account).

In accordance with some embodiments, the electronic device includes a touch-sensitive surface. The electronic device receives one or more inputs in a first direction (e.g., one or more left swipes or right swipes via the touch-sensitive surface or detecting a change in device orientation in the first direction). In response to receiving the one or more inputs, the electronic device displays, on the display, a second visual indicator (e.g., 1012) identifying a second account different from the first payment account and the default payment account, and the electronic device enables the electronic device to participate in a transaction using the second account via the one or more wireless communication elements (e.g., arming the device for making an NFC transaction using the second account and disabling the device from participating in transactions using the first account).

In accordance with some embodiments, the electronic device receives a request for account information from a contactless payment terminal. In response to receiving the request for account information, the electronic device transmits, via the one or more wireless communication elements, account information for a respective enabled account to the contactless payment terminal, wherein the account information enables the contactless payment terminal to engage in the payment transaction. In some embodiments, engaging in the payment transaction includes routing information to one or more financial institutions to verify payment credentials and/or receive authorization to complete the transaction (e.g., if account information for a payment account is transmitted to the terminal).

In accordance with some embodiments, the set of one or more criteria includes a criterion that is met when the device is authorized to use (e.g., without user confirmation) the first payment account (e.g., to override the default payment account) for transactions at the current location.

In accordance with some embodiments, the electronic device determines that the current location is associated with a loyalty account. The electronic device concurrently displays, on the display, a visual indication of the loyalty account along with a respective visual indication of a payment account (e.g., along with the visual indication of the default payment account or the first payment account). Thus, if the availability of an appropriate loyalty card is detected, the device displays the indication of the default payment card (or the private label card) along with the indication of the loyalty card.

In accordance with some embodiments, the electronic device includes one or more input devices. Prior to receiving the user input requesting to enable the device for a payment transaction: the electronic device receives a request (e.g., manual entry, importing from a server, or input using a camera sensor of the electronic device) to link a payment account with the electronic device. The request comprising account information (e.g., card number, card expiration date, name on card) of the payment account. The electronic device links the payment account with the electronic device; (e.g., adding the payment account to an electronic wallet on the electronic device). The electronic device determines that a financial institution associated with the payment account has authorized the payment account for selection based on location without requiring user input. The electronic device receives user input activating the payment account for selection based on location without requiring user input.

In accordance with some embodiments, in accordance with the determination that the set of one or more payment criteria is met, the electronic device enables the electronic device to participate in a transaction using the first payment account via the one or more wireless communication elements. The electronic device receives a request associated with a payment transaction from a contactless payment terminal. The electronic device determines whether the request includes a request for payment account information using an account type corresponding to a second payment account different from the first payment account (e.g., an NFC-enabled terminal requests a particular retailer's private label credit card when the device is placed into a field of the terminal). In accordance with a determination that the request includes a request for payment information using the second account type, the electronic device provides a notification (e.g., visual, audio, or haptic) requesting authorization to transmit, using one or more wireless communication elements, payment account information of the second account to the contactless payment terminal, wherein the payment account information of the second account enables the contactless payment terminal to engage in the payment transaction. Thus, when the device determines that a first payment account is appropriate for a particular location, but the contactless payment terminal requests payment using a different payment account, the user is notified and requested to provide authorization to proceed with the payment transaction using the second payment account.

Note that details of the processes described above with respect to method 1100 (e.g., FIG. 11) are also applicable in an analogous manner to the methods described above and below. For example, methods 700, 900, 1300, 1500, 1700, and 1900 may include one or more of the characteristics of the various methods described above with reference to method 1100. For example, the electronic wallet, payment accounts, loyalty accounts, affordances, and inputs of methods 700, 900, 1300, 1500, 1700, and 1900 optionally have one or more of the characteristics of the electronic device, payment accounts, loyalty accounts, affordances, and inputs of the electronic device described in method 1100. For brevity, these details are not repeated below.

FIGS. 12A-12D illustrate exemplary techniques and exemplary user interfaces for transmitting account information of an account selected from among multiple accounts in an electronic wallet, in accordance with some embodiments. The technique is performed at an electronic device with a display and one or more wireless communication elements (e.g., one or more wireless antennas such as NFC antennas, WiFi antennas.). The user interfaces in these figures are used to illustrate the processes described below, including the processes in FIG. 13.

The electronic device receives an input (e.g., user input) requesting to enable the device for a payment transaction (e.g., the user performs a double-click of a hardware button of the device to arm the device for making NFC payments). At FIG. 12A, in response to receiving the input, the electronic device displays, on the display, a payment indication (e.g., 1202) that represents a plurality of payment accounts including a first payment account and a second payment account (e.g., display a "smart selection" indication that does not identify a particular payment account).

Figure 12B:
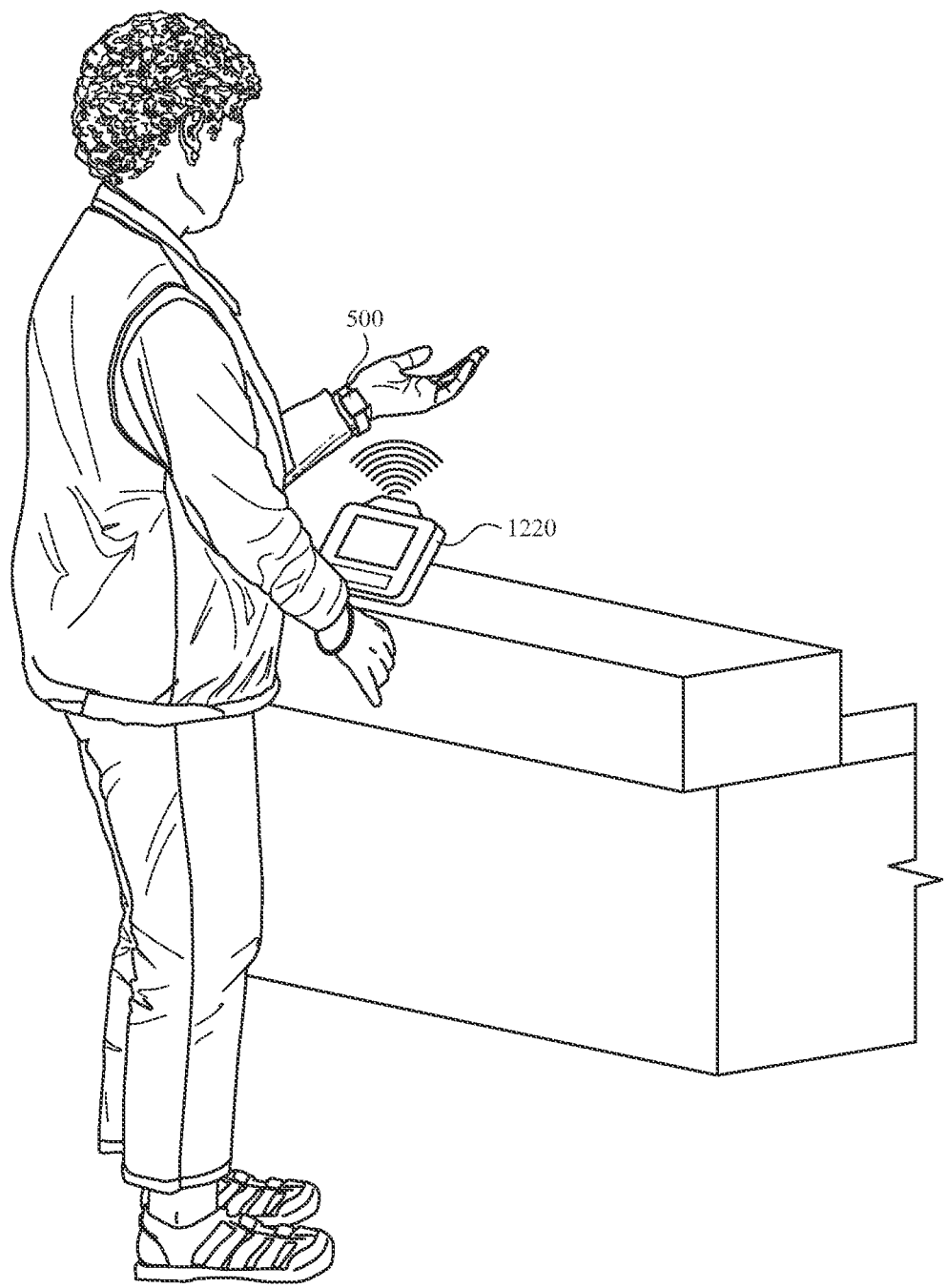
Figure 13:
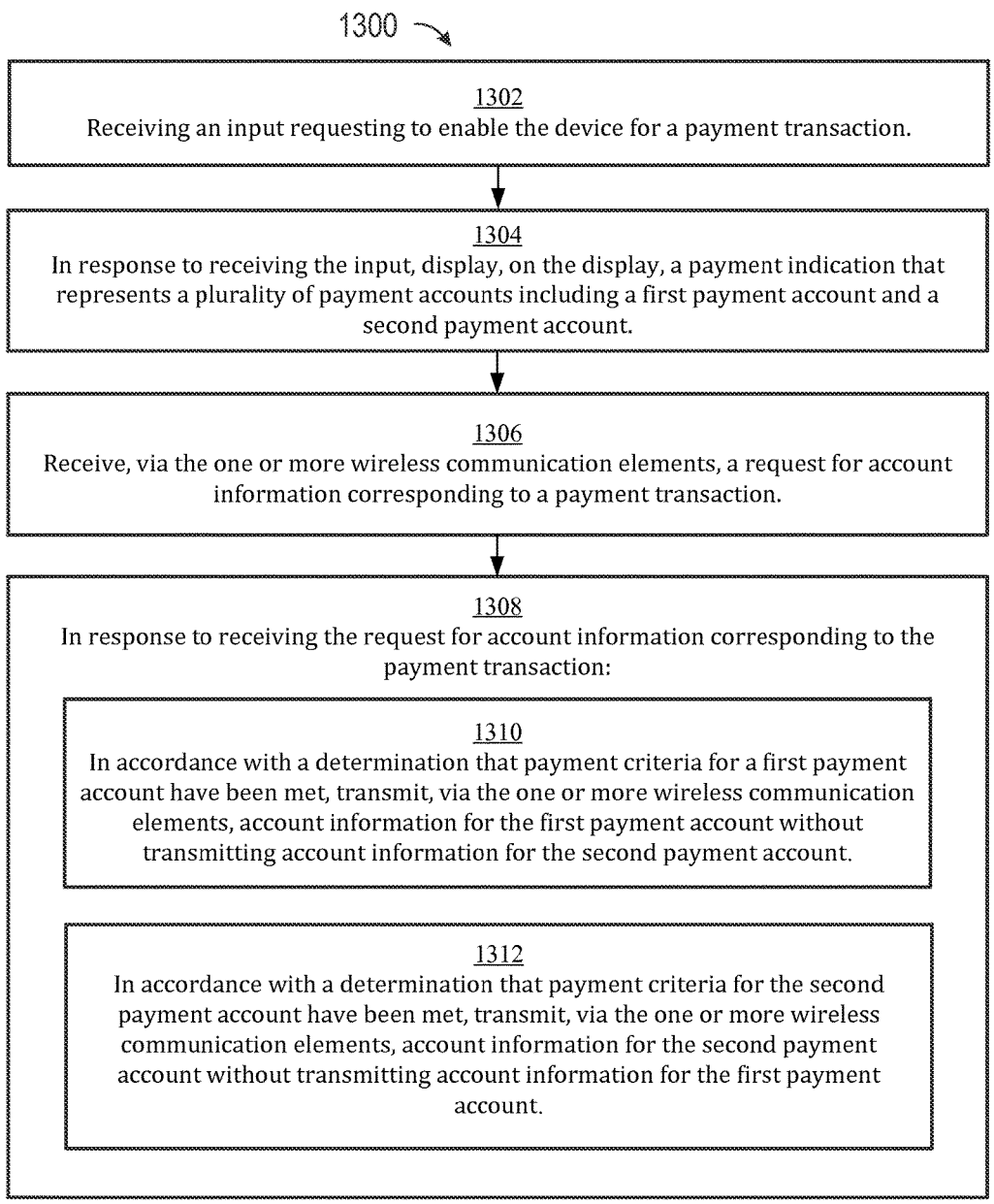
FIG. 13 is a flow diagram illustrating a method for transmitting account information of an account, in accordance with some embodiments.

As illustrated in FIG. 12B, a user places the electronic device 500 into an NFC field of a contactless payment terminal 1220. The electronic device receives, via the one or more wireless communication elements, a request for account information corresponding to a payment transaction (e.g., received from the contactless payment terminal 1220).

In response to receiving the request for account information corresponding to the payment transaction, in accordance with a determination that payment criteria for a first payment account have been met (e.g., the first payment account is associated with a current location of the device), the electronic device transmits, via the one or more wireless communication elements, account information for the first payment account without transmitting account information for the second payment account (and, optionally, without transmitting payment account information for any other payment account associated with the payment indication other than the first payment account). In response to receiving the request for account information corresponding to the payment transaction, in accordance with a determination that payment criteria for the second payment account have been met (e.g., the second payment account is associated with a current location of the device), the electronic device transmits, via the one or more wireless communication elements, account information for the second payment account without transmitting account information for the first payment account (and, optionally, without transmitting payment account information for any other payment account associated with the payment indication other than the second payment account). Thus, a user can see a visual indication that the "smart selection" feature is selected. When the device detects an attempt to make a payment, the electronic device transmits account information for an appropriate account.

In accordance with some embodiments, the electronic device is configured to enable payment using one of a default payment account and a plurality of non-default payment accounts (e.g., payment accounts that are only used when payment criteria corresponding to the respective payment account are met). In accordance with a determination that payment criteria have not been met for any of the non-default payment accounts, the electronic device transmits, via the one or more wireless communication elements, account information for the default payment account without transmitting account information for the non-default payment accounts.

In accordance with some embodiments, the payment criteria include a criterion based on a determination associated with a current location of the electronic device. For example, the criteria are met when the electronic device is within a determined geographical area. For another example, the criteria are not met when the electronic device is not within a determined geographical area.

In accordance with some embodiments, as illustrated in FIG. 12A, the payment indication 1202 that represents the plurality of payment accounts does not include an indication of the first payment account and does not include an indication of the second payment account. For example, there is no indication on the display that indicates the first or second payment accounts. The payment indication 1202 that represents the plurality of payment accounts does not look like a credit card and does not look like the indication of the first payment account or the indication of the second payment account. Thus, a user can understand at a glance that the device is in a special mode of operation.

In accordance with some embodiments, the plurality of payment accounts only include payment accounts for which the electronic device has received user input activating selection based on location without requiring user input.

In accordance with some embodiments, the plurality of payment accounts only include payment accounts for which a financial institution associated with the payment account has authorized the respective payment account for selection based on location without requiring user input.

In accordance with some embodiments, a contextual-selection mode of operation in which the device selects, based on context, which of the plurality of payment accounts to use for a payment transaction is represented as a selectable payment option. In some embodiments, the device receives selection of the selectable payment option and in response to selection of the selectable payment option, switches to a contextual-selection mode of operation.

Figure 12C:
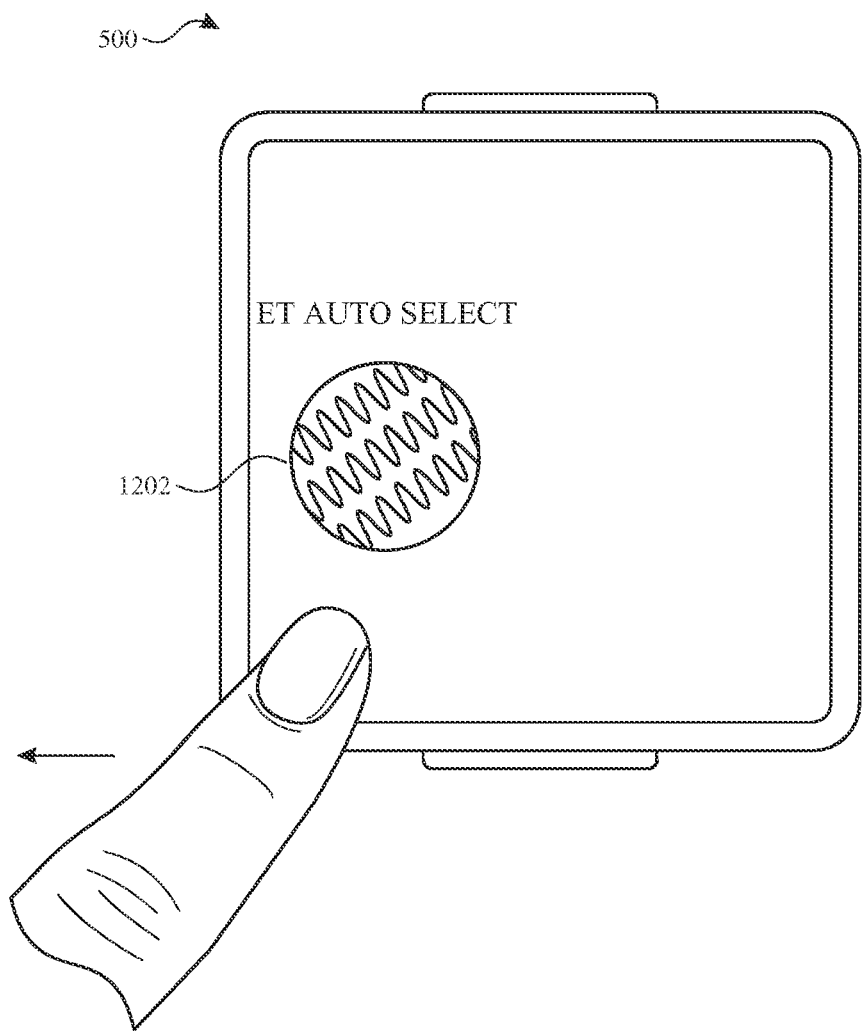
Figure 12D:
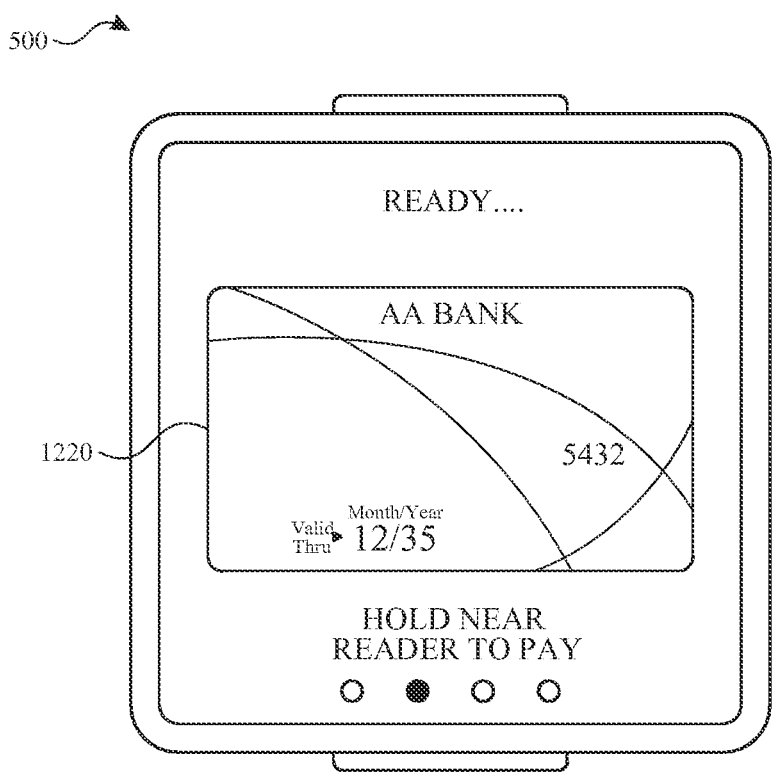

In FIG. 12C, in accordance with some embodiments, the electronic device includes a touch-sensitive surface. For example, prior to making a payment as illustrated in FIG. 12B, the electronic device receives one or more inputs (e.g., user inputs) in a first direction (e.g., one or more left swipes or right swipes via the touch-sensitive surface or a change in orientation of the device in the first direction). As illustrated in FIG. 12C, the electronic device may display an animation that includes transitioning the payment indication 1202 off the display. In response to receiving the one or more inputs, the electronic device replaces, on the display, the payment indication 1202 that represents the plurality of payment accounts with a second visual indicator 1220 different from the payment indication 1202 that represents the plurality of payment accounts, wherein the second visual selection indicator identifies a third payment account different from the first payment account and the second payment account. In response to receiving the one or more inputs, the electronic device enables the electronic device to participate in a transaction using the third payment account via the one or more wireless communication elements. (e.g., arming the device for making an NFC transaction using the second account and disabling the device from participating in transactions using the first account). Thus, the user can select a specific payment account. Once the user selects a specific payment account, the user can make a payment using that account, as illustrated in FIG. 12B.

In accordance with some embodiments, the payment indication 1202 that represents the plurality of payment accounts is different from the visual indicators (e.g., 1220) of individual payment accounts of the plurality of payment accounts. For example, the payment indication 1202 includes a logo without a surrounding card, while all other payment accounts are represented by card images (e.g., visual indication 1220), or the payment indication is accompanied by text that indicates that it represents contextual-selection between a plurality of different payment accounts (e.g., "AUTO SELECT").

FIG. 13 is a flow diagram illustrating a method for transmitting account information of an account selected from among multiple accounts in an electronic wallet, in accordance with some embodiments. Method 1300 is performed at a device (e.g., 100, 300, 500) with a display and one or more wireless communication elements. Some operations in method 1300 may be combined, the order of some operations may be changed, and some operations may be omitted.

As described below, method 1300 provides an intuitive way for transmitting account information of an account selected from among multiple accounts in an electronic wallet. The method reduces the cognitive burden on a user for selecting an account for use in a payment, thereby creating a more efficient human-machine interface. For battery-operated computing devices, enabling a user to select an account faster and more efficiently conserves power and increases the time between battery charges.

At block 1302, the electronic device receives an input (e.g., user input) requesting to enable the device for a payment transaction (e.g., the user performs a double-click of a hardware button 508 of the device to arm the device for making NFC payments).

At block 1304, in response to receiving the input, the electronic device displays, on the display, a payment indication (e.g., 1202) that represents a plurality of payment accounts including a first payment account and a second payment account (e.g., display a "smart selection" indication that does not identify a particular payment account).

At block 1306, the electronic device receives, via the one or more wireless communication elements, a request for account information corresponding to a payment transaction; (e.g., received from a contactless payment terminal 1220).

At block 1308, in response to receiving the request for account information corresponding to the payment transaction, the technique proceeds to blocks 1310-1312. At block 1310, in accordance with a determination that payment criteria for a first payment account have been met, the electronic device transmits, via the one or more wireless communication elements, account information for the first payment account without transmitting account information for the second payment account (and, optionally, without transmitting payment account information for any other payment account associated with the payment indication other than the first payment account).

At block 1312, in accordance with a determination that payment criteria for the second payment account have been met, transmitting, via the one or more wireless communication elements, account information for the second payment account without transmitting account information for the first payment account (and, optionally, without transmitting payment account information for any other payment account associated with the payment indication other than the second payment account).

In accordance with some embodiments, the electronic device is configured to enable payment using one of a default payment account and a plurality of non-default payment accounts (e.g., payment accounts that are only used when payment criteria for the payment account are met). In accordance with a determination that payment criteria have not been met for any of the non-default payment accounts, the electronic device transmits, via the one or more wireless communication elements, account information for the default payment account without transmitting account information for the non-default payment accounts.

In accordance with some embodiments, the payment criteria include a criterion based on a determination associated with a current location of the electronic device. For example, the criteria are met when the electronic device is within a determined geographical area. For another example, the criteria are not met when the electronic device is not within a determined geographical area.

In accordance with some embodiments, the payment indication (e.g., 1202) that represents the plurality of payment accounts does not include an indication of the first payment account and does not include an indication of the second payment account.

In accordance with some embodiments, the plurality of payment accounts only include payment accounts for which the electronic device has received user input activating selection based on location without requiring user input.

In accordance with some embodiments, the plurality of payment accounts only include payment accounts for which a financial institution associated with the payment account has authorized the respective payment account for selection based on location without requiring user input.

In accordance with some embodiments, a contextual-selection mode of operation in which the device selects, based on context, which of the plurality of payment accounts to use for a payment transaction is represented as a selectable payment option. In some embodiments, the device receives selection of the selectable payment option and in response to selection of the selectable payment option, switches to a contextual-selection mode of operation.

In accordance with some embodiments, the electronic device includes a touch-sensitive surface. The electronic device receives one or more inputs (e.g., user inputs) in a first direction (e.g., one or more left swipes or right swipes via the touch-sensitive surface or a change in orientation of the device in the first direction). In response to receiving the one or more inputs, the electronic device replaces, on the display, the payment indication (e.g., 1202) that represents the plurality of payment accounts with a second visual indicator (e.g., 1220) different from the payment indication (e.g., 1202) that represents the plurality of payment accounts, wherein the second visual selection indicator identifies a third payment account different from the first payment account and the second payment account. In response to receiving the one or more inputs, the electronic device enables the electronic device to participate in a transaction using the third payment account via the one or more wireless communication elements. Thus, the user can select a specific payment account.

In accordance with some embodiments, the payment indication (e.g., 1202) that represents the plurality of payment accounts is different from the visual indicators (e.g., 1220) of individual payment accounts of the plurality of payment accounts.

Note that details of the processes described above with respect to method 1300 (e.g., FIG. 13) are also applicable in an analogous manner to the methods described above and below. For example, methods 700, 900, 1100, 1500, 1700, and 1900 may include one or more of the characteristics of the various methods described above with reference to method 1300. For example, the electronic wallet, payment accounts, loyalty accounts, affordances, and inputs of methods 700, 900, 1100, 1500, 1700, and 1900 optionally have one or more of the characteristics of the electronic device, payment accounts, loyalty accounts, affordances, and inputs of the electronic device described in method 1300. For brevity, these details are not repeated below.

FIGS. 14A-14E illustrate exemplary techniques and exemplary user interfaces for receiving a selection of an account from among multiple accounts in an electronic wallet, in accordance with some embodiments. For example, account information of a selected account may subsequently be transmitted to an NFC-enabled payment terminal for use in a transaction (e.g., when the device is placed into a field of the payment terminal). The technique is performed at an electronic device with a display, a touch-sensitive surface configured to detect intensity of contacts, and one or more wireless communication elements. The user interfaces in these figures are used to illustrate the processes described below, including the processes in FIG. 15.

The electronic device receives a first input (e.g., user input at a hardware button). For example, the user double-clicks a mechanical or capacitive button 508 of the device.

Figure 14A:
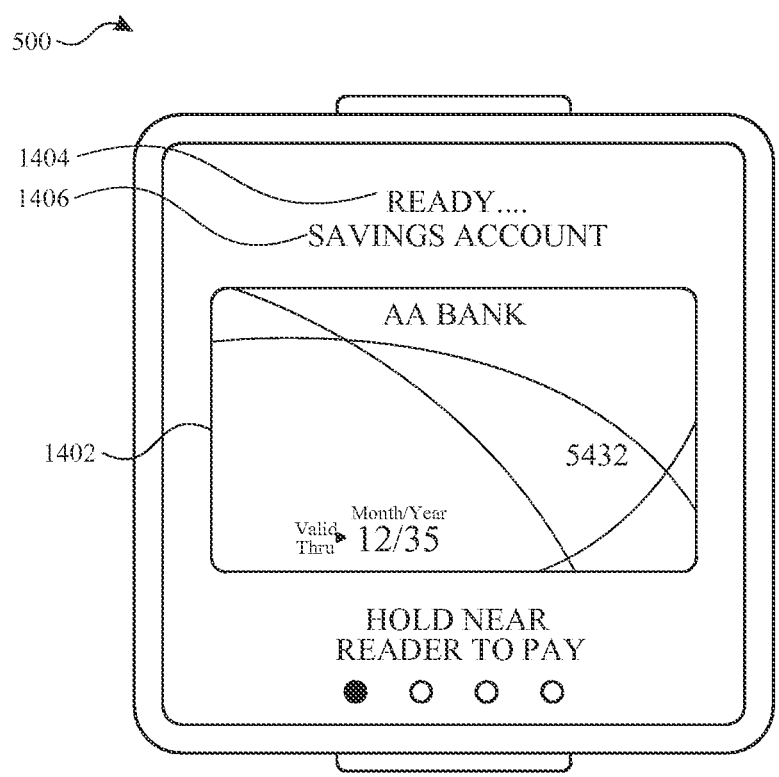
FIGS. 14A-14E illustrate exemplary techniques and exemplary user interfaces for receiving a selection of an account, in accordance with some embodiments.
Figure 15:
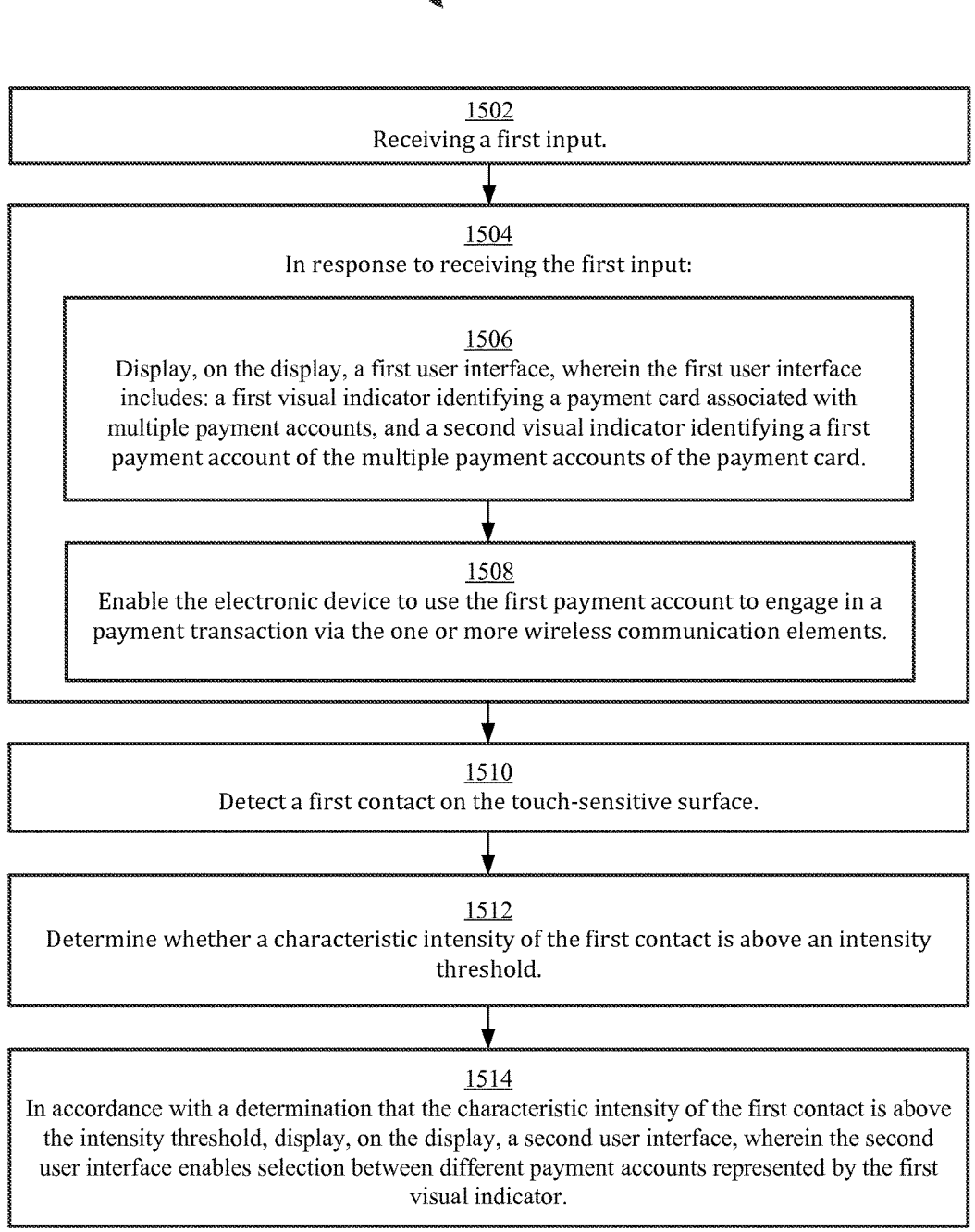
FIG. 15 is a flow diagram illustrating a method for receiving a selection of an account, in accordance with some embodiments.

As illustrated in FIG. 14A, in response to receiving the first input, the electronic device displays, on the display, a first user interface (e.g., the user interface of FIG. 14A), wherein the first user interface includes a first visual indicator 1402 identifying a payment card associated with multiple payment accounts, and a second visual indicator 1406 identifying a first payment account (e.g., a savings account) of the multiple payment accounts of the payment card. As illustrated in FIG. 14A, the second visual indicator 1406 may include "Savings Account" to indicate that the savings account of the payment card is active or selected. The first visual indicator 1402 may include one or more of: the name of the financial institution that services the payment account; an account number; an expiration date; and background art.

The electronic device enables the electronic device to use the first payment account to engage in a payment transaction via the one or more wireless communication elements. For example, once enabled for the first payment account, a user can place the electronic device into a field of a contactless payment terminal to make an NFC payment using the first payment account. In FIG. 14A, ready indication 1404 is a visual indication that the device is enabled to participate in a payment transaction using the first payment account.

Figure 14B:
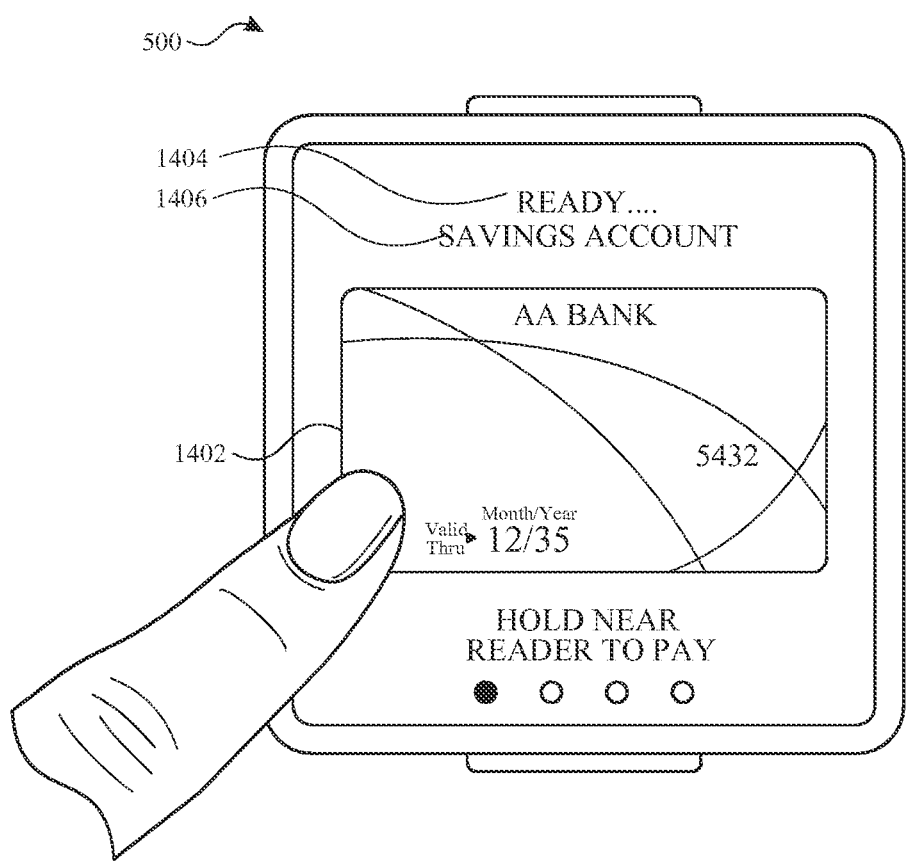

As illustrated in FIG. 14B, the electronic devices detects a first contact on the touch-sensitive surface. The electronic device determines whether a characteristic intensity of the first contact is above an intensity threshold.

Figure 14C:
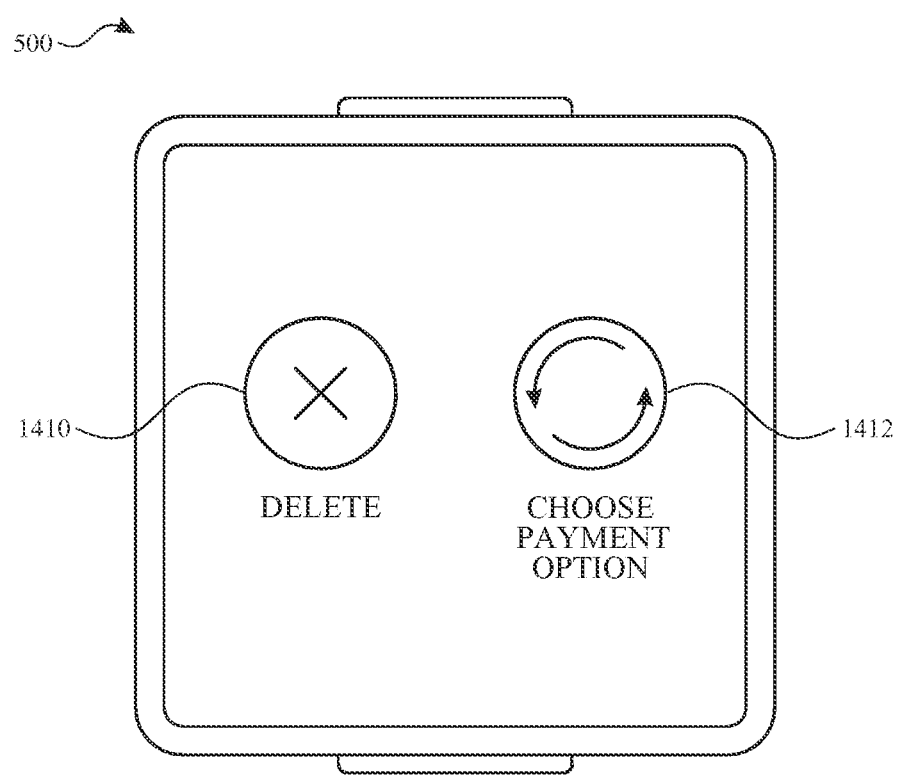
Figure 14D:
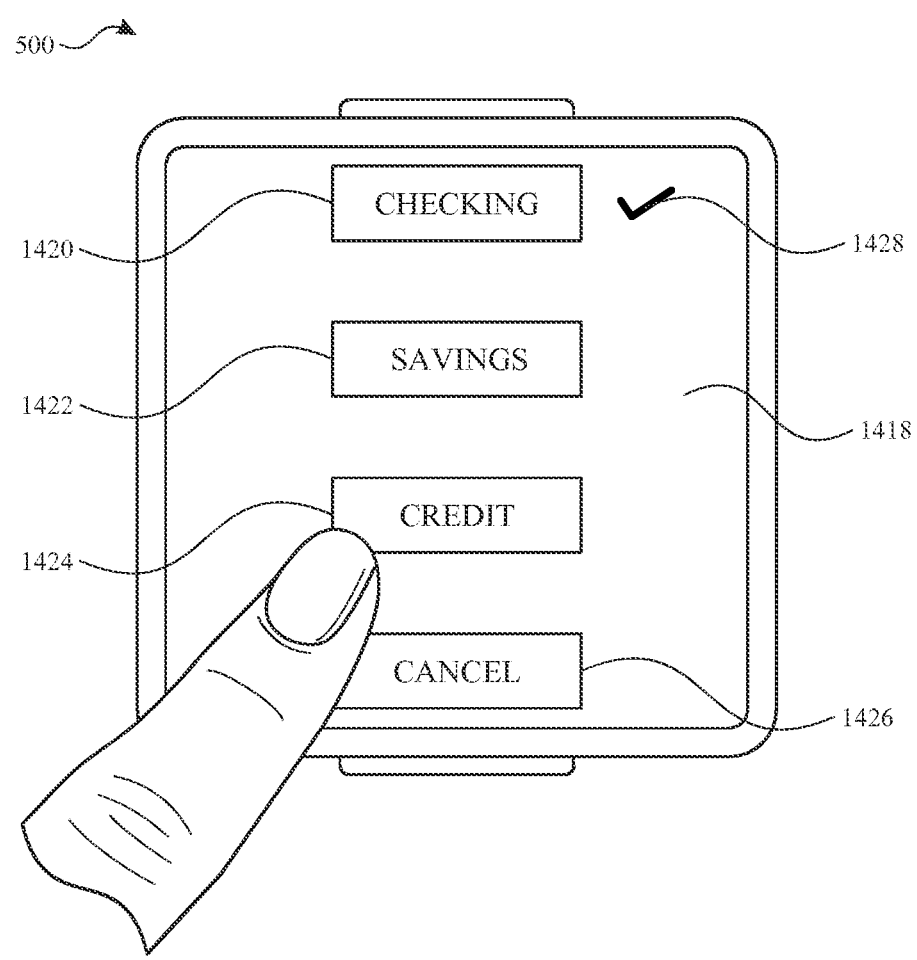

As illustrated in FIGS. 14C and 14D, in accordance with a determination that the characteristic intensity of the first contact is above the intensity threshold (e.g., hard press), the electronic device displays, on the display, a second user interface, wherein the second user interface enables selection between different payment accounts represented by the first visual indicator. For example, the hard press can result in the display of the user interface of FIG. 14D. For another example, the hard press can result in the display of FIG. 14C, after which activation of affordance 1412 at the user interface of FIG. 14C results in the display of the user interface of FIG. 14D.

There are multiple ways for the user to access the user interface that allows selection from among the multiple payment accounts of the payment card. One method is to enable the electronic device to engage in a payment transaction (e.g., using an electronic wallet application), thus resulting in the first visual indicator to be displayed while the device is in a payment mode, as discussed above. Another method is to access the settings or details of a particular payment account from an electronic wallet application, thus resulting in the first visual indicator being displayed while the device is not in a payment mode (e.g., not enabled to engage in a payment transaction via the one or more wireless communication elements). While displaying the user interface (and not in the payment mode), the device detects a contact on the touch-sensitive surface; the device determines whether a characteristic intensity of the contact is above an intensity threshold; and in accordance with a determination that the characteristic intensity of the contact is above the intensity threshold (e.g., hard press), the device displays, on the display, an additional user interface, wherein the additional user interface enables selection between different payment accounts represented by the first visual indicator. Both of these methods (via payment mode and non-payment mode) allow the user to bring up the account selection interface to select from among the multiple payment accounts of a payment card.

As illustrated in FIG. 14C, in accordance with some embodiments, the second user interface includes a payment account selection affordance 1412. The electronic device detects a second contact at a location on the touch-sensitive surface corresponding to the payment account selection affordance 1412. As illustrated in FIG. 14D, in response to detecting the second contact, the electronic device displays, on the display, a third user interface 1418, wherein the third user interface 1418 includes one or more account affordances (e.g., 1420, 1422, 1424) corresponding to at least some of the multiple payment accounts. The electronic device detects a third contact at a location associated with an account affordance 1424 of the one or more account affordances (e.g., 1420, 1422, 1424), wherein the account affordance 1424 corresponds to a second payment account (e.g., a credit account) of the multiple payment accounts and the second payment account is different from the first payment account. In some examples, when the electronic device detects activation of cancel affordance 1426, the electronic device displays the user interface of FIG. 14C.

Figure 14E:
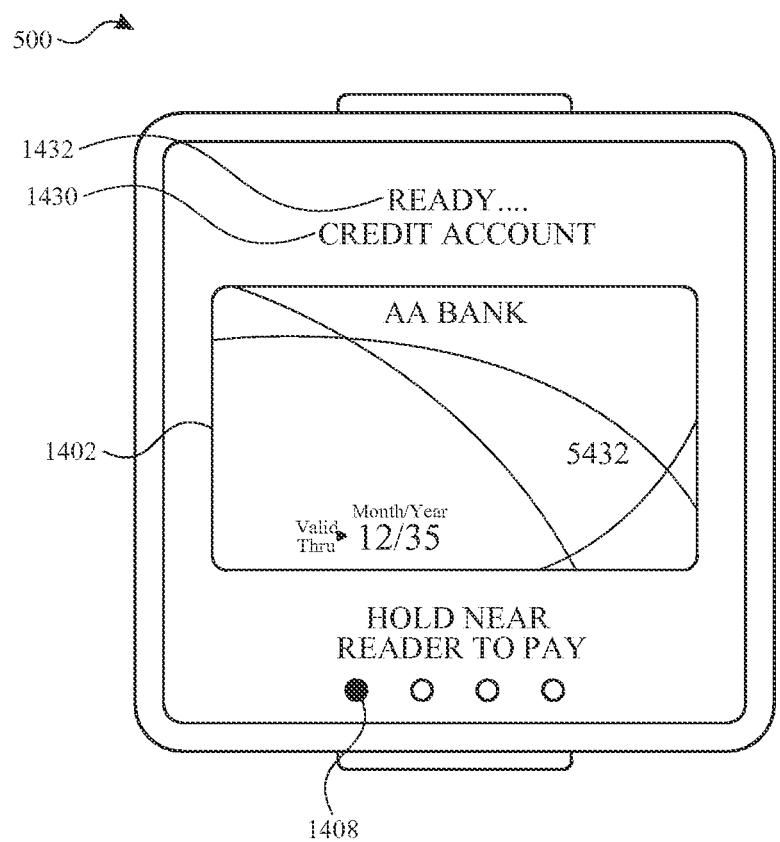

As illustrated in FIG. 14E, in response to detecting the third contact, the electronic device displays, on the display, a fourth user interface (e.g., the user interface of FIG. 14E), wherein the fourth user interface includes: the first visual indicator 1402 identifying the payment card associated with multiple payment accounts (e.g., the payment card has not changed), and a third visual indicator 1430 identifying the second payment account (e.g., a credit account different from the checking account) of the multiple payment accounts of the payment card. For example, the third visual indicator 1430 says "Credit Account" to indicate that the credit account of the payment card is active or selected. In response to detecting the third contact, the electronic device also enables the electronic device to use the second payment account to engage in a payment transaction via the one or more wireless communication elements (and disables the electronic device from using the first payment account to engage in a payment transaction). For example, a user can place the electronic device into a field of a contactless payment terminal to make an NFC payment using the first payment account. For example, ready indication 14032 is a visual indication that the device is enabled to participate in a payment transaction using the second payment account.

In accordance with some embodiments, in accordance with a determination that the characteristic intensity of the first contact is below the intensity threshold (e.g., a light press), the electronic device maintains display of the first visual indicator 1402 (and, optionally, the second visual indicator 1406) without displaying, on the display, the second user interface.

In accordance with some embodiments, the one or more account affordances 1420, 1422, 1424 include a plurality of account affordances.

In accordance with some embodiments, a visual indicator (e.g., 1420, 1422, 1424) of a currently selected payment account is highlighted (e.g., different color, displayed with a check mark 1428, etc.) on the second user interface.

In accordance with some embodiments, detecting the second contact includes determining that a characteristic intensity of the second contact is not above an intensity threshold (e.g., it is not a hard press).

In accordance with some embodiments, the second user interface includes a payment account deletion affordance 1410. The electronic device detects activation of the payment account deletion affordance 1410. In response to detecting activation of the payment account deletion affordance 1410, the electronic device removes (e.g., unlinking from the electronic device) the multiple payment accounts of the payment card from an electronic wallet of the device.

In accordance with some embodiments, the payment account deletion affordance 1410 includes one or more visual characteristics differentiating the payment account deletion affordance from the payment account selection affordance 1412. For example, the affordances have a different shape, a different fill color, or different text to help prevent a user from mistaking one affordance for the other.

In accordance with some embodiments, while displaying, on the display, the fourth user interface, the electronic device detects a swipe input (e.g., horizontal swipe input) on the touch-sensitive surface. In some embodiments, the swipe input has a characteristic intensity below the intensity threshold. In response to detecting the swipe input, the electronic device displays a fifth user interface, wherein the fifth user interface includes a fourth visual indicator identifying a second payment card different from the payment card. Thus, the user can swipe to change payment cards.

In accordance with some embodiments, the first user interface, the second user interface, the third user interface, and the fourth user interface are user interfaces of a single electronic wallet application, the single electronic wallet application including a plurality of payment accounts associated with a user of the electronic device.

In accordance with some embodiments, the electronic device receives a request for account information from a contactless payment terminal. In response to receiving the request for account information, the electronic device transmits, via the one or more wireless communication elements, account information for the second payment account to the contactless payment terminal, wherein the account information enables the contactless payment terminal to engage in a payment transaction. In some embodiments, engaging in the payment transaction includes routing information to one or more financial institutions to verify payment credentials and/or receive authorization to complete the transaction. For example, the payment account information is transmitted to a contactless payment terminal using NFC.

FIG. 15 is a flow diagram illustrating a method for receiving a selection of an account from among multiple accounts in an electronic wallet, in accordance with some embodiments. Method 1500 is performed at a device (e.g., 100, 300, 500) with a display, a touch-sensitive surface configured to detect intensity of contacts, and one or more wireless communication elements. Some operations in method 1500 may be combined, the order of some operations may be changed, and some operations may be omitted.

As described below, method 1500 provides an intuitive way for receiving a selection of an account from among multiple accounts in an electronic wallet. The method reduces the cognitive burden on a user for selecting an account, thereby creating a more efficient human-machine interface. For battery-operated computing devices, enabling a user to select an account faster and more efficiently conserves power and increases the time between battery charges.

At block 1502, the electronic device receives a first input (e.g., user input at a hardware button). For example, the user double-clicks a mechanical or capacitive button of the device.

At block 1504, in response to receiving the first input, the technique proceeds to 1506. At block 1506, the electronic device displays, on the display, a first user interface (e.g., user interface of FIG. 15A), wherein the first user interface includes: a first visual indicator (e.g., 1402) identifying a payment card associated with multiple payment accounts and a second visual indicator (e.g., 1406) identifying a first payment account of the multiple payment accounts of the payment card.

At block 1506, the electronic device enables the electronic device to use the first payment account to engage in a payment transaction via the one or more wireless communication elements. At block 1508, the electronic device detects a first contact on the touch-sensitive surface.

At block 1510, the electronic device determines whether a characteristic intensity of the first contact is above an intensity threshold.

At block 1512, in accordance with a determination that the characteristic intensity of the first contact is above the intensity threshold (e.g., hard press), the electronic device displays, on the display, a second user interface (e.g., 1418 of FIG. 14D or the user interface of FIG. 14C), wherein the second user interface enables selection between different payment accounts represented by the first visual indicator.

In accordance with some embodiments, the second user interface includes a payment account selection affordance (e.g., 1412). The electronic device detects a second contact at a location on the touch-sensitive surface corresponding to the payment account selection affordance (e.g., 1412). In response to detecting the second contact, the electronic device displays, on the display, a third user interface (e.g., 1418), wherein the third user interface (e.g., 1418) includes one or more account affordances (e.g., 1420, 1422, 1424) corresponding to at least some of the multiple payment accounts. The electronic device detects a third contact at a location associated with an account affordance (e.g., 1424) of the one or more account affordances (e.g., 1420, 1422, 1424), wherein the account affordance (e.g., 1424) corresponds to a second payment account of the multiple payment accounts and the second payment account is different from the first payment account.

In response to detecting the third contact, the electronic device displays, on the display, a fourth user interface (e.g., the user interface of FIG. 14E), wherein the fourth user interface includes: the first visual indicator (e.g., 1402) identifying the payment card associated with multiple payment accounts, and a third visual indicator (e.g., 1430) identifying the second payment account of the multiple payment accounts of the payment card. In response to detecting the third contact, the electronic device enables the electronic device to use the second payment account to engage in a payment transaction via the one or more wireless communication elements (and disables the electronic device from using the first payment account to engage in a payment transaction).

In accordance with some embodiments, in accordance with a determination that the characteristic intensity of the first contact is below the intensity threshold (e.g., a light press), the electronic device maintains display of the first visual indicator (e.g., 1402) (and, optionally, the second visual indicator 1406) without displaying, on the display, the second user interface.

In accordance with some embodiments, the one or more account affordances (e.g., 1420, 1422, 1424) include a plurality of account affordances.

In accordance with some embodiments, a visual indicator (e.g., 1420, 1422, 1424) of a currently selected payment account is highlighted (e.g., different color, displayed with a check mark 1428, etc.) on the second user interface.

In accordance with some embodiments, detecting the second contact includes determining that a characteristic intensity of the second contact is not above an intensity threshold (e.g., it is not a hard press).

In accordance with some embodiments, the second user interface includes a payment account deletion affordance (e.g., 1410). The electronic device detects activation of the payment account deletion affordance (e.g., 1410). In response to detecting activation of the payment account deletion affordance (e.g., 1410), the electronic device removes (e.g., unlinks from the electronic device) the multiple payment accounts of the payment card from an electronic wallet of the device.

In accordance with some embodiments, the payment account deletion affordance (e.g., 1410) includes one or more visual characteristics differentiating the payment account deletion affordance from the payment account selection affordance (e.g., 1412).

In accordance with some embodiments, while displaying, on the display, the fourth user interface, the electronic device detects a swipe input (e.g., horizontal swipe input) on the touch-sensitive surface. In some embodiments, the swipe input has a characteristic intensity below the intensity threshold. In response to detecting the swipe input, the electronic device displays a fifth user interface, wherein the fifth user interface includes a fourth visual indicator identifying a second payment card different from the payment card.

In accordance with some embodiments, the first user interface, the second user interface, the third user interface, and the fourth user interface are user interfaces of a single electronic wallet application, the single electronic wallet application including a plurality of payment accounts associated with a user of the electronic device.

In accordance with some embodiments, the electronic device receives a request for account information from a contactless payment terminal. In response to receiving the request for account information, the electronic device transmits, via the one or more wireless communication elements, account information for the second payment account to the contactless payment terminal, wherein the account information enables the contactless payment terminal to engage in a payment transaction. In some embodiments, engaging in the payment transaction includes routing information to one or more financial institutions to verify payment credentials and/or receive authorization to complete the transaction. For example, the payment account information is transmitted to a contactless payment terminal using NFC.

Note that details of the processes described above with respect to method 1500 (e.g., FIG. 15) are also applicable in an analogous manner to the methods described above and below. For example, methods 700, 900, 1100, 1300, 1700, and 1900 may include one or more of the characteristics of the various methods described above with reference to method 1500. For example, the electronic wallet, payment accounts, loyalty accounts, affordances, and inputs of methods 700, 900, 1100, 1300, 1700, and 1900 optionally have one or more of the characteristics of the electronic device, payment accounts, loyalty accounts, affordances, and inputs of the electronic device described in method 1500. For brevity, these details are not repeated below.

FIGS. 16A-16G illustrate exemplary techniques and exemplary user interfaces for linking a payment account to one or more electronic devices, in accordance with some embodiments. The technique is performed at a first electronic device with a display and one or more wireless communication elements (e.g., one or more wireless antennas such as NFC antennas, WiFi antennas.). The user interfaces in these figures are used to illustrate the processes described below, including the processes in FIG. 17.

A user may want to add a payment account to two devices, which are paired with each other, such as the user's phone and the user's smart watch. The following description describes a technique for linking the payment account to the user's first device (e.g., phone) and the user's second device (e.g., smart watch) in a convenient and efficient manner.

Figure 16A:
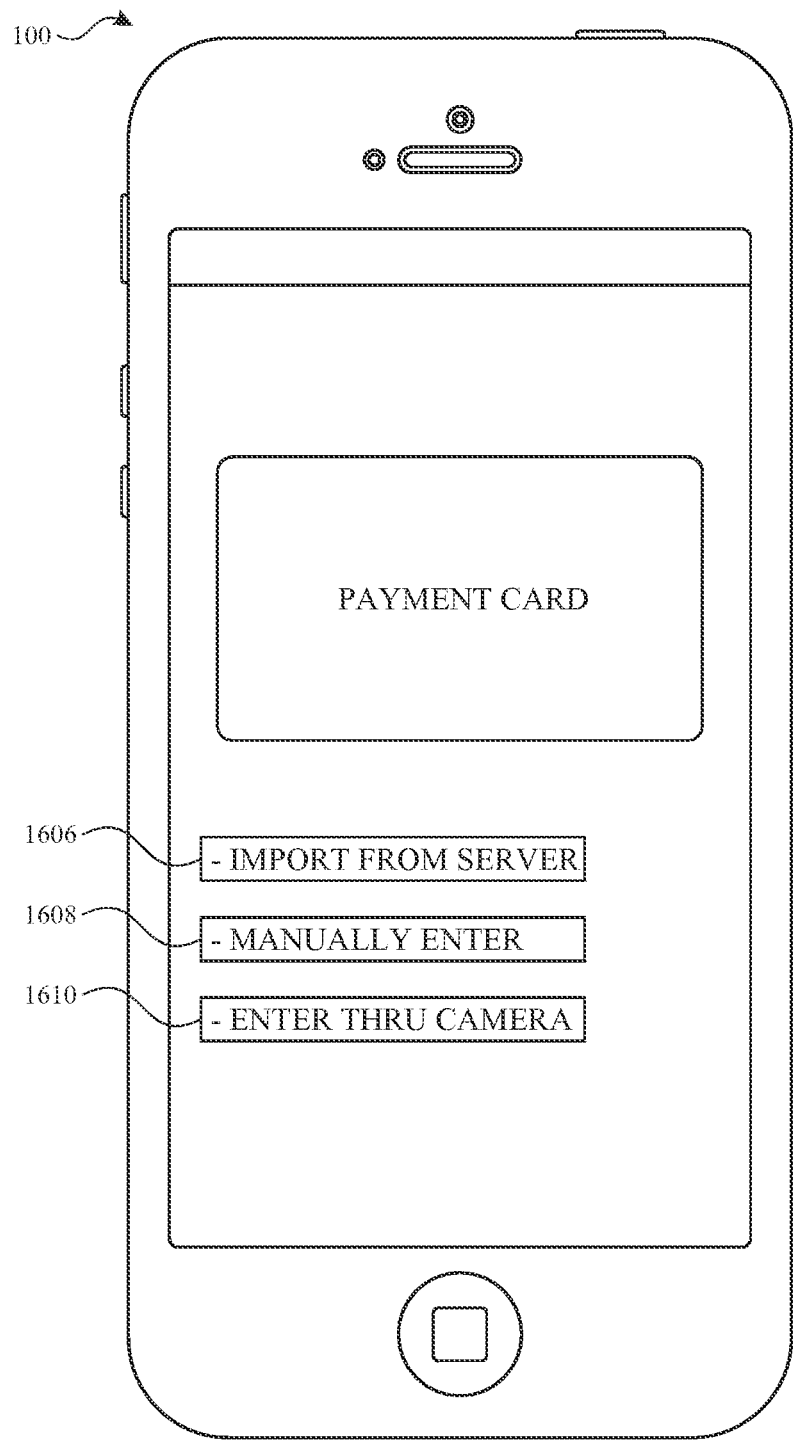
FIGS. 16A-16G illustrate exemplary techniques and exemplary user interfaces for linking a payment account to one or more electronic devices, in accordance with some embodiments.

At FIG. 16A, the first electronic device displays a user interface including three affordances for linking a payment account to the first electronic device. For example, affordance 1606, when activated, allows for importing payment account details from a remote server; affordance 1608, when activated, allows for manually entering payment account details (e.g., using a displayed keypad); affordance 1610, when activated, allows for capturing payment account details using a camera sensor of the first electronic device.

Figure 16B:
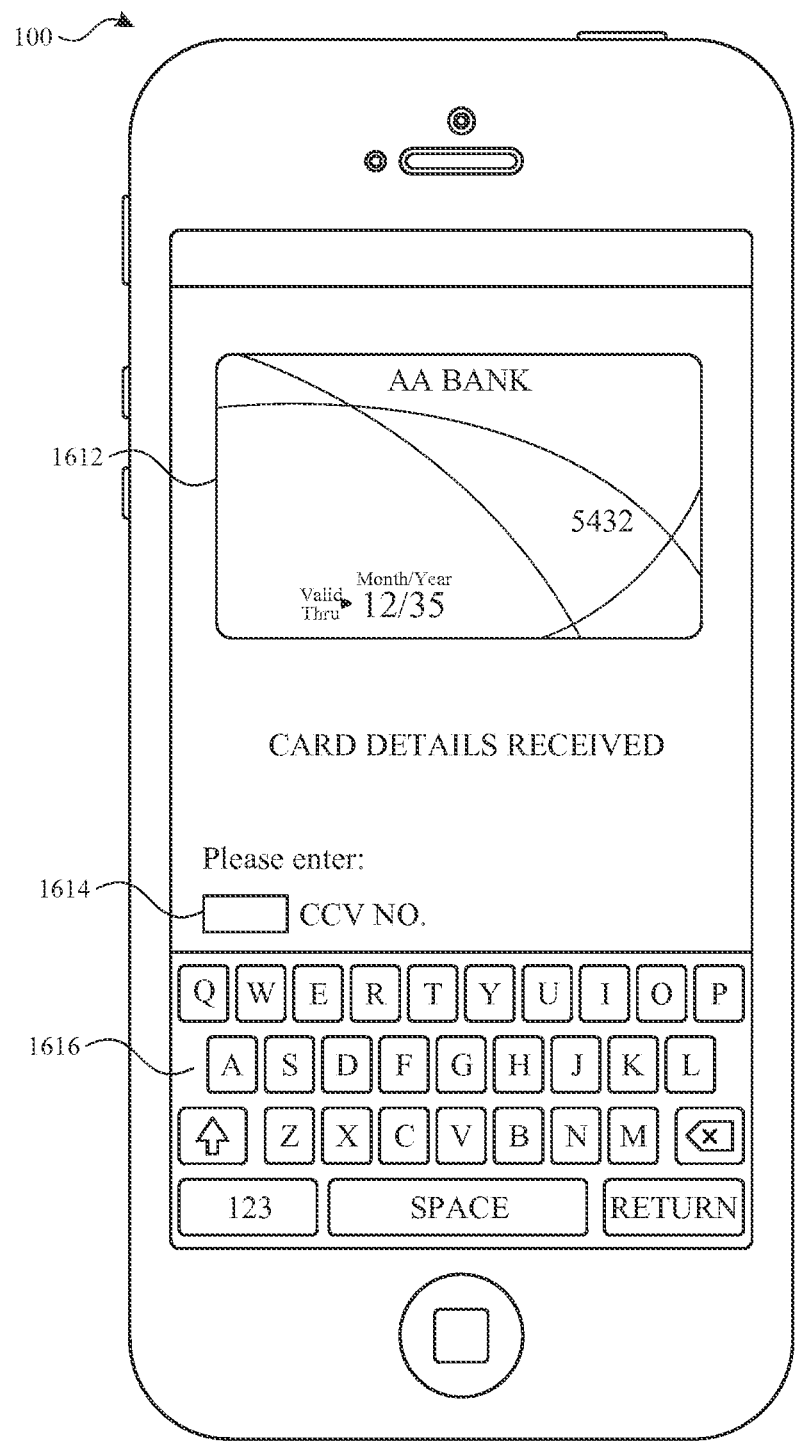

At FIG. 16B, the first electronic device may display a user interface that includes a payment account indication 1612 representing the payment account. The device may prompt the user to enter the security code (e.g., a numerical card security code such as CVD, CVV, CVC) of the payment account. For example, the device can receive input using keypad 1616 for entry of the security code into field 1614. Thus, the first electronic device receives a first request (e.g., a user input) to link a payment account associated with a payment card (e.g., a credit card) to the first electronic device.

Figure 16C:
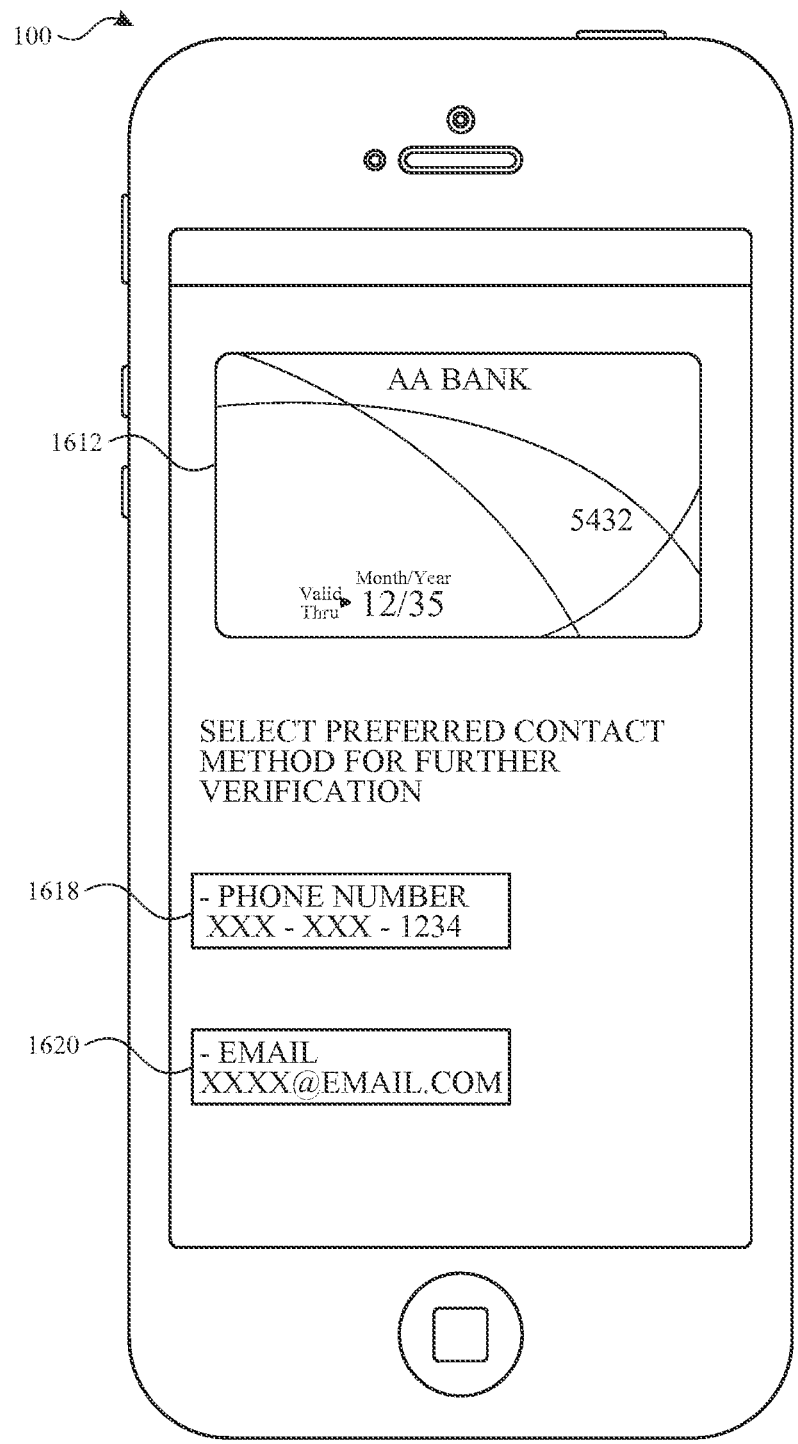

In response to receiving the first request, the first electronic device initiates a process for linking the payment account to the first electronic device. As illustrated in FIG. 16B, in some examples, during the process for linking the payment account to the first electronic device, the first electronic device receives input of a security code (e.g., a numerical card security code such as CVD, CVV, CVC) of the payment card. For example, the user may enter the security code into field 1614 by using keypad 1616. In some examples, the first electronic device determines whether further verification is needed to link the payment account to the first electronic device. In accordance with a determination that further verification is not needed to link the payment account to the first electronic device, the first electronic device links the payment account to the electronic device. As illustrated in FIG. 16C, in accordance with a determination that further verification is needed to link the payment account to the first electronic device, the first electronic device provides an indication that further verification is needed to link the payment account to the respective device (e.g., displaying on the display of the first electronic device that approval for linking the payment account is pending or requesting the user to call a phone number for verification). In this example, the user can activate affordance 1618 to receive a telephone call to complete the further verification or the user can activate affordance 1620 to receive an email to complete the further verification. In some embodiments, the indication that further verification is needed to link the payment account to the first electronic device includes an alphanumeric visual indicator displayed on the display of the electronic device (e.g., the alphanumeric indicator comprising "approval pending" that indicates that further verification steps have been initiated without additional user input). For example, a financial institution (e.g., a bank) associated with the payment account may need to confirm details of the payment account before the payment account is linked to the respective device. The verification may or may not require additional user interaction with the financial institution. Additional details regarding the determination and process for further verification is described in U.S. Provisional Patent Application Ser. No. 62/004,886, "USER INTERFACE FOR PAYMENTS," which is hereby incorporated by reference in its entirety.

Figure 16D:
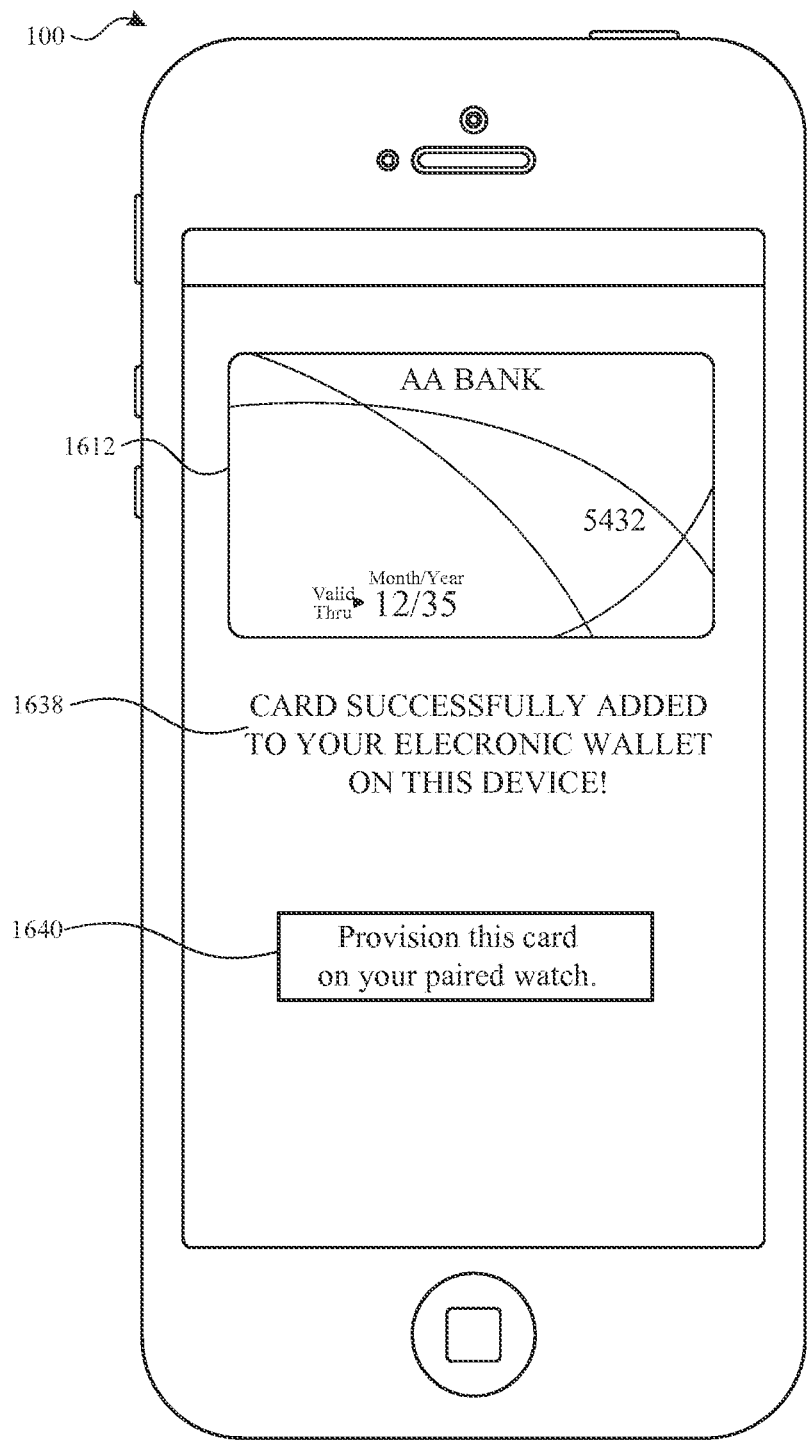

As illustrated in FIG. 16D, after successfully linking the payment account to the first electronic device (e.g., in response to linking the payment account to the first electronic device), the first electronic device concurrently displays, on the display, an indication 1638 that the payment account has been successfully linked to the first electronic device and a selectable affordance 1640 for linking the payment account to a second electronic device different from the first electronic device.

Figure 16E:
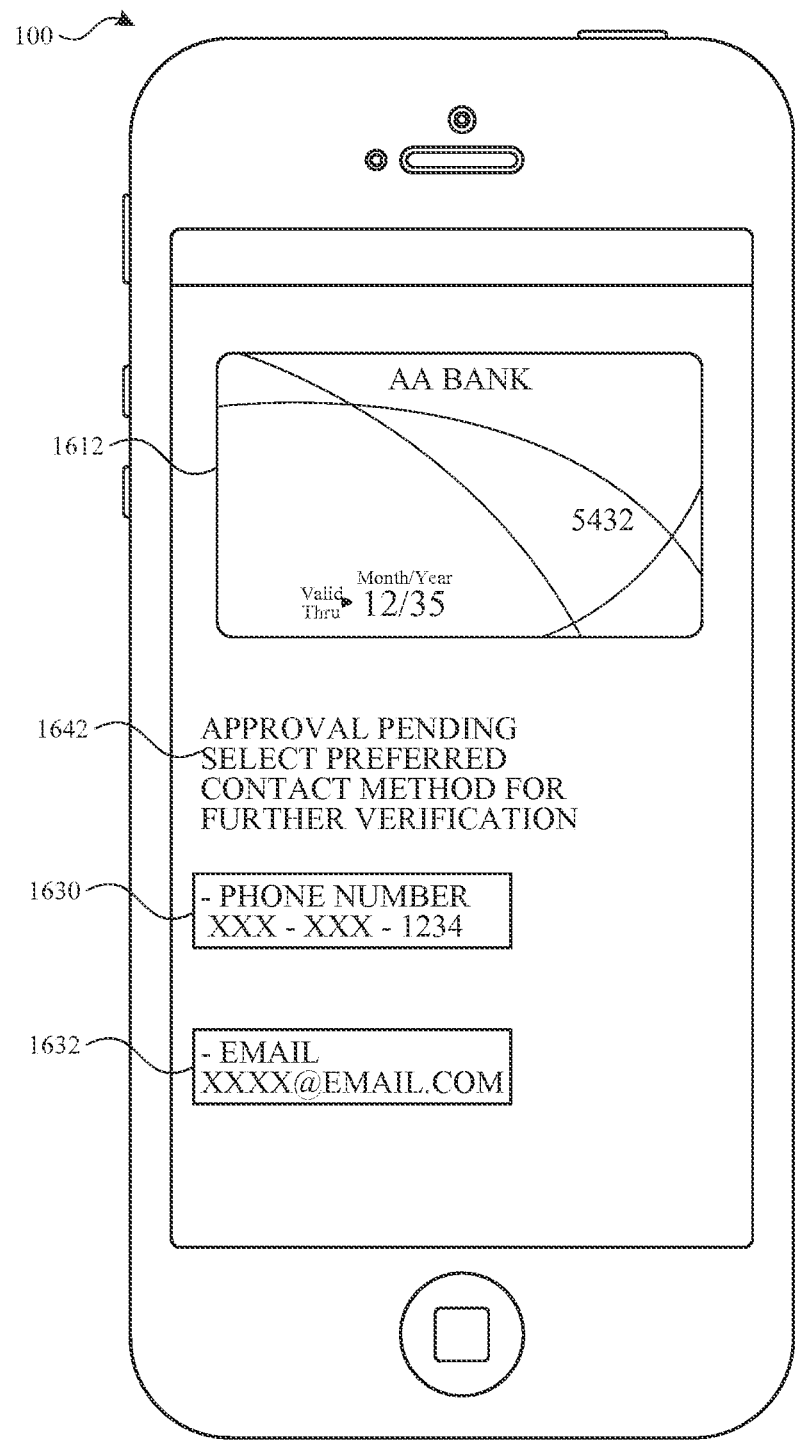
Figure 16F:
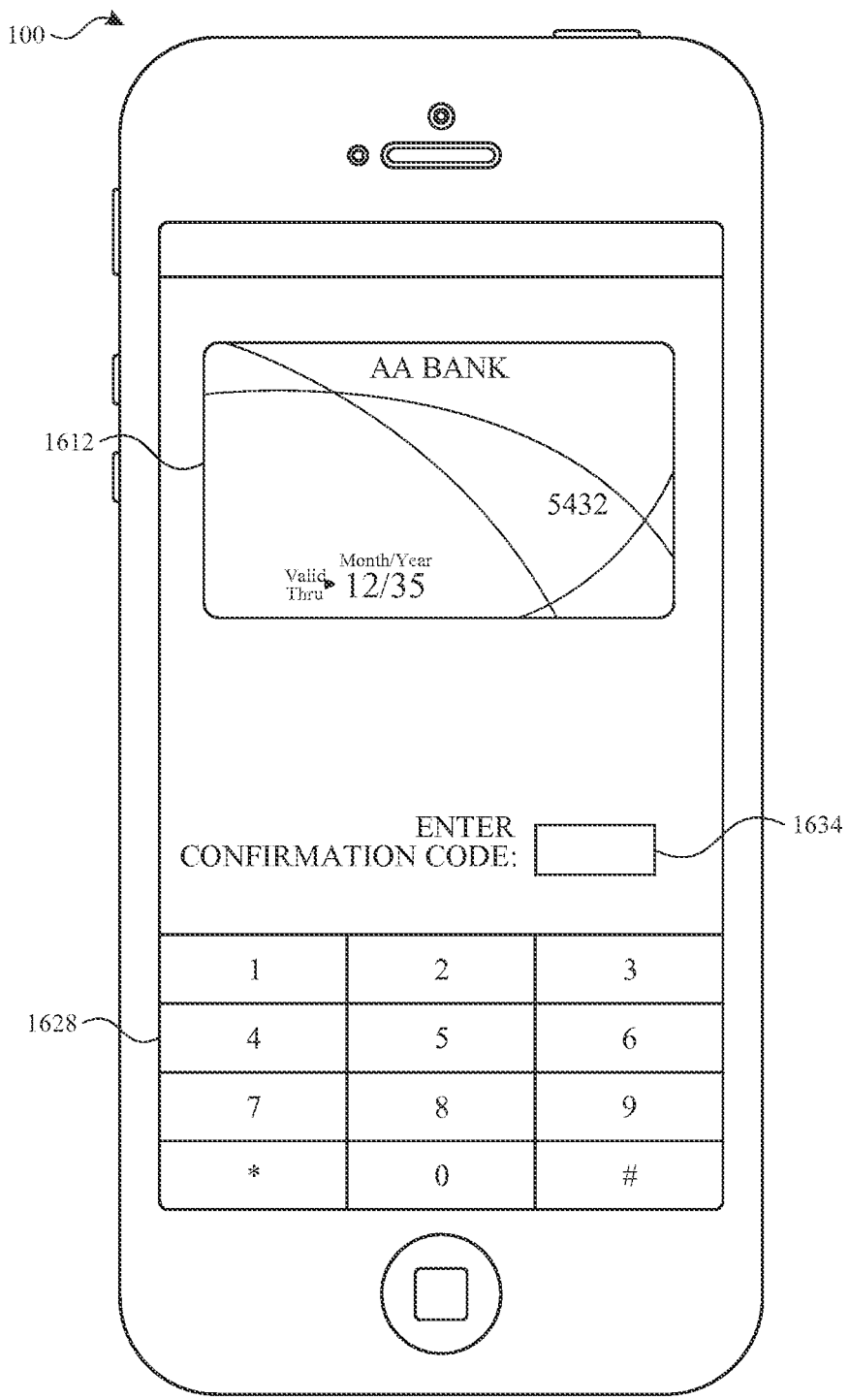

The first electronic device receives activation of the selectable affordance 1640 (e.g., user activates the selectable affordance 1640 by tapping on the affordance). In response to receiving activation of the selectable affordance 1640, the first electronic device initiates a process for linking the payment account to the second electronic device (e.g., as illustrated in FIGS. 16E-16F).

In accordance with some embodiments, the second electronic device is uniquely paired with the first electronic device. For example, the second electronic device has a special relationship with the first electronic device in that the second electronic device is only paired with the first electronic device and is not paired with any other devices.

In accordance with some embodiments, the first electronic device is paired with the second electronic device and the first electronic device is paired with a third electronic device, and wherein a pairing relationship between the first electronic device and the second electronic device is different than a pairing relationship between the first electronic device and the third electronic device.

In accordance with some embodiments, initiating the process for linking the payment account to the second electronic device includes (the first electronic device) transmitting, via the one or more wireless communication elements, to a financial institution associated with the payment card an indication that the second electronic device is uniquely paired with the first electronic device. For example, the first electronic device sends a security token to the financial institution indicating that the second electronic device is uniquely paired with a device that was just linked to the same payment account.

Figure 16G:
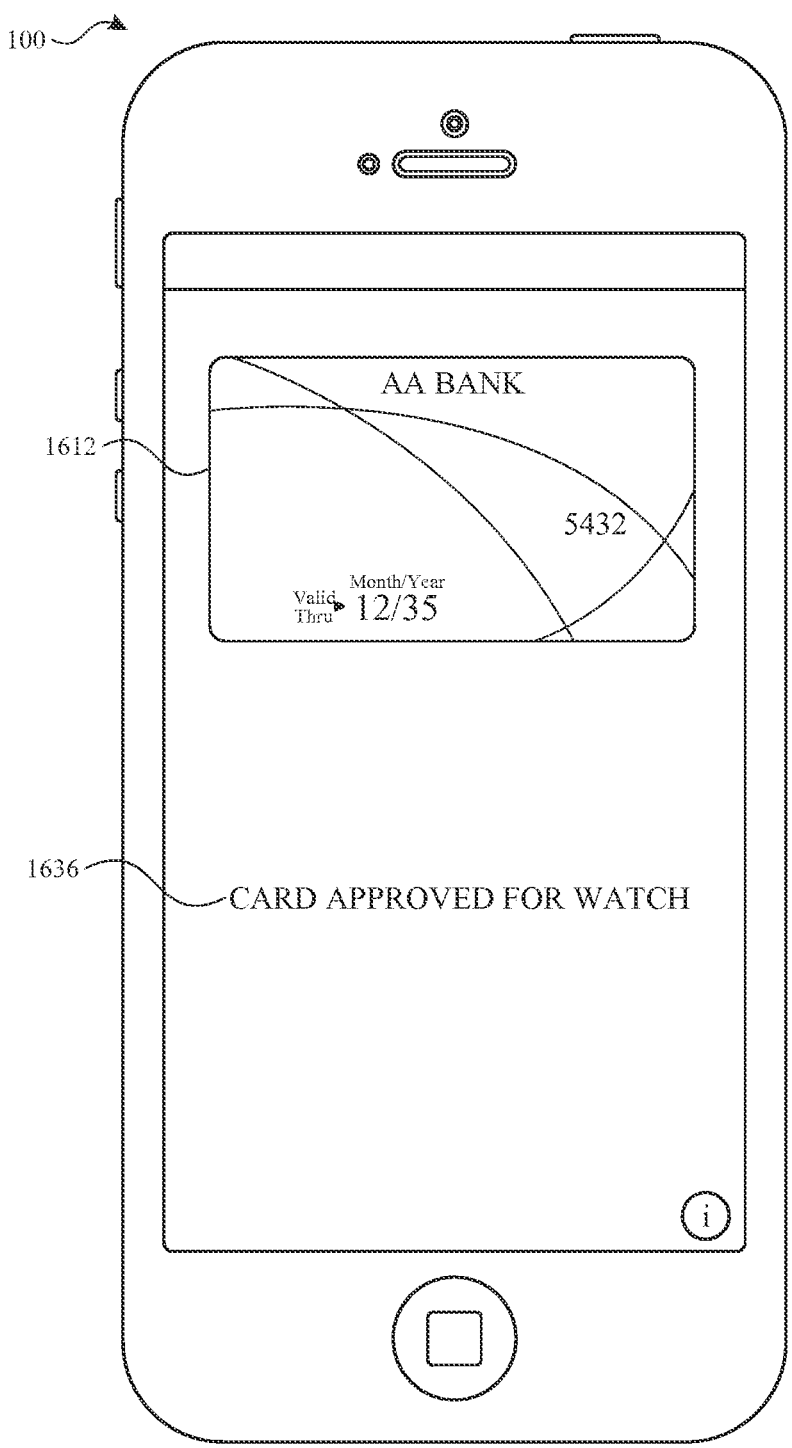

In accordance with some embodiments, after initiating linking the payment account to the second electronic device, the first electronic device receives a confirmation from the second electronic device that linking the second electronic device to the payment account was successful. A primary account number (e.g., Digital PAN, DPAN, a 16-digit account number, or other account number, which, for example, cannot be used for completing a manual transaction over a voice call—only for completing a payment electronically through the device) linked to the second electronic device for the payment account is different from a primary account number (e.g., Digital PAN, DPAN, a 16-digit account number, or other account number) linked to the first electronic device for the payment account. As illustrated in FIG. 16G, in some examples, the first electronic device displays a confirmation 1636 that the payment account was linked to the second electronic device.

In accordance with some embodiments, the first request (e.g., a user input) to link a payment account (to the first electronic device) includes an account number of the payment card (e.g., which is provided by the user through manual entry, imported from a server, or input by the user via a camera sensor of the electronic device) and wherein initiating the process for linking the payment account to the second electronic device occurs without requiring additional input (e.g., user input) of the account number of the payment card.

As illustrated in FIG. 16F, in accordance with some embodiments, a second request (e.g., to link the payment account to the second electronic device, which initiates the process for linking the payment account to the second electronic device) includes a security code (e.g., a numerical card security code such as CVD, CVV, CVC) of the payment card (e.g., that was input by a user). For example, a user can enter the security code into field 1634 using keypad 1628.

In accordance with some embodiments, the first electronic device initiates the process for linking the payment account to the second electronic device.

In accordance with some embodiments, initiating the process linking the payment account to the second electronic device includes (the first electronic device) transmitting, via the one or more wireless communication elements, to a financial institution associated with the payment card (1) the account number of the credit card and (2) a security token confirming the payment account was previously linked to the first electronic device. In some embodiments, the security token is generated by the electronic device after linking the payment account to the first device. In some embodiments, the security token is received by the electronic device from the financial institution after linking the payment account to the first device.

In accordance with some embodiments, initiating the process for linking the payment account to the second electronic device includes: (the first electronic device) determining whether further verification is needed to link the payment account to the second electronic device; in accordance with a determination that further verification is not needed to link the payment account to the second electronic device, (the first electronic device) initiating a process for linking the payment account to the second electronic device and providing an indication (e.g., on the display) that the payment account has been linked to the second electronic device; and, as illustrated in FIG. 16E, in accordance with a determination that further verification is needed to link the payment account to the second electronic device, (the first electronic device) providing an indication 1642 (e.g., on the display) that further verification is needed to link the payment account to the second electronic device.

As illustrated in FIG. 16E, in accordance with some embodiments, the indication that further verification is needed to link the payment account to the second electronic device includes a visual indication of additional steps to be taken by a user to link the payment account to the respective device (e.g., affordance 1630 with phone number to be called; affordance 1632 with email address to be emailed).

In accordance with some embodiments, the first electronic device transmits account linking information to the second electronic device. The account linking information enables the second electronic device to link the payment account to the second electronic device.

In accordance with some embodiments, in accordance with the determination that further verification is needed to link the payment account to the second electronic device, the first electronic device displays, on the display, a plurality of communication method affordances, wherein each communication method affordance is associated with a respective communication method for a verification communication. The plurality of communication method affordances is based on communication received from the financial institution.

In accordance with some embodiments, in accordance with the determination that further verification is needed to link the payment account to the second electronic device, the first electronic device receives a selection of a communication method affordance of the plurality of communication method affordances, and in response to receiving the selection of the communication method affordance, the first electronic device transmits, to the financial institution, an indication of the respective communication method of the selected communication method affordance. The verification communication is based on the communication method affordance.

In accordance with some embodiments, the first electronic device receives a primary account number from the financial institution for use in authorizing payments from the payment account using the second electronic device. The primary account number is different than the account number of the credit card. The first electronic device assigns the primary account number to the second electronic device.

In accordance with some embodiments, an electronic wallet of the second electronic device includes payment account information for a second payment account associated with a user of the second electronic device, wherein the second payment account is distinct from the payment account.

In accordance with some embodiments, the first electronic device receives, from the second electronic device, an indication that the second electronic device participated in a payment transaction using the linked payment account. For example, the second electronic device transmits, using the one or more wireless communication elements of the second electronic device, payment account information of the linked payment account to a contactless payment terminal that is proximate to the second electronic device, wherein the payment account information enables the contactless payment terminal to engage in a payment transaction; In some embodiments, engaging in the payment transaction includes routing information to one or more financial institutions to verify payment credentials and/or receive authorization to complete the transaction. For example, the payment account information is transmitted to a contactless payment terminal using NFC.

FIG. 17 is a flow diagram illustrating a method for linking a payment account to one or more electronic devices, in accordance with some embodiments. Method 1700 is performed at a device (e.g., 100, 300, 500) with a display and one or more wireless communication elements (e.g., one or more wireless antennas such as NFC antennas, WiFi antennas.). Some operations in method 1700 may be combined, the order of some operations may be changed, and some operations may be omitted.

As described below, method 1700 provides an intuitive way for linking a payment account to one or more electronic devices, in accordance with some embodiments. The method reduces the cognitive burden on a user for linking a payment account to one or more electronic devices, thereby creating a more efficient human-machine interface. For battery-operated computing devices, enabling a user to select an account faster and more efficiently conserves power and increases the time between battery charges.

At block 1702, the first electronic device receiving a first request (e.g., a user input) to link a payment account associated with a payment card (e.g., a credit card) to the first electronic device.

At block 1704, in response to receiving the first request, the first electronic device initiates a process for linking the payment account to the first electronic device.

At block 1706, after successfully linking the payment account to the first electronic device (e.g., in response to linking the payment account to the first electronic device), the first electronic device concurrently displays, on the display: an indication (e.g., 1638) that the payment account has been successfully linked to the first electronic device and a selectable affordance (e.g., 1640) for linking the payment account to a second electronic device different from the first electronic device.

At block 1708, the first electronic device receives activation of the selectable affordance (e.g., 1640).

At block 1710, in response to receiving activation of the selectable affordance (e.g., 1640), the first electronic device initiates a process for linking the payment account to the second electronic device.

In accordance with some embodiments, the second electronic device is uniquely paired with the first electronic device.

In accordance with some embodiments, the first electronic device is paired with the second electronic device and the first electronic device is paired with a third electronic device, and wherein a pairing relationship between the first electronic device and the second electronic device is different than a pairing relationship between the first electronic device and the third electronic device.

In accordance with some embodiments, initiating the process for linking the payment account to the second electronic device includes (the first electronic device) transmitting, via the one or more wireless communication elements, to a financial institution associated with the payment card an indication that the second electronic device is uniquely paired with the first electronic device.

In accordance with some embodiments, after initiating linking the payment account to the second electronic device, the first electronic device receives a confirmation from the second electronic device that linking the second electronic device to the payment account was successful. A primary account number (e.g., Digital PAN, DPAN, a 16-digit account number, or other account number, which, for example, cannot be used for completing a manual transaction over a voice call—only for completing a payment electronically through the device) linked to the second electronic device for the payment account is different from a primary account number (e.g., Digital PAN, DPAN, a 16-digit account number, or other account number) linked to the first electronic device for the payment account.

In accordance with some embodiments, the first request (e.g., a user input) to link a payment account (to the first electronic device) includes an account number of the payment card (e.g., which is provided by the user through manual entry, imported from a server, or input by the user via a camera sensor of the electronic device) and wherein initiating the process for linking the payment account to the second electronic device occurs without requiring additional input (e.g., user input) of the account number of the payment card.

In accordance with some embodiments, a second request includes a security code (e.g., a numerical card security code such as CVD, CVV, CVC) of the payment card (e.g., that was input by a user).

In accordance with some embodiments, the first electronic device initiates the process for linking the payment account to the second electronic device.

In accordance with some embodiments, initiating the process linking the payment account to the second electronic device includes (the first electronic device) transmitting, via the one or more wireless communication elements, to a financial institution associated with the payment card (1) the account number of the credit card and (2) a security token confirming the payment account was previously linked to the first electronic device. In some embodiments, the security token is generated by the electronic device after linking the payment account to the first device. In some embodiments, the security token is received by the electronic device from the financial institution after linking the payment account to the first device.

In accordance with some embodiments, initiating the process for linking the payment account to the second electronic device includes: (the first electronic device) determining whether further verification is needed to link the payment account to the second electronic device; in accordance with a determination that further verification is not needed to link the payment account to the second electronic device, (the first electronic device) initiating a process for linking the payment account to the second electronic device and providing an indication (e.g., on the display) that the payment account has been linked to the second electronic device; and in accordance with a determination that further verification is needed to link the payment account to the second electronic device, (the first electronic device) providing an indication (e.g., 1642) that further verification is needed to link the payment account to the second electronic device.

In accordance with some embodiments, the indication (e.g., 1642) that further verification is needed to link the payment account to the second electronic device includes a visual indication of additional steps to be taken by a user to link the payment account to the respective device (e.g., affordance 1630 with phone number to be called; affordance 1632 with email address to be emailed).

In accordance with some embodiments, the first electronic device transmits account linking information to the second electronic device. The account linking information enables the second electronic device to link the payment account to the second electronic device.

In accordance with some embodiments, in accordance with the determination that further verification is needed to link the payment account to the second electronic device, the first electronic device displays, on the display, a plurality of communication method affordances, wherein each communication method affordance is associated with a respective communication method for a verification communication. The plurality of communication method affordances is based on communication received from the financial institution.

In accordance with some embodiments, in accordance with the determination that further verification is needed to link the payment account to the second electronic device, the first electronic device receives a selection of a communication method affordance of the plurality of communication method affordances, and in response to receiving the selection of the communication method affordance, the first electronic device transmits, to the financial institution, an indication of the respective communication method of the selected communication method affordance. The verification communication is based on the communication method affordance.

In accordance with some embodiments, the first electronic device receives a primary account number from the financial institution for use in authorizing payments from the payment account using the second electronic device. The primary account number is different than the account number of the credit card. The first electronic device assigns the primary account number to the second electronic device.

In accordance with some embodiments, an electronic wallet of the second electronic device includes payment account information for a second payment account associated with a user of the second electronic device, wherein the second payment account is distinct from the payment account.

In accordance with some embodiments, the first electronic device receives, from the second electronic device, an indication that the second electronic device participated in a payment transaction using the linked payment account. For example, the second electronic device transmits, using the one or more wireless communication elements of the second electronic device, payment account information of the linked payment account to a contactless payment terminal that is proximate to the second electronic device, wherein the payment account information enables the contactless payment terminal to engage in a payment transaction; In some embodiments, engaging in the payment transaction includes routing information to one or more financial institutions to verify payment credentials and/or receive authorization to complete the transaction. For example, the payment account information is transmitted to a contactless payment terminal using NFC.

Note that details of the processes described above with respect to method 1700 (e.g., FIG. 17) are also applicable in an analogous manner to the methods described above and below. For example, methods 700, 900, 1100, 1300, 1500, and 1900 may include one or more of the characteristics of the various methods described above with reference to method 1700. For example, the electronic wallet, payment accounts, loyalty accounts, affordances, and inputs of methods 700, 900, 1100, 1300, 1500, and 1900 optionally have one or more of the characteristics of the electronic device, payment accounts, loyalty accounts, affordances, and inputs of the electronic device described in method 1700. For brevity, these details are not repeated below.

FIGS. 18A-18C illustrate exemplary techniques and exemplary user interfaces for linking a payment account to an electronic device, in accordance with some embodiments. The technique is performed at a first electronic device with a display and one or more wireless communication elements (e.g., one or more wireless antennas such as NFC antennas, WiFi antennas.). The user interfaces in these figures are used to illustrate the processes described below, including the processes in FIG. 19.

The first electronic device displays, on the display, a payment-account user interface 1800 for a second electronic device (e.g., a smart watch) that is associated with the first electronic device (e.g., the first electronic device and the second electronic device are paired, uniquely paired, signed into the same user account, or linked in some other way that indicates that the devices share a same user that is associated with the payment accounts), wherein displaying the payment-account user interface 1800 includes concurrently displaying: a representation 1804 of a first payment account along with status information 1802 for the first payment account indicating that the first payment account is linked to the second electronic device and that the second electronic device is configured to enable payment using the first payment account; and a representation 1808 of a second payment account along with status information 1806 for the second payment account indicating that the second payment account is linked to the first electronic device but is not linked to the second electronic device.

In accordance with some embodiments, the status information (e.g., 1802) for the first payment account further indicates that the first payment account is linked to the first electronic device. In accordance with some embodiments, the status information (e.g., 1802) for the first payment account further indicates that the first payment account is not linked to the first electronic device.

In accordance with some embodiments, the payment-account user interface (e.g., 1800) includes representations (e.g., 1814) of one or more accounts that are associated with a user of the electronic device and that are not linked to the first electronic device and that are not linked to the second electronic device (e.g., cards on file with another application, such as Safari autocomplete, or an iTunes account that is linked to the user of the devices). For example, the user can activate a respective representation (e.g., 1816 or 1818) of the one or more accounts to initiate a process for linking the corresponding payment account to the first electronic device (e.g., using affordance 1818) or to the second electronic device (e.g., using affordance 1816).

In accordance with some embodiments, the payment-account user interface 1800 includes a linking affordance (e.g., 1810) associated with the second payment account. For example, the linking affordance (e.g., 1810) indicates that the user's phone (the first electronic device) is provisioned to make payments using the second payment account, while the user's watch (the second electronic device) is not provisioned to make payments using the second payment account. The first electronic device detects activation of the linking affordance (e.g. 1810). In response to detecting activation of the linking affordance (e.g., 1810), the first electronic device displays, on the display, a user interface (e.g., 1830) for linking the second payment account to the second electronic device including a synchronization option (e.g., 1838) to synchronize payment notifications between the first electronic device and the second electronic device. The first electronic device detects activation of the synchronization option (e.g., user flips the option to ON). In response to detecting activation of the synchronization option, the first electronic device synchronizes future payment notifications to be presented at both the first electronic device and the second electronic device (e.g., visual, audio, or haptic notifications).

In accordance with some embodiments, as illustrated in FIG. 18C, the first electronic device receives confirmation that the second payment account is linked to the second electronic device. In response to receiving the confirmation that the second payment account is linked to the second electronic device, the first electronic device displays, on the display, a confirmation 1840 that the second payment account is linked to the second electronic device.

In accordance with some embodiments, displaying the payment-account user interface 1800 includes concurrently displaying: a first group of a first plurality of representations of payment accounts that are linked to the second electronic device and not linked to the first electronic device; and a second group of a second plurality of representations of payment accounts that are linked to the first electronic device and not linked to the second electronic device.

In accordance with some embodiments, the payment-account user interface (e.g., 1800) includes a linking affordance (e.g., 1810) associated with the second payment account. For example, the linking affordance (e.g., 1810) indicates that the user's phone (the first electronic device) is provisioned to make payments using the payment account, while the user's watch (the second electronic device) is not provisioned to make payments using the payment account.

The first electronic device detects activation of the linking affordance (e.g., 1810). In response to detecting activation of the linking affordance (e.g., 1810), the first electronic device displays, on the display, a user interface (e.g., 1830) for linking the second payment account to the second electronic device. While displaying, on the display, the user interface for linking the second payment account to the second electronic device, the first electronic device receives a request (e.g., from the user) to initiate linking the second payment account to the second electronic device, wherein the request to initiate linking the second payment account to the second electronic device does not include an input (e.g., a user input) of an account number of the second payment account.

In accordance with some embodiments, the payment-account user interface (e.g., 1800) includes a second linking affordance (e.g., 1822) associated with the first payment account, and wherein the first payment account is not linked to the first electronic device. The first electronic device detects activation of the second linking affordance (e.g., 1822). In response to detecting activation of the second linking affordance, the first electronic device displays, on the display, a user interface for linking the first payment account to the first electronic device. While displaying, on the display, the user interface for linking the first payment account to the first electronic device, the electronic device receives a request (e.g., from the user) to initiate linking the first payment account to the first electronic device, wherein the request to initiate linking the first payment account to the first electronic device does not include an input (e.g., a user input) of an account number of the first payment account.

In accordance with some embodiments, the first electronic device is a handheld device (e.g., a smart phone) and the second electronic device is a wearable device (e.g., a smart watch).

In accordance with some embodiments, the first electronic device is a handheld device and the second electronic device a personal computing device that is larger than the first electronic device (e.g., a tablet or portable laptop computer).

In accordance with some embodiments, the payment-account user interface 1800 for the second electronic device that is associated with the first electronic device (e.g., the first electronic device and the second electronic device are paired, uniquely paired, signed into the same user account, or linked in some other way that indicates that the devices share a same user that is associated with the payment accounts) further includes: a representation of a third payment account along with status information for the third payment account indicating that the third payment account is linked to a third electronic device and that the third electronic device is configured to enable payment using the third payment account. The third electronic device is different from the first electronic device and the second electronic device (e.g., another electronic device, such as a table, that is associated with the user of the first electronic device).

FIG. 19 is a flow diagram illustrating a method for linking a payment account to an electronic device, in accordance with some embodiments. Method 1900 is performed at a device (e.g., 100, 300, 500) with a display and one or more wireless communication elements (e.g., one or more wireless antennas such as NFC antennas, WiFi antennas.). Some operations in method 1900 may be combined, the order of some operations may be changed, and some operations may be omitted.

As described below, method 1900 provides an intuitive way for linking a payment account to an electronic device. The method reduces the cognitive burden on a user for linking a payment account to an electronic device, thereby creating a more efficient human-machine interface. For battery-operated computing devices, enabling a user to linking a payment account to an electronic device faster and more efficiently conserves power and increases the time between battery charges.

At block 1902, the first electronic device displays, on the display, a payment-account user interface (e.g., 1800) for a second electronic device that is associated with the first electronic device.

At block 1904, displaying the payment-account user interface includes concurrently displaying, at block 1906, a representation (e.g., 1804) of a first payment account along with status information (e.g., 1802) for the first payment account indicating that the first payment account is linked to the second electronic device and that the second electronic device is configured to enable payment using the first payment account, and at block 1908, a representation (e.g., 1808) of a second payment account along with status information (e.g., 1806) for the second payment account indicating that the second payment account is linked to the first electronic device but is not linked to the second electronic device.

In accordance with some embodiments, the status information (e.g., 1802) for the first payment account further indicates that the first payment account is linked to the first electronic device. In accordance with some embodiments, the status information (e.g., 1802) for the first payment account further indicates that the first payment account is not linked to the first electronic device.

In accordance with some embodiments, the payment-account user interface (e.g., 1800) includes representations (e.g., 1814) of one or more accounts that are associated with a user of the electronic device and that are not linked to the first electronic device and that are not linked to the second electronic device (e.g., cards on file with another application, such as Safari autocomplete, or an iTunes account that is linked to the user of the devices).

In accordance with some embodiments, the payment-account user interface (e.g., 1800) includes a linking affordance (e.g., 1810) associated with the second payment account. For example, the linking affordance (e.g., 1810) indicates that the user's phone (the first electronic device) is provisioned to make payments using the second payment account, while the user's watch (the second electronic device) is not provisioned to make payments using the second payment account. The first electronic device detects activation of the linking affordance (e.g., 1810). In response to detecting activation of the linking affordance (e.g., 1810), the first electronic device displays, on the display, a user interface (e.g., 1830) for linking the second payment account to the second electronic device including a synchronization option (e.g., 1838) to synchronize payment notifications between the first electronic device and the second electronic device. The first electronic device detects activation of the synchronization option (e.g., user flips the option to ON). In response to detecting activation of the synchronization option, the first electronic device synchronizes future payment notifications to be presented at both the first electronic device and the second electronic device (e.g., visual, audio, or haptic notifications).

In accordance with some embodiments, the first electronic device receives confirmation that the second payment account is linked to the second electronic device. In response to receiving the confirmation that the second payment account is linked to the second electronic device, the first electronic device displays, on the display, a confirmation (e.g., 1840) that the second payment account is linked to the second electronic device.

In accordance with some embodiments, displaying the payment-account user interface (e.g., 1800) includes concurrently displaying: a first group of a first plurality of representations of payment accounts that are linked to the second electronic device and not linked to the first electronic device; and a second group of a second plurality of representations of payment accounts that are linked to the first electronic device and not linked to the second electronic device.

In accordance with some embodiments, the payment-account user interface (e.g., 1800) includes a linking affordance (e.g., 1810) associated with the second payment account. For example, the linking affordance (e.g., 1810) indicates that the user's phone (the first electronic device) is provisioned to make payments using the payment account, while the user's watch (the second electronic device) is not provisioned to make payments using the payment account. The first electronic device detects activation of the linking affordance (e.g., 1810). In response to detecting activation of the linking affordance (e.g., 1810), the first electronic device displays, on the display, a user interface (e.g., 1830) for linking the second payment account to the second electronic device. While displaying, on the display, the user interface for linking the second payment account to the second electronic device, the first electronic device receives a request (e.g., from the user) to initiate linking the second payment account to the second electronic device, wherein the request to initiate linking the second payment account to the second electronic device does not include an input (e.g., a user input) of an account number of the second payment account.

In accordance with some embodiments, the payment-account user interface (e.g., 1800) includes a second linking affordance (e.g., 1822) associated with the first payment account, and wherein the first payment account is not linked to the first electronic device. The first electronic device detects activation of the second linking affordance (e.g., 1822). In response to detecting activation of the second linking affordance, the first electronic device displays, on the display, a user interface for linking the first payment account to the first electronic device. While displaying, on the display, the user interface for linking the first payment account to the first electronic device, the electronic device receives a request (e.g., from the user) to initiate linking the first payment account to the first electronic device, wherein the request to initiate linking the first payment account to the first electronic device does not include an input (e.g., a user input) of an account number of the first payment account.

In accordance with some embodiments, the first electronic device is a handheld device (e.g., a smart phone) and the second electronic device is a wearable device (e.g., a smart watch).

In accordance with some embodiments, the first electronic device is a handheld device and the second electronic device a personal computing device that is larger than the first electronic device (e.g., a tablet or portable laptop computer).

In accordance with some embodiments, the payment-account user interface (e.g., 1800) for the second electronic device that is associated with the first electronic device (e.g., the first electronic device and the second electronic device are paired, uniquely paired, signed into the same user account, or linked in some other way that indicates that the devices share a same user that is associated with the payment accounts) further includes: a representation of a third payment account along with status information for the third payment account indicating that the third payment account is linked to a third electronic device and that the third electronic device is configured to enable payment using the third payment account. The third electronic device is different from the first electronic device and the second electronic device (e.g., another electronic device, such as a table, that is associated with the user of the first electronic device).

Note that details of the processes described above with respect to method 1900 (e.g., FIG. 19) are also applicable in an analogous manner to the methods described above and below. For example, methods 700, 900, 1100, 1300, 1500, and 1700 may include one or more of the characteristics of the various methods described above with reference to method 1900. For example, the electronic wallet, payment accounts, loyalty accounts, affordances, and inputs of methods 700, 900, 1100, 1300, 1500, and 1700 optionally have one or more of the characteristics of the electronic device, payment accounts, loyalty accounts, affordances, and inputs of the electronic device described in method 1900. For brevity, these details are not repeated below.

Figure 20:
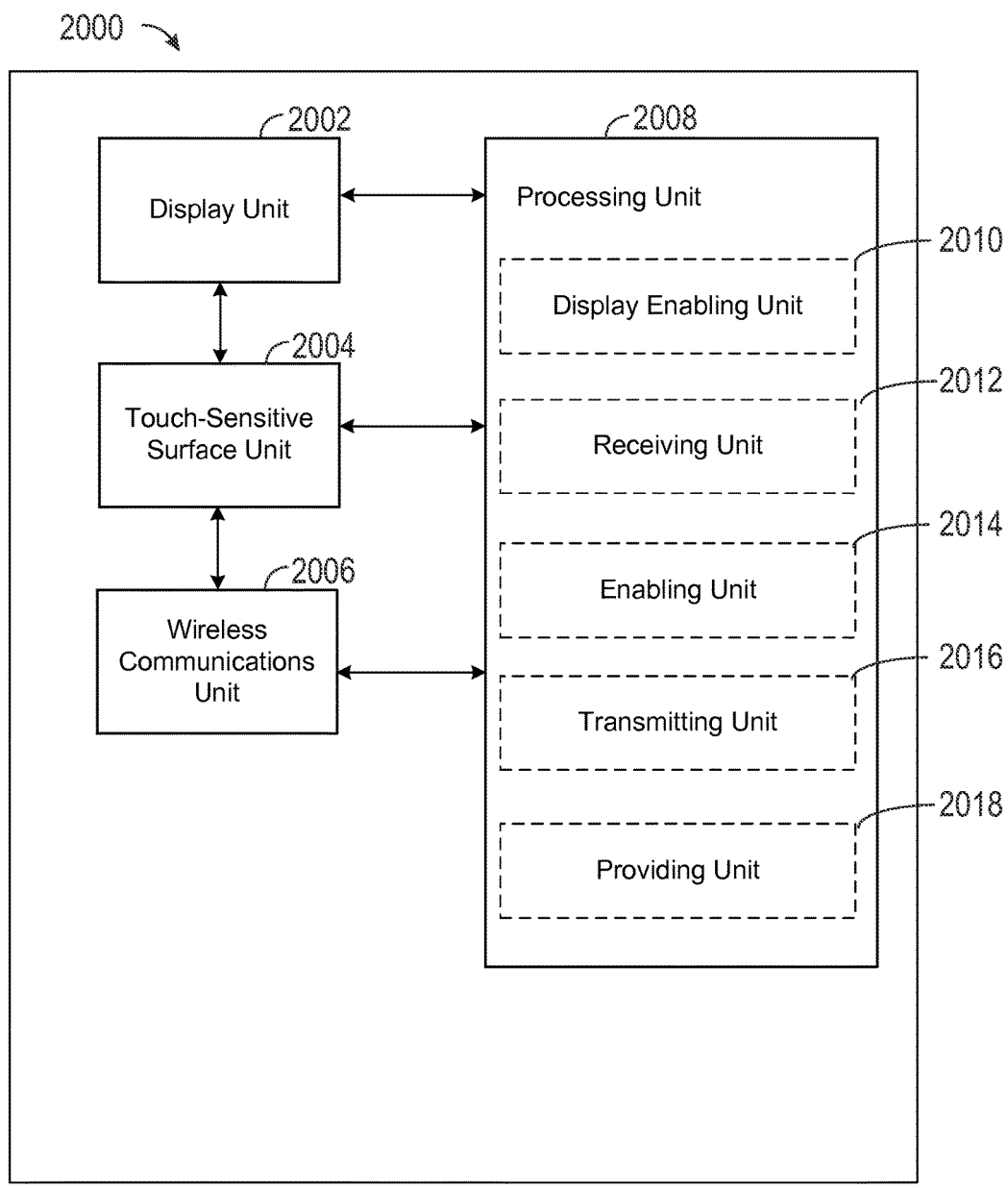
FIGS. 20-26 illustrate functional block diagrams in accordance with some embodiments.

In accordance with some embodiments, FIG. 20 shows an exemplary functional block diagram of an electronic device 2000 configured in accordance with the principles of the various described embodiments. In accordance with some embodiments, the functional blocks of electronic device 2000 are configured to perform the techniques described above. The functional blocks of the device 2000 are, optionally, implemented by hardware, software, or a combination of hardware and software to carry out the principles of the various described examples. It is understood by persons of skill in the art that the functional blocks described in FIG. 20 are, optionally, combined or separated into sub-blocks to implement the principles of the various described examples. Therefore, the description herein optionally supports any possible combination or separation or further definition of the functional blocks described herein.

As shown in FIG. 20, an electronic device 2000 includes: a display unit 2002, a touch-sensitive surface unit 2004, one or more wireless communication units 2006 including one or more wireless communication elements, and a processing unit 2008 coupled to the display unit 2002, the touch-sensitive surface unit 2004, and the one or more wireless communication unit 2006.

The processing unit 2008 is configured to: receive (e.g., with receiving unit 2012) an input requesting to enable the device for a payment transaction; in response to receiving the input requesting to enable the device for a payment transaction: enable display (e.g. with display enabling unit 2010), on the display unit 2002, of a first visual indicator identifying a first account; and enable (e.g., with enabling unit 2014) the electronic device to participate in a transaction using the first account via the one or more wireless communication units 2006; receive (e.g., with receiving unit 2012) one or more swipe inputs in a first direction via the touch-sensitive surface unit 2004; in response to receiving the one or more user swipe inputs: enable display (e.g. with display enabling unit 2010), on the display unit 2002, of a second visual indicator identifying a second account; and enable (e.g., with enabling unit 2014) the electronic device to participate in a transaction using the second account via the one or more wireless communication units 2006; and wherein the first visual indicator is different from the second visual indicator.

In some embodiments, the first account is a payment account and the second account is a loyalty account.

In some embodiments, the first account is a payment account and the second account is a payment account.

In some embodiments, the processing unit 2008 is further configured to: while displaying the second visual indicator: receive (e.g., with receiving unit 2012) a card code display input; and in response to receiving the card code display input, enable display (e.g. with display enabling unit 2010), on the display unit 2002, of visual loyalty card code information.

In some embodiments, the processing unit 2008 is further configured to: while displaying the second visual indicator: receive (e.g., with receiving unit 2012) a request for account information from a contactless payment terminal; and in response to receiving the request for account information, transmit (e.g., with transmitting unit 2016), via the one or more wireless communication units 2006, account information for the second account to the contactless payment terminal, wherein the account information enables the contactless payment terminal to engage in the payment transaction.

In some embodiments, the processing unit 2008 is further configured to: while displaying the second visual indicator and after transmitting account information for the second account to the contactless payment terminal: receive (e.g., with receiving unit 2012), via the one or more wireless communication units 2006, a failure communication from the contactless payment terminal; and in response to receiving the failure communication: enable display (e.g. with display enabling unit 2010), on the display unit 2002, of an indication that the second account was not accepted; and provide an option to enable the electronic device to participate in the transaction using an account different from the second account.

In some embodiments, the processing unit 2008 is further configured to: subsequent to transmitting account information for the second account to the contactless payment terminal, enable concurrent display (e.g., with display enabling unit 2010), on the display unit 2002, of an indication that the first account and the second account were both used during the payment transaction.

In some embodiments, enabling the electronic device to participate in the transaction using the second account via the one or more wireless communication units 2006 does not require receiving a second user input requesting to enable the device for a payment transaction.

In some embodiments, enabling the electronic device to participate in the transaction using the first account includes displaying a first animation of a ready indicator appearing from under an image of a card of the first account, wherein the ready indicator indicates that the device is enabled to participate in payment transactions using the first account. The processing unit 2008 is further configured to: in response to receiving a portion of the one or more user swipe inputs, enable display (e.g. with display enabling unit 2010), on the display unit 2002, of a second animation of the ready indicator to slide the ready indicator back under the image of the card of the first account.

In some embodiments, enabling display, on the display unit 2002, of the first visual indicator identifying the first account occurs prior to enabling the electronic device to participate in the transaction using the first account via the one or more wireless communication units 2006; and enabling display, on the display unit 2002, of the second visual indicator identifying the second account occurs prior to enabling the electronic device to participate in the transaction using the second account via the one or more wireless communication units 2006.

In some embodiments, one of the first account and the second account is a payment account and one of the first account and the second account is a loyalty account; and the first visual indicator of the first account has a first dimension characteristic; and the second visual indicator of the second account has a second dimension characteristic different from the first dimension characteristic.

In some embodiments, an electronic wallet of the electronic device includes payment account information for a plurality of payment accounts associated with a user of the electronic device.

The operations described above with reference to FIG. 7 are, optionally, implemented by components depicted in FIGS. 1A-1B, FIG. 5B, or FIG. 20. For example, receiving operation 702, displaying operation 706, and enabling operation 708 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

Figure 21:
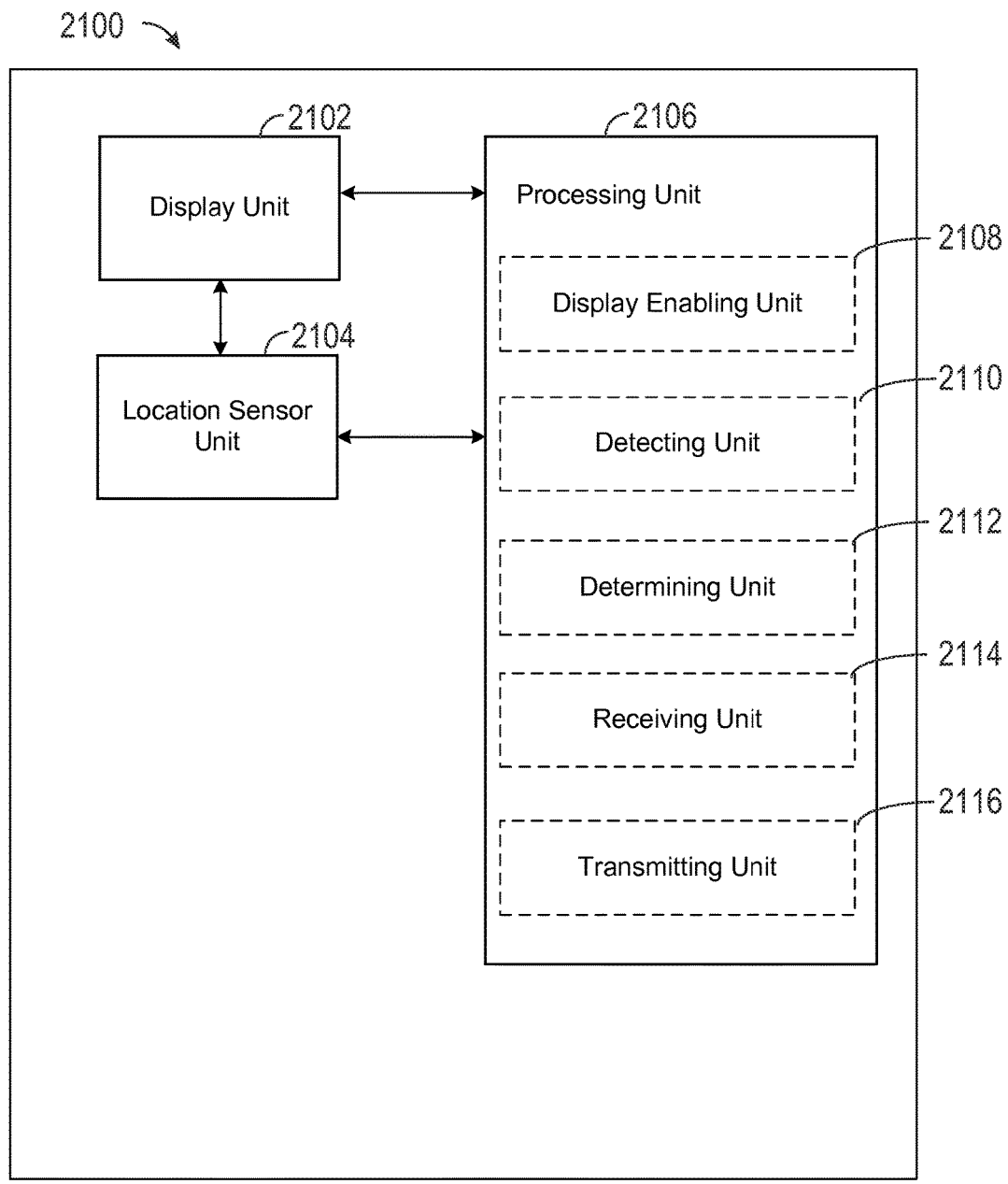

In accordance with some embodiments, FIG. 21 shows an exemplary functional block diagram of an electronic device 2100 configured in accordance with the principles of the various described embodiments. In accordance with some embodiments, the functional blocks of electronic device 2100 are configured to perform the techniques described above. The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

As shown in FIG. 21, an electronic device 2100 includes: a display unit 2102, a location sensor unit 2104, and a processing unit 2106 coupled to the display unit 2102 and a location sensor unit 2104.

The processing unit 2106 is configured to: detect (e.g., with detecting unit 2110), using the location sensor unit 2104, a current location; determine (e.g., with determining unit 2112) whether the current location is associated with a first account; in accordance with a failure to determine that the current location is associated with an account other than a default payment account, enable display (e.g., with display enabling unit 2108), on the display unit 2102, of a visual indication of a default payment account; in accordance with a determination that the current location is associated with the first account, enable concurrent display (e.g., with display enabling unit 2108), on the display unit 2102, of the visual indication of the default payment account and a visual indication of the first account; and wherein the default payment account and the first account are linked to the electronic device and the default payment account and the first account are different.

In some embodiments, the first account is a payment account. In some embodiments, the first account is a loyalty account.

In some embodiments, the processing unit 2106 is further configure to: receive (e.g., with receiving unit 2114) a request associated with a payment transaction from a contactless payment terminal; determine (e.g., with determining unit 2112) whether the request includes a request for payment account information using a first account type corresponding to the first account; and in accordance with the determination that the current location is associated with the first account and in accordance with a determination that the request includes a request for payment information using the first account type, transmit (e.g., with transmitting unit 2116), using one or more wireless communication elements, payment account information of the first account to the contactless payment terminal, wherein the payment account information of the first account enables the contactless payment terminal to engage in the payment transaction.

In some embodiments, the processing unit 2106 is further configure to: receive (e.g., with receiving unit 2114) a request associated with a payment transaction from a contactless payment terminal; determine (e.g., with determining unit 2112) that the request includes a request for payment account information using a first account type corresponding to the first account; and in accordance with the failure to determine that the current location is associated with an account other than the default payment account, transmit (e.g., with transmitting unit 2116), using one or more wireless communication elements, payment account information of the default payment account to the contactless payment terminal, wherein the payment account information of the default payment account enables the contactless payment terminal to engage in the payment transaction.

In some embodiments, the visual indication of the first account is displayed on the visual indication of the default account, and wherein the visual indication of the first account indicates that the first account is enabled to be selected by the device for use in a payment transaction without requiring additional user input.

In some embodiments, the processing unit 2106 is further configure to: prior to detecting, using the location sensor unit 2104, the current location, receive (e.g., with receiving unit 2114) an input requesting to enable the device for a payment transaction.

In some embodiments, detecting, using the location sensor unit 2104, the current location is in response to receiving the input requesting to enable the device for a payment transaction.

In some embodiments, determining whether the current location is associated with the first account is in response to receiving an input requesting to enable the device for a payment transaction.

In some embodiments, a failure to determine that the current location is associated with an account other than a default payment account occurs when the device fails to determine that the current location is associated with a first account before the electronic device is enabled to participate in a transaction using the default payment account via one or more wireless communication elements.

In some embodiments, the processing unit 2106 is further configure to: receive (e.g., with receiving unit 2114) a request for loyalty account information from a contactless payment terminal, wherein the first account is a loyalty account; and in response to receiving the request for loyalty account information, in accordance with the failure to determine that the current location is associated with an account other than the default payment account and in accordance with a subsequent determination that the current location is associated with the first account: transmit (e.g., with transmitting unit 2116), via one or more wireless communication elements, account information for the first account to the contactless payment terminal; and transmit (e.g., with transmitting unit 2116), via the one or more wireless communication elements, payment account information of the default payment account to the contactless payment terminal.

In some embodiments, the processing unit 2106 is further configure to: receive (e.g., with receiving unit 2114) a request associated with a payment transaction from a contactless payment terminal; determine (e.g., with determining unit 2112) that the request includes a request for payment account information using a first account type corresponding to the first account, wherein the first account is a payment account that is different from the default payment account; in response to receiving the request for account information in accordance with the failure to determine that the current location is associated with an account other than the default payment account and in accordance with a subsequent determination that the current location is associated with the first account: forgo transmitting (e.g., with transmitting unit 2116), via one or more wireless communication elements, account information for the first account to the contactless payment terminal; and transmit (e.g., with transmitting unit 2116), via the one or more wireless communication elements, payment account information of the default payment account to the contactless payment terminal.

In some embodiments, the processing unit 2106 is further configure to: receive (e.g., with receiving unit 2114) a request associated with a payment transaction from a contactless payment terminal, wherein: prior to receiving the request associated with the payment transaction from the contactless payment terminal, the visual indication of the default payment account and the visual indication of the first account were concurrently displayed, on the display unit 2102; wherein the request includes a request for payment account information using a first account type corresponding to the first account; and wherein the first account is a payment account of the first account type; and in response to receiving the request for account information and in accordance with the failure to determine that the current location is associated with an account other than the default payment account and in accordance with a subsequent determination that the current location is associated with the first account: forgo transmitting (e.g., with transmitting unit 2116), via one or more wireless communication elements, account information for the default payment account to the contactless payment terminal; and transmit (e.g., with transmitting unit 2116), via the one or more wireless communication elements, payment account information of the first account to the contactless payment terminal.

In some embodiments, the processing unit 2106 is further configure to: in accordance with the determination that the current location is associated with the first account: receive (e.g., with receiving unit 2114), via the one or more wireless communication elements, a failure communication from the contactless payment terminal; and in response to receiving the failure communication: transmit (e.g., with transmitting unit 2116), via one or more wireless communication elements, account information for the default payment account to the contactless payment terminal.

In some embodiments, enabling concurrent display, on the display unit 2102, of the visual indication of the default payment account and a visual indication of the first account includes enabling concurrent display, on the display unit 2102, of the visual indication of the default payment account in a stack with the visual indication of the first account.

The operations described above with reference to FIG. 9 are, optionally, implemented by components depicted in FIGS. 1A-1B, FIG. 5B, or FIG. 21. For example, detecting operation 902, determining operation 904, and displaying operation 906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

Figure 22:
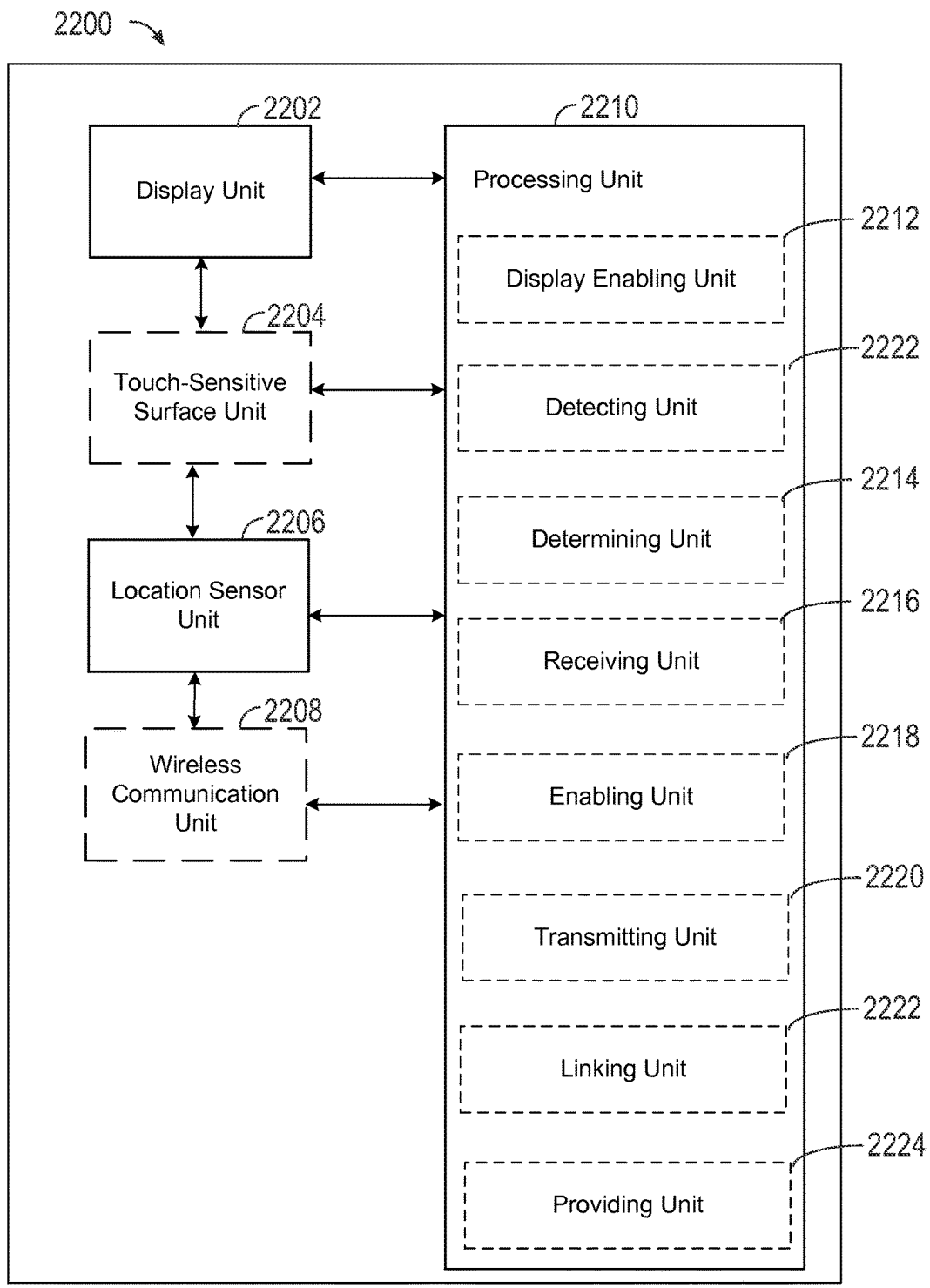

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes: a display unit 2202, and, optionally, a touch-sensitive surface unit 2204, a location sensor unit 2206, and one or more wireless communication unit 2208. The electronic device 2200 also includes a processing unit 2210 coupled to the display unit 2202, and, optionally, to the touch-sensitive surface unit 2204, the location sensor unit 2206, and the one or more wireless communication unit 2208.

The processing unit 2210 is configured to: receive (e.g., with receiving unit 2216) an input requesting to enable the device for a payment transaction; and in response to receiving the input: detect (e.g., with detecting unit 2222), using the location sensor unit 2206, a current location; determine (e.g., with determining unit 2214) whether a set of one or more payment criteria have been met, wherein the set of one or more payment criteria includes a criterion that is met when the current location is associated with a first payment account; in accordance with a determination that the set of one or more payment criteria is not met, enable display (e.g., with display enabling unit 2212), on the display unit 2202, of a visual indication of a default payment account, wherein the default payment account is different from the first payment account; and in accordance with a determination that the set of one or more payment criteria is met, enable display (e.g., with display enabling unit 2212), on the display unit 2202, of a visual indication of the first payment account.

In some embodiments, the processing unit 2210 is further configured to: in accordance with the determination that the set of one or more payment criteria is met, enable (e.g., with enabling unit 2218) the electronic device to participate in a transaction using the first payment account via the one or more wireless communication unit 2208.

In some embodiments, the processing unit 2210 is further configured to: in accordance with the determination that the set of one or more payment criteria is not met, enable the electronic device to participate in a transaction using the default payment account via the one or more wireless communication unit 2208.

In some embodiments, the processing unit 2210 is further configured to: in accordance with the determination that the set of one or more payment criteria is not met, forgo enabling display (e.g., with display enabling unit 2212), on the display unit 2202, of the visual indication of the first payment account.

In some embodiments, the processing unit 2210 is further configured to: receive (e.g., with receiving unit 2216) one or more inputs in a first direction; in response to receiving the one or more inputs: enable display (e.g., with display enabling unit 2212), on the display unit 2202, of a second visual indicator identifying a second account different from the first payment account and the default payment account; and enable (e.g., with enabling unit 2218) the electronic device to participate in a transaction using the second account via the one or more wireless communication elements.

In some embodiments, the processing unit 2210 is further configured to: receive a request for account information from a contactless payment terminal; and in response to receiving a request for account information, transmit (e.g., with transmitting unit 2220), via the one or more wireless communication units 2208, account information for a respective enabled account to the contactless payment terminal, wherein the account information enables the contactless payment terminal to engage in the payment transaction.

In some embodiments, the set of one or more criteria includes a criterion that is met when the device is authorized to use the first payment account for transactions at the current location.

In some embodiments, the processing unit 2210 is further configured to: determine (e.g., with determining unit 2214) that the current location is associated with a loyalty account; and enable concurrent display (e.g., with display enabling unit 2212), on the display unit 2202, of a visual indication of the loyalty account along with a respective visual indication of a payment account.

In some embodiments, the processing unit 2210 is further configured to: prior to receiving the user input requesting to enable the device for a payment transaction: receive (e.g., with receiving unit 2216) a request to link a payment account with the electronic device, the request comprising account information of the payment account; link (e.g., with linking unit 2222) the payment account with the electronic device; determine (e.g., with determining unit 2214) that a financial institution associated with the payment account has authorized the payment account for selection based on location without requiring user input; and receive (e.g., with receiving unit 2216) user input activating the payment account for selection based on location without requiring user input.

In some embodiments, the processing unit 2210 is further configured to: in accordance with the determination that the set of one or more payment criteria is met, enable (e.g., with enabling unit 2218) the electronic device to participate in a transaction using the first payment account via the one or more wireless communication elements; receive (e.g., with receiving unit 2216) a request associated with a payment transaction from a contactless payment terminal; determine (e.g., with determining unit 2214) whether the request includes a request for payment account information using an account type corresponding to a second payment account different from the first payment account; and in accordance with a determination that the request includes a request for payment information using the second account type, provide (e.g., with providing unit 2224) a notification requesting authorization to transmit, using one or more wireless communication elements, payment account information of the second account to the contactless payment terminal, wherein the payment account information of the second account enables the contactless payment terminal to engage in the payment transaction.

The operations described above with reference to FIG. 11 are, optionally, implemented by components depicted in FIGS. 1A-1B, FIG. 5B, or FIG. 22. For example, receiving operation 1102, detecting operation 1106, and determining operation 1108 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

Figure 23:
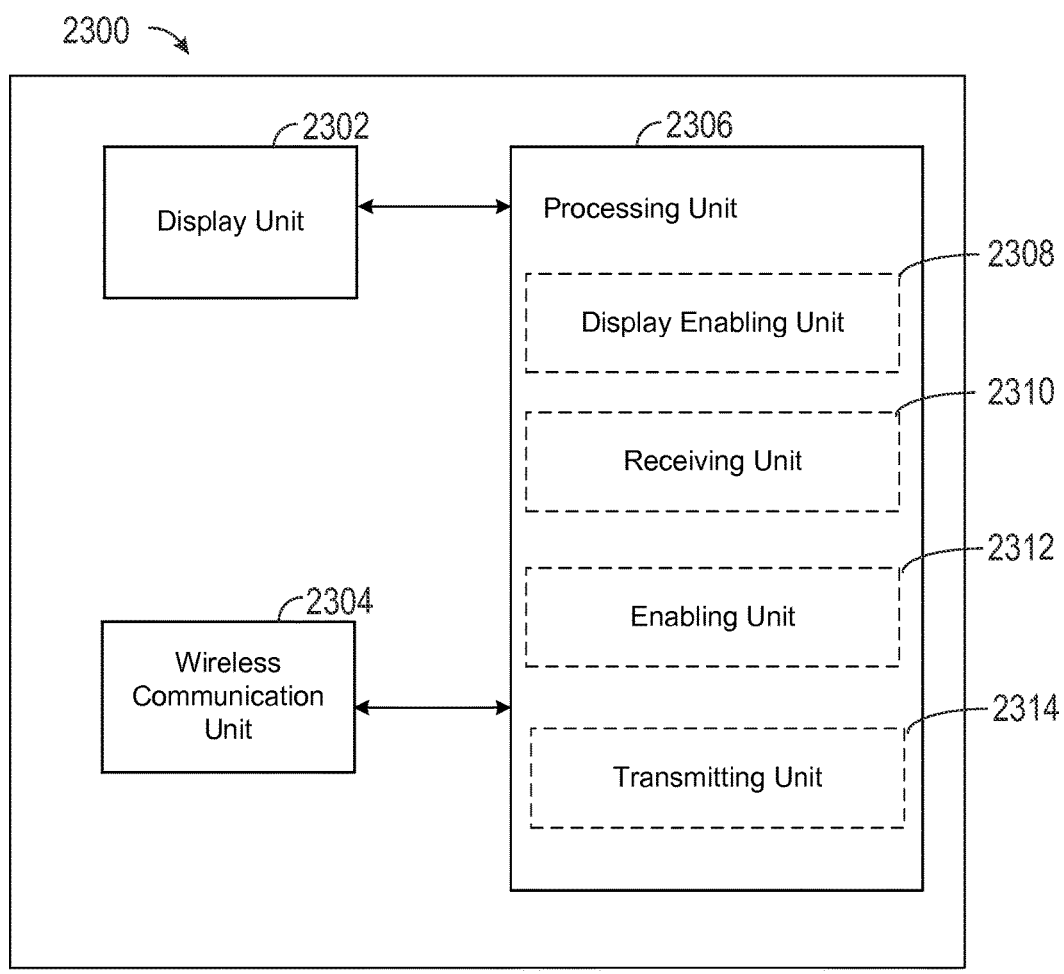

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes: a display unit 2302, one or more wireless communication unit 2304, and a processing unit 2306 coupled to the display unit 2302 and to the one or more wireless communication unit 2304.

The processing unit 2306 is configured to: receive (e.g., with receiving unit 2310) an input requesting to enable the device for a payment transaction; in response to receiving the input, enable display (e.g., with display enabling unit 2308), on the display unit 2302, of a payment indication that represents a plurality of payment accounts including a first payment account and a second payment account; receive (e.g., with receiving unit 2310), via the one or more wireless communication unit 2304, a request for account information corresponding to a payment transaction; in response to receiving the request for account information corresponding to the payment transaction: in accordance with a determination that payment criteria for a first payment account have been met, transmit (e.g., with transmitting unit 2314), via the one or more wireless communication unit 2304, account information for the first payment account without transmitting account information for the second payment account; and in accordance with a determination that payment criteria for the second payment account have been met, transmit (e.g., with transmitting unit 2314), via the one or more wireless communication unit 2304, account information for the second payment account without transmitting account information for the first payment account.

In some embodiments, the electronic device is configured to enable payment using one of a default payment account and a plurality of non-default payment accounts. The processing unit 2306 is further configured to: in accordance with a determination that payment criteria have not been met for any of the non-default payment accounts, transmit (e.g., with transmitting unit 1214), via the one or more wireless communication unit 2304, account information for the default payment account without transmitting account information for the non-default payment accounts.

In some embodiments, the payment criteria include a criterion based on a determination associated with a current location of the electronic device. In some embodiments, the payment criteria include a criterion based on the request for account information corresponding to the payment transaction.

In some embodiments, the payment indication that represents the plurality of payment accounts does not include an indication of the first payment account and does not include an indication of the second payment account.

In some embodiments, the plurality of payment accounts only include payment accounts for which the electronic device has received user input activating selection based on location without requiring user input.

In some embodiments, the plurality of payment accounts only include payment accounts for which a financial institution associated with the payment account has authorized the respective payment account for selection based on location without requiring user input.

In some embodiments, a contextual-selection mode of operation in which the device selects, based on context, which of the plurality of payment accounts to use for a payment transaction is represented as a selectable payment option.

In some embodiments, the electronic device optionally includes a touch-sensitive surface unit. The processing unit 2306 is further configured to: receive (e.g., with receiving unit 2310) one or more inputs in a first direction; in response to receiving the one or more inputs: enable replacement of the display (e.g., with display enabling unit 2308), on the display unit 2302, of the payment indication that represents the plurality of payment accounts with a second visual indicator different from the payment indication that represents the plurality of payment accounts, wherein the second visual selection indicator identifies a third payment account different from the first payment account and the second payment account; and enable (e.g., with enabling unit 2312) the electronic device to participate in a transaction using the third payment account via the one or more wireless communication elements.

In some embodiments, the payment indication that represents the plurality of payment accounts is different from the visual indicators of individual payment accounts of the plurality of payment accounts.

The operations described above with reference to FIG. 13 are, optionally, implemented by components depicted in FIGS. 1A-1B, FIG. 5B, or FIG. 23. For example, receiving operation 1302, displaying operation 1306, and receiving operation 1308 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

Figure 24:
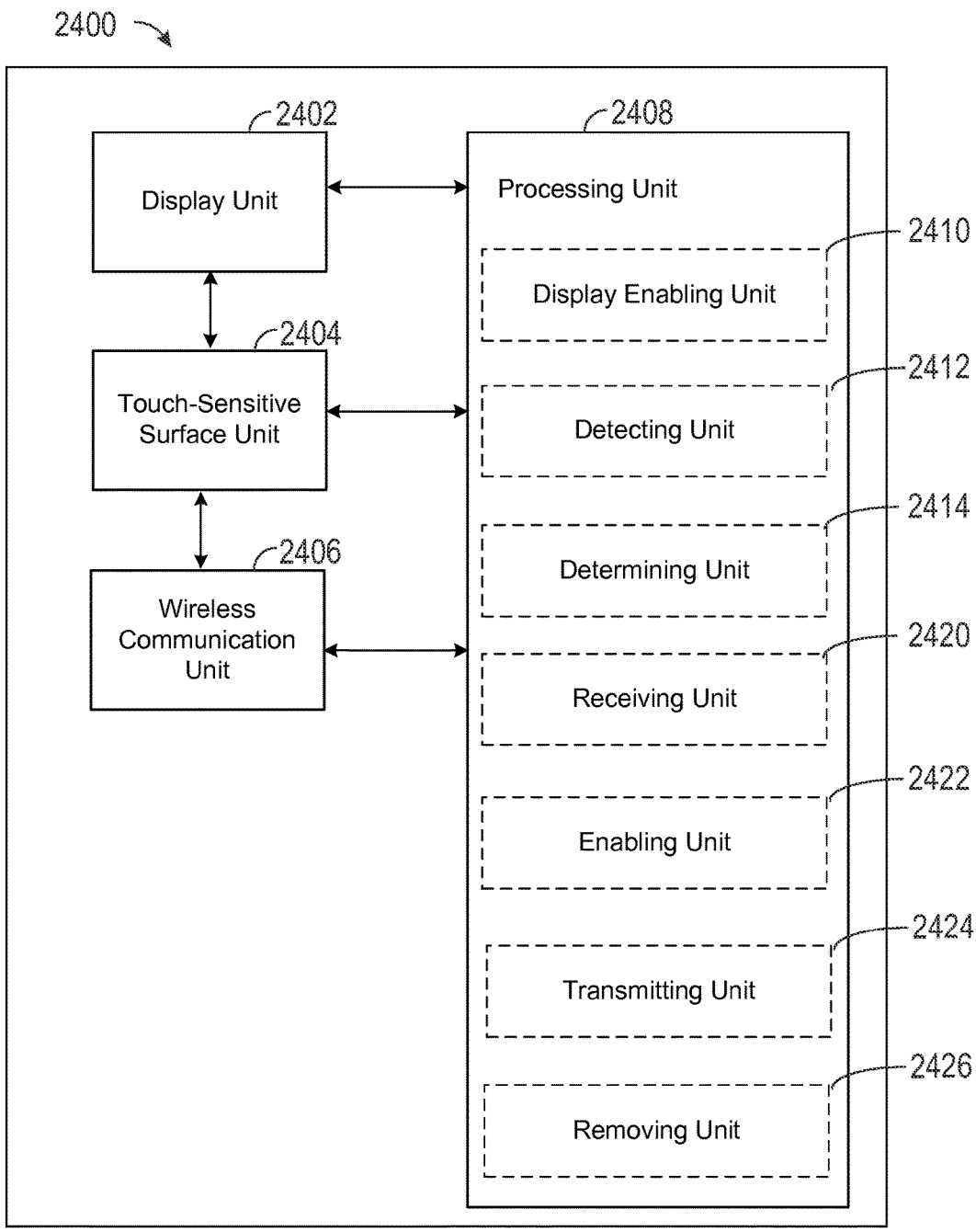

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes: a display unit 2402, a touch-sensitive surface unit 2404, one or more wireless communication unit 2406, and a processing unit 2408 coupled to the display unit 2402, the touch-sensitive surface unit 2404 configured to detect intensity of contacts, and the one or more wireless communication unit 2406.

The processing unit 2408 is configured to: receive (e.g., with receiving unit 2420) a first input; in response to receiving the first input: enable display (e.g., with display enabling unit 2410), on the display unit 2402, of a first user interface, wherein the first user interface includes: a first visual indicator identifying a payment card associated with multiple payment accounts, and a second visual indicator identifying a first payment account of the multiple payment accounts of the payment card; enable (e.g., with enabling unit 2422) the electronic device to use the first payment account to engage in a payment transaction via the one or more wireless communication elements; detect (e.g., with detecting unit 2412) a first contact on the touch-sensitive surface unit; determine (e.g., with determining unit 2414) whether a characteristic intensity of the first contact is above an intensity threshold; and in accordance with a determination that the characteristic intensity of the first contact is above the intensity threshold, enable display (e.g., with display enabling unit 2410), on the display unit 2402, of a second user interface, wherein the second user interface enables selection between different payment accounts represented by the first visual indicator.

In some embodiments, the second user interface includes a payment account selection affordance, and the processing unit 2408 is further configured to: detect (e.g., with detecting unit 1412) a second contact at a location on the touch-sensitive surface unit corresponding to the payment account selection affordance; and in response to detecting the second contact, enable display (e.g., with display enabling unit 2410), on the display unit 2402, of a third user interface, wherein the third user interface includes one or more account affordances corresponding to at least some of the multiple payment accounts; detect (e.g., with detecting unit 2412) a third contact at a location on the touch-sensitive surface unit associated with an account affordance of the one or more account affordances, wherein the account affordance corresponds to a second payment account of the multiple payment accounts and the second payment account is different from the first payment account; and in response to detecting the third contact: enable display (e.g., with display enabling unit 2410), on the display unit 2402, of a fourth user interface, wherein the fourth user interface includes: the first visual indicator identifying the payment card associated with multiple payment accounts, and a third visual indicator identifying the second payment account of the multiple payment accounts of the payment card; enable (e.g., with enabling unit 2422) the electronic device to use the second payment account to engage in a payment transaction via the one or more wireless communication elements.

In some embodiments, the second user interface includes one or more account affordances corresponding to at least some of the multiple payment accounts, and the processing unit 2408 is further configured to: detect (e.g., with detecting unit 2412) a second contact at a location on the touch-sensitive surface unit associated with an account affordance of the one or more account affordances, wherein the account affordance corresponds to a second payment account of the multiple payment accounts and the second payment account is different from the first payment account; and in response to detecting the second contact: enable display (e.g., with display enabling unit 2410), on the display unit 2402, of a fourth user interface, wherein the fourth user interface includes: the first visual indicator identifying the payment card associated with multiple payment accounts, and a third visual indicator identifying the second payment account of the multiple payment accounts of the payment card; and enable (e.g., with enabling unit 2422) the electronic device to use the second payment account to engage in a payment transaction via the one or more wireless communication elements.

In some embodiments, the processing unit 2408 is further configured to: in accordance with a determination that the characteristic intensity of the first contact is below the intensity threshold, maintain enablement of the display (e.g., using display enabling unit 2410) of the first visual indicator without enabling display (e.g., using display enabling unit 2410), on the display unit 2402, of the second user interface.

In some embodiments, the one or more account affordances include a plurality of account affordances. In some embodiments, a visual indicator of a currently selected payment account is highlighted. In some embodiments, detecting the second contact includes determining that a characteristic intensity of the second contact is not above an intensity threshold.

In some embodiments, the second user interface includes a payment account deletion affordance, the processing unit 2408 is further configured to: detect (e.g., with detecting unit 2412) activation of the payment account deletion affordance; and in response to detecting activation of the payment account deletion affordance, remove (e.g., with removing unit) the multiple payment accounts of the payment card from an electronic wallet of the device.

In some embodiments, the payment account deletion affordance includes one or more visual characteristics differentiating the payment account deletion affordance from the payment account selection affordance.

In some embodiments, the processing unit 2408 is further configured to: while displaying, on the display unit, the fourth user interface: detect (e.g., with detecting unit 2412) a swipe input on the touch-sensitive surface unit 2404; and in response to detecting the swipe input, enable display (e.g., with display enabling unit 2410), on the display unit 2402, of a fifth user interface, wherein the fifth user interface includes a fourth visual indicator identifying a second payment card different from the payment card.

In some embodiments, the first user interface, the second user interface, the third user interface, and the fourth user interface are user interfaces of a single electronic wallet application, the single electronic wallet application including a plurality of payment accounts associated with a user of the electronic device.

In some embodiments, the processing unit 2408 is further configured to: receive (e.g., with receiving unit 2420) a request for account information from a contactless payment terminal; and in response to receiving the request for account information, transmit (e.g., with transmitting unit 2424), via the one or more wireless communication unit 2406, account information for the second payment account to the contactless payment terminal, wherein the account information enables the contactless payment terminal to engage in a payment transaction.

The operations described above with reference to FIG. 15 are, optionally, implemented by components depicted in FIGS. 1A-1B, FIG. 5B, or FIG. 24. For example, receiving operation 1502, displaying operation 1506, and enabling operation 1508 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

Figure 25:
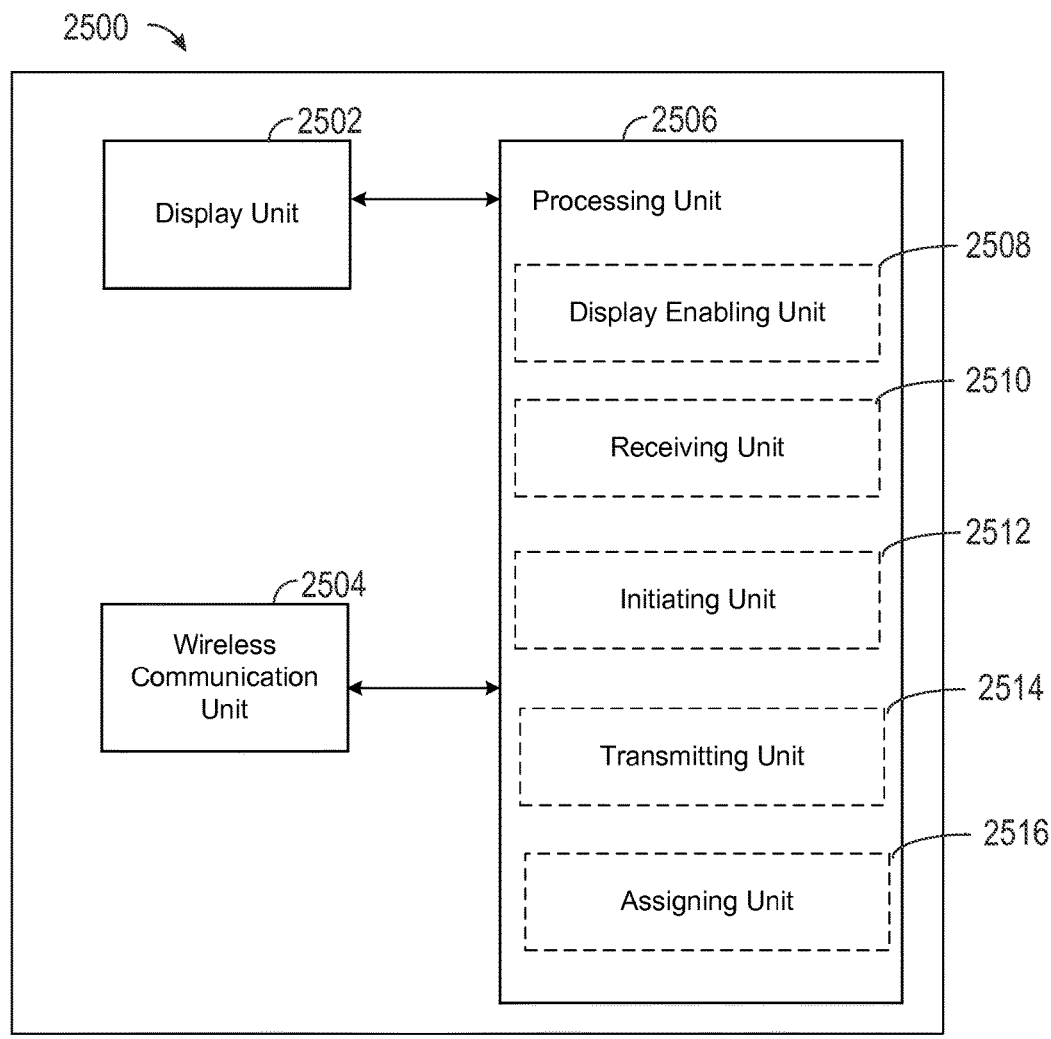

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, a first electronic device 2500 includes: a display unit 2502, one or more wireless communication unit 2504, and a processing unit 2506 coupled to the display unit 2502 and the one or more wireless communication unit 2504.

The processing unit 2506 is configured to: receive (e.g., with receiving unit 2510) a first request to link a payment account associated with a payment card to the first electronic device; in response to receiving the first request, initiate (e.g., with initiating unit 2512) a process for linking the payment account to the first electronic device; after successfully linking the payment account to the first electronic device, enable concurrent display (e.g., with display enabling unit 2508), on the display unit 2502, of: an indication that the payment account has been successfully linked to the first electronic device; and a selectable affordance for linking the payment account to a second electronic device different from the first electronic device; and receive (e.g., with receiving unit 2510) activation of the selectable affordance; and in response to receiving activation of the selectable affordance, initiate (e.g., with initiating unit 2512) a process for linking the payment account to the second electronic device.

In some embodiments, the second electronic device is uniquely paired with the first electronic device.

In some embodiments, the first electronic device is paired with the second electronic device and the first electronic device is paired with a third electronic device, and wherein a pairing relationship between the first electronic device and the second electronic device is different than a pairing relationship between the first electronic device and the third electronic device.

In some embodiments, initiating (e.g., with initiating unit 2512) the process for linking the payment account to the second electronic device includes: transmitting (e.g., with transmitting unit 2514), via the one or more wireless communication elements, to a financial institution associated with the payment card an indication that the second electronic device is uniquely paired with the first electronic device.

In some embodiments, the processing unit 2506 is further configured to: after initiating linking the payment account to the second electronic device, receive (e.g., with receiving unit 2510) a confirmation from the second electronic device that linking the second electronic device to the payment account was successful; and wherein a primary account number linked to the second electronic device for the payment account is different from a primary account number linked to the first electronic device for the payment account.

In some embodiments, the first request to link a payment account includes an account number of the payment card and wherein initiating the process for linking the payment account to the second electronic device occurs without requiring additional input of the account number of the payment card.

In some embodiments, a second request includes a security code of the payment card.

In some embodiments, the processing unit 2506 is further configured to: initiate (e.g., with initiating unit 2512) the process for linking the payment account to the second electronic device.

In some embodiments, to initiate (e.g., with initiating process 2512) a process linking the payment account to the second electronic device, the processing unit 2506 is further configured to: transmit (e.g., with transmitting unit 2514), via the one or more wireless communication unit 2504, to a financial institution associated with the payment card: the account number of the credit card; and a security token confirming the payment account was previously linked to the first electronic device.

In some embodiments, initiating the process for linking the payment account to the second electronic device includes: determining whether further verification is needed to link the payment account to the second electronic device; in accordance with a determination that further verification is not needed to link the payment account to the second electronic device, initiating a process for linking the payment account to the second electronic device and providing an indication that the payment account has been linked to the second electronic device; and in accordance with a determination that further verification is needed to link the payment account to the second electronic device, providing an indication that further verification is needed to link the payment account to the second electronic device.

In some embodiments, the indication that further verification is needed to link the payment account to the second electronic device includes a visual indication of additional steps to be taken by a user to link the payment account to the respective device.

In some embodiments, the processing unit 2506 is further configured to: transmit (e.g., with transmitting unit 2514) account linking information to the second electronic device, wherein the account linking information enables the second electronic device to link the payment account to the second electronic device.

In some embodiments, the processing unit 2506 is further configured to: in accordance with the determination that further verification is needed to link the payment account to the respective device: enable display (e.g., with display enabling unit 2508), on the display unit 2502, of a plurality of communication method affordances, wherein each communication method affordance is associated with a respective communication method for a verification communication; and wherein the plurality of communication method affordances is based on communication received from the financial institution.

In some embodiments, the processing unit 2506 is further configured to: in accordance with the determination that further verification is needed to link the payment account to the second electronic device: receive (e.g., with receiving unit 2510) a selection of a communication method affordance of the plurality of communication method affordances; in response to receiving the selection of the communication method affordance, transmit (e.g., with transmitting unit 2514), to the financial institution, an indication of the respective communication method of the selected communication method affordance; and wherein the verification communication is based on the communication method affordance.

In some embodiments, the processing unit 2506 is further configured to: receive (e.g., with receiving unit 2510) a primary account number from the financial institution for use in authorizing payments from the payment account using the second electronic device, wherein the primary account number is different than the account number of the credit card; and assign (e.g., with assigning unit 2516) the primary account number to the respective device.

In some embodiments, an electronic wallet of the second electronic device includes payment account information for a second payment account associated with a user of the second electronic device, wherein the second payment account is distinct from the payment account.

In some embodiments, the processing unit 2506 is further configured to: receive (e.g., with receiving unit 2510), from the second electronic device, an indication that the second electronic device participated in a payment transaction using the linked payment account.

The operations described above with reference to FIG. 17 are, optionally, implemented by components depicted in FIGS. 1A-1B, FIG. 5B, or FIG. 25. For example, receiving operation 1702, initiating operation 1704, and displaying operation 1706 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

Figure 26:
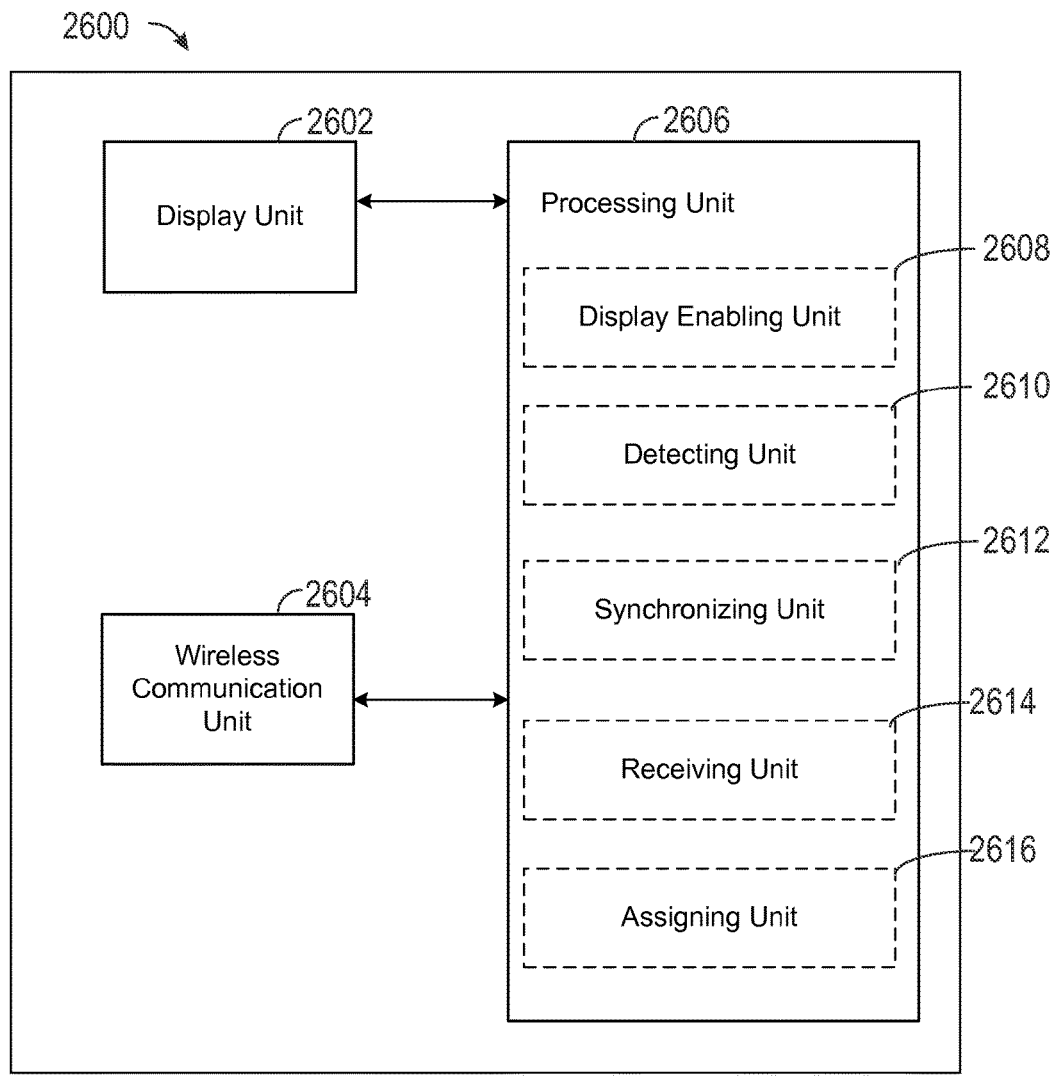

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, a first electronic device 2600 includes: a display unit 2602 and one or more wireless communication unit 2604, and a processing unit 6506 coupled to the display unit 2602 and the one or more wireless communication unit 2604.

The processing unit 2606 is configured to: enable display (e.g., with display enabling unit 2608), on the display unit 2602, of a payment-account user interface for a second electronic device that is associated with the first electronic device, wherein enabling display of the payment-account user interface includes enabling concurrent display of: a representation of a first payment account along with status information for the first payment account indicating that the first payment account is linked to the second electronic device and that the second electronic device is configured to enable payment using the first payment account; and a representation of a second payment account along with status information for the second payment account indicating that the second payment account is linked to the first electronic device but is not linked to the second electronic device.

In some embodiments, the status information for the first payment account further indicates that the first payment account is linked to the first electronic device.

In some embodiments, the payment-account user interface includes representations of one or more accounts that are associated with a user of the electronic device and that are not linked to the first electronic device and that are not linked to the second electronic device.

In some embodiments, the payment-account user interface includes a linking affordance associated with the second payment account, and wherein the processing unit 2606 is further configured to: detect (e.g., with detecting unit 2610) activation of the linking affordance; and in response to detecting activation of the linking affordance, enable display (e.g., with display enabling unit 2608), on the display unit 2602, of a user interface for linking the second payment account to the second electronic device including a synchronization option to synchronize payment notifications between the first electronic device and the second electronic device; and detect (e.g., with detecting unit 2610) activation of the synchronization option; and in response to detecting activation of the a synchronization option, synchronize (e.g., with synchronizing unit 2612) future payment notifications to be presented at both the first electronic device and the second electronic device.

In some embodiments, enabling display of the payment-account user interface includes enabling concurrent display of: a first group of a first plurality of representations of payment accounts that are linked to the second electronic device and not linked to the first electronic device; and a second group of a second plurality of representations of payment accounts that are linked to the first electronic device and not linked to the second electronic device.

In some embodiments, the payment-account user interface includes a linking affordance associated with the second payment account, and wherein the processing unit 2606 is further configured to: detect (e.g., with detecting unit 2610) activation of the linking affordance; in response to detecting activation of the linking affordance, enable display (e.g., with display enabling unit 2608), on the display unit 2602, of a user interface for linking the second payment account to the second electronic device; and while displaying, on the display unit 2602, the user interface for linking the second payment account to the second electronic device, receive (e.g., with receiving unit 2614) a request to initiate linking the second payment account to the second electronic device, wherein the request to initiate linking the second payment account to the second electronic device does not include an input of an account number of the second payment account.

In some embodiments, the payment-account user interface includes a second linking affordance associated with the first payment account, and wherein the first payment account is not linked to the first electronic device, and wherein the processing unit 2606 is further configured to: detect (e.g., with detecting unit 2610) activation of the second linking affordance; in response to detecting activation of the second linking affordance, enable display (e.g., with display enabling unit 2608), on the display unit 2602, of a user interface for linking the first payment account to the first electronic device; and while displaying, on the display unit 2602, the user interface for linking the first payment account to the first electronic device, receive (e.g., with receiving unit 2614) a request to initiate linking the first payment account to the first electronic device, wherein the request to initiate linking the first payment account to the first electronic device does not include an input of an account number of the first payment account.

In some embodiments, the first electronic device is a handheld device and the second electronic device is a wearable device.

In some embodiments, the first electronic device is a handheld device and the second electronic device a personal computing device that is larger than the first electronic device.

In some embodiments, the payment-account user interface for the second electronic device that is associated with the first electronic device further includes: a representation of a third payment account along with status information for the third payment account indicating that the third payment account is linked to a third electronic device and that the third electronic device is configured to enable payment using the third payment account, wherein the third electronic device is different from the first electronic device and the second electronic device.

The operations described above with reference to FIG. 19 are, optionally, implemented by components depicted in FIGS. 1A-1B, FIG. 5B, or FIG. 26. For example, displaying operation 1902 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or 5B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium comprising one or more programs for execution by one or more processors of an electronic device with a display and one or more wireless communication elements, the one or more programs including instructions for:

receiving an input requesting to enable the device for a payment transaction with a wireless payment terminal, wherein the request to enable the device for the payment transaction is an authorization from a user associated with a first payment account and a second payment account to use either the first payment account or the second payment account for the payment transaction with the wireless payment terminal;

in response to receiving the input, displaying, on the display, a payment indication that represents a plurality of payment accounts including the first payment account that was authorized for use for the payment transaction and the second payment account that was authorized for use for the payment transaction, wherein the payment indication was not displayed on the display prior to receiving the input requesting to enable the device for the payment transaction;

while displaying the payment indication that represents the plurality of payment accounts that have been authorized for use for the payment transaction, receiving, from the wireless payment terminal, via the one or more wireless communication elements, a request for account information corresponding to the payment transaction;

in response to receiving the request for account information corresponding to the payment transaction and without receiving further user input, automatically selecting and transmitting respective account information from the electronic device to the wireless payment terminal, including:

in accordance with a determination, by the electronic device, that payment criteria for the first payment account have been met, transmitting to the wireless payment terminal, via the one or more wireless communication elements, account information for the first payment account without transmitting account information for the second payment account; and in accordance with a determination, by the electronic device, that payment criteria for the second payment account have been met, transmitting to the wireless payment terminal, via the one or more wireless communication elements, account information for the second payment account without transmitting account information for the first payment account; and after automatically selecting and transmitting the respective account information to the wireless payment terminal, displaying, on the display, a graphical indication that the respective account information has been successfully transmitted to the wireless payment terminal.

2. The non-transitory computer-readable storage medium of claim 1, wherein the electronic device is configured to enable payment using one of a default payment account and a plurality of non-default payment accounts and further including instructions for:

in accordance with a determination, by the electronic device, that payment criteria have not been met for any of the non-default payment accounts, transmitting to the wireless payment terminal, via the one or more wireless communication elements, account information for the default payment account without transmitting account information for the non-default payment accounts.

3. The non-transitory computer-readable storage medium of claim 1, wherein the payment criteria includes a criterion based on a determination associated with a current location of the electronic device.

4. The non-transitory computer-readable storage medium of claim 1, wherein the payment criteria includes a criterion based on the request for account information corresponding to the payment transaction.

5. The non-transitory computer-readable storage medium of claim 1, wherein the payment indication that represents the plurality of payment accounts does not include an indication of the first payment account that was authorized for use for the payment transaction and does not include an indication of the second payment account that was authorized for use for the payment transaction.

6. The non-transitory computer-readable storage medium of claim 1, wherein the plurality of payment accounts only include payment accounts for which the electronic device has received user input activating selection based on location without requiring user input.

7. The non-transitory computer-readable storage medium of claim 1, wherein the plurality of payment accounts only include payment accounts for which a financial institution associated with the payment account has authorized the respective payment account for selection based on location without requiring user input.

8. The non-transitory computer-readable storage medium of claim 1, wherein a contextual-selection mode of operation in which the electronic device selects, based on context, which of the plurality of payment accounts to use for a payment transaction is represented as a selectable payment option.

9. The non-transitory computer-readable storage medium of claim 1, wherein the electronic device includes a touch-sensitive surface and further including instructions for:

receiving one or more inputs in a first direction;

in response to receiving the one or more inputs:

replacing, on the display, the payment indication that represents the plurality of payment accounts with a second visual indicator different from the payment indication that represents the plurality of payment accounts, wherein the second visual indicator identifies a third payment account that was authorized for use for the payment transaction different from the first payment account and the second payment account; and enabling the electronic device to participate in a transaction with a wireless payment terminal using the third payment account via the one or more wireless communication elements.

10. The non-transitory computer-readable storage medium of claim 1, wherein the payment indication that represents the plurality of payment accounts is different from visual indicators of individual payment accounts of the plurality of payment accounts.

11. A method, comprising:

at an electronic device with a display and one or more wireless communication elements:

receiving an input requesting to enable the device for a payment transaction with a wireless payment terminal, wherein the request to enable the device for the payment transaction is an authorization from a user associated with a first payment account and a second payment account to use either the first payment account or the second payment account for the payment transaction with the wireless payment terminal;

in response to receiving the input, displaying, on the display, a payment indication that represents a plurality of payment accounts including the first payment account that was authorized for use for the payment transaction and the second payment account that was authorized for use for the payment transaction, wherein the payment indication was not displayed on the display prior to receiving the input requesting to enable the device for the payment transaction;

while displaying the payment indication that represents the plurality of payment accounts that have been authorized for use for the payment transaction, receiving from the wireless payment terminal, via the one or more wireless communication elements, a request for account information corresponding to the payment transaction ;

in response to receiving the request for account information corresponding to the payment transaction and without receiving further user input, automatically selecting and transmitting respective account information from the electronic device to the wireless payment terminal, including:

in accordance with a determination, by the electronic device, that payment criteria for the first payment account have been met, transmitting to the wireless payment terminal, via the one or more wireless communication elements, account information for the first payment account without transmitting account information for the second payment account; and in accordance with a determination, by the electronic device, that payment criteria for the second payment account have been met, transmitting to the wireless payment terminal, via the one or more wireless communication elements, account information for the second payment account without transmitting account information for the first payment account; and after automatically selecting and transmitting the respective account information to the wireless payment terminal, displaying, on the display, a graphical indication that the respective account information has been successfully transmitted to the wireless payment terminal.

12. An electronic device comprising:
a display;
one or more wireless communication elements;
one or more processors; and
memory storing one or more programs, the one or more programs including instructions which, when executed by the one or more processors, cause the electronic device to:
receive an input requesting to enable the device for a payment transaction with a wireless payment terminal, wherein the request to enable the device for the payment transaction is an authorization from a user associated with a first payment account and a second payment account to use either the first payment account or the second payment account for the payment transaction with the wireless payment terminal;
in response to receiving the input, display, on the display, a payment indication that represents a plurality of payment accounts including the first payment account that was authorized for use for the payment transaction and the second payment account that was authorized for use for the payment transaction, wherein the payment indication was not displayed on the display prior to receiving the input requesting to enable the device for the payment transaction;
while causing the display of the payment indication that represents the plurality of payment accounts that have been authorized for user for the payment transaction, receive from the wireless payment terminal, via the one or more wireless communication elements, a request for account information corresponding to the payment transaction;
in response to receiving the request for account information corresponding to the payment transaction and without receiving further user input, automatically select and transmit respective account information from the electronic device to the wireless payment terminal, including:
in accordance with a determination, by the electronic device, that payment criteria for the first payment account have been met, transmit to the wireless payment terminal, via the one or more wireless communication elements, account information for the first payment account without transmitting account information for the second payment account; and
in accordance with a determination, by the electronic device, that payment criteria for the second payment account have been met, transmit to the wireless payment terminal, via the one or more wireless communication elements, account information for the second payment account without transmitting account information for the first payment account; and
after automatically selecting and transmitting the respective account information to the wireless payment terminal, display, on the display, a graphical indication that the respective account information has been successfully transmitted to the wireless payment terminal.

13. The non-transitory computer-readable storage medium of claim 1, wherein the authorization from the user is authenticated by the electronic device.

14. The non-transitory computer-readable storage medium of claim 1, wherein the authorization from the user is biometrically authenticated by the electronic device.

15. The non-transitory computer-readable storage medium of claim 1, wherein the electronic device includes a secure element and the account information corresponding to the payment transaction is retrieved from the secure element.

16. The method of claim 11, wherein the electronic device is configured to enable payment using one of a default payment account and a plurality of non-default payment accounts, the method further comprising:
in accordance with a determination, by the electronic device, that payment criteria have not been met for any of the non-default payment accounts, transmitting to the wireless payment terminal, via the one or more wireless communication elements, account information for the default payment account without transmitting account information for the non-default payment accounts.

17. The method of claim 11, wherein the payment criteria includes a criterion based on a determination associated with a current location of the electronic device.

18. The method of claim 11, wherein the payment criteria includes a criterion based on the request for account information corresponding to the payment transaction.

19. The method of claim 11, wherein the payment indication that represents the plurality of payment accounts does not include an indication of the first payment account that was authorized for use for the payment transaction and does not include an indication of the second payment account that was authorized for use for the payment transaction.

20. The method of claim 11, wherein the plurality of payment accounts only include payment accounts for which the electronic device has received user input activating selection based on location without requiring user input.

21. The method of claim 11, wherein the plurality of payment accounts only include payment accounts for which a financial institution associated with the payment account has authorized the respective payment account for selection based on location without requiring user input.

22. The method of claim 11, wherein a contextual-selection mode of operation in which the electronic device selects, based on context, which of the plurality of payment accounts to use for a payment transaction is represented as a selectable payment option.

23. The method of claim 11, wherein the electronic device includes a touch-sensitive surface and further comprising:
receiving one or more inputs in a first direction;
in response to receiving the one or more inputs:
replacing, on the display, the payment indication that represents the plurality of payment accounts with a second visual indicator different from the payment indication that represents the plurality of payment accounts, wherein the second visual indicator identifies a third payment account that was authorized for use for the payment transaction different from the first payment account and the second payment account; and
enabling the electronic device to participate in a transaction with a wireless payment terminal using the third payment account via the one or more wireless communication elements.

24. The method of claim 11, wherein the payment indication that represents the plurality of payment accounts is different from visual indicators of individual payment accounts of the plurality of payment accounts.

25. The method of claim 11, wherein the authorization from the user is authenticated by the electronic device.

26. The method of claim 11, wherein the authorization from the user is biometrically authenticated by the electronic device.

27. The method of claim 11, wherein the electronic device includes a secure element and the account information corresponding to the payment transaction is retrieved from the secure element.

28. The electronic device of claim 12, wherein the electronic device is configured to enable payment using one of a default payment account and a plurality of non-default payment accounts, the one or more processors further configured to:
  in accordance with a determination, by the electronic device, that payment criteria have not been met for any of the non-default payment accounts, transmit to the wireless payment terminal, via the one or more wireless communication elements, account information for the default payment account without transmitting account information for the non-default payment accounts.

29. The electronic device of claim 12, wherein the payment criteria includes a criterion based on a determination associated with a current location of the electronic device.

30. The electronic device of claim 12, wherein the payment criteria includes a criterion based on the request for account information corresponding to the payment transaction.

31. The electronic device of claim 12, wherein the payment indication that represents the plurality of payment accounts does not include an indication of the first payment account that was authorized for use for the payment transaction and does not include an indication of the second payment account that was authorized for use for the payment transaction.

32. The electronic device of claim 12, wherein the plurality of payment accounts only include payment accounts for which the electronic device has received user input activating selection based on location without requiring user input.

33. The electronic device of claim 12, wherein the plurality of payment accounts only include payment accounts for which a financial institution associated with the payment account has authorized the respective payment account for selection based on location without requiring user input.

34. The electronic device of claim 12, wherein a contextual-selection mode of operation in which the electronic device selects, based on context, which of the plurality of payment accounts to use for a payment transaction is represented as a selectable payment option.

35. The electronic device of claim 12, wherein the electronic device includes a touch-sensitive surface and the one or more processors further configured to:
  receive one or more inputs in a first direction;
  in response to receiving the one or more inputs:
    replace, on the display, the payment indication that represents the plurality of payment accounts with a second visual indicator different from the payment indication that represents the plurality of payment accounts, wherein the second visual indicator identifies a third payment account that was authorized for use for the payment transaction different from the first payment account and the second payment account; and
    enable the electronic device to participate in a transaction with a wireless payment terminal using the third payment account via the one or more wireless communication elements.

36. The electronic device of claim 12, wherein the payment indication that represents the plurality of payment accounts is different from visual indicators of individual payment accounts of the plurality of payment accounts.

37. The electronic device of claim 12, wherein the authorization from the user is authenticated by the electronic device.

38. The electronic device of claim 12, wherein the authorization from the user is biometrically authenticated by the electronic device.

39. The electronic device of claim 12, wherein the electronic device includes a secure element and the account information corresponding to the payment transaction is retrieved from the secure element.

* * * * *